United States Patent

Takashima

(10) Patent No.: US 8,458,479 B2
(45) Date of Patent: Jun. 4, 2013

(54) VERIFICATION APPARATUS

(75) Inventor: Katsuyuki Takashima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 461 days.

(21) Appl. No.: 12/809,440

(22) PCT Filed: Feb. 20, 2008

(86) PCT No.: PCT/JP2008/052884
§ 371 (c)(1),
(2), (4) Date: Jun. 18, 2010

(87) PCT Pub. No.: WO2009/104260
PCT Pub. Date: Aug. 27, 2009

(65) Prior Publication Data
US 2010/0275028 A1 Oct. 28, 2010

(51) Int. Cl.
*H04L 9/32* (2006.01)
(52) U.S. Cl.
USPC .............. 713/176; 380/28; 380/30; 380/44; 714/758; 714/800
(58) Field of Classification Search
USPC ........................................................ 713/176
See application file for complete search history.

(56) References Cited

U.S. PATENT DOCUMENTS

| | | | |
|---|---|---|---|
| 5,497,423 A * | 3/1996 | Miyaji | 380/30 |
| 6,295,359 B1 * | 9/2001 | Cordery et al. | 380/44 |
| 6,795,553 B1 * | 9/2004 | Kobayashi et al. | 380/28 |
| 7,023,990 B1 * | 4/2006 | Arita | 380/28 |
| 7,110,538 B2 | 9/2006 | Gallant et al. | |

(Continued)

FOREIGN PATENT DOCUMENTS

| | | |
|---|---|---|
| JP | 2002 215023 | 7/2002 |
| JP | 2003 216027 | 7/2003 |

(Continued)

OTHER PUBLICATIONS

Richard A. Mollin; Mathematical Basics, An Introduction to Cryptography, Second Edition, Sep. 18, 2006 by Chapman and Hall/CRC—413 Pages.*

(Continued)

*Primary Examiner* — Carl Colin
*Assistant Examiner* — Syed Zaidi
(74) *Attorney, Agent, or Firm* — Oblon, Spivak, McClelland, Maier & Neustadt, L.L.P.

(57) ABSTRACT

An integer partitioning unit inputs an order p of a finite group G and an integer e, and calculates an integer $e_1$ and an integer $e_2$ that satisfy $e_1 \cdot e \equiv e_2 \pmod{p}$ based on the order p of the finite group G and the integer e which are input. A verification value calculation unit inputs an element s of the finite group G and an element h of the finite group G, and calculates an element $a$ ($=e_1 \cdot h - e_2 \cdot s$) of the finite group G based on the element s and the element h which are input and the integer $e_1$ and the integer $e_2$ which are calculated by the integer partitioning unit in the integer partitioning process. A verification judging unit judges, based on the element a calculated by the verification value calculation unit, whether or not the element a is an identity element O of the finite group G. Hence, whether or not $h = e \cdot s$ is judged at high speed.

19 Claims, 37 Drawing Sheets

U.S. PATENT DOCUMENTS

| | | | |
|---|---|---|---|
| 7,200,225 B1* | 4/2007 | Schroeppel | 380/28 |
| 2002/0044649 A1* | 4/2002 | Gallant et al. | 380/30 |
| 2002/0095452 A1* | 7/2002 | Perkins | 708/650 |
| 2003/0072443 A1* | 4/2003 | Harley et al. | 380/30 |
| 2003/0076954 A1* | 4/2003 | Vanstone et al. | 380/28 |
| 2004/0059984 A1* | 3/2004 | Cavanna et al. | 714/758 |
| 2004/0078407 A1* | 4/2004 | Naslund et al. | 708/492 |
| 2005/0149840 A1* | 7/2005 | Lee et al. | 714/800 |
| 2005/0262353 A1* | 11/2005 | Gentry et al. | 713/176 |
| 2006/0072743 A1* | 4/2006 | Naslund et al. | 380/28 |
| 2008/0080710 A1* | 4/2008 | Harley et al. | 380/44 |
| 2009/0285386 A1 | 11/2009 | Takashima | |
| 2010/0104094 A1 | 4/2010 | Takashima | |

FOREIGN PATENT DOCUMENTS

| | | |
|---|---|---|
| JP | 2004 201124 | 7/2004 |
| JP | 2005 173301 | 6/2005 |
| WO | 00 39668 | 7/2000 |

OTHER PUBLICATIONS

Sheueling Chang Shantz. 2001. From Euclid's GCD to Montgomery Multiplication to the Great Divide. Technical Report. Sun Microsystems, Inc., Mountain View, CA, USA.*

Darrel Hankerson, Scott Vanstone and Alfred Menezes; "Chapter 5: Implementation Issues", Guide to Elliptic Curve Cryptography, Springer Professional Computing, 2004, 205-256.*

Darrel Hankerson, Scott Vanstone and Alfred Menezes; "Chapter 2: Finite Arithmetic", Guide to Elliptic Curve Cryptography, Springer Professional Computing, 2004, 25-73.*

Darrel Hankerson, Scott Vanstone and Alfred Menezes; "Chapter 3: Elliptic Curve Arithmetic", Guide to Elliptic Curve Cryptography, Springer Professional Computing, 2004, 75-152.*

Darrel Hankerson, Scott Vanstone and Alfred Menezes; "Chapter 1: Introduction and Overview", Guide to Elliptic Curve Cryptography, Springer Professional Computing, 2004, 1-23.*

R. L. Rivest, A. Shamir, and L. Adleman. 1978. A method for obtaining digital signatures and public-key cryptosystems. Commun. ACM 21, 2 (Feb. 1978).*

Sakai, Yasuyuki et al., "Development of Cryptographic Module Vertification Tool", Information-Technology Promotion Agency, Japan : Security Center, (Apr. 8, 2005), http://www.ipa.go.jp/security/fy16/development/crypt_module/index.html, (with partial English translation).

Gallant, P. Robert et al., "Faster Point Multiplication on Elliptic Curves with Efficient Endomorphisms", Crypto 2001, LNCS, vol. 2139, pp. 190-200, (2001).

"18033-2: Information Technology—Security techniques—Encryption algorithms—Part 2: Asymmetric ciphers", ISO/IEC 18033-2, (May 1, 2006).

Cramer, Ronald et al., "Design and Analysis of Practical Public-Key Encryption Schemes Secure against Adaptive Chosen Ciphertext Attack", Cryptology Eprint Archive, (2001).

Boneh, Dan et al., "Efficient Selective-ID Secure Identify Based Encryption Without Random Oracles", Eurocrypt 2004, LNCS, vol. 3027, pp. 223-238, (Sep. 2004).

Boyen, Xavier "The BB, Identity-Based Cryptosystem: A Standard for Encryption and Key Encapsulation", Submissions for IEEE P1363.3, 12 pages, (Aug. 14, 2006).

Barbosa, M. et al., "SK-KEM: An Identity-Based KEM" Submissions for IEEE P1363.3, 20 pages, (Jun. 7, 2006).

Bellare, Mihir et al., "Security Proofs for Identity-Based Identification and Signature Schemes", Eurocrypt 2004, LNCS, vol. 3027, 27 pages, (2004).

* cited by examiner

VERIFICATION APPARATUS

TECHNICAL FIELD

The present invention relates to a verification apparatus that verifies the consistency of a ciphertext or the like in a cryptographic system such as a public key cryptographic system.

BACKGROUND ART

A cryptographic system is available which employs a finite group such as a group formed of the residue classes of integers under multiplication or a group formed of points on an elliptic curve.
In the cryptographic system employing the finite group, it may be judged whether or not $h=e \cdot s$ (when group operation of the finite group is described additively) or $h=s^e$ (when group operation of the finite group is described multiplicatively) based on elements h and s of the finite group and an integer e in order to verify, for example, the consistency of a ciphertext.
Patent Document 1: JP 2004-201124
Patent Document 2: WO00/39668
Patent Document 3: U.S. Pat. No. 7,110,538
Non-Patent Document 1: R. P. Gallant, R. J. Lambert, S. A. Vanstone, "Faster Point Multiplication on Elliptic Curves with Efficient Endomorphisms", Crypto 2001, LNCS 2139, pp. 190 to 200, 2001
Non-Patent Document 2: "18033-2: Information Technology-Security techniques-Encryption algorithms-Part 2: Asymmetric ciphers", ISO/IEC 18033-2, 2006
Non-Patent Document 3: R. Cramer, V. Shoup, "Design and Analysis of Practical Public-Key Encryption Schemes secure against Adaptive Chosn Ciphertext Attack" Cryptology ePrint Archive, http://eprint.iacr.org, 2001
Non-Patent Document 4: D. Boneh, X. Boyen, "Efficient Selective-ID Secure Identity Based Encryption Without Random Oracle" EUROCRYPT 2004, LNCS 3027, pp. 223 to 238, 2004
Non-Patent Document 5: X. Boyen, "The BB1 Identity-Based Cryptosystem: A Standard for Encryption and Key Encapsulation", Submissions for IEEE P1363.3, http://grouper.ieee.org/groups/1363/IBC/submissions/index.html, 2006
Non-Patent Document 6: M. Barbosa, L. Chen, Z. Cheng, M. Chimley, A. Dent, P. Farshim, K. Harrison, J. Malone-Lee, N. P. Smart, F. Vercauteren, "SK-KEM: An Identity-Based KEM", Submissions for IEEE P1363.3, http://grouper.ieee.org/groups/1363/IBC/submissions/index.html
Non-Patent Document 7: M. Bellare, C. Namprempre, G. Neven, "Security Proofs for Identity-Based Identification and Signature Schemes", EUROCRYPT 2004, LNCS 3027, 2004

DISCLOSURE OF THE INVENTION

Problems to be Solved by the Invention

The finite group employed in the cryptographic system has a very large order. It may take a long period of time for a processing device such as a computer to perform one group operation.

The present invention has been made to solve, for example, the above problem, and has as its object to judge at a high speed whether or not $h=s \cdot e$ using a processing device such as a computer.

Means to Solve the Problem

A verification apparatus according to the present invention comprises
a processing device which processes data, an integer partitioning unit, a verification value calculation unit, and a verification judging unit,
using the processing device, the integer partitioning unit inputs an order p of a finite group G and an integer e, and calculates an integer $e_1$ and an integer $e_2$ that satisfy $e_1 \cdot e \equiv e_2 \pmod{p}$ based on the order p and the integer e which are input,
using the processing device, the verification value calculation unit inputs an element s of the finite group G and an element h of the finite group G, and calculates an element a $(=e_1 \cdot h - e_2 \cdot s)$ of the finite group G based on the element s and the element h which are input and the integer $e_1$ and the integer $e_2$ which are calculated by the integer partitioning unit, and
the verification judging unit judges, using the processing device and based on the element a calculated by the verification value calculation unit, that verification is successful when the element a is an identity element of the finite group G.
In the verification apparatus according to the present invention, the integer partitioning unit calculates, using the processing device, the integer $e_1$ and the integer $e_2$ that satisfy a condition that an absolute value of the integer $e_1$ is smaller than a square root of the order p and that the integer $e_2$ is smaller than a square root of the order p.
The verification apparatus according to the present invention further comprises a storage device which stores data,
the integer partitioning unit has a first remainder storage unit, a second remainder storage unit, an initial value setting unit, a conformity judging unit, a third remainder calculation unit, and a partitioned integer output unit,
the first remainder storage unit stores an integer $v_1$ using the storage device,
the second remainder storage unit stores an integer $v_2$ using the storage device,
the initial value setting unit causes, using the processing device, the first remainder storage unit to store the order p as the integer $v_1$, and the second remainder storage unit to store the integer e as the integer $v_2$,
the conformity judging unit judges, using the processing device, that the output condition is satisfied when the integer $v_2$ stored by the second remainder storage unit is smaller than the square root of the order p,
when the conformity judging unit does not judge that the output condition is satisfied, the third remainder calculation unit calculates, using the processing device and based on the integer $v_1$ stored by the first remainder storage unit and the integer $v_2$ stored by the second remainder storage unit, a remainder obtained when the integer $v_1$ is divided by the integer $v_2$, and treats the remainder as an integer $v_3$, causes the first remainder storage unit to store the integer $v_2$ stored by the second remainder storage unit as the integer $v_1$, and causes the second remainder storage unit to store the integer $v_3$ calculated as the integer $v_2$, and
when the conformity judging unit judges that the output condition is satisfied, the partitioned integer output unit outputs, using the processing device, the integer $v_2$ stored by the second remainder storage unit as the integer $e_2$.

In the verification apparatus according to the present invention,
the integer partitioning unit further comprises a first coefficient storage unit, a second coefficient storage unit, a quotient calculation unit, and a third coefficient calculation unit,
the first coefficient storage unit stores an integer $t_1$ using the storage device,
the second coefficient storage unit stores an integer $t_2$ using the storage device,
the initial value setting unit, using the processing device, further causes the first coefficient storage unit to store 0 as the integer $t_1$, and the second coefficient storage unit to store 1 as the integer $t_2$,
the quotient calculation unit, using the processing device and based on the integer $v_1$ stored by the first remainder storage unit and the integer $v_2$ stored by the second remainder storage unit, calculates a maximum integer that does not exceed a quotient obtained when the integer $v_1$ is divided by the integer $v_2$, and treats the integer calculated as an integer q,
when the conformity judging unit does not judge that the output condition is satisfied, the third coefficient calculation unit calculates, using the processing device and based on the integer $t_1$ stored by the first coefficient storage unit, the integer $t_2$ stored by the second coefficient storage unit, and the integer q calculated by the quotient calculation unit, an integer obtained by subtracting a product of the integer $t_2$ and the integer q from the integer $t_1$ and treats the integer calculated as an integer $t_3$, causes the first coefficient storage unit to store the integer $t_2$ stored by the second coefficient storage unit as the integer $t_1$, and causes the second coefficient storage unit to store the integer $t_3$ calculated as the integer $t_2$, and
using the processing device, when the conformity judging unit judges that the output condition is satisfied, the partitioned integer output unit further outputs the integer $t_2$ stored by the second coefficient storage unit as the integer $e_1$.

In the verification apparatus according to the present invention,
the verification value calculation unit calculates $\Sigma(n^i \cdot P_i)$ using the processing device (where n is a predetermined integer not less than 2, i is an integer not less than 0 and not more than k, k is a maximum value of numbers of digits of an absolute value of the integer $e_1$ and of the integer $e_2$, both expressed in base-n notation, $P_i$ is an element of the finite group G and satisfies $P_i = e_{1,sgn} \cdot e_{1,i} \cdot h - e_{2,i} \cdot s$, $e_{1,sgn}$ is one of 1 and $-1$, and $e_{1,i}$ and $e_{2,i}$ are integers each not less than 0 and not more than $n-1$ and satisfying $e_1 = e_{1,sgn} \cdot \Sigma(n^i \cdot e_{1,i})$ and $e_2 = \Sigma(n^i \cdot e_{2,i})$), and treats the value calculated as the element a of the finite group G.

A ciphertext decryption apparatus according to the present invention comprises a storage device which stores data, a processing device which processes data, a key storage unit, a ciphertext input unit, a ciphertext verification unit, a verification apparatus according to claim 1, and a decrypted text generating unit,
the key storage unit stores, using the storage device, a key for decrypting a ciphertext,
the ciphertext input unit inputs, using the processing device, the ciphertext,
the ciphertext verification unit calculates, using the processing device, an integer e, an element s of the finite group G, and an element h of the finite group G, which are to be input by the verification apparatus, based on the key stored by the key storage unit and the ciphertext input by the ciphertext input unit,
the verification apparatus inputs the integer e, the element s of the finite group G, and the element h of the finite group G, which are calculated by the ciphertext verification unit, and judges whether or not verification is successful, and
when the verification apparatus judges that the verification is successful, the decrypted text generating unit decrypts, using the processing device, the ciphertext input by the ciphertext input unit using the key stored by the key storage unit, to generate a decrypted text.

The ciphertext decryption apparatus according to the present invention further comprises an encryption parameter storage unit, an identifier storage unit, an identifier element calculation unit, and an identifier element storage unit,
using the storage device, the encryption parameter storage unit stores an order p of the finite group G, a generator $g_1$ of the finite group G, and an element R of the finite group G,
using the storage device, the identifier storage unit stores a bit string ID that identifies the ciphertext decryption apparatus,
using the processing device, based on the bit string ID stored by the identifier storage unit, the identifier element calculation unit calculates a hash value which is obtained when the bit string ID is hashed by a predetermined hash function $H_1$, and treats the hash value calculated as an integer $H_1(ID)$, and based on the generator $g_1$ stored by the encryption parameter storage unit, the element R stored by the encryption parameter storage unit, and the integer $H_1(ID)$ calculated, the identifier element calculation unit adds the element R to an element which is obtained when the generator $g_1$ is multiplied by the integer $H_1(ID)$, and treats a result as an element $Q (= R + H_1(ID) \cdot g_1)$ of the finite group G,
using the storage device, the identifier element storage unit stores the element Q calculated by the identifier element calculation unit,
using the storage device, the key storage unit stores an element $D_{ID}$ of finite group $G_2$,
using the processing device, the ciphertext input unit inputs an element U of the finite group G and a bit string V as a ciphertext,
the ciphertext verification unit has the pairing value calculation unit, a bit string calculation unit, and an integer calculation unit,
using the processing device and based on the element U input by the ciphertext input unit and the element $D_{ID}$ stored by the key storage unit, the pairing value calculation unit calculates a pairing value of the element U and element $D_{ID}$ by a predetermined pairing function e, and treats the pairing value calculated as a pairing value $\alpha (= e(U, D_{ID}))$,
using the processing device, based on the pairing value $\alpha$ calculated by the pairing value calculation unit, the bit string calculation unit calculates a hash value which is obtained when the pairing value $\alpha$ is hashed by a predetermined hash function $H_2$, and treats the hash value calculated as a bit string $H_2(\alpha)$, and based on the bit string V input by the ciphertext input unit and the bit string $H_2(\alpha)$ calculated, the bit string calculation unit obtains an exclusive OR of the bit string V and the bit string $H_2(\alpha)$, and treats the exclusive OR obtained as a bit string m (=V XOR $H_2(\alpha)$), using the processing device and based on the bit string m calculated by the bit string calculation unit, the integer calculation unit calculates a hash value which is obtained when the bit string m is hashed by a predetermined hash function $H_3$, and treats the hash value calculated as an integer r (=$H_3$(m)), the verification apparatus inputs an order p stored by the encryption parameter storage unit as the order p, the integer r calculated by the integer calculation unit as the integer e, the element Q stored by the identifier element storage unit as the element s, and the element U input by the ciphertext input unit as the element h, and judges whether or not verification is successful, and when the verification apparatus judges that the verification is successful, the decrypted text generating unit, using the processing device, calculates, based on the bit string m calculated by the bit string calculation unit, a hash value which is obtained when the bit string m is hashed by a predetermined hash function $H_4$, and treats the hash value calculated as a common key K (=$H_4$(m)), and outputs the common key K calculated as the decrypted text.

In the ciphertext decryption apparatus according to the present invention, the identifier element calculation unit calculates the element Q before the ciphertext input unit inputs the ciphertext.

The ciphertext decryption apparatus according to the present invention further comprises a common key storage unit, an encrypted message input unit, and a message decryption unit, using the storage device, the common key storage unit stores the common key K output by the decrypted text generating unit, using the processing device, the encrypted message input unit inputs an encrypted message, and using the processing device, the message decryption unit decrypts the encrypted message input by the encrypted message input unit by means of the common key K stored by the common key storage unit.

The ciphertext decryption apparatus according to the present invention further comprises an encryption parameter storage unit, using the storage device, the encryption parameter storage unit stores the order p of the finite group G, using the storage device, the key storage unit stores an integer w not less than 1 and not more than p−1, an integer x not less than 1 and not more than p−1, an integer y not less than 1 and not more than p−1, and an integer z not less than 1 and not more than p−1, using the processing device, the ciphertext input unit inputs an element u of the finite group G, an element u' of the finite group G, and an element v of the finite group G, as the ciphertext, the ciphertext verification unit has a hash value calculation unit and an integer calculation unit, using the processing device and based on the element u and element u' input by the ciphertext input unit, the hash value calculation unit calculates a hash value which is obtained when the element u and the element u' are hashed by a predetermined hash function H, and treats the hash value calculated as an integer $\alpha$ (=H(u,u')), using the processing device, and based on the order p stored by the encryption parameter storage unit, the integer x and integer y stored by the key storage unit, and the integer $\alpha$ calculated by the hash value calculation unit, the integer calculation unit calculates a remainder which is obtained when a sum of the integer x and a product of the integer y and integer $\alpha$ is divided by the order p, and treats the remainder calculated as an integer t (=(x+y·$\alpha$) mod p), the verification apparatus inputs the order p stored by the encryption parameter storage unit as the order p, the integer w stored by the key storage unit as the integer e, the element u input by the ciphertext input unit as the element s, and the element u' input by the ciphertext input unit as the element h, judges whether or not the verification is successful, and treats a judgment result as a first verification result, and the verification apparatus inputs the order p stored by the encryption parameter storage unit, the integer t stored by the integer calculation unit as the integer e, the element u input by the ciphertext input unit as the element s, and the element v input by the ciphertext input unit as the element h, judges whether or not the verification is successful, and treats a judgment result as a second verification result, and when both the first verification result and the second verification result show that the verification apparatus judges the verification successful, using the processing device, based on the integer z stored by the key storage unit and the element u input by the ciphertext input unit, the decrypted text generating unit adds z times the element u, and treats a result as the element h (=z·u) of the finite group G, and based on the element u input by the ciphertext input unit and an element h~ calculated, the decrypted text generating unit generates the common key K (=KDF(u,h~)) from the element u and the element h~ by a predetermined key derivation function KDF, and outputs the common key K generated as the decrypted text.

The ciphertext decryption apparatus according to the present invention further comprises a common key storage unit, an encrypted message input unit, and a message decryption unit, using the storage device, the common key storage unit stores the common key K output by the decrypted text generating unit, using the processing device, the encrypted message input unit inputs an encrypted message, and using the processing device and by means of the common key K stored by the common key storage unit, the message decryption unit decrypts the encrypted message input by the encrypted message input unit.

The ciphertext decryption apparatus according to the present invention further comprises an encryption parameter storage unit, using the storage device, the encryption parameter storage unit stores an order p of an additive group $G_1$, a generator g of the additive group $G_1$, and an element $v_0$ of a multiplicative group $G_T$ whose order is the order p, using the storage device, the key storage unit stores an element $d_0$ of an additive group $G_2$ whose order is the order p, and an element $d_1$ of the additive group $G_2$, using the processing device, the ciphertext input unit inputs a bit string c, an element $c_0$ of the additive group $G_1$, an element $c_1$ of the additive group $G_1$, and an integer t not less than 1 and not more than p−1, as the ciphertext, the ciphertext verification unit has a pairing value calculation unit and an integer calculation unit, using the processing device, based on the element $c_0$ input by the ciphertext input unit and the element $d_0$ stored by the secret key storage unit, the pairing value calculation unit calculates a pairing value of the element $c_0$ and element $d_0$ by a predetermined pairing function e, and treats the value calculated as an element $k_0$ $(=e(c_0, d_0))$ of the multiplicative group $G_T$, based on the element $c_1$ input by the ciphertext input unit and the element $d_1$ stored by the secret key storage unit, the pairing value calculation unit calculates a pairing value of the element $c_1$ and element $d_1$ by the pairing function e, and treats the value calculated as an element $k_1$ $(=e(c_1, d_1))$ of the multiplicative group $G_T$, and based on the element $k_0$ calculated and the element $k_1$ calculated, the pairing value calculation unit divides the element $k_0$ by the element $k_1$, and treats an element obtained as an element k $(=k_0/k_1)$ of the multiplicative group $G_T$, using the processing device, based on the element k calculated by the pairing value calculation unit, and the bit string c, element $c_0$, and element $c_1$ input by the ciphertext input unit, the integer calculation unit calculates a hash value which is obtained when the element k, bit string c, element $c_0$, and element $c_1$ are hashed by a predetermined hash function H'', and treats a value calculated as an integer $H''(k,c,c_0,c_1)$, and based on the integer t input by the ciphertext input unit, the integer $H''(k,c,c_0,c_1)$ calculated, and the order p stored by the encryption parameter storage unit, the integer calculation unit calculates a remainder which is obtained when an integer obtained by subtracting the integer $H''(k,c,c_0,c_1)$ from the integer t is divided by the order p, and treats the remainder calculated as an integer s $(=t-H''(k,c,c_0,c_1) \bmod p)$, the verification apparatus treats the additive group $G_1$ as the finite group G, and inputs the order p stored by the encryption parameter storage unit, as the order p, the integer s calculated by the integer calculation unit, as the integer e, the generator g stored by the encryption parameter storage unit, as the element s, and the element $c_0$ input by the ciphertext input unit, as the element h, the verification apparatus judges whether or not the verification is successful, and treats a result as a first verification result, the verification apparatus treats the multiplicative group $G_T$ as the finite group G, and inputs the order p stored by the encryption parameter storage unit, as the order p, the integer s calculated by the integer calculation unit, as the integer e, the element $v_0$ stored by the encryption parameter storage unit, as the element s, and the element k calculated by the pairing value calculation unit, as the element h, and the verification apparatus judges whether or not the verification is successful, and treats a result as a second verification result, and when both the first verification result and the second verification result show that the verification apparatus judges the verification successful, using the processing device, based on the element k calculated by the pairing value calculation unit, the decrypted text generating unit calculates a hash value which is obtained when the element k is hashed by a hash function H', and treats the value calculated as a bit string H'(k), based on the bit string c input by the ciphertext input unit and the bit string H'(k) calculated, the decrypted text generating unit obtains an exclusive OR of the bit string c and the hash value H'(k), and treats a result as a bit string M' $(=c \text{ XOR } H'(k))$, and the decrypted text generating unit outputs the calculated bit string M' as the decrypted text.

A signature verification apparatus according to the present invention comprises a processing device which processes data, a message input unit, a signature input unit, a signature verification unit, a verification apparatus and a verification result output unit, using the processing device, the message input unit inputs a message, using the processing device, the signature input unit inputs a signature for the message input by the message input unit, using the processing device and based on the message input by the message input unit and the signature input by the signature input unit, the signature verification unit calculates an integer e, an element s of the finite group G, and an element h of the finite group G, which are to be input to the verification apparatus, the verification apparatus inputs the integer e, the element s of the finite group G, and the element h of the finite group G, which are calculated by the signature verification unit, and judges whether or not verification is successful, and using the processing device and based on a verification result of the verification apparatus, the verification result output unit outputs a verification result indicating whether or not the verification is successful.

The signature verification apparatus according to the present invention further comprises a storage device which stores data, an encryption parameter storage unit, and an identifier storage unit, using the storage device, the encryption parameter storage unit stores an order p of the finite group G, a generator g of the finite group G, and an element X of the finite group G, using the storage device, the identifier storage unit stores a bit string ID that identifies a signature apparatus, using the processing device, the message input unit inputs a bit string M as the message, using the processing device, the signature input unit inputs an element R of the finite group G, an element S of the finite group G, an element Y of the finite group G, and an integer z not less than 1 and not more than p−1, as the signature, the signature verification unit has an integer calculation unit, a verification element calculation unit, a challenge calculation unit, and a first verification unit, using the processing device and based on the element R input by the signature input unit and the bit string ID stored by the identifier storage unit, the integer calculation unit calculates a hash value which is obtained when the element R and the bit string ID are hashed by a predetermined hash function H, and treats the value calculated as an integer h $(=H(R,ID))$, using the processing device and based on the element R and element S input by the signature input unit, the verification element calculation unit adds the element S and an inverse element of the element R, and treats a sum as an element R' $(=S-R)$ of the finite group G, using the processing device and based on the bit string ID stored by the identifier storage unit, the element R, element S, and element Y input by the signature input unit, and the bit string M input by the message input unit, the challenge calculation unit calculates a hash value which is obtained when the bit string ID, the element R, the element S, the element Y, and the bit string M are hashed by a predetermined hash function H', and treats the value calculated as an integer c $(=H'(I,R,S,Y,M))$, using the processing device and based on the generator g stored by the encryption parameter storage unit, the element S, element Y, and integer z input by the signature input unit, and the integer c calculated by the challenge calculation unit, the first verification unit judges whether or not an element Y+c·S, obtained by adding the element Y and an element c·S which is obtained when the element S is added a number of times of the integer c, is equal to an element z·g obtained when the generator g is added a number of times of the integer z, and when the element Y+c·S and the element z·g are equal, the first verification unit judges that the verification is successful, and treats a judgment result as a first verification result, the verification apparatus inputs an order p stored by the encryption parameter storage unit, as the order p, the integer h calculated by the integer calculation unit, as the integer e, the element X stored by the encryption parameter storage unit, as the element s, and the element R' calculated by the verification element calculation unit, as the element h, judges whether or not the verification is successful, and treats a judgment result as a second verification result, and using the processing device and based on the first verification result of the verification by the first verification unit and the second verification result of the verification by the verification apparatus, when both the first verification result and the second verification result show that the verification is judged successful, the verification result output unit outputs a verification result indicating that the verification is successful.

An authentication apparatus according to the present invention comprises a processing device which processes data, a transmission device which transmits data, a reception device which receives data, an authentication request reception unit, a question transmission unit, a response reception unit, a signature verification unit, a verification apparatus, and an authentication result output unit, using the reception device, the authentication request reception unit receives an authentication request message, using the transmission device, the question transmission unit transmits a question message as a response to the authentication request message received by the authentication request reception unit, using the reception device, the response reception unit receives the response message to the question message transmitted, using the processing device and based on the authentication request message received by the authentication request reception unit and the response message received by the response reception unit, the signature verification unit calculates an integer e, an element s of the finite group G, and an element h of the finite group G which are to be input to the verification apparatus, the verification apparatus inputs the integer e, the element s of the finite group G, and the element h of the finite group G which are calculated by the signature verification unit, and judges whether or not verification is successful, and using the processing device and based on a verification result of the verification apparatus, the authentication result output unit outputs an authentication result indicating whether or not the verification is successful.

The authentication apparatus further comprises a storage device which stores data, an encryption parameter storage unit, an identifier storage unit, and a challenge generating unit, using the storage device, the encryption parameter storage unit stores an order p of the finite group G, a generator g of the finite group G, and an element X of the finite group G, using the storage device, the identifier storage unit stores a bit string ID which identifies a proving apparatus, using the reception device, the authentication request reception unit receives an element R of the finite group G, an element S of the finite group G, and an element Y of the finite group G from the proving apparatus as the authentication request message, using the processing device, the challenge generating unit randomly generates an integer c not less than 1 and not more than p−1, using the transmission device, the question transmission unit transmits the integer c generated by the challenge generating unit to the proving apparatus as the question message, using the reception device, the response reception unit receives an integer z not less than 1 and not more than p−1 from the proving apparatus as the response message, the signature verification unit has an integer calculation unit, a verification element calculation unit, and a first verification unit, using the processing device and based on the element R received by the authentication request reception unit and the bit string ID stored by the identifier storage unit, the integer calculation unit calculates a hash value which is obtained when the element R and the bit string ID are hashed by a predetermined hash function H, and treats the hash value calculated as an integer h (=H(R,ID)), using the processing device and based on the element R and element S received by the authentication request reception unit, the verification element calculation unit adds the element S and an inverse element of the element R, and treats a sum as an element R' of the finite group G, using the processing device and based on the generator g stored by the encryption parameter storage unit, the element S and element Y received by the authentication request reception unit, the integer c generated by the challenge generating unit, and the integer z received by the response reception unit, the first verification unit judges whether or not an element Y+c·S, which is obtained by adding the element Y and an element c·S obtained when the element S is added c times, is equal to an element z·g which is obtained when the element g is added z times, and when the element Y+c·S and the element z·g are equal, the first verification unit judges that verification is successful, and treats a judgment result as a first verification result, the verification apparatus inputs an order p stored by the encryption parameter storage unit, as the order p, the integer h calculated by the integer calculation unit, as the integer e, the element X stored by the encryption parameter storage unit, as the element s, and the element R' calculated by the verification element calculation unit, as the element h, judges whether or not verification is successful, and treats a judgment result as a second verification result, and using the processing device and based on the first verification result of the verification by the first verification unit and the second verification result of the verification by the verification apparatus, when both the first verification result and the second verification result show that the verification is judged successful, the authentication result output unit outputs an authentication result indicating that authentication is successful.

A cryptographic system according to the present invention comprises the verification apparatus.

A computer program according to the present invention causes a computer having a processing device that processes data, to serve as a verification apparatus according to claim 1.

In a verification method according to the present invention used by a verification apparatus having a processing device that processes data, to verify consistency, the processing device inputs an order p of a finite group G and an integer e, and calculates an integer $e_1$ and an integer $e_2$ that satisfy $e_1 \cdot e \equiv e_2 \pmod p$ based on the order p and the integer e which are input, the processing device inputs an element s of the finite group G and an element h of the finite group G, and calculates an element $\underline{a}$ $(=e_1 \cdot h - e_2 \cdot s)$ of the finite group G based on the element $\bar{g}$ and the element h which are input and the integer $e_1$ and the integer $e_2$ which are calculated, and the processing device judges, based on the element $\underline{a}$ calculated, that verification is successful when the element $\underline{a}$ is an identity element of the finite group G.

Effect of the Invention

According to the present invention, for example, when the element a calculated by the verification value calculation unit based on the integer $e_1$ and integer $e_2$ calculated by the integer partitioning unit is the identity element of the finite group G, the verification judging unit judges that the verification is successful. Hence, when h=e·s, it can be judged that the verification is successful. If, in the verification value calculation unit, the time necessary for the process of calculating the element a is shorter than the time necessary for calculating e·s, then the time necessary for the process of judging whether or not h=e·s can be shortened.

BEST MODE FOR CARRYING OUT THE INVENTION

Embodiment 1

The first embodiment will be described with reference to FIGS. 1 to 9.

In the following description, the finite group employed by the cryptographic system is defined as G.

An operation on the finite group G will be described additively. This is for the sake of descriptive convenience and does not exclude a group whose group operation is described multiplicatively.

Assume that an order p of the finite group G is a prime number. Accordingly, the finite group G is a cyclic group.

FIG. 1 is a block diagram showing a configuration example of the function block of a ciphertext decryption apparatus 200 of this embodiment.

The ciphertext decryption apparatus 200 inputs a ciphertext and decrypts the input ciphertext to generate a decrypted text.

The ciphertext decryption apparatus 200 includes a key storage unit 210, a ciphertext input unit 220, a ciphertext verification unit 230, a verification apparatus 100, and a decrypted text generating unit 260.

The key storage unit 210 stores a key (secret key) for decrypting the ciphertext.

The ciphertext input unit 220 inputs the ciphertext.

The ciphertext verification unit 230 calculates values necessary for verifying the ciphertext input by the ciphertext input unit 220 based on the key stored by the key storage unit 210 and the ciphertext input by the ciphertext input unit 220.

The verification apparatus 100 verifies the ciphertext input by the ciphertext input unit 220 based on the values calculated by the ciphertext verification unit 230.

When the verification by the verification apparatus 100 is successful, the decrypted text generating unit 260 decrypts the ciphertext input by the ciphertext input unit 220 using the key stored by the key storage unit 210, to generate a text as the decrypted text.

An unauthorized person may try to obtain a clue to decipher a regular ciphertext by inputting an irregular ciphertext to the ciphertext decryption apparatus 200 and analyzing a decrypted text generated by the ciphertext decryption apparatus 200.

The ciphertext decryption apparatus 200 verifies the consistency of the ciphertext and generates a decrypted text only when the verification is successful, so that a clue to decipher the regular ciphertext will not be given to the unauthorized person.

FIG. 2 shows an example of the appearance of the ciphertext decryption apparatus 200 according to this embodiment.

The ciphertext decryption apparatus 200 includes hardware resources such as a system unit 910, a display device 901 having a display screen such as a CRT (Cathode Ray Tube) or LCD (Liquid Crystal Display), a keyboard 902 (K/B), a mouse 903, an FDD 904 (Flexible Disk Drive), a compact disk drive 905 (CDD), a printer 906, and a scanner 907, which are connected through cables and signal lines.

The system unit 910, being a computer, is connected to a facsimile machine 932 and a telephone 931 through cables, and to the Internet 940 through a local area network 942 (LAN) and a gateway 941.

FIG. 3 shows an example of the hardware resources of the ciphertext decryption apparatus 200 of this embodiment.

The ciphertext decryption apparatus 200 includes a CPU 911 (also called a Central Processing Unit, central processing device, processing device, operation device, microprocessor, microcomputer, or processor) which executes programs. The CPU 911 is connected through a bus 912 to a ROM 913, a RAM 914, a communication device 915, the display device 901, the keyboard 902, the mouse 903, the FDD 904, the CDD 905, the printer 906, the scanner 907, and a magnetic disk drive 920, and controls these hardware devices. In place of the magnetic disk drive 920, a storage device such as an optical disk drive and a memory card reader/writer may be used.

The RAM 914 is an example of a volatile memory. Storage media such as the ROM 913, FDD 904, CDD 905, and magnetic disk drive 920 are examples of a nonvolatile memory. These are examples of a storage device or a storage unit.

The communication device 915, the keyboard 902, the scanner 907, the FDD 904, and the like are examples of an input unit or an input device.

The communication device 915, the display device 901, the printer 906, and the like are examples of an output unit or an output device.

The communication device 915 is connected to the facsimile machine 932, the telephone 931, the LAN 942, and the like. The communication device 915 may be connected not only to the LAN 942 but also to a WAN (Wide Area Network) such as the Internet 940 or ISDN. When connected to the WAN such as the Internet 940 or ISDN, the gateway 941 becomes unnecessary.

In the magnetic disk drive 920, an operating system 921 (OS), a window system 922, a program group 923, and a file group 924 are stored. The programs of the program group 923 are executed by the CPU 911, the operating system 921, and the window system 922.

In the program group 923, a program for executing functions indicated by the term "unit" described in the embodiments to be stated below is stored. The program is read and executed by the CPU 911.

In the file group 924, information, data, signal values, variables, and parameters indicated by the terms "judgment result of", "calculation result of", or "processing result of" described in the embodiments to be stated below are stored as items of the "file" or "database". Such "file" and "database" are stored by a recording medium such as a disk or a memory. The information, data, signal values, variables, and parameters stored by the storage medium such as a disk or memory are read to a main memory or cache memory by the CPU 911 through a read/write circuit, and used for operations of the CPU such as extraction, search, reference, comparison, operation, calculation, processing, output, printing, and display. During the operations of the CPU, namely during extraction, search, reference, comparison, operation, calculation, processing, output, printing, and display, the information, data, signal values, variables, and parameters are temporarily stored by the main memory, the cache memory, or the buffer memory.

Arrows in the flowcharts described in the embodiments to be stated below mainly show inputting and outputting of data or signals. Data and signal values are recorded on recording media such as a memory in the RAM 914, a flexible disk in the FDD 904, a compact disk in the CDD 905, a magnetic disk in the magnetic disk drive 920, an optical disk, a mini disk, and a DVD (Digital Versatile Disk). Data and signals are transmitted on line by the bus 912, a signal line, a cable, or other transmission medium.

What is described by the term "unit" in the embodiments stated below may be a "circuit", a "device", or an "apparatus", or may be a "step", a "procedure", or "processing". That is, what is described as a "unit" may be realized by the firmware stored by the ROM 913. Alternatively, it may be implemented only by software, only by hardware such as an element, a device, a substrate, or a wiring, or by a combination of software and hardware, or by a combination of software, hardware, and firmware. Firmware and software are stored as programs in a recording medium such as a magnetic disk, a flexible disk, an optical disk, a compact disk, a mini disk, or a DVD. Such programs are read by the CPU 911 and executed by the CPU 911. That is, such programs operate a computer, as units described below, or they cause the computer to execute a procedure or a method of the "unit" described below.

FIG. 4 is a block diagram of a configuration example of the internal block of the verification apparatus 100 according to this embodiment.

The verification apparatus 100 inputs an element s and an element h of the finite group G, the order p of the finite group G, and an integer e and judges whether or not h=e·s. Note that the integer e is equal to or larger than 1 and equal to or smaller than p−1.

The verification apparatus 100 has an integer partitioning unit 110, a verification value calculation unit 130, and a verification judging unit 150.

Using the CPU 911, the integer partitioning unit 110 inputs the order p of the finite group G and the integer e, and calculates two integers $e_1$ and $e_2$.

The verification value calculation unit 130 calculates, using the CPU 911, an element a of the finite group G based on the element s and the element h of the finite group G and the integer $e_1$ and the integer $e_2$ calculated by the integer partitioning unit 110.

The verification judging unit 150 judges, using the CPU 911, whether or not the element a calculated by the verification value calculation unit 130 is the identity element of the finite group G. If the element a is the identity element of the finite group G, the verification judging unit 150 judges that the verification is successful (that is, h=e·s).

FIG. 5 is a flowchart showing an example of the flow of a verification process used by the verification apparatus 100 of this embodiment to judge whether or not h=e·s.

In an integer partitioning process S701, the integer partitioning unit 110 calculates, using the CPU 911, the two integers $e_1$ and $e_2$ based on the input order p and integer e. The integer partitioning unit 110 calculates the integer $e_1$ and integer $e_2$ that satisfy conditions $e_1 \cdot e \equiv e_2 \pmod{p}$, $|e_1| < \sqrt{p}$, and $0 < |e_2| < \sqrt{p}$.

In a verification value calculation process S702, the verification value calculation unit 130 calculates, using the CPU 911, the element $a = e \cdot h - e_2 \cdot s$ of the finite group G based on the input element s and element h and the integer $e_1$ and integer $e_2$ calculated by the integer partitioning unit 110 in the integer partitioning process S701.

In a verification judging process S703, the verification judging unit 150 judges, using the CPU 911, whether or not the element a calculated by the verification value calculation unit 130 in the verification value calculation process S702 is the identity element (to be described as "0" hereinafter) of the finite group G.

If it is judged that the element a is the identity element O, the process advances to a successful judgment process S704.

If it is judged that the element a is not the identity element O, the process advances to a failure judgment process S705.

In the successful judgment process S704, using the CPU 911, the verification judging unit 150 judges that the verification is successful, and ends the verification process.

In the failure judgment process S705, using the CPU 911, the verification judging unit 150 judges that the charter fails, and ends the verification process.

FIG. 6 is a detailed block diagram showing a configuration example of the internal block of the integer partitioning unit 110 according to this embodiment.

The integer partitioning unit 110 calculates the integer $e_1$ and integer $e_2$ that satisfy $e_1 \cdot e \equiv e_2 \pmod{p}$ based on the order p of the finite group G and the integer e. More specifically, the integer partitioning unit 110 determines the integer $e_1$ and integer $e_2$ such that the remainder obtained when the product of the integer $e_1$ and integer e is divided by the order p is equal to the integer $e_2$.

In order to speedup the calculation in the verification value calculation unit 130, the integer partitioning unit 110 chooses, among integers $e_1$ and integers $e_2$ satisfying $e_1 \cdot e \equiv e_2 \pmod{p}$, an integer $e_1$ whose absolute value is smaller than the square root of the order p and an integer $e_2$ which is an integer equal to or larger than 1 and smaller than the square root of the order p.

The integer partitioning unit 110 has an order input unit 111, an integer input unit 112, an initial value setting unit 113, a first remainder storage unit 114, a second remainder storage unit 115, a conformity judging unit 116, a third remainder calculation unit 117, a first coefficient storage unit 124, a second coefficient storage unit 125, a quotient calculation unit 126, a third coefficient calculation unit 127, and a partitioned integer output unit 129.

The order input unit 111 inputs, using the CPU 911, data representing the order p of the finite group G. The order input unit 111 stores, using the RAM 914, the input data representing the order p.

The integer input unit 112 inputs, using the CPU 911, data representing the integer e. The integer input unit 112 stores, using the RAM 914, the input data representing the integer e.

The first remainder storage unit 114 stores, using the RAM 914, data representing an integer $v_1$.

The second remainder storage unit 115 stores, using the RAM 914, data representing an integer $v_2$.

The first coefficient storage unit 124 stores, using the RAM 914, data representing an integer $t_1$.

The second coefficient storage unit 125 stores, using the RAM 914, data representing an integer $t_2$.

The initial value setting unit 113 sets initial values to the first remainder storage unit 114, second remainder storage unit 115, first coefficient storage unit 124, and second coefficient storage unit 125.

Using the CPU 911, the initial value setting unit 113 inputs the data representing the order p and stored by the order input unit 111 and the data representing the integer e and stored by the integer input unit 112. The initial value setting unit 113 causes, using the CPU 911, the first remainder storage unit 114 to store the input data representing the order p as the data representing the integer $v_1$. The initial value setting unit 113 causes, using the CPU 911, the second remainder storage unit 115 to store the input data representing the integer e as the data representing the integer $v_2$. The initial value setting unit 113 causes, using the CPU 911, the first coefficient storage unit 124 to store data representing 0 as the data representing the integer $t_1$. The initial value setting unit 113 causes, using the CPU 911, the second coefficient storage unit 125 to store data representing 1 as the data representing the integer $t_2$.

Note that $v_1=p$, $v_2=e$, $t_1=0$, and $t_2=1$. Hence, $$t_1 \cdot e + k_1 \cdot p = v_1 \quad \text{[Equation 1]}$$

$$t_2 \cdot e + k_2 \cdot p = v_2 \quad \text{[Equation 2]}$$

$$v_1 > v_2 \geq 0 \quad \text{[Equation 3]}$$

$$|t_1| < |t_2| \quad \text{[Equation 4]}$$

$$v_1 \cdot |t_2| + v_2 \cdot |t_1| = p \quad \text{[Equation 5]}$$

where $k_1$ and $k_2$ are integers.

The conformity judging unit 116 inputs, using the CPU 911, the data representing the order p and stored by the order input unit 111, and the data representing the integer $v_2$ by the second remainder storage unit 115. The conformity judging unit 116 judges, using the CPU 911, whether or not an output condition is satisfied based on the order p and integer $v_2$ represented by the input data. More specifically, using the CPU 911, the conformity judging unit 116 compares the integer $v_2$ and the square root of the order p, and judges that the output condition is satisfied when the integer $v_2$ is smaller than the square root of the order p.

Alternatively, the conformity judging unit 116 may, using the CPU 911, calculate in advance the maximum integer that does not exceed the square root of the order p.

In place of calculating the square root of the order p, whether or not the output condition is satisfied may be judged by comparing the number of digits of the integer $v_2$ in binary notation and the number of digits of the order p in binary notation. More specifically, using the CPU 911, the conformity judging unit 116 obtains the number of bits of the data representing the order p in advance, and divides the obtained number of bits by 2 (rounds it up if it not divisible), thus obtaining a square-root number of bits. A square-root number of bits represents the number of digits of an integer, in binary notation, that does not exceed the square root of the order p. The conformity judging unit 116 stores, using the RAM 914, the calculated square-root number of bits, and calculates, using the CPU 911, the number of bits of the data representing the integer $v_2$. The conformity judging unit 116 compares, using the CPU 911, the calculated number of bits with the stored square-root number of bits. If the number of bits of the data representing the integer $v_2$ is equal to or smaller than the square-root number of bits, the conformity judging unit 116 considers that the integer $v_2$ is smaller than the square root of the order p, and judges that the output condition is satisfied.

If the conformity judging unit 116 judges that the output condition is not satisfied, the third remainder calculation unit 117 inputs, using the CPU 911, the data representing the integer $v_1$ and stored by the first remainder storage unit 114 and the data representing the integer $v_2$ and stored by the second remainder storage unit 115. Based on the integer $v_1$ and integer $v_2$ represented by the input data, the third remainder calculation unit 117 calculates the remainder obtained when the integer $v_1$ is divided by the integer $v_2$, and treats it as an integer $v_3$.

Also, if the conformity judging unit 116 judges that the output condition is not satisfied, the quotient calculation unit 126 inputs, using the CPU 911, the data representing the integer $v_1$ and stored by the first remainder storage unit 114 and the data representing the integer $v_2$ and stored by the second remainder storage unit 115. Based on the integer $v_1$ and integer $v_2$ represented by the input data, the quotient calculation unit 126 calculates the maximum integer that does not exceed the quotient obtained when the integer $v_1$ is divided by the integer $v_2$, and treats it as an integer q. The quotient calculation unit 126 stores, using the RAM 914, data representing the calculated integer q.

Using the CPU 911, the third coefficient calculation unit 127 inputs the data representing the integer $t_1$ and stored by the first coefficient storage unit 124, the data representing the integer $t_2$ and stored by the second coefficient storage unit 125, and the data presenting the integer q and stored by the quotient calculation unit 126. Based on the integer $t_1$, integer $t_2$, and integer q represented by the input data, the third coefficient calculation unit 127 calculates, using the CPU 911, an integer $t_3$ ($=t_1-q \cdot t_2$) which is obtained by subtracting the product of the integer q and integer $t_2$ from the integer $t_1$.

Note that $$\begin{aligned} v_3 - t_3 \cdot e &= (v_1 - q \cdot v_2) - (t_1 - q \cdot v_3) \cdot e \quad \text{[Equation 6]} \\ &= (v_1 - t_1 \cdot e) - q \cdot (v_2 - t_2 \cdot e) \\ &= (k_1 - q \cdot k_2) \cdot p \end{aligned}$$

$$\therefore t_3 \cdot e + k_3 \cdot p = v_3$$

where $k_3$ is an integer.

Also, since the integer $v_3$ is the remainder obtained when the integer $v_1$ is divided by the integer $v_2$, $$v_2 > v_3 \geq 0 \quad \text{[Equation 7]}$$

Also, if $v_1 > v_2 > 0$, $q \geq 1$ is established. Hence, if $t_1 \leq 0$ and $t_2 > 0$, $$t_3 = t_1 - q \cdot t_2 < 0 \qquad \text{[Equation 8]}$$

If $t_1 > 0$ and $t_2 < 0$, $$t_3 = t_1 - q \cdot t_2 > 0 \qquad \text{[Equation 9]}$$

Therefore, in either case, $$|t_3| = |t_1| + q \cdot |t_2| \qquad \text{[Equation 10]}$$

Hence, $$\begin{aligned} v_2 \cdot |t_3| + v_3 \cdot |t_2| & \qquad \text{[Equation 11]} \\ = v_2 \cdot |t_1| + v_2 \cdot q \cdot |t_1| + (v_1 - q \cdot v_2) \cdot |t_2| & \\ = v_1 \cdot |t_2| + v_2 \cdot |t_1| & \\ = p & \end{aligned}$$

The third remainder calculation unit 117 causes, using the CPU 911, the first remainder storage unit 114 to store the input data representing the integer $v_2$ as data representing the integer $v_1$. Based on the calculated integer $v_3$, the third remainder calculation unit 117 causes, using the CPU 911, the second remainder storage unit 115 to store data representing the integer $v_3$ as data representing the integer $v_2$.

The third coefficient calculation unit 127 causes, using the CPU 911, the first coefficient storage unit 124 to store the input data representing the integer $t_2$ as data representing the integer $t_1$. Based on the calculated integer $t_3$, the third coefficient calculation unit 127 causes, using the CPU 911, the second coefficient storage unit 125 to store data representing the integer $t_3$ as data representing the integer $t_2$.

From equations 6 to 11, equations 1 to 5 hold among the integer $v_1$, integer $v_2$, integer $t_1$, and integer $t_2$ represented by the latest data stored by the first remainder storage unit 114, the second remainder storage unit 115, the first coefficient storage unit 124, and the second coefficient storage unit 125, respectively.

When the conformity judging unit 116 judges that the output condition is satisfied, the partitioned integer output unit 129 inputs, using the CPU 911, the data representing the integer $v_2$ and stored by the second remainder storage unit 115 and the data representing the integer $t_2$ and stored by the second coefficient storage unit 125. The partitioned integer output unit 129 outputs, using the CPU 911, the input data representing the integer $t_2$ as data representing the integer $e_1$. The partitioned integer output unit 129 also outputs, using the CPU 911, the input data representing the integer $v_2$ as data representing the integer $e_2$.

When the third remainder calculation unit 117 and the third coefficient calculation unit 127 repeatedly perform these calculations, $v_2$ will become the greatest common divisor of the order p and integer e. As the order p is a prime number, the greatest common divisor of the order p and integer e is 1. Hence, $0 < v_2 < \sqrt{p}$ is established eventually, and the partitioned integer output unit 129 outputs data representing the integer $e_1$ and integer $e_2$.

FIG. 7 is a flowchart showing an example of the flow of an integer partitioning process used by the integer partitioning unit 110 according to this embodiment to partition the integer e.

In an initial value setting step S711, using the CPU 911, the initial value setting unit 113 sets the initial values to the first remainder storage unit 114, the second remainder storage unit 115, the first coefficient storage unit 124, and the second coefficient storage unit 125. The first remainder storage unit 114 stores, using the RAM 914, the order p input by the order input unit 111 as the integer $v_1$. The second remainder storage unit 115 stores, using the RAM 914, the integer e input by the integer input unit 112 as the integer $v_2$. The first coefficient storage unit 124 stores, using the RAM 914, 0 as the integer $t_1$. The second coefficient storage unit 125 stores, using the RAM 914, 1 as the integer $t_2$.

In a conformity judging step S712, the conformity judging unit 116 judges, using the CPU 911, whether or not the integer $v_2$ stored by the second remainder storage unit 115 is smaller than the square root of the order p input by the order input unit 111.

If it is judged that the integer $v_2$ is smaller than the square root of the order p, the process advances to a partitioned integer output step S718.

If it is judged that the integer $v_2$ is larger than the square root of the order p, the process advances to a remainder calculation step S713.

In the remainder calculation step S713, using the CPU 911, the third remainder calculation unit 117 calculates the remainder obtained when the integer $v_1$ stored by the first remainder storage unit 114 is divided by the integer $v_2$ stored by the second remainder storage unit 115, and treats it as the integer $v_3$.

In a quotient calculation step S714, using the CPU 911, the quotient calculation unit 126 calculates the maximum integer that does not exceed the quotient obtained when the integer $v_1$ stored by the first remainder storage unit 114 is divided by the integer $v_2$ stored by the second remainder storage unit 115, and treats it as the integer q.

In a coefficient calculation step S715, using the CPU 911, the third coefficient calculation unit 127 calculates an integer obtained by subtracting the product of the integer $t_2$ stored by the second coefficient storage unit 125 and the integer q calculated by the quotient calculation unit 126 in the quotient calculation step S714 from the integer $t_1$ stored by the first coefficient storage unit 124, and treats it as the integer $t_3$.

In a remainder update step S716, using the CPU 911, the third remainder calculation unit 117 updates the first remainder storage unit 114 and the second remainder storage unit 115. Using the RAM 914, the first remainder storage unit 114 stores the integer $v_2$, stored by the second remainder storage unit 115, as the integer $v_1$. Using the RAM 914, the second remainder storage unit 115 stores the integer $v_3$, calculated by the third remainder calculation unit 117 in the remainder calculation step S713, as the integer $v_2$.

In a coefficient update step S717, using the CPU 911, the third coefficient calculation unit 127 updates the first coefficient storage unit 124 and the second coefficient storage unit 125. Using the RAM 914, the first coefficient storage unit 124 stores the integer $t_2$ stored by the second coefficient storage unit 125 as the integer $t_1$. Using the RAM 914, the second coefficient storage unit 125 stores the integer $t_3$, calculated by the third coefficient calculation unit 127 in the coefficient calculation step S715, as the integer $t_2$.

After that, the process returns to the conformity judging step S712.

In the partitioned integer output step S718, using the CPU 911, the partitioned integer output unit 129 outputs the integer $t_2$ stored by the second coefficient storage unit 125 as the integer $e_1$. Using the CPU 911, the partitioned integer output unit 129 outputs the integer $v_2$ stored by the second remainder storage unit 115 as the integer $e_2$.

After that, the integer partitioning process is ended.

From equation 2, the integer $e_1$ and integer $e_2$ output by the partitioned integer output unit 129 satisfy:

$$e_1 \cdot e + k_2 \cdot p = e_2 \quad \therefore e_1 \cdot e \equiv e_2 \pmod{p} \quad \text{[Equation 12]}$$

Also, in the conformity judging step S712, it is judged that the output condition is satisfied. Hence, $$e_2 = v_2 \cdot \sqrt{p} \quad \text{[Equation 13]}$$

Assume that the conformity judging step S712 has been executed twice or more. In the previous conformity judging step S712, it is judged that the output condition is not satisfied. Hence, $$v_1 > \sqrt{p} \quad \text{[Equation 14]}$$

At this time, from equation 5, $$v_1 \cdot |t_2| < p \quad \therefore |e_1| = |t_2| < \sqrt{p} \quad \text{[Equation 15]}$$

Assume that the conformity judging step S712 is executed only once. In this case, equation 5 is satisfied since $e_1=1$.

As described above, the integer partitioning unit 110 calculates the integer $e_1$ and integer $e_2$ that satisfy $e_1 \cdot e \equiv e_2 \pmod{p}$, $|e_1| < \sqrt{p}$, and $0 < e_2 < \sqrt{p}$ using the extended Euclidean algorithm.

FIG. 8 is a detailed block diagram showing a configuration example of the internal block of the verification value calculation unit 130 of this embodiment.

Based on the element s and element h of the finite group G and the integer $e_1$ and integer $e_2$ calculated by the integer partitioning unit 110, the verification value calculation unit 130 calculates the element $\underline{a}$ ($=e_1 \cdot h - e_2 \cdot s$) of the finite group G.

The verification value calculation unit 130 has a partitioned integer input unit 131, an element input unit 132, an index calculation unit 133, a table generating unit 134, a table storage unit 135, a verification initial value setting unit 141, a multiplication result storage unit 142, a double-base addition unit 143, an addition result storage unit 144, a multiplication unit 145, and a verification value output unit 149.

Using the CPU 911, the partitioned integer input unit 131 inputs the data representing the integer $e_1$ and integer $e_2$ output by the integer partitioning unit 110. Using the RAM 914, the partitioned integer input unit 131 stores the input data representing the integer $e_1$ and integer $e_2$.

Using the CPU 911, the element input unit 132 inputs data representing the element s and element h of the finite group G. Using the RAM 914, the element input unit 132 stores the input data representing the element s and element h.

Using the CPU 911, the index calculation unit 133 inputs the data representing the integer $e_1$ and integer $e_2$ and stored by the partitioned integer input unit 131. Using the CPU 911, the index calculation unit 133 judges whether the integer $e_1$ is a positive integer or a negative integer. Using the RAM 914, the index calculation unit 133 stores data representing the judgment result. When judging that the integer $e_1$ is a negative integer, using the CPU 911, the index calculation unit 133 turns the integer $e_1$ into a positive integer by inverting the sign.

Using the CPU 911 and based on the calculated absolute value of the integer $e_1$, the index calculation unit 133 calculates a set of integers ($e_{1,i}$) respectively representing figures that express in base-n notation the absolute value of the integer $e_1$ (note that i is an integer equal to or larger than 0 and equal to or smaller than k−1, and that n is a predetermined integer equal to or larger than 2). More specifically, using the CPU 911, the index calculation unit 133 calculates the set of integers ($e_{1,i}$) that satisfy the following conditions:

$$|e_1| = \sum_{i=0}^{k-1}(n^i \cdot e_{1,i}), \ 0 \le e_{1,i} < n \quad \text{[Equation 16]}$$

Similarly, using the CPU 911 and based on the integer $e_2$, the index calculation unit 133 calculates a set of integers ($e_{2,i}$) respectively representing figures that express in base-n notation the integer $e_2$. Namely, $$e_2 = \sum_{i=0}^{k-1}(n^i \cdot e_{2,i}), \ 0 \le e_{2,i} < n \quad \text{[Equation 17]}$$

For example, when n=2, using the CPU 911, the index calculation unit 133 decomposes data representing the absolute value of the integer $e_1$ and data representing the integer $e_2$ in units of bits into ($e_{1,i}$) and ($e_{2,i}$). When n=4, the index calculation unit 133 decomposes the data representing the absolute value of the integer $e_1$ and the data representing the integer $e_2$ in units of two-bit strings into ($e_{1,i}$) and ($e_{2,i}$).

Note that k is a minimum integer with which $e_{1,i}=0$ and $e_{2,i}=0$ hold for every i that satisfies i≧k.

For example, if n=2, $e_1=23$, and $e_2=34$, then $e_1=(10111)_2$ and $e_2=(100010)_2$. Hence, k=6.

Using the RAM 914, the index calculation unit 133 stores data representing the calculated set of integers ($e_{1,i}$) and set of integers ($e_{2,i}$).

Using the CPU 911, the table generating unit 134 inputs the data representing the element s and element h and stored by the element input unit 132, and the data representing the judgment result of the index calculation unit 133 as to whether the integer $e_1$ is positive or negative.

Using the CPU 911 and based on the element s and element h and the judgment result represented by the input data, the table generating unit 134 calculates n×n elements $p_{x,y}$ ($=e_{1,sgn} \cdot x \cdot h - y \cdot s$ where x and y are integers each equal to or larger than 0 and equal to or smaller than n−1, and $e_{1,sgn}$ is 1 when the integer $e_1$ is positive and −1 when the integer $e_1$ is negative) of the finite group G.

For example, when n=2, the table generating unit 134 calculates four elements $p_{0,0}$, $p_{1,0}$, $p_{0,1}$, and $p_{1,1}$. Since the element $p_{0,0}$ is always an identity element, the table generating unit 134 may calculate only the remaining three elements.

Using the RAM 914, the table storage unit 135 stores data representing the n×n elements $p_{x,y}$ calculated by the table generating unit 134.

Using the RAM 914, the multiplication result storage unit 142 stores data representing an element a', which is a value obtained during the calculation of the element ä of the finite group G, of the finite group G.

Using the RAM 914, the addition result storage unit 144 stores data representing an element a'', which is a value obtained during the calculation of the element ä of the finite group G, of the finite group G.

Using the CPU 911, the verification initial value setting unit 141 causes the multiplication result storage unit 142 to store data representing the identity element of the finite group G, as data representing the element a'.

Using the CPU 911, the double-base addition unit 143 inputs the data representing the sets of integers ($e_{1,i}$) and ($e_{2,i}$)

and stored by the index calculation unit 133 one by one sequentially with a decrementing order of i.

> Using the CPU 911 and based on the integer $e_{1,i}$ and integer $e_{2,i}$ represented by the input data, the double-base addition unit 143 acquires, among the data representing the elements $p_{x,y}$ of the finite group G and stored by the table storage unit 135, data representing an element $p_{x,y}$ that satisfies $x=e_{1,i}$ and $y=e_{2,i}$ as data representing an element $P_i$.
>
> Using the CPU 911, the double-base addition unit 143 inputs the data representing the element a' of the finite group G and stored by the multiplication result storage unit 142.
>
> Using the CPU 911 and based on the element a' of the finite group G represented by the input data and the element $P_i$, the double-base addition unit 143 calculates an element $a'+P_i$ as the sum of the element a' and element $P_i$.
>
> Using the CPU 911, the double-base addition unit 143 causes the addition result storage unit 144 to store data representing the calculated element $a'+P_i$, as data representing the element a".

Using the CPU 911, the multiplication unit 145 inputs the data representing the element a" of the finite group G and stored by the addition result storage unit 144. Using the CPU 911 and based on the element a" represented by the input data, the multiplication unit 145 calculates an element n·a" by adding the element a" n times. For example, when n=2, the multiplication unit 145 calculates an element 2·a" by adding the element a" and element a". When n=4, the multiplication unit 145 calculates an element 2·a" by adding the element a" and element a", and then calculates an element 4·a" by further adding the element 2·a" and element 2·a" which are calculated.

> Using the CPU 911, the multiplication unit 145 causes the multiplication result storage unit 142 to store data representing the calculated element n·a" as data representing the element a'.

The above operation is repeated. When the double-base addition unit 143 inputs all the integers $e_{1,i}$ and integers $e_{2,i}$ stored by the index calculation unit 133, the verification value output unit 149 inputs, using the CPU 911, the data representing the element a" of the finite group G and stored by the addition result storage unit 144. Using the CPU 911, the verification value output unit 149 outputs the input data representing the element a", as data representing the element a.

FIG. 9 is a flowchart showing an example of the flow of a verification value calculation process used by the verification value calculation unit 130 of this embodiment to calculate the element a of the finite group G.

In an index calculation step S721, using the CPU 911, the index calculation unit 133 calculates the integer $e_{1,sgn}$ based on the integer $e_1$ input by the partitioned integer input unit 131. Using the CPU 911, the index calculation unit 133 sets the integer $e_{1,sgn}$ to 1 when the integer $e_1$ is positive, and −1 when the integer $e_2$ is negative.

> Using the CPU 911, the index calculation unit 133 calculates k integers $e_{1,i}$ (where i is an integer equal to or larger than 0 and equal to or smaller than k−1) based on the integer $e_1$ input by the partitioned integer input unit 131. For example, using the CPU 911, the index calculation unit 133 calculates the remainder of the division, by n, of the maximum integer that does not exceed the quotient obtained when the absolute value of the integer $e_1$ is divided by n raised to the i-th power, and treats the obtained remainder as $e_{1,i}$.
>
> Similarly, using the CPU 911, the index calculation unit 133 calculates k integers $e_{2,i}$ (where i is an integer equal to or larger than 0 and equal to or smaller than k−1) based on the integer $e_2$ input by the partitioned integer input unit 131. For example, using the CPU 911, the index calculation unit 133 calculates the remainder of the division, by n, of the maximum integer that does not exceed the quotient obtained when the integer $e_2$ is divided by n raised to the i-th power, and treats the obtained remainder as $e_{2,i}$.

In a table generating step S722, using the CPU 911, the table generating unit 134 calculates $n^2$ elements $p_{x,y}$ (where x and y are integers each equal to or larger than 0 and equal to or smaller than n−1) of the finite group G based on the element s and element h input by the element input unit 132 and the integer $e_{1,sgn}$ calculated by the index calculation unit 133 in the index calculation step S721. Using the CPU 911, the table generating unit 134 calculates an element obtained by subtracting an element as the sum of addition by y times of the element s from an element as the sum of addition by $e_{1,sgn}$·x times of the element h, and treats the result as the element $p_{x,y}$.

> Using the RAM 914, the table storage unit 135 stores $n^2$ elements $p_{x,y}$ calculated by the table generating unit 134.

In a verification initial value setting step S723, using the CPU 911, the verification initial value setting unit 141 initializes the multiplication result storage unit 142. Using the RAM 914, the multiplication result storage unit 142 stores the identity element of the finite group G as the element a'.

In a repetitive initial value setting step S724, using the RAM 914, the double-base addition unit 143 stores, as an integer j, an integer obtained by subtracting 1 from the integer k.

In a double-base addition step S725, using the CPU 911 and based on the stored integer j, the double-base addition unit 143 acquires, among the k integers $e_{1,i}$ and the k integers $e_{2,i}$ calculated by the index calculation unit 133 in the index calculation step S721, an integer $e_{1,j}$ and an integer $e_{2,j}$ that satisfy i=j.

> Using the CPU 911 and based on the acquired integer $e_{1,i}$ and integer $e_{2,i}$, the double-base addition unit 143 acquires an element $p_{x,y}$ that satisfies $x=e_{1,j}$ and $y=e_{2,j}$ among the $n^2$ elements $p_{x,y}$ of the finite group G stored by the table storage unit 135, and treats it as the element $P_i$.
>
> Using the CPU 911 and based on the element a' of the finite group G stored by the multiplication result storage unit 142 and the acquired element $P_i$, the double-base addition unit 143 calculates the element $a'+P_i$ as the sum of the element a' and element $P_i$ by the operation on the finite group G.
>
> Using the RAM 914, the addition result storage unit 144 stores the element $a'+P_i$ calculated by the double-base addition unit 143 as the element a".

In a repetitive update step S726, using the CPU 911, the double-base addition unit 143 calculates an integer j−1 obtained by subtracting 1 from the stored integer j. Using the RAM 914, the double-base addition unit 143 stores the calculated integer j−1 as the integer j.

When the calculated integer j is positive or 0, the process advances to a multiplication step S727.

When the calculated integer j is negative, the process advances to a verification value output step S728.

In the multiplication step S727, using the CPU 911 and based on the element a" of the finite group G stored by the addition result storage unit 144, the multiplication unit 145 calculates an element n·a", which is obtained by adding n times the element a" by the operation on the finite group G.

> Using the RAM 914, the multiplication result storage unit 142 stores, as the element a', the element n·a" calculated by the multiplication unit 145.

Then, the process returns to the double-base addition step S725.

In the verification value output step S728, using the CPU 911, the verification value output unit 149 outputs, as the element a, the element a" of the finite group G stored by the addition result storage unit 144.

Then, the verification value calculation process is ended.

As described above, the verification value calculation unit 130 calculates the element a by utilizing the double-base scalar multiplication on the additive group (or double-base exponentiation on the multiplicative group).

In the above process, when j=i, if the element a" stored by the addition result storage unit 144 in the double-base addition step S725 is rewritten as $a_i$, this yields:

$$a_k = P_k,$$ [Equation 18]
$$a_i = n \cdot a_{i+1} + P_i$$
$$\therefore a = a_0 = \sum_{i=0}^{k-1} (n^i \cdot P_i)$$

Note that the element $P_i$ of the finite group G satisfies:

$$P_i = p_{e_{1,i}, e_{2,i}} = e_{1,sgn} \cdot e_{1,i} \cdot h - e_{2,i} \cdot s$$ [Equation 19]

Hence, $$a = e_{1,sgn} \cdot \sum_{i=0}^{k-1} (n^i \cdot e_{1,i}) \cdot h - \sum_{i=0}^{k-1} (n^i \cdot e_{2,i}) \cdot s$$ [Equation 20]
$$= e_1 \cdot h - e_2 \cdot s$$

Since $e_1 \cdot e \equiv e_2 \pmod{p}$, $$a = e_1 \cdot (h - e \cdot s)$$ [Equation 21]

If h=e·s, the element a is the identity element of the finite group G. If h≠e·s, since the order p of the finite group G is a prime number, the element a is not the identity element of the finite group G unless $e_1$=0. Therefore, by judging whether or not the element a calculated by the verification value calculation unit 130 is an identity element, whether or not h=e·s can be judged.

The time necessary for the verification value calculation unit 130 to calculate the element a of the finite group G will be described.

In the following description, assume that the time necessary for performing group operation of the finite group G once is denoted by T. The time necessary for other calculations or data acquisition is much shorter than T and is accordingly ignored.

In the table generating step S722, the table generating unit 134 performs group operation n−2 times to calculate the elements $p_{0,y}$ (y≠0,1), n−2 times to calculate the elements $p_{x,0}$ (x≠0,1), and (n−1)² times to calculate the elements $p_{x,y}$ (x≠0, y≠0). Therefore, the time necessary for the table generating step S722 is (n²−3)T.

In the double-base countable step S725, the double-base addition unit 143 performs group operation once to calculate the element a". As the double-base countable step S725 is repeated k times, the total time necessary for the double-base countable step S725 is kT.

When n is exponentiation of 2, in the multiplication step S727, the multiplication unit 145 performs group operation $\log_2 n$ times to calculate the element a'. As the multiplication step S727 is repeated k−1 times, the total time necessary for the multiplication step S727 is $\log_2 n(k-1)T$.

Hence, the time necessary for the entire verification value calculation process is $[n^2-3+k+\log_2 n(k-1)]T$. For example, when n=2, the required time is 2kT; when n=4, (3k+12)T.

For the purpose of comparison, the time necessary when calculating e·s without partitioning the integer e will be described.

Assume that the number of digits of the integer e expressed in base-n notation is k'.

The calculation procedure is the same as that for the verification value calculation process. Since the number of elements employed as the base is one, the table to be calculated in advance stores n elements x·s (where x is an integer equal to or larger than 0 and equal to or smaller than n−1).

The time necessary for generation of the table is (n−2)T.

The total time necessary for addition is k'T.

The total time necessary for multiplication is $\log_2 n(k'-1)T$.

Therefore, the time necessary for entirely calculating e·s is $[n-2+k'+\log_2 n(k'-1)]T$. For example, when n=2, the time is (2k'−1)T; when n=4, 3k'T.

Since e is an integer equal to or larger than 1 and equal to or smaller than p−1, k' is probabilistically almost equal to the number of digits of p expressed in base-n notation.

In contrast to this, the absolute value of $e_1$, and $e_2$ are each an integer equal to or larger than 1 and smaller than √p. Hence, k is probabilistically almost equal to the number of digits of √p expressed in base-n notation, which is almost half k'.

Assuming that k=k'/2, the time necessary for the entire verification value calculation process is k'T when n=2 and (1.5k'+12)T when n=4. If the order p of the finite group G is sufficiently large, the time necessary for the entire verification value calculation process is about half the time necessary for the process of calculating e·s.

Hence, the time necessary for judging whether or not h=e·s becomes almost half.

The verification apparatus 100 according to this embodiment has the processing device (CPU 911) which processes data, the integer partitioning unit 110, the verification value calculation unit 130, and the verification judging unit 150.

Using the processing device (CPU 911), the integer partitioning unit 110 inputs the order p of the finite group G and the integer e, and calculates the integer $e_1$ and integer $e_2$ that satisfy $e_1 \cdot e \equiv e_2 \pmod{p}$ based on the input order p and integer e.

Using the processing device (CPU 911), the verification value calculation unit 130 inputs the element s of the finite group G and the element h of the finite group G, and calculates the element a ($=e_1 \cdot h - e_2 \cdot s$) of the finite group G based on the input element s and element h and the integer $e_1$ and integer $e_2$ calculated by the integer partitioning unit 110.

The verification judging unit 150 judges, using the processing device (CPU 911) and based on the element a calculated by the verification value calculation unit 130, that verification is successful when the element a is the identity element of the finite group G.

With the verification apparatus 100 of this embodiment, when the element a calculated by the verification value calculation unit 130 based on the integer $e_1$ and integer $e_2$ calculated by the integer partitioning unit 110 is the identity element of the finite group G, the verification judging unit 150 judges that verification is successful. Therefore, when h=e·s, it can be judged that verification is successful. If, in the verification value calculation unit 130, the time necessary for the process of calculating the element $\bar{a}$ is shorter than the time necessary for calculating e·s, then the time necessary for the process of judging whether or not h=e·s can be shortened.

The integer partitioning unit 110 according to this embodiments calculates, using the processing device (CPU 911), the integer $e_1$ and integer $e_2$ that satisfy a condition that the absolute value of the integer $e_1$ is smaller than the square root of the order p and that the integer $e_2$ is smaller than the square root of the order p.

With the verification apparatus 100 according to this embodiment, the integer partitioning unit 110 calculates the integer $e_1$ and integer $e_2$ that satisfy the condition that the absolute value of the integer $e_1$ is smaller than the square root of the order p and that the integer $e_2$ is smaller than the square root of the order p. Therefore, the time necessary for the process of calculating the element $\bar{a}$ in the verification value calculation unit 130 can be shortened.

The verification apparatus 100 according to this embodiment further has a storage device (such as the RAM 914 or the magnetic disk drive 920) which stores data.

The integer partitioning unit 110 has the first remainder storage unit 114, the second remainder storage unit 115, the initial value setting unit 113, the conformity judging unit 116, the third remainder calculation unit 117, and the partitioned integer output unit 129.

The first remainder storage unit 114 stores the integer $v_1$ using the storage device (RAM 914).

The second remainder storage unit 115 stores the integer $v_2$ using the storage device (RAM 914).

The initial value setting unit 113 causes, using the processing device (CPU 911), the first remainder storage unit 114 to store the order p as the integer $v_1$, and the second remainder storage unit 115 to store the integer e as the integer $v_2$.

The conformity judging unit 116 judges, using the processing device (CPU 911), that the output condition is satisfied when the integer $v_2$ stored by the second remainder storage unit 115 is smaller than the square root of the order p.

When the conformity judging unit 116 does not judge that the output condition is satisfied, the third remainder calculation unit 117 calculates, using the processing device (CPU 911) and based on the integer $v_1$ stored by the first remainder storage unit 114 and the integer $v_2$ stored by the second remainder storage unit 115, the remainder obtained when the integer $v_1$ is divided by the integer $v_2$, and treats it as the integer $v_3$, causes the first remainder storage unit 114 to store the integer $v_2$ stored by the second remainder storage unit 115 as the integer $v_1$, and causes the second remainder storage unit 115 to store the calculated integer $v_3$ as the integer $v_2$.

When the conformity judging unit 116 judges that the output condition is satisfied, the partitioned integer output unit 129 outputs, using the processing device (CPU 911), the integer $v_2$ stored by the second remainder storage unit 115 as the integer $e_2$.

With the verification apparatus 100 according to this embodiment, the integer $e_2$ that satisfies conditions $e_1 \cdot e \equiv e_2$ (mod p), $|e_1| < \sqrt{p}$, and $0 < e_2 < \sqrt{p}$ can be calculated within a short period of time.

The integer partitioning unit 110 according to this embodiment further has the first coefficient storage unit 124, the second coefficient storage unit 125, the quotient calculation unit 126, and the third coefficient calculation unit 127.

The first coefficient storage unit 124 stores the integer $t_1$ using the storage device (RAM 914).

The second coefficient storage unit 125 stores the integer $t_2$ using the storage device (RAM 914).

The initial value setting unit 113, using the processing device (CPU 911), further causes the first coefficient storage unit 124 to store 0 as the integer $t_1$, and the second coefficient storage unit 125 to store 1 as the integer $t_2$.

The quotient calculation unit 126, using the processing device (CPU 911) and based on the integer $v_1$ stored by the first remainder storage unit 114 and the integer $v_2$ stored by the second remainder storage unit 115, calculates the maximum integer that does not exceed the quotient obtained when the integer $v_1$ is divided by the integer $v_2$, and treats the calculated integer as the integer q.

When the conformity judging unit 116 does not judge that the output condition is satisfied, the third coefficient calculation unit 127 calculates, using the processing device (CPU 911) and based on the integer $t_1$ stored by the first coefficient storage unit 124, the integer $t_2$ stored by the second coefficient storage unit 125, and the integer q calculated by the quotient calculation unit 126, an integer obtained by subtracting the product of the integer $t_2$ and the integer q from the integer $t_1$ and treats it as the integer $t_3$, causes the first coefficient storage unit 124 to store the integer $t_2$ stored by the second coefficient storage unit 125 as the integer $t_1$, and causes the second coefficient storage unit 125 to store the calculated integer $t_3$ as the integer $t_2$.

Using the processing device (CPU 911), when the conformity judging unit 116 judges that the output condition is satisfied, the partitioned integer output unit 129 further outputs the integer $t_2$ stored by the second coefficient storage unit 125 as the integer $e_1$.

With the verification apparatus 100 according to this embodiment, the integer $e_1$ that satisfies the conditions $e_1 \cdot e \equiv e_2 \pmod{p}$, $|e_1| < \sqrt{p}$, and $0 < e_2 < \sqrt{p}$ can be calculated within a short period of time.

The verification value calculation unit 130 according to this embodiment calculates $\Sigma(n^i \cdot P_i)$ using the processing device (CPU 911) (where n is a predetermined integer equal to or larger than 2, i is an integer equal to or larger than 0 and equal to or smaller than k, k is the maximum value of the numbers of digits of the absolute value of the integer $e_1$ and of the integer $e_2$, both expressed in base-n notation, $P_i$ is an element of the finite group G and satisfies $P_i = e_{1,sgn} \cdot e_{2,i} \cdot s$, $e_{1,sgn}$ is 1 or $-1$, and $e_{1,i}$ and $e_{2,i}$ are integers each equal to or larger than 0 and equal to or smaller than $n-1$ and satisfying $e_1 = e_{1,sgn} \cdot \Sigma(n^i \cdot e_{1,i})$ and $e_2 = \Sigma(n^i \cdot e_{2,i})$), and treats the calculated value as the element $\bar{a}$ of the finite group G.

With the verification apparatus 100 according to this embodiment, the time necessary for the verification value calculation unit 130 to calculate the element $\bar{a}$ is proportional to the number k of digits of the absolute value of the integer $e_1$ and of the integer $e_2$, both expressed in base-n notation. As a result, the time necessary for calculating the element $\bar{a}$ can be shortened.

The ciphertext decryption apparatus 200 according to this embodiment includes the storage device (e.g., the RAM 914 and the magnetic disk drive 920) which stores data, the processing device (e.g., the CPU 911) which processes data, the key storage unit 210, the ciphertext input unit 220, the ciphertext verification unit 230, the verification apparatus 100, and the decrypted text generating unit 260.

The key storage unit 210 stores, using the storage device, the key for decrypting the ciphertext.

The ciphertext input unit 220 inputs, using the processing device, the ciphertext.

The ciphertext verification unit 230 calculates, using the processing device, the integer e, the element s of the finite group G, and the element h of the finite group G, which are to be input by the verification apparatus 100, based on the key stored by the key storage unit 210 and the ciphertext input by the ciphertext input unit 220.

The verification apparatus 100 inputs the integer e, the element s of the finite group G, and the element h of the finite group G, which are calculated by the ciphertext verification unit 230, and judges whether or not verification is successful.

When the verification apparatus 100 judges that the verification is successful, the decrypted text generating unit 260 decrypts, using the processing device, the ciphertext input by the ciphertext input unit 220 using the key stored by the key storage unit 210, to generate the decrypted text.

The ciphertext decryption apparatus 200 according to this embodiment verifies the consistency of an input ciphertext, and generates a decrypted text when the verification is successful. This can prevent a clue to decipher the ciphertext from being given to an unauthorized person. Also, the verification apparatus 100 verifies the consistency of the ciphertext by judging whether or not $h = e \cdot s$. Therefore, the time necessary for verification can be shortened.

The verification apparatus 100 according to this embodiment can be realized when the computer executes a computer program that operates the computer as the verification apparatus 100.

The computer program according to this embodiment is effective in that it can realize the following the verification apparatus 100. When the element a calculated by the verification value calculation unit 130 based on the integer $e_1$ and integer $e_2$ calculated by the integer partitioning unit 110 is the identity element of the finite group G, the verification judging unit 150 judges that verification is successful. Therefore, when $h = e \cdot s$, it can be judged that verification is successful. If, in the verification value calculation unit 130, the time necessary for the process of calculating the element a is shorter than the time necessary for calculating $e \cdot s$, then the time necessary for the process of judging whether or not $h = e \cdot s$ can be shortened.

The verification method used by the verification apparatus 100 according to this embodiment to verify the consistency has the following steps.

The processing device (CPU 911) inputs the order p of the finite group G and the integer e, and calculates the integer $e_1$ and integer $e_2$ that satisfy $e_1 \cdot e \equiv e_2 \pmod{p}$ based on the input order p and integer e.

The processing device (CPU 911) inputs the element s of the finite group G and the element h of the finite group G, and calculates the element a ($= e_1 \cdot h - e_2 \cdot s$) of the finite group G based on the input element s and element h and the calculated integer $e_1$ and integer $e_2$.

The processing device (CPU 911) judges, based on the calculated element a, that verification is successful when the element a is the identity element of the finite group G.

With the verification method of this embodiment, when the element a calculated by the processing device (CPU 911) based on the calculated integer $e_1$ and integer $e_2$ is the identity element of the finite group G, it is judged that verification is successful. Therefore, when $h = e \cdot s$, it can be judged that verification is successful. If the time necessary for the process of calculating the element a is shorter than the time necessary for calculating $e \cdot s$, then the time necessary for the process of judging whether or not $h = e \cdot s$ can be shortened.

The ciphertext decryption apparatus 200 described so far is a public key cryptography decryption apparatus. The ciphertext decryption apparatus 200 has the ciphertext correctness verification apparatus (verification apparatus 100). The ciphertext correctness verification apparatus judges whether or not a ciphertext is correct by verifying whether or not an element $s^e$ obtained by multiplying the element s of the multiplicative group e times in accordance with exponentiation on the multiplicative group such as a group formed of the residue classes of integers, or the element $e \cdot s$ obtained by adding the element s of the additive group e times in accordance with the scalar multiplication on the additive group such as a group formed of points on a (hyper) elliptic curve, coincides with the known element h.

The ciphertext correctness verification apparatus (verification apparatus 100) has a device (integer partitioning unit 110) that partitions an exponential part (integer e), a device (verification value calculation unit 130) that, using the partitioned exponents (the integer $e_1$ and integer $e_2$), calculates a value ($h^{e_1} - s^{e_2}$) by the double-base exponentiation on the multiplicative group, or a value ($e_1 \cdot h - e_2 \cdot s$) by the double-base scalar multiplication on the additive group such as a group formed of points on a (hyper) elliptic curve, and a device (verification judging unit 150) that judges whether or not the calculated value is equal to the identity element 1 of the multiplicative group or the identity element 0 of the additive group.

The integer partitioning unit 110 described so far is a calculation device which inputs the exponent (integer) e and the group order p of the multiplicative group or additive group used in a cipher and calculates the two integers $e_1$ and $e_2$ (note that $e_1 \cdot e \equiv e_2 \pmod{p}$) each having a bit length half that of the group order p.

The verification apparatus 100 verifies $s^{e_2} \cdot h^{-e_1} = 1$ (multiplicative description) or $e_2 \cdot s - e_1 \cdot h = 0$ (additive description).

The integer partitioning unit 110 described so far partitions an exponent part by performing the extended Euclidean algorithm.

The integer partitioning unit 110 described so far has, in repetitive division of two integers, a calculation device (third remainder calculation unit 117) in which the integer $v_2$ as a divisor and the integer $v_1$ as the dividend are the remainder $v_3$ of the division of the preceding step and the integer $v_2$ as the divisor of the preceding step, respectively, and a calculation device (conformity judging unit 116) that judges that the remainder $v_2$ of the division result of each step is equal to or larger than a predetermined number ($\sqrt{p}$), or equal to or smaller than a predetermined number ($\sqrt{p}$).

The integer partitioning unit 110 may calculate the integers $e_1$ and $e_2$ in accordance with the following procedure other than the procedure described above.

First, using the CPU 911, the integer partitioning unit 110 inputs a positive integer p, an integer e that satisfies $1 < e < p$, and the square root $\sqrt{p}$ of p.

Then, using the RAM 914, the integer partitioning unit 110 stores $u_1 \leftarrow 1$, $v_1 \leftarrow p$, $u_2 \leftarrow 0$, and $v_2 \leftarrow e$ as initial values.

Then, using the CPU 911, the integer partitioning unit 110 checks whether $v_2 < \sqrt{p}$.

If $v_2 > \sqrt{p}$, using the CPU 911, the integer partitioning unit 110 calculates $q \leftarrow v_1/v_2$ (the fraction is omitted), $v_3 \leftarrow v_1 \mod v_2$, and $u_3 \leftarrow u_1 - q \cdot u_2$, and using the RAM 914, stores them as $v_1 \leftarrow v_2$, $v_2 \leftarrow v_3$, $u_1 \leftarrow u_2$, $u_2 \leftarrow u_3$. The integer partitioning unit 110 then returns to the checking of whether $v_2 < \sqrt{p}$. If $v_2 > \sqrt{p}$, the same calculation is repeated.

When $v_2 < \sqrt{p}$ is established, using the CPU 911, the integer partitioning unit 110 calculates $e_1 \leftarrow (v_2 - u_2 \cdot p)/v_1$, and sets $e_2 \leftarrow v_2$.

Finally, using the CPU 911, the integer partitioning unit 110 outputs $e_1$ and $e_2$.

This procedure also provides $e_1 \cdot e \equiv e_2 \pmod p$, and the bit length of each of $e_1$ and $e_2$ becomes almost half the bit length of p.

Embodiment 2

The second embodiment will be described with reference to FIGS. 10 to 15.

FIG. 10 shows an example of the entire system configuration of an ID-based public key cryptographic system 820A of this embodiment.

The ID-based public key cryptographic system 820A is a cryptographic communication system that uses identification data such as a mail address that identifies a ciphertext decryption apparatus 200A as the public key of the ciphertext decryption apparatus 200A. Since the correspondence between the ciphertext decryption apparatus 200A and the public key need not be certified, a public key certificate, a certificate authority, and the like are not needed.

The ID-based public key cryptographic system 820A has an encryption parameter setting apparatus 810A, a key generating apparatus 300A, a ciphertext generating apparatus 400A, and the ciphertext decryption apparatus 200A.

The encryption parameter setting apparatus 810A determines encryption parameters to be used in the ID-based public key cryptographic system 820A. The encryption parameters determined by the encryption parameter setting apparatus 810A are open to the user of the ID-based public key cryptographic system 820A. The encryption parameters determined by the encryption parameter setting apparatus 810A include, e.g., an order p, an additive group $G_1$, an element $g_1$ of the additive group $G_1$, an additive group $G_2$, an element $g_2$ of the additive group $G_2$, a multiplicative group $G_T$, a pairing e, a hash function $H_1$, a hash function $H_2$, a hash function $H_3$, and a hash function $H_4$.

The order p is a prime number.

The order of the additive group $G_1$ is p. The element $g_1$ is a generator of the additive group $G_1$.

The order of the additive group $G_2$ is p, which is the same as the order of the additive group $G_1$. The element $g_2$ is a generator of the additive group $G_2$.

The order of the multiplicative group $G_T$ is p, which is the same as the order of the additive group $G_1$ or the additive group $G_2$.

The pairing e is a map that transforms a set of an element of the additive group $G_1$ and an element of the additive group $G_2$ into an element (pairing value) of the multiplicative group $G_T$. The pairing e has bilinearity. More specifically, for all u, v, a, and b, $e(a \cdot u, b \cdot v) = e(u,v)^{ab}$ holds (where u is an element of the additive group $G_1$, v is an element of the additive group $G_2$, and a and b are integers). The pairing value $e(g_1, g_2)$ of the element $g_1$ of the additive group $G_1$ and the element $g_2$ of the additive group $G_2$ is not the identity element of the multiplicative group $G_T$.

The hash function $H_1$ is a hash function that generates an integer equal to or larger than 1 and equal to or smaller than p−1 from a bit string having an arbitrary length.

The hash function $H_2$ is a hash function that generates a bit string having a predetermined length from elements of the multiplicative group $G_T$.

The hash function $H_3$ is a hash function that generates an integer equal to or larger than 1 and equal to or smaller than p−1 from a bit string having a predetermined length.

The hash function $H_4$ is a hash function that generates a bit string having a predetermined length from a bit string having a predetermined length.

When these encryption parameters are determined in advance, the encryption parameter setting apparatus 810A need not determine them.

The encryption parameter setting apparatus 810A generates a secret random number s and a public element R generated based on the secret random number s. The secret random number s generated by the encryption parameter setting apparatus 810A is notified to the key generating apparatus 300A in secret. The public element R generated by the encryption parameter setting apparatus 810A is open to the user of the ID-based public key cryptographic system 820A. Although the public element R includes information on the secret random number s, it is practically impossible to obtain the secret random number s from the public element R. Hence, the user of the ID-based public key cryptographic system 820A can use secret information without noticing it if an operation is done using the public element R.

The key generating apparatus 300A holds in secret the secret random number s notified from the encryption parameter setting apparatus 810A. The key generating apparatus 300A generates a secret key $D_{ID}$ of the ciphertext decryption apparatus 200A based on the public encryption parameters, public identification data ID of the ciphertext decryption apparatus 200A, and the secret random number s which is held. The secret key $D_{ID}$ generated by the key generating apparatus 300A is notified to the ciphertext decryption apparatus 200A in secret.

The ciphertext generating apparatus 400A generates a ciphertext c and a common key K based on the public encryption parameters, the public element R, and the identification data ID of the ciphertext decryption apparatus 200A. The ciphertext generating apparatus 400A encrypts a message M by the generated common key K, thus generating an encrypted message CM. The ciphertext generating apparatus 400A transmits the generated ciphertext c and the encrypted message CM to the ciphertext decryption apparatus 200A.

The ciphertext decryption apparatus 200A holds in secret the secret key $D_{ID}$ generated by the key generating apparatus 300A. The ciphertext decryption apparatus 200A receives the ciphertext c and encrypted message CM transmitted by the ciphertext generating apparatus 400A. Based on the public encryption parameters, the ciphertext decryption apparatus 200A decrypts the received ciphertext c by the secret key $D_{ID}$ it holds, thus generating a common key K identical to that of the ciphertext generating apparatus 400A. The ciphertext decryption apparatus 200A decrypts the encrypted message CM by the generated common key K, thus generating a message M' identical to the message M.

The appearances and hardware resources of the encryption parameter setting apparatus 810A, key generating apparatus 300A, ciphertext generating apparatus 400A, and ciphertext decryption apparatus 200A are similar to those of the ciphertext decryption apparatus 200A described in the first embodiment.

FIG. 11 is a block diagram showing a configuration example of the function block of part of the encryption parameter setting apparatus 810A of this embodiment.

The encryption parameter setting apparatus 810A has an encryption parameter storage unit 819A, a public element generating unit 811A, a secret random number output unit 814A, and a public element output unit 815A.

Using a magnetic disk drive 920, the encryption parameter storage unit 819A stores data representing the public encryption parameters.

The public element generating unit 811A generates the secret random number s and the public element R based on the encryption parameters stored by the encryption parameter storage unit 819A.

The public element generating unit 811A has a secret random number generating unit 812A and a public element calculation unit 813A.

Using a CPU 911, the secret random number generating unit 812A inputs the data representing the order p among the encryption parameters stored by the encryption parameter storage unit 819A. Using the CPU 911, the secret random number generating unit 812A randomly generates an integer equal to or larger than 1 and equal to or smaller than p−1 based on the order p represented by the input data, and treats it as the secret random number s. Using a RAM 914, the secret random number generating unit 812A stores data representing the generated secret random number s.

Using the CPU 911, the public element calculation unit 813A inputs the data representing the additive group $G_1$ and element $g_1$ among the encryption parameters stored by the encryption parameter storage unit 819A, and the data representing the secret random number s and stored by the secret random number generating unit 812A. Using the CPU 911 and based on the additive group $G_1$, element $g_1$, and secret random number s represented by the input data, the public element calculation unit 813A calculates an element which is obtained when the element $g_1$ is added s times by the operation on the additive group $G_1$, and treats it as the public element R. Using the RAM 914, the public element calculation unit 813A stores data representing the calculated public element R.

Using the CPU 911, the secret random number output unit 814A inputs the data representing the secret random number s and stored by the secret random number generating unit 812A. Using the CPU 911, the secret random number output unit 814A outputs the input data representing the secret random number s.

The secret random number s output by the secret random number output unit 814A is notified to the key generating apparatus 300A in secret.

Using the CPU 911, the public element output unit 815A inputs the data representing the public element R and stored by the public element calculation unit 813A. Using the CPU 911, the public element output unit 815A outputs the input data representing the public element R.

The public element R output by the public element output unit 815A is open to the user of the ID-based public key cryptographic system 820A.

FIG. 12 is a block diagram showing a configuration example of the function block of the key generating apparatus 300A according to this embodiment.

The key generating apparatus 300A has an encryption parameter storage unit 390A, a secret random number storage unit 330A, an identifier input unit 340A, a secret key generating unit 350A, and a secret key output unit 360A.

Using the magnetic disk drive 920, the encryption parameter storage unit 390A stores data representing the public encryption parameters in advance.

Using a tamper-resistant storage device, the secret random number storage unit 330A stores, in secret, data representing the secret random number s and notified by the encryption parameter setting apparatus 810A.

As for the ciphertext decryption apparatus 200A whose secret key is to be generated, the identifier input unit 340A inputs, using the CPU 911, an arbitrary-length bit string ID which is identification data for identifying the ciphertext decryption apparatus 200A. The bit string ID is, for example, data representing a character string indicating the mail address of the ciphertext decryption apparatus 200A. Using the RAM 914, the identifier input unit 340A stores the input bit string ID.

The secret key generating unit 350A generates the secret key $D_{ID}$ based on the encryption parameters stored by the encryption parameter storage unit 390A, the secret random number s stored by the secret random number storage unit 330A, and the bit string ID input by the identifier input unit 340A.

The secret key generating unit 350A has a hash value calculation unit 351A, an integer addition unit 352A, an inverse number calculation unit 353A, and a secret key calculation unit 354A.

Using the CPU 911, the hash value calculation unit 351A inputs the data representing the hash function $H_1$ among the encryption parameters stored by the encryption parameter storage unit 390A, and the bit string ID stored by the identifier input unit 340A. Using the CPU 911 and based on the hash function $H_1$ represented by the input data and the input bit string ID, the hash value calculation unit 351A calculates a hash value $H_1$ (ID), which is obtained when the bit string ID is hashed by the hash function $H_1$. The hash value $H_1$ (ID) is an integer equal to or larger than 1 and equal to or smaller than p−1. Using the RAM 914, the hash value calculation unit 351A stores data representing the calculated hash value $H_1$ (ID).

Using the CPU 911, the integer addition unit 352A inputs the data representing the order p among the encryption parameters stored by the encryption parameter storage unit 390A, the data representing the secret random number s and stored by the secret random number storage unit 330A, and the data representing the hash value $H_1$(ID) and stored by the hash value calculation unit 351A. Using the CPU 911 and based on the order p, secret random number s, and hash value $H_1$(ID) represented by the input data, the integer addition unit 352A calculates an integer $s+H_1$(ID), which is the remainder obtained when the sum of the secret random number s and hash value $H_1$(ID) is divided by the order p. The integer addition unit 352A stores, using the RAM 914, data representing the calculated integer $s+H_1$(ID).

Using the CPU 911, the inverse number calculation unit 353A inputs the data representing the order p among the encryption parameters stored by the encryption parameter storage unit 390A, and the data representing the integer $s+H_1$(ID) and stored by the integer addition unit 352A. Using the CPU 911 and based on the order p and integer $s+H_1$(ID) represented by the input data, the inverse number calculation unit 353A calculates an integer $1/[s+H_1$(ID)] which yields a remainder of 1 when its product with the integer $s+H_1$(ID) is divided by the order p. The inverse number calculation unit 353A stores, using the RAM 914, data representing the calculated integer $1/[s+H_1$(ID)].

Using the CPU 911, the secret key calculation unit 354A inputs the data representing the additive group $G_2$ and element $g_2$ among encryption parameters stored by the encryption parameter storage unit 390A, and the data representing the integer $1/[s+H_1(ID)]$ and calculated by the inverse number calculation unit 353A. Using the CPU 911 and based on the additive group $G_2$, element $g_2$, and integer $1/[s+H_1(ID)]$ represented by the input data, the secret key calculation unit 354A calculates an element which is obtained when the element $g_2$ is added $1/[s+H_1(ID)]$ times by the operation on the additive group $G_2$, and treats it as the secret key $D_{ID}$. Using the RAM 914, the secret key calculation unit 354A stores data representing the calculated secret key $D_{ID}$.

Using the CPU 911, the secret key output unit 360A inputs the data representing the secret key $D_{ID}$ and stored by the secret key calculation unit 354A. Using the CPU 911, the secret key output unit 360A outputs the input data representing the secret key $D_{ID}$.

The secret key $D_{ID}$ output by the secret key output unit 360A is notified to the ciphertext decryption apparatus 200A in secret.

FIG. 13 is a block diagram showing a configuration example of the function block of a ciphertext generating apparatus 400A according to this embodiment.

The ciphertext generating apparatus 400A has an encryption parameter storage unit 490A, an identifier storage unit 410A, a common key generating unit 420A, a common key storage unit 430A, a message input unit 440A, a message encryption unit 450A, an encrypted message output unit 460A, and a ciphertext output unit 470A.

Using the magnetic disk drive 920, the encryption parameter storage unit 490A stores data representing the public encryption parameters (including the public element R) in advance.

Using the magnetic disk drive 920, the identifier storage unit 410A stores a bit string ID which is the identification data of the ciphertext decryption apparatus 200A to which the ciphertext is to be transmitted.

Based on the encryption parameters stored by the encryption parameter storage unit 490A and the bit string ID stored by the identifier storage unit 410A, the common key generating unit 420A generates the common key K and a ciphertext which serves to notify the common key K to the ciphertext decryption apparatus 200A.

The common key generating unit 420A has a secret bit string generating unit 421A, a secret integer calculation unit 422A, an identifier element calculation unit 423A, a cipher element calculation unit 424A, a secret pairing value calculation unit 425A, a cipher bit string calculation unit 426A, and a common key calculation unit 427A.

Using the CPU 911, the secret bit string generating unit 421A randomly generates a predetermined-length bit string m. Using the RAM 914, the secret bit string generating unit 421A stores the generated bit string m.

Using the CPU 911, the secret integer calculation unit 422A inputs the data representing the hash function $H_3$ among the encryption parameters stored by the encryption parameter storage unit 490A, and the bit string m stored by the secret bit string generating unit 421A. Using the CPU 911 and based on the hash function $H_3$ represented by the input data and the input bit string m, the secret integer calculation unit 422A calculates a hash value r, which is obtained when the bit string m is hashed by the hash function $H_3$. The hash value r is an integer equal to or larger than 1 and equal to or smaller than p−1. Using the RAM 914, the secret integer calculation unit 422A stores data representing the calculated hash value r.

Using the CPU 911, the identifier element calculation unit 423A inputs the data representing the hash function $H_1$, additive group $G_1$, element $g_1$, and public element R among the encryption parameters stored by the encryption parameter storage unit 490A, and the bit string ID stored by the identifier storage unit 410A. Using the CPU 911 and based on the hash function $H_1$ represented by the input data and the input bit string ID, the identifier element calculation unit 423A calculates a hash value $H_1(ID)$, which is obtained when the bit string ID is hashed by the hash function $H_1$. The hash value $H_1(ID)$ is an integer equal to or larger than 1 and equal to or smaller than p−1. Using the CPU 911 and based on the additive group $G_1$ and element $g_1$ represented by the input data and the calculated hash value $H_1(ID)$, the identifier element calculation unit 423A calculates an element $H_1(ID) \cdot g_1$ which is obtained when the element $g_1$ is added $H_1(ID)$ times by the operation on the additive group $G_1$. Using the CPU 911 and based on the additive group $G_1$ and public element R represented by the input data and the calculated element $H_1(ID) \cdot g$, the identifier element calculation unit 423A calculates an element which is obtained when the public element R and the element $H_1(ID) \cdot g$ are added by the operation on the additive group $G_1$, and treats it as an element Q. Using the RAM 914, the identifier element calculation unit 423A stores data representing the calculated element Q.

Since $R = s \cdot g_1$, the element Q calculated by the identifier element calculation unit 423A is expressed as:

$$Q = R + H_1(ID) \cdot g_1 \qquad \text{[Equation 22]}$$
$$= (s + H_1(ID)) \cdot g_1$$

Using the CPU 911, the cipher element calculation unit 424A inputs the data representing the additive group $G_1$ among the encryption parameters stored by the encryption parameter storage unit 490A, the data representing the hash value r and stored by the secret integer calculation unit 422A, and the data representing the element Q and stored by the identifier element calculation unit 423A. Using the CPU 911 and based on the additive group $G_1$, hash value r, and element Q represented by the input data, the cipher element calculation unit 424A calculates an element which is obtained when the element Q is added r times by the operation on the additive group $G_1$, and treats it as an element U. Using the RAM 914, the cipher element calculation unit 424A stores data representing the calculated element U.

Using the CPU 911, the secret pairing value calculation unit 425A inputs the data representing the element $g_1$, element $g_2$, pairing e, and multiplicative group $G_T$ among the encryption parameters stored by the encryption parameter storage unit 490A, and the data representing the hash value r and stored by the secret integer calculation unit 422A. Using the CPU 911 and based on the element $g_1$, element $g_2$, and pairing e represented by the input data, the secret pairing value calculation unit 425A calculates a pairing value $e(g_1,g_2)$ of the element $g_1$ and element $g_2$. The pairing value $e(g_1,g_2)$ is an element of the multiplicative group $G_T$. Alternatively, the secret pairing value calculation unit 425A may calculate a pairing value $e(g_1,g_2)$ in advance and, using the magnetic disk drive 920, store data representing the calculated pairing value $e(g_1,g_2)$. Using the CPU 911 and based on the hash value r represented by the input data and the calculated pairing value $e(g_1,g_2)$, the secret pairing value calculation unit 425A calculates an element which is obtained when the pairing value $e(g_1,g_2)$ is multiplied r times by the operation on the multiplicative group $G_T$, and treats it as an element α. Using the RAM 914, the secret pairing value calculation unit 425A stores data representing the calculated element α.

Using the CPU 911, the cipher bit string calculation unit 426A inputs the data representing the hash function $H_2$ among the encryption parameters stored by the encryption parameter storage unit 490A, the bit string m stored by the secret bit string generating unit 421A, and the data representing the element α and stored by the secret pairing value calculation unit 425A. Using the CPU 911 and based on the hash function $H_2$ and element α represented by the input data, the cipher bit string calculation unit 426A calculates a hash value $H_2(\alpha)$, which is obtained when the element α is hashed by the hash function $H_2$. The hash value $H_2(\alpha)$ is a bit string having a predetermined length. Using the CPU 911 and based on the input bit string m and the calculated hash value $H_2(\alpha)$, the cipher bit string calculation unit 426A obtains the bitwise exclusive OR of the bit string m and the hash value $H_2(\alpha)$, and treats the result as a bit string V. Using the RAM 914, the cipher bit string calculation unit 426A stores the calculated bit string V.

Using the CPU 911, the common key calculation unit 427A inputs the data representing the hash function $H_4$ among the encryption parameters stored by the encryption parameter storage unit 490A, and the bit string m stored by the secret bit string generating unit 421A. Using the CPU 911 and based on the hash function $H_4$ represented by the input data and the input bit string m, the common key calculation unit 427A calculates a hash value which is obtained when the bit string m is hashed by the hash function $H_4$, and treats it as a common key K. The common key K is a bit string having a predetermined length. Using the RAM 914, the common key calculation unit 427A stores the calculated common key K.

Using the CPU 911, the common key storage unit 430A inputs the common key K stored by the common key calculation unit 427A. Using the RAM 914, the common key storage unit 430A stores the input common key K.

Using the CPU 911, the ciphertext output unit 470A inputs the data representing the element U and stored by the cipher element calculation unit 424A, and the bit string V stored by the cipher bit string calculation unit 426A. Using the CPU 911, the ciphertext output unit 470A generates data including the data representing the input element U and the bit string V, and outputs it as the ciphertext c.

Using the CPU 911, the message input unit 440A inputs the message M to be transmitted to the ciphertext decryption apparatus 200A. Using the magnetic disk drive 920, the message input unit 440A stores the input message M.

Using the CPU 911, the message encryption unit 450A inputs the common key K stored by the common key storage unit 430A, and the message M stored by the message input unit 440A. Using the CPU 911 and based on the input message M and common key K, the message encryption unit 450A encrypts the message M using the common key K and treats it as the encrypted message CM. Using the magnetic disk drive 920, the message encryption unit 450A stores the generated encrypted message CM.

Using the CPU 911, the encrypted message output unit 460A inputs the encrypted message CM stored by the message encryption unit 450A. Using the CPU 911, the encrypted message output unit 460A outputs the input encrypted message CM.

The ciphertext c output by the ciphertext output unit 470A and the encrypted message CM output by the encrypted message output unit 460A are transmitted to the ciphertext decryption apparatus 200A.

FIG. 14 is a block diagram showing a configuration example of the function block of the ciphertext decryption apparatus 200A according to this embodiment.

The ciphertext decryption apparatus 200A has an encryption parameter storage unit 290A, an identifier storage unit 241A, an identifier element calculation unit 242A, an identifier element storage unit 243A, a key storage unit 210A, a ciphertext input unit 220A, a ciphertext verification unit 230A, a verification apparatus 100A, a decrypted text generating unit 260A, a common key storage unit 270A, an encrypted message input unit 281A, a message decryption unit 282A, and a decrypted message output unit 283A.

Using the magnetic disk drive 920, the encryption parameter storage unit 290A stores data representing the public encryption parameters (including the public element R) in advance.

Using the magnetic disk drive 920, the identifier storage unit 241A stores the bit string ID that identifies the ciphertext decryption apparatus 200A itself.

Using the CPU 911, the identifier element calculation unit 242A inputs data representing the hash function $H_1$, additive group $G_1$, element $g_1$, and public element R among the encryption parameters stored by the encryption parameter storage unit 290A, and the bit string ID stored by the identifier storage unit 241A. Using the CPU 911 and based on the hash function $H_1$ represented by the input data and the input bit string ID, the identifier element calculation unit 242A calculates a hash value $H_1(ID)$, which is obtained when the bit string ID is hashed by the hash function $H_1$. The hash value $H_1(ID)$ is an integer equal to or larger than 1 and equal to or smaller than p−1. Using the CPU 911 and based on the additive group $G_1$ and element $g_1$ represented by the input data and the calculated hash value $H_1(ID)$, the identifier element calculation unit 242A calculates an element $H_1(ID) \cdot g_1$, which is obtained when the element $g_1$ is added $H_1(ID)$ times by the operation on the additive group $G_1$. Using the CPU 911 and based on the additive group $G_1$ and public element R represented by the input data, and the calculated element $H_1(ID) \cdot g_1$, the identifier element calculation unit 242A calculates an element which is obtained when the public element R and the element $H_1(ID) \cdot g_1$ are added by the operation on the additive group $G_1$, and treats it as an element Q. Using the RAM 914, the identifier element calculation unit 242A stores data representing the calculated element Q.

Using the CPU 911, the identifier element storage unit 243A inputs the data representing the element Q and stored by the identifier element calculation unit 242A. Using the magnetic disk drive 920, the identifier element storage unit 243A stores the input data representing the element Q.

To the ciphertext decryption apparatus 200A, the bit string that identifies the ciphertext decryption apparatus 200A itself is constant, and accordingly the value of the element Q is also constant. Hence, the ciphertext decryption apparatus 200A need not calculate the element Q each time it inputs a ciphertext c. If the identifier element calculation unit 242A calculates an element Q and the identifier element storage unit 243A stores it before a ciphertext c is input, the amount of calculation after inputting the ciphertext c can be reduced.

Using a tamper-resistant storage device, the key storage unit 210A stores in secret data representing the secret key $D_{ID}$ generated by the key generating apparatus 300A in advance.

Using the CPU 911, the ciphertext input unit 220A inputs the ciphertext c received from the ciphertext generating apparatus 400A. Using the CPU 911, the ciphertext input unit 220A acquires data representing the element U and bit string V from the input ciphertext c. Using the RAM 914, the ciphertext input unit 220A stores the acquired data representing the element U and bit string V.

The ciphertext verification unit 230A generates data to be input by the verification apparatus 100A based on the encryption parameters stored by the encryption parameter storage unit 290A, the secret key $D_{ID}$ stored by the key storage unit 210, and the element U and bit string V represented by the ciphertext c input by the ciphertext input unit 220A.

The ciphertext verification unit 230A has a pairing value calculation unit 231A, a bit string calculation unit 232A, and an integer calculation unit 233A.

Using the CPU 911, the pairing value calculation unit 231A inputs the data representing the pairing e among the encryption parameters stored by the encryption parameter storage unit 290A, the data representing the secret key $D_{ID}$ and stored by the key storage unit 210A, and the data representing the element U and stored by the ciphertext input unit 220. Using the CPU 911 and based on the pairing e, element U, and secret key $D_{ID}$ represented by the input data, the pairing value calculation unit 231A calculates the pairing value of the element U and secret key $D_{ID}$ by the pairing e, and treats it as a pairing value $\alpha$. The pairing value $\alpha$ is an element of the multiplicative group $G_T$. Using the RAM 914, the pairing value calculation unit 231A stores data representing the calculated pairing value $\alpha$.

From the bilinearity of the pairing e, the pairing value $\alpha$ calculated by the pairing value calculation unit 231A is expressed as:

$$\alpha = e(U, D_{ID}) \quad [\text{Equation 23}]$$
$$= e\left(r \cdot (s + H_1(ID)) \cdot g_1, \frac{1}{s + H_1(ID)} \cdot g_2\right)$$
$$= e(g_1, g_2)^r$$

More specifically, the pairing value $\alpha$ calculated by the pairing value calculation unit 231A is equal to the element a of the multiplicative group $G_T$ which is calculated by the secret pairing value calculation unit 425A of the ciphertext generating apparatus 400A.

Using the CPU 911, the bit string calculation unit 232A inputs the data representing the hash function $H_2$ among the encryption parameters stored by the encryption parameter storage unit 290A, the bit string V stored by the ciphertext input unit 220, and the data representing the pairing value $\alpha$ and stored by the pairing value calculation unit 231A. Using the CPU 911 and based on the hash function $H_2$ and pairing value $\alpha$ represented by the input data, the bit string calculation unit 232A calculates a hash value $H_2(\alpha)$, which is obtained when the pairing value $\alpha$ is hashed by the hash function $H_2$. The hash value $H_2(\alpha)$ is a bit string having a predetermined length. Using the CPU 911 and based on the input bit string V and the calculated hash value $H_2(\alpha)$, the bit string calculation unit 232A obtains the bitwise exclusive OR of the bit string V and the hash value $H_2(\alpha)$, and treats the result as a bit string m. Using the RAM 914, the bit string calculation unit 232A stores the calculated bit string m.

As the pairing value $\alpha$ calculated by the pairing value calculation unit 231A is equal to the element $\alpha$ of the multiplicative group $G_T$ which is calculated by the secret pairing value calculation unit 425A of the ciphertext generating apparatus 400A, the bit string m calculated by the bit string calculation unit 232A is equal to the bit string m calculated by the secret bit string generating unit 421A of the ciphertext generating apparatus 400A.

Using the CPU 911, the integer calculation unit 233A inputs the data representing the hash function $H_3$ among the encryption parameters stored by the encryption parameter storage unit 290A, and the bit string m stored by the bit string calculation unit 232A. Using the CPU 911 and based on the hash function $H_3$ represented by the input data and the input bit string m, the integer calculation unit 233A calculates a hash value which is obtained when the bit string m is hashed by the hash function $H_3$, and treats it as a hash value r. The hash value r is an integer equal to or larger than 1 and equal to or smaller than p−1. Using the RAM 914, the integer calculation unit 233A stores data representing the calculated hash value r.

As the bit string m calculated by the bit string calculation unit 232A is equal to the bit string m generated by the secret bit string generating unit 421A of the ciphertext generating apparatus 400A, the hash value r calculated by the integer calculation unit 233A is equal to the hash value r calculated by the secret integer calculation unit 422A of the ciphertext generating apparatus 400A.

Hence, if the ciphertext c input by the ciphertext input unit 220A is a correct ciphertext, U=r·Q is established.

The verification apparatus 100A checks whether or not U=r·Q. If U=r·Q, the verification apparatus 100A judges that the verification is successful.

The verification apparatus 100A is an apparatus corresponding to the verification apparatus 100 described in the first embodiment.

Using the CPU 911, the verification apparatus 100A inputs the data representing the order p among the encryption parameters stored by the encryption parameter storage unit 290A, as data representing the order p described in the first embodiment.

Using the CPU 911, the verification apparatus 100A inputs the data representing the hash value r and stored by the integer calculation unit 233A, as data representing the integer e described in the first embodiment.

Using the CPU 911, the verification apparatus 100A inputs the data representing the element U and stored by the ciphertext input unit 220, as data representing the element h described in the first embodiment.

Using the CPU 911, the verification apparatus 100A inputs the data representing the element Q and stored by the identifier element storage unit 243A, as data representing the element s described in the first embodiment.

Using the CPU 911 and based on the order p and hash value r represented by the input data, the verification apparatus 100A calculates an integer $e_1$ and integer $e_2$ that satisfy $e_1 \cdot r \equiv e_2 \pmod{p}$ $|e_1| < \sqrt{p}$, and $0 < e_2 < \sqrt{p}$. Using the CPU 911 and based on the element U and element Q represented by the input data and the calculated integer $e_1$ and integer $e_2$, the verification apparatus 100A calculates an element $a = e_1 \cdot U - e_2 \cdot Q$ of the additive group $G_1$ by the operation on the additive group $G_1$. The verification apparatus 100A judges, using the CPU 911 and based on the calculated element a, whether or not the element a is an identity element of the additive group $G_1$. Using the CPU 911, if the element a is an identity element of the additive group $G_1$, the verification apparatus 100A judges that "the verification is successful"; if not, "the verification fails".

Using the CPU 911, the verification apparatus 100A outputs data representing the verification result.

Using the CPU 911, the decrypted text generating unit 260A inputs the data representing the verification result and output by the verification apparatus 100A. If the verification result represented by the input data expresses that "the verification is successful", the decrypted text generating unit 260A generates, using the CPU 911, a common key K. If the verification result expresses that "the verification fails", the decrypted text generating unit 260A does not generate a common key K. Alternatively, if the verification result expresses that "the verification fails", the decrypted text generating unit 260A may generate a random common key K that will be of no clue to the unauthorized person.

If the judgment result expresses that "the verification is successful", using the CPU 911, the decrypted text generating unit 260A inputs the data representing the hash function $H_4$ among the encryption parameters stored by the encryption parameter storage unit 290A, and the bit string m stored by the bit string calculation unit 232A. Using the CPU 911 and based on the hash function $H_4$ represented by the input data and the input bit string m, the decrypted text generating unit 260A calculates a hash value which is obtained when the bit string m is hashed by the hash function $H_4$, and treats it as a common key K. The common key K is a bit string having a predetermined length. Using the RAM 914, the decrypted text generating unit 260A stores the calculated common key K.

If the ciphertext c input by the ciphertext input unit 220A is a correct ciphertext, the bit string m calculated by the bit string calculation unit 232A is equal to the bit string m generated by the secret bit string generating unit 421A of the ciphertext generating apparatus 400A. Hence, the common key K calculated by the decrypted text generating unit 260A is equal to the common key K calculated by the common key calculation unit 427A of the ciphertext generating apparatus 400A.

Therefore, the ciphertext generating apparatus 400A and ciphertext decryption apparatus 200A can share the same common key K.

Using the CPU 911, the common key storage unit 270A inputs the common key K stored by the decrypted text generating unit 260A. Using the RAM 914, the common key storage unit 270A stores the input common key K.

Using the CPU 911, the encrypted message input unit 281A inputs the encrypted message CM received from the ciphertext generating apparatus 400A. Using the magnetic disk drive 920, the encrypted message input unit 281A stores the input encrypted message CM.

Using the CPU 911, the message decryption unit 282A inputs the common key K stored by the common key storage unit 270A, and the encrypted message CM stored by encrypted message input unit 281A. Using the CPU 911, the message decryption unit 282A decrypts the input encrypted message CM by the input common key K, thus generating a message M'. Using the magnetic disk drive 920, the message decryption unit 282A stores the generated message M'.

As the ciphertext generating apparatus 400A and ciphertext decryption apparatus 200A share the same common key K, the message M' generated by the message decryption unit 282A is identical to the message M input by the message input unit 440A of the ciphertext generating apparatus 400A.

Using the CPU 911, the decrypted message output unit 283A inputs the message M' stored by the message decryption unit 282A. Using the CPU 911, the decrypted message output unit 283A outputs the input message M'.

FIG. 15 is a flowchart showing an example of the flow of the ciphertext decryption process used by the ciphertext decryption apparatus 200A according to this embodiment to decrypt the ciphertext c.

In a pairing value calculation step S731A, using the CPU 911 and based on the element U input by the ciphertext input unit 220A and the secret key $D_{ID}$ stored by the key storage unit 210A, the pairing value calculation unit 231A calculates the pairing value of the element U and secret key $D_{ID}$ by the pairing e, and treats it as the pairing value $\alpha$.

In a bit string calculation step S732A, using the CPU 911 and based on the pairing value $\alpha$ calculated by the pairing value calculation unit 231A in the pairing value calculation step S731A, the bit string calculation unit 232A calculates the hash value $H_2(\alpha)$, which is obtained when the pairing value $\alpha$ is hashed by the hash function $H_2$. Using the CPU 911 and based on the bit string V input by the ciphertext input unit 220A and the calculated hash value $H_2(\alpha)$, the bit string calculation unit 232A obtains the bitwise exclusive OR of the bit string V and the hash value $H_2(\alpha)$, and treats the result as the bit string m.

In an integer calculation step S733A, using the CPU 911 and based on the bit string m calculated by the bit string calculation unit 232A in the bit string calculation step S732A, the integer calculation unit 233A calculates the hash value which is obtained when the bit string m is hashed by the hash function $H_3$, and treats it as the hash value r.

In a ciphertext verification step S734A, using the CPU 911 and based on the element Q stored by the identifier element storage unit 243A, the element U input by the ciphertext input unit 220A, and the hash value r calculated by the integer calculation unit 233A in the integer calculation step S733A, the verification apparatus 100A verifies whether U=r·Q.

If U=r·Q, the process advances to a decrypted text generating step S735A.

If U≠r·Q, the ciphertext decryption process is ended.

In the decrypted text generating step S735A, using the CPU 911 and based on the bit string m calculated by the bit string calculation unit 232A in the bit string calculation step S732A, the decrypted text generating unit 260A calculates the hash value which is obtained when the bit string m is hashed by the hash function $H_4$, and treats it as the common key K.

After that, the ciphertext decryption process is ended, and the encrypted message CM is decrypted by the calculated common key K.

In order not to give any clue to decipher a cipher to an unauthorized person who wishes to decipher the cipher illegally, the ciphertext decryption apparatus 200A must verify whether the ciphertext is consistent.

In the ciphertext decryption apparatus 200A according to this embodiment, in order to verify the consistency of the ciphertext, the verification apparatus 100A judges whether or not U=r·Q.

As described in the first embodiment, the verification apparatus 100A can verify whether or not U=r·Q at high speed.

Hence, the ciphertext decryption apparatus 200A can decrypt the ciphertext at high speed.

The ciphertext decryption apparatus 200A according to this embodiment includes a storage device (e.g., RAM 914 and magnetic disk drive 920) which stores data, a processing device (CPU 911) which processes data, the key storage unit 210A, the ciphertext input unit 220A, the ciphertext verification unit 230A, the verification apparatus 100A, and the decrypted text generating unit 260A.

The key storage unit 210 stores, using the storage device, a key (secret key $D_{ID}$) for decrypting the ciphertext.

Using the processing device (CPU 911), the ciphertext input unit 220A inputs the ciphertext c.

Using the processing device (CPU 911) and based on the key (secret key $D_{ID}$) stored by the key storage unit 210A and the ciphertext c input by the ciphertext input unit 220A, the ciphertext verification unit 230 calculates the integer e (hash value r), the element s (element Q) of the finite group G (additive group $G_1$), and the element h (element U) of the finite group G (additive group $G_1$), which are to be input by the verification apparatus 100A.

The verification apparatus 100A inputs the integer e (hash value r), the element s (element Q) of the finite group G (additive group $G_1$), and the element h (element U) of the finite group G (additive group $G_1$), which are calculated by the ciphertext verification unit 230A, and judges whether or not verification is successful.

When the verification apparatus 100A judges that the verification is successful, the decrypted text generating unit 260A, using the processing device (CPU 911), decrypts the ciphertext c input by the ciphertext input unit 220A by means of the key (secret key $D_{ID}$) stored by the key storage unit 210A, to generate the decrypted text (common key K).

According to the ciphertext decryption apparatus 200A of this embodiment, when the verification apparatus 100A verifies the consistency of the ciphertext and judges that the verification is successful, the decrypted text generating unit 260A generates a decrypted text. This can prevent any clue to decipher a cipher from being given to an unauthorized person who inputs an incorrect ciphertext to the ciphertext decryption apparatus 200A with the intention of obtaining from the decryption result a clue to decipher the cipher. Also, the time necessary for the verification apparatus 100A to perform the process of verifying the consistency of the ciphertext can be shortened. Thus, the time necessary for the ciphertext decryption apparatus 200A to perform the entire process of decrypting the ciphertext can be shortened.

The ciphertext decryption apparatus 200A according to this embodiment further has the encryption parameter storage unit 290A, the identifier storage unit 241A, the identifier element calculation unit 242A, and the identifier element storage unit 243A.

Using the storage device (magnetic disk drive 920), the encryption parameter storage unit 290A stores the order p of the finite group G (additive group $G_1$), the generator $g_1$ of the finite group G (additive group $G_1$), and the element R of the finite group G (additive group $G_1$).

Using the storage device (magnetic disk drive 920), the identifier storage unit 241A stores the bit string ID that identifies the ciphertext decryption apparatus 200A.

Using the processing device and based on the bit string ID stored by the identifier storage unit 241A, the identifier element calculation unit 242A calculates the hash value which is obtained when the bit string ID is hashed by the predetermined hash function $H_1$, and treats it as the integer (hash value) $H_1(ID)$. Using the processing device and based on the generator $g_1$ stored by the encryption parameter storage unit 290A, the element R stored by the encryption parameter storage unit 290A, and the calculated integer (hash value) $H_1(ID)$, the identifier element calculation unit 242A adds the element R to an element which is obtained when the generator $g_1$ is multiplied by the integer (hash value) $H_1(ID)$, and treats the result as the element Q ($=R+H_1(ID)\cdot g_1$) of the finite group G (additive group $G_1$).

Using the storage device (magnetic disk drive 920), the identifier element storage unit 243A stores the element Q calculated by the identifier element calculation unit 242A.

Using the storage device, the key storage unit 210A stores the element $D_{ID}$ of the finite group (additive group $G_1$) $G_2$.

Using the processing device (CPU 911), the ciphertext input unit 220A inputs the element U of the finite group G (additive group $G_1$) and the bit string V as the ciphertext c.

The ciphertext verification unit 230A has the pairing value calculation unit 231A, the bit string calculation unit 232A, and the integer calculation unit 233A.

Using the processing device (CPU 911) and based on the element U input by the ciphertext input unit 220A and the element $D_{ID}$ stored by the key storage unit 210A, the pairing value calculation unit 231A calculates the pairing value of the element U and element $D_{ID}$ by a predetermined pairing function e, and treats it as a pairing value $\alpha$ ($=e(U,D_{ID})$).

Using the processing device (CPU 911) and based on the pairing value $\alpha$ calculated by the pairing value calculation unit 231A, the bit string calculation unit 232A calculates a hash value which is obtained when the pairing value $\alpha$ is hashed by the predetermined hash function $H_2$, and treats it as a bit string (hash value) $H_2(\alpha)$. Using the processing device (CPU 911) and based on the bit string V input by the ciphertext input unit 220A and the calculated bit string (hash value) $H_2(\alpha)$, the bit string calculation unit 232A obtains the exclusive ORs of the bit string V and the bit string (hash value) $H_2(\alpha)$, and treats the result as the bit string m ($=V$ XOR $H_2(\alpha)$).

Using the processing device (CPU 911) and based on the bit string m calculated by the bit string calculation unit 232A, the integer calculation unit 233A calculates a hash value which is obtained when the bit string m is hashed by the predetermined hash function $H_3$, and treats it as an integer (hash value) r ($=H_3(m)$).

The verification apparatus 100A inputs the order p stored by the encryption parameter storage unit 290A, the integer (hash value) r calculated by the integer calculation unit 233A as the integer e, the element Q stored by the identifier element storage unit 243A as the element s, and the element U input by the ciphertext input unit 220A as the element h, and judges whether or not the verification is successful.

When the verification apparatus 100A judges that the verification is successful, the decrypted text generating unit 260A, using the processing device (CPU 911), calculates, based on the bit string m calculated by the bit string calculation unit 232A, a hash value which is obtained when the bit string m is hashed by the predetermined hash function $H_4$, and treats it as the common key K ($=H_4(m)$). The decrypted text generating unit 260A outputs the calculated common key K as the decrypted text.

According to the ciphertext decryption apparatus 200A of this embodiment, when the verification apparatus 100A verifies whether $U=r\cdot Q$ and judges that the verification is successful, the decrypted text generating unit 260A generates the decrypted text. This can prevent any clue to decipher a cipher from being given to an unauthorized person. Also, the time necessary for the verification apparatus 100A to perform the process of verifying whether $U=r\cdot Q$ can be shortened. Thus, the time necessary for the ciphertext decryption apparatus 200A to perform the entire process of decrypting the ciphertext can be shortened.

The identifier element calculation unit 242A according to this embodiment calculates the element Q before the ciphertext input unit 220A inputs the ciphertext c.

According to the ciphertext decryption apparatus 200A of this embodiment, the process of calculating the element Q is executed before the ciphertext input unit 220A inputs the ciphertext c. Therefore, the time taken since the ciphertext input unit 220A inputs the ciphertext c until the decrypted text generating unit 260A calculates the common key K can be further shortened.

The ciphertext decryption apparatus 200A according to this embodiment further has the common key storage unit 270A, the encrypted message input unit 281A, and the message decryption unit 282A.

Using the storage device (RAM 914), the common key storage unit 270A stores the common key K output by the decrypted text generating unit 260A.

Using the processing device (CPU 911), the encrypted message input unit 281A inputs the encrypted message CM.

Using the processing device (CPU 911), the message decryption unit 282A decrypts the encrypted message CM input by the encrypted message input unit 281A by means of the common key K stored by the common key storage unit 270A.

According to the ciphertext decryption apparatus 200A of this embodiment, the message decryption unit 282A decrypts the encrypted message CM by the common key K shared with the ciphertext generating apparatus 400A through the ciphertext c. Hence, common key cryptography that enables high-speed processing can be employed for the generation and decryption of the encrypted message CM.

The cryptographic system (ID-based public key cryptographic system 820A) of this embodiment has the verification apparatus 100A.

According to the cryptographic system (ID-based public key cryptographic system 820A) of this embodiment, since the verification apparatus 100A verifies the consistency of the ciphertext, any clue to decipher the cipher can be prevented from being given to the unauthorized person. Also, since the time necessary for the verification apparatus 100A to perform the process of verifying the consistency of the ciphertext can be shortened, the time taken by the entire cryptographic communication can be shortened.

The ciphertext decryption apparatus 200A (public key cryptography decryption apparatus) described so far is a key decapsulation apparatus in a public key cryptographic system (ID-based public key cryptographic system 820A), and has a ciphertext correctness verification apparatus (verification apparatus 100A). The ciphertext correctness verification apparatus judges whether or not a ciphertext is correct by verifying whether or not an element $s^e$ obtained when the element s of the multiplicative group is multiplied e times in accordance with exponentiation on a multiplicative group such as a group formed of the residue classes of integers, or the element e·s obtained when the element s of an additive group is added e times in accordance with the scalar multiplication on an additive group such as a group formed of points on a (hyper)elliptic curve, coincides with the known element h.

The ciphertext correctness verification apparatus (verification apparatus 100A) has a device (integer partitioning unit 110) that partitions an exponential part (integer e), a device (verification value calculation unit 130) that, using the partitioned exponents (the integer $e_1$ and integer $e_2$), calculates a value $h^{e1}-s^{e2}$ by the double-base exponentiation on the multiplicative group, or a value $e_1 \cdot h - e_2 \cdot s$ by the double-base scalar multiplication on the additive group such as a group formed of points on a (hyper) elliptic curve, and a device (verification judging unit 150) that judges whether or not the calculated value is equal to the identity element 1 of the multiplicative group or the identity element 0 of the additive group.

The ciphertext decryption apparatus 200A described so far is an ID-based cryptography decryption apparatus.

The ciphertext decryption apparatus 200A has an advance calculation device (identifier element calculation unit 242A) that calculates, in advance, a value (element $Q=R+H_1(ID) \cdot g_1$) which is calculated from the public parameters (element $g_1$ and public element R) and the ID of the recipient (ciphertext decryption apparatus 200A), and a storage device (identifier element storage unit 243A) that stores the advance calculated value (element Q).

The ciphertext decryption apparatus 200A (ID-based cryptography decryption apparatus) described so far has an advance calculation device (identifier element calculation unit 242A) that calculates, in advance, a value (element Q) which is calculated from the public parameters (element $g_1$ and public element R) and the ID of the recipient (ciphertext decryption apparatus 200A), a storage device (identifier element storage unit 243A) that stores the advance calculated value (element Q), and the verification apparatus 100A that verifies a value ($Q^r$) obtained when the advance calculated value (element Q) is subjected to exponentiation on the multiplicative group, or a value (r·Q) obtained when the advance calculated value (element Q) is subjected to scalar multiplication on the additive group such as a group formed of points on a (hyper)elliptic curve.

The verification apparatus 100A has a device (integer partitioning unit 110) that partitions an exponential part (hash value r), a device (verification value calculation unit 130) that calculates, using the partitioned exponents (integer $e_1$ and integer $e_2$), a value $U^{e1} \cdot Q^{-e2}$ by the double-base exponentiation on the multiplicative group, or a value $e_1 \cdot U - e_2 \cdot Q$ by the double-base scalar multiplication on the additive group such as a group formed of points on a (hyper)elliptic curve, and a device (verification judging unit 150) that judges whether or not the calculated value is equal to the identity element 1 of the multiplicative group or the identity element 0 of the additive group.

The ciphertext decryption apparatus 200A described so far is an SK (Sakai-Kasahara)-ID-based cryptography decryption apparatus.

The ciphertext decryption apparatus 200A has an advance calculation device (identifier element calculation unit 242A) that calculates, in advance, an element $Q=R \cdot g_1^h$ or $Q=R+h \cdot g_1$, which is calculated from the element R and element $g_1$, being the public parameters (encryption parameters), of the multiplicative group or additive group, and the hash value $h=H_1(ID)$ of the bit string ID that identifies the recipient (ciphertext decryption apparatus 200A), a storage device (identifier element storage unit 243A) that stores the element Q, and a ciphertext correctness verification apparatus (verification apparatus 100A) that judges whether a ciphertext is correct by verifying whether or not $Q^r$ or $r \cdot Q$, concerning the integer r as the hash value of the random bit string m, coincides with known U.

The ciphertext decryption apparatus 200A described so far is a key decapsulation apparatus (SK-ID-based cipher key decapsulation apparatus) in an SK-ID-based cryptographic system (ID-based public key cryptographic system 820A).

The ciphertext decryption apparatus 200A has an advance calculation device (identifier element calculation unit 242A) that calculates, in advance, an element $Q=R \cdot g_1^h$ or $Q=R+h \cdot g_1$, which is calculated from the element R and element $g_1$, being the public parameters (encryption parameters), of the multiplicative group or additive group, and the hash value $h=H_1(ID)$ of the bit string ID that identifies the recipient (ciphertext decryption apparatus 200A), a storage device (identifier element storage unit 243A) that stores the element Q, and a ciphertext correctness verification apparatus (verification apparatus 100A) that judges whether a ciphertext is correct by verifying whether or not $Q^r$ or $r \cdot Q$, concerning the integer r which is the hash value of the random bit string m, coincides with known U.

The ciphertext decryption apparatus 200A (SK-ID-based cryptography decryption apparatus) described so far has an advance calculation device (identifier element calculation unit 242A) that calculates, in advance, an element $Q=R \cdot g_1^h$ or $Q=R+h \cdot g_1$, which is calculated from the element R and element $g_1$, being public parameters (encryption parameters), of the multiplicative group or additive group, and the hash value $h=H_1(ID)$ of the bit string ID that identifies the recipient (ciphertext decryption apparatus 200A), a storage device (identifier element storage unit 243A) that stores the element Q, a device (integer calculation unit 233A) that calculates a hash value (integer r) of a random bit string m, a device (integer partitioning unit 110) that partitions an exponential part (integer r), a device (verification value calculation unit 130) that calculates, using the partitioned exponents (integer $e_1$ and integer $e_2$), a value $U^{e_1} \cdot Q^{-e_2}$ by the double-base exponentiation on the multiplicative group, or a value $e_1 \cdot U - e_2 \cdot Q$ by the double-base scalar multiplication on the additive group such as a group formed of points on a (hyper)elliptic curve, and a device (verification judging unit 150) that judges whether or not the calculated value is equal to the identity element 1 of the multiplicative group or the identity element 0 of the additive group.

The ciphertext decryption apparatus 200A (SK-ID-based cipher key decapsulation apparatus) described so far has an advance calculation device (identifier element calculation unit 242A) that calculates, in advance, an element $Q=R \cdot g_1^h$ or $Q=R+h \cdot g_1$, which is calculated from the element R and element $g_1$, being the public parameters (encryption parameters), of the multiplicative group or additive group, and the hash value $h=H_1(ID)$ of the bit string ID that identifies the recipient (ciphertext decryption apparatus 200A), a storage device (identifier element storage unit 243A) that stores the element Q, a device (integer calculation unit 233A) that calculates an integer r which is a hash value of a random bit string m, a device (integer partitioning unit 110) that partitions an exponential part (integer r), a device (verification value calculation unit 130) that calculates, using the partitioned exponents (integer $e_1$ and integer $e_2$), a value $U^{e_1} \cdot Q^{-e_2}$ by the double-base exponentiation on the multiplicative group, or a value $e_1 \cdot U - e_2 \cdot Q$ by the double-base scalar multiplication on the additive group such as a group formed of points on a (hyper)elliptic curve, and a device (verification judging unit 150) that judges whether or not the calculated value is equal to the identity element 1 of the multiplicative group or the identity element 0 of the additive group.

The ID-based public key cryptographic system 820A described so far is an SK-IBKEM cryptographic system which is an ID-based cryptography that utilizes a pairing operation on a (hyper)elliptic curve.

The ID-based public key cryptographic system 820A employs the additive group $G_1$, the additive group $G_2$, and the multiplicative group $G_T$ which have an order p being a prime number, the base point (generator) $g_1$ in the group $G_1$, the base point $g_2$ in the group $G_2$, and the pairing e.

First, using the CPU 911, the encryption parameter setting apparatus 810A (encryption parameter generating apparatus) randomly selects the integer s which is equal to or larger than 1 and equal to or smaller than $p-1$. Then, using the CPU 911, the encryption parameter setting apparatus 810A calculates the element $R=s \cdot g_1$ of the group $G_1$. Using the CPU 911, the encryption parameter setting apparatus 810A outputs the secret key (secret random number) s for the key generating apparatus 300A (key generation center or PKG: Private Key Generator) and the public key (public element) R for the PKG.

Using the CPU 911, the key generating apparatus 300A (secret key derivation device) inputs the bit string ID that identifies the ciphertext decryption apparatus 200A. First, using the CPU 911, the key generating apparatus 300A calculates the hash value h=H1 (ID). Using the CPU 911, the key generating apparatus 300A then calculates the integer $e=1/(s+h) \bmod p$, and calculates an element $d_{ID}=e \cdot g_2$, which is the secret key for the ID, of the group $G_2$ and outputs it.

Using the CPU 911, the ciphertext generating apparatus 400A (encryption apparatus) first generates the random bit string m. Then, using the CPU 911, the ciphertext generating apparatus 400A calculates the hash value $r=H_3(m)$ and the hash value $h=H_1(ID)$, and then calculates the element $Q=R+h \cdot g_1$ of the group $G_1$. Using the CPU 911, the ciphertext generating apparatus 400A calculates the element $U=r \cdot Q$ of the group $G_1$, and calculates the bit string $V=XOR(m,H_2(e(g_1,g_2)^r))$ which is the exclusive ORs of the bit string m and the hash value $H_2(e(g_1,g_2)^r)$. Using the CPU 911, the ciphertext generating apparatus 400A outputs the key (common key) $K=H_4(m)$ and the ciphertext $c=(U,V)$.

The ciphertext decryption apparatus 200A (decryption apparatus) inputs the bit string ID that identifies the ciphertext decryption apparatus 200A itself, the secret key $d_{ID}$ generated by the key generating apparatus 300A, and the ciphertext $c=(U,V)$ output by the ciphertext generating apparatus 400A. The ciphertext decryption apparatus 200A calculates the pairing value $\alpha=e(U,d_{ID})$, and calculates the bit string $m=XOR(V,H_2(\alpha))$ which is the exclusive ORs of the bit string V and the hash value $H_2(\alpha)$. The ciphertext decryption apparatus 200A calculates the hash value $r=H_3(m)$ and the hash value $h=H_1$ (ID), and calculates the element $Q=R+h \cdot g_1$ of the group $G_1$. Using the CPU 911, the ciphertext decryption apparatus 200A checks whether or not $r \cdot Q = U$ is established. If it is not established, the ciphertext decryption apparatus 200A outputs "reject". If it is established, using the CPU 911, the ciphertext decryption apparatus 200A calculates the common key $K = H_4(m)$ and outputs it.

The verification apparatus 100A described so far speeds up the process of checking whether or not $r \cdot Q = U$ is established in the SK-IBKEM cryptographic system.

Using the CPU 911 and based on the element $g_1$ and the element R which are encryption parameters commonly used in the entire system, and the hash value $h = H_1(ID)$ of the ID of the recipient (ciphertext decryption apparatus 200A) itself, the identifier element calculation unit 242A calculates the element $Q = R + h \cdot g_1$ of the group $G_1$ in advance by the double-base scalar multiplication on the group $G_1$ regardless of the content of the communication with the ciphertext generating apparatus 400A.

In the verification apparatus 100A, using the CPU 911, the integer partitioning unit 110 inputs r and p and calculates the integers $e_1$ and $e_2$ that satisfy $e_1 \cdot r \equiv e_2 \pmod{p}$. Using the CPU 911, the verification value calculation unit 130 calculates an element $W = e_2 \cdot Q - e_1 \cdot U$ of the group $G_1$ by the double-base scalar multiplication on the group $G_1$. Using the CPU 911, the verification judging unit 150 checks whether or not the element W is the identity element 0 of the group $G_1$. Thus, whether or not $r \cdot Q = U$ is established is checked at high speed.

Embodiment 3.

The third embodiment will be described with reference to FIGS. 16 to 20.

FIG. 16 shows an example of the entire system configuration of a public key cryptographic system 820B of this embodiment.

In the public key cryptographic system 820B, a ciphertext generating apparatus 400B generates a ciphertext using the public key of a ciphertext decryption apparatus 200B, and the ciphertext decryption apparatus 200B decrypts the ciphertext using a secret key corresponding to the public key.

The public key cryptographic system 820B has an encryption parameter setting apparatus 810B, a key generating apparatus 300B, the ciphertext generating apparatus 400B, and the ciphertext decryption apparatus 200B.

The encryption parameter setting apparatus 810B determines encryption parameters to be used in the public key cryptographic system 820B. The encryption parameters determined by the encryption parameter setting apparatus 810B are open to the user of the public key cryptographic system 820B. The encryption parameters determined by the encryption parameter setting apparatus 810B include, e.g., an order p, an additive group G, an element g of the additive group G, a hash function H, and a key derivation function KDF.

The order p is a prime number.

The order of the additive group G is p. The element g is a generator of the additive group G.

The hash function H is a hash function that generates an integer equal to or larger than 1 and equal to or smaller than p−1 from an ordered pair of two elements of the additive group G.

The key derivation function KDF is a function that generates a bit string having a predetermined length from an ordered pair of two elements of the additive group G.

When these encryption parameters are predetermined, the encryption parameter setting apparatus 810A can be omitted.

The key generating apparatus 300B generates a pair of a secret key and a public key based on the public encryption parameters. In secret, the secret key generated by the key generating apparatus 300B is notified to the ciphertext decryption apparatus 200B. The public key generated by the key generating apparatus 300B is open to the user in the form of, e.g., a public key certificate, as the public key of the ciphertext decryption apparatus 200B.

The key generating apparatus 300B generates four elements g', c, d, and h of the additive group G as the public key. The key generating apparatus 300B generates four integers w, x, y, and z, each equal to or larger than 1 and equal to or smaller than p−1, as the secret key.

The key generating apparatus 300B may be part of the ciphertext decryption apparatus 200B.

The ciphertext generating apparatus 400B generates a ciphertext c and a common key K based on the public encryption parameters and the public key. The ciphertext generating apparatus 400B encrypts a message M by the generated common key K, thus generating an encrypted message CM. The ciphertext generating apparatus 400B transmits the generated ciphertext c and the encrypted message CM to the ciphertext decryption apparatus 200B.

The ciphertext decryption apparatus 200B holds, in secret, the secret key generated by the key generating apparatus 300B. The ciphertext decryption apparatus 200B receives the ciphertext c and encrypted message CM transmitted by the ciphertext generating apparatus 400B. Based on the public encryption parameters, the ciphertext decryption apparatus 200B decrypts the received ciphertext c by the secret key it holds, thus generating a common key K identical to that of the ciphertext generating apparatus 400B. The ciphertext decryption apparatus 200B decrypts the encrypted message CM by the generated common key K, thus generating a message M' identical to the message M.

The appearances and hardware resources of the encryption parameter setting apparatus 810B, key generating apparatus 300B, ciphertext generating apparatus 400B, and ciphertext decryption apparatus 200B are similar to those of the ciphertext decryption apparatus 200 described in the first embodiment.

FIG. 17 is a block diagram showing a configuration example of the function block of the key generating apparatus 300B of this embodiment.

The key generating apparatus 300B has an encryption parameter storage unit 390B, a secret key generating unit 350B, a public key generating unit 370B, a secret key output unit 360B, and a public key output unit 380B.

Using a magnetic disk drive 920, the encryption parameter storage unit 390B stores data representing the public encryption parameters in advance.

The secret key generating unit 350B generates the secret key based on the encryption parameters stored by the encryption parameter storage unit 390B.

The secret key generating unit 350B has four secret random number generating units 351B to 354B.

Using a CPU 911, each of the four secret random number generating units 351B to 354B inputs the data representing the order p among the encryption parameters stored by the encryption parameter storage unit 390B. Using the CPU 911, each of the four secret random number generating units 351B to 354B randomly generates an integer equal to or larger than 1 and equal to or smaller than p−1 based on the order p represented by the input data.

The first secret random number generating unit 351B treats the generated integer as the integer w and, using a RAM 914, stores data representing the generated integer w.

The second secret random number generating unit 352B treats the generated integer as the integer x and, using the RAM 914, stores data representing the generated integer x.

The third secret random number generating unit 353B treats the generated integer as the integer y and, using the RAM 914, stores data representing the generated integer y.

The fourth secret random number generating unit 354B treats the generated integer as the integer z and, using the RAM 914, stores data representing the generated integer z.

Based on the encryption parameters stored by the encryption parameter storage unit 390B and the secret key generated by the secret key generating unit 350B, the public key generating unit 370B generates the public key.

The public key generating unit 370B has four public element calculation units 371B to 374B.

Using the CPU 911, each of the four public element calculation units 371B to 374B inputs the data representing the additive group G and element g among the encryption parameters stored by the encryption parameter storage unit 390B.

Using the CPU 911, the first public element calculation unit 371B inputs the data representing the integer w and stored by the first secret random number generating unit 351B. Using the CPU 911 and based on the additive group G, element g, and integer w represented by the input data, the first public element calculation unit 371B calculates an element which is obtained when the element g is added w times by the operation on the additive group G, and treats the calculated element as the element g'. Using the RAM 914, the first public element calculation unit 371B stores data representing the calculated element g'.

Using the CPU 911, the second public element calculation unit 372B inputs the data representing the integer x and stored by the second secret random number generating unit 352B. Using the CPU 911 and based on the additive group G, element g, and integer x represented by the input data, the second public element calculation unit 372B calculates an element which is obtained when the element g is added x times by the operation on the additive group G, and treats the calculated element as the element c. Using the RAM 914, the second public element calculation unit 372B stores data representing the calculated element c.

Using the CPU 911, the third public element calculation unit 373B inputs the data representing the integer y and stored by the third secret random number generating unit 353B. Using the CPU 911 and based on the additive group G, element g, and integer y represented by the input data, the third public element calculation unit 373B calculates an element which is obtained when the element g is added y times by the operation on the additive group G, and treats the calculated element as the element d. Using the RAM 914, the third public element calculation unit 373B stores data representing the calculated element d.

Using the CPU 911, the fourth public element calculation unit 374B inputs the data representing the integer z and stored by the fourth secret random number generating unit 354B. Using the CPU 911 and based on the additive group G, element g, and integer z represented by the input data, the fourth public element calculation unit 374B calculates an element which is obtained when the element g is added z times by the operation on the additive group G, and treats the calculated element as the element h. Using the RAM 914, the fourth public element calculation unit 374B stores data representing the calculated element h.

Using the CPU 911, the secret key output unit 360B inputs the data representing the integer w, integer x, integer y, and integer z stored by the four secret random number generating units 351B to 354B. Using the CPU 911, the secret key output unit 360B outputs, as the secret key, the data representing the input integer w, integer x, integer y, and integer z.

In secret, the secret key output by the secret key output unit 360B is notified to the ciphertext decryption apparatus 200B.

Using the CPU 911, the public key output unit 380B inputs the data representing the element g', element c, element d, and element h stored by the four public element calculation units 371B to 374B. Using the CPU 911, the public key output unit 380B outputs, as the public key, the input data representing the element g', element c, element d, and element h.

The public key output by the public key output unit 380B is open to the user of the public key cryptographic system 820B as the public key of the ciphertext decryption apparatus 200.

FIG. 18 is a block diagram showing a configuration example of the function block of the ciphertext generating apparatus 400B of this embodiment.

The ciphertext generating apparatus 400B has an encryption parameter storage unit 490B, a public key storage unit 410B, a common key generating unit 420B, a ciphertext output unit 470B, a common key storage unit 430B, a message input unit 440B, a message encryption unit 450B, and an encrypted message output unit 460B.

Using the magnetic disk drive 920, the encryption parameter storage unit 490B stores data representing the public encryption parameters in advance.

Using the magnetic disk drive 920, the public key storage unit 410B stores data representing the public key of the ciphertext decryption apparatus 200B to which the ciphertext is to be transmitted.

Based on the encryption parameters stored by the encryption parameter storage unit 490B and the public key stored by the public key storage unit 410B, the common key generating unit 420B generates the common key K and the ciphertext which serves to notify the common key K to the ciphertext decryption apparatus 200B.

The common key generating unit 420B has a secret random number generating unit 421B, a first cipher element calculation unit 422B, a second cipher element calculation unit 423B, a hash value calculation unit 424B, an integer calculation unit 425B, a third cipher element calculation unit 426B, a secret element calculation unit 427B, and a common key calculation unit 428B.

Using the CPU 911, the secret random number generating unit 421B inputs the data representing the order p among the encryption parameters stored by the encryption parameter storage unit 490B. Using the CPU 911 and based on the order p represented by the input data, the secret random number generating unit 421B randomly generates an integer equal to or larger than 1 and equal to or smaller than p−1, and treats it as a secret random number r. Using the RAM 914, the secret random number generating unit 421B stores data representing the generated secret random number r.

Using the CPU 911, the first cipher element calculation unit 422B inputs the data representing the additive group G and element g among the encryption parameters stored by the encryption parameter storage unit 490B, and the data representing the secret random number r and stored by the secret random number generating unit 421B. Using the CPU 911 and based on the additive group G, element g, and secret random number r represented by the input data, the first cipher element calculation unit 422B calculates an element which is obtained when the element g is added r times by the operation on the additive group G, and treats it as an element u. Using the RAM 914, the first cipher element calculation unit 422B stores data representing the calculated element u.

Using the CPU 911, the second cipher element calculation unit 423B inputs the data representing the additive group G among the encryption parameters stored by the encryption parameter storage unit 490B, the data representing the element g' of the public key of the ciphertext decryption apparatus 200B stored by the public key storage unit 410B, and the data representing the secret random number r and stored by the secret random number generating unit 421B. Using the CPU 911 and based on the additive group G, element g', and secret random number r represented by the input data, the second cipher element calculation unit 423B calculates an element which is obtained when the element g' is added r times by the operation on the additive group G, and treats it as an element u'. Using the RAM 914, the second cipher element calculation unit 423B stores data representing the calculated element u'.

Since g'=w·g and u=r·g, the element u' calculated by the second cipher element calculation unit 423B is expressed as:

$$u' = r \cdot g' = w \cdot u \qquad \text{[Equation 24]}$$

Using the CPU 911, the hash value calculation unit 424B inputs the data representing the hash function H among the encryption parameters stored by the encryption parameter storage unit 490B, the data representing the element u and stored by the first cipher element calculation unit 422B, and the data representing the element u' and stored by the second cipher element calculation unit 423B. Using the CPU 911 and based on the hash function H, element u, and element u' represented by the input data, the hash value calculation unit 424B calculates a hash value which is obtained when an ordered pair of the element u and element u' is hashed, and treats it as a hash value α. The hash value α is an integer equal to or larger than 1 and equal to or smaller than p−1. Using the RAM 914, the hash value calculation unit 424B stores data representing the calculated hash value α.

Using the CPU 911, the integer calculation unit 425B inputs the data representing the order p among the encryption parameters stored by the encryption parameter storage unit 490B, the data representing the secret random number r and stored by the secret random number generating unit 421B, and the data presenting the hash value α calculated by the hash value calculation unit 424B. Using the CPU 911 and based on the order p, secret random number r, and hash value α represented by the input data, the integer calculation unit 425B calculates a remainder which is obtained when the product of the hash value α and secret random number r is divided by the order p, and treats it as an integer r'. Using the RAM 914, the integer calculation unit 425B stores data representing the calculated integer r'.

Using the CPU 911, the third cipher element calculation unit 426B inputs the data representing the additive group G among the encryption parameters stored by the encryption parameter storage unit 490B, the data representing the element c and element d of the public key of the ciphertext decryption apparatus 200B stored by the public key storage unit 410B, the data representing the secret random number r and stored by the secret random number generating unit 421B, and the data representing the integer r' and stored by the integer calculation unit 425B. Using the CPU 911 and based on the additive group G, element c, element d, secret random number r, and integer r' represented by the input data, the third cipher element calculation unit 426B calculates an element which is the sum of an element obtained when the element c is added r times and an element obtained when the element d is added r' times by the operation on the additive group G, and treats the sum as an element v. Using the RAM 914, the third cipher element calculation unit 426B stores data representing the calculated element v.

Since c=x·g, d=y·g, and u=r·g, the element v calculated by the third cipher element calculation unit 426B is expressed as:

$$\begin{aligned} v &= r \cdot c + r' \cdot d \qquad \text{[Equation 25]} \\ &= (r \cdot x + r' \cdot y) \cdot g \\ &= (x + \alpha \cdot y) \cdot u \end{aligned}$$

Using the CPU 911, the secret element calculation unit 427B inputs the data representing the additive group G among the encryption parameters stored by the encryption parameter storage unit 490B, the data representing the element h of the public key, stored by the public key storage unit 410B, of the ciphertext decryption apparatus 200B, and the data representing the secret random number r and stored by the secret random number generating unit 421B. Using the CPU 911 and based on the additive group G, element h, and secret random number r represented by the input data, the secret element calculation unit 427B calculates an element which is obtained when the element h is added r times by the operation on the additive group G, and treats it as an element h~. Using the CPU 911, the secret element calculation unit 427B stores data representing the calculated element h~.

Since h=z·g and u=r·g, the element h~ calculated by the secret element calculation unit 427B is expressed as:

$$\tilde{h} = r \cdot h = z \cdot u \qquad \text{[Equation 26]}$$

Using the CPU 911, the common key calculation unit 428B inputs the data representing the key derivation function KDF among the encryption parameters stored by the encryption parameter storage unit 490B, the data representing the element u and stored by the first cipher element calculation unit 422B, and the data representing the element h~ and stored by the secret element calculation unit 427B. Based on the key derivation function KDF, element u, and element h~ represented by the input data, the common key calculation unit 428B calculates a bit string from an ordered pair of the element u and element h~ by the key derivation function, and treats it as a common key K. Using the RAM 914, the common key calculation unit 428B stores the calculated common key K.

Using the CPU 911, the common key storage unit 430B inputs the common key K stored by the common key calculation unit 428B. Using the RAM 914, the common key storage unit 430B stores the input common key K.

Using the CPU 911, the ciphertext output unit 470B inputs the data representing the element u and stored by the first cipher element calculation unit 422B, the data representing the element u' and stored by the second cipher element calculation unit 423B, and the data representing the element v and stored by the third cipher element calculation unit 426B. Using the CPU 911, the ciphertext output unit 470B outputs data representing the input element u, element u', and element v as the ciphertext c.

Using the CPU 911, the message input unit 440B inputs the message M to be transmitted to the ciphertext decryption apparatus 200B. Using the magnetic disk drive 920, the message input unit 440B stores the input message M.

Using the CPU 911, the message encryption unit 450B inputs the common key K stored by the common key storage unit 430B and the message M stored by the message input unit 440B. Using the CPU 911 and based on the input message M and common key K, the message encryption unit 450B encrypts the message M by the common key K into the encrypted message CM. Using the magnetic disk drive 920, the message encryption unit 450B stores the encrypted message CM it has generated.

Using the CPU 911, the encrypted message output unit 460B inputs the encrypted message CM stored by the message encryption unit 450B. Using the CPU 911, the encrypted message output unit 460B outputs the input encrypted message CM.

The ciphertext c output by the ciphertext output unit 470B and the encrypted message CM output by the encrypted message output unit 460B are transmitted to the ciphertext decryption apparatus 200B.

FIG. 19 is a block diagram showing a configuration example of the function block of the ciphertext decryption apparatus 200B of this embodiment.

The ciphertext decryption apparatus 200B has an encryption parameter storage unit 290B, a key storage unit 210B, a ciphertext input unit 220B, a ciphertext verification unit 230B, a verification apparatus 100B, a decrypted text generating unit 260B, a common key storage unit 270B, an encrypted message input unit 281B, a message decryption unit 282B, and a decrypted message output unit 283B.

Using the magnetic disk drive 920, the encryption parameter storage unit 290B stores data representing the public encryption parameters in advance.

In secret, using a tamper-resistant storage device, the key storage unit 210B stores data representing the secret key generated by the key generating apparatus 300B in advance.

Using the CPU 911, the ciphertext input unit 220B inputs the ciphertext c received from the ciphertext generating apparatus 400B. Using the CPU 911, the ciphertext input unit 220B acquires the data representing the element u, element u', and element v from the input ciphertext c. Using the RAM 914, the ciphertext input unit 220B stores the acquired data representing the element u, element u', and element v.

The ciphertext verification unit 230B has a hash value calculation unit 231B and an integer calculation unit 232B.

Using the CPU 911, the hash value calculation unit 231B calculates the data representing the hash function H among the encryption parameters stored by the encryption parameter storage unit 290B, and the data representing the element u and element u' and stored by the ciphertext input unit 220B. Using the CPU 911 and based on the hash function H, element u, and element u' represented by the input data, the hash value calculation unit 231B calculates a hash value which is obtained when an ordered pair of the element u and element u' is hashed by the hash function H, and treats it as a hash value $\alpha$. The hash value $\alpha$ is an integer equal to or larger than 1 and equal to or smaller than p−1. Using the RAM 914, the hash value calculation unit 231B stores data representing the calculated hash value $\alpha$.

The hash value $\alpha$ calculated by the hash value calculation unit 231B is equal to the hash value $\alpha$ calculated by the hash value calculation unit 424B of the ciphertext generating apparatus 400B.

Using the CPU 911, the integer calculation unit 232B inputs the data representing the order p among the encryption parameters stored by the encryption parameter storage unit 290B, the data representing the integer x and integer y of the secret key stored by the key storage unit 210B, and the hash value $\alpha$ stored by the hash value calculation unit 231B. Using the CPU 911 and based on the order p, integer x, integer y, and hash value $\alpha$ represented by the input data, the integer calculation unit 232B calculates a remainder which is obtained when the sum of the integer x and the product of the integer y and hash value $\alpha$ is divided by the order p, and treats it as an integer t. Using the CPU 911, the integer calculation unit 232B stores data representing the calculated integer t.

If the ciphertext c input by the ciphertext input unit 220A is a correct ciphertext, equation 24 and equation 25 are established. Hence, whether the ciphertext c input by the ciphertext input unit 220A is a correct ciphertext can be judged by verifying whether u'=w·u and v=t·u.

The verification apparatus 100B checks whether or not u'=w·u and checks whether or not v=t·u. If u'=w·u and v=t·u, the verification apparatus 100B judges that the verification is successful.

Either checking may come first. In the following explanation, whether or not u'=w·u is checked first, and then whether or not v=t·u is checked.

The verification apparatus 100B is an apparatus corresponding to the verification apparatus 100 described in the first embodiment.

First, the verification apparatus 100B checks whether or not u'=w·u.

Using the CPU 911, the verification apparatus 100B inputs the data representing the order p among the encryption parameters stored by the encryption parameter storage unit 290B, as data representing the order p described in the first embodiment.

Using the CPU 911, the verification apparatus 100B inputs the data representing the integer w of the secret key stored by the key storage unit 210B, as data representing the integer e described in the first embodiment.

Using the CPU 911, the verification apparatus 100B inputs the data representing the element u' and stored by the ciphertext input unit 220B, as data representing the element h described in the first embodiment.

Using the CPU 911, the verification apparatus 100B inputs the data representing the element u and stored by the ciphertext input unit 220B, as data representing the element s described in the first embodiment.

Using the CPU 911 and based on the order p and integer w represented by the input data, the verification apparatus 100B calculates an integer $e_1$ and an integer $e_2$ that satisfy $e_1 \cdot w \equiv e_2 \pmod{p}$, $|e_1| < \sqrt{p}$, and $0 < e_2 < \sqrt{p}$. The integer w is part of the secret key of the ciphertext decryption apparatus 200 and is known before the ciphertext input unit 220B inputs the ciphertext c. Hence, using the CPU 911, the verification apparatus 100B may calculate the integer $e_1$ and the integer $e_2$ in advance before the ciphertext input unit 220B inputs the ciphertext c, and store them using the tamper-resistant storage device.

Using the CPU 911 and based on the element u and element u' represented by the input data and the calculated integer $e_1$ and integer $e_2$, the verification apparatus 100B calculates an element $a = e_1 \cdot u' - e_2 \cdot u$ of the additive group G by the operation on the additive group G. Using the CPU 911 and based on the calculated element a, the verification apparatus 100B judges whether or not the element a is the identity element of the additive group G. Using the CPU 911, if the element a is the identity element of the additive group G, the verification apparatus 100B judges that the first verification is successful; if not, "the verification fails".

When it is judged that the first verification is successful, then the verification apparatus 100B judges whether or not v=t·u.

Using the CPU 911, the verification apparatus 100B inputs the data representing the order p among the encryption parameters stored by the encryption parameter storage unit 290B, as data representing the order p described in the first embodiment.

Using the CPU 911, the verification apparatus 100B inputs the data representing the integer t and stored by the ciphertext input unit 220, as data representing the element e described in the first embodiment.

Using the CPU 911, the verification apparatus 100B inputs the data representing the element v and stored by the ciphertext input unit 220, as data representing the element h described in the first embodiment.

Using the CPU 911, the verification apparatus 100B inputs the data representing the element u and stored by the ciphertext input unit 220, as data representing the element s described in the first embodiment.

Using the CPU 911 and based on the order p and integer t represented by the input data, the verification apparatus 100B calculates an integer $e_1$ and an integer $e_2$ that satisfy $e \cdot t \equiv e_2 \pmod{p}$, $|e_1| < \sqrt{p}$, and $0 < e_2 < \sqrt{p}$. Using the CPU 911 and based on the element v and element u represented by the input data and the calculated integer $e_1$ and integer $e_2$, the verification apparatus 100B calculates an element $a = e_1 \cdot v - e_2 \cdot u$ of the additive group G by the operation on the additive group G. Using the CPU 911 and based on the calculated element a, the verification apparatus 100B judges whether or not the element a is the identity element of the additive group G. Using the CPU 911, if the element a is the identity element of the additive group G, the verification apparatus 100B judges that the second verification is also successful and accordingly "the verification is successful"; if not, "the verification fails".

Using the CPU 911, the verification apparatus 100B outputs data representing the verification result.

When the verification apparatus 100B judges that "the verification is successful", the decrypted text generating unit 260B generates a common key K.

The decrypted text generating unit 260B has a secret element calculation unit 261B and a common key calculation unit 262B.

Using the CPU 911, the secret element calculation unit 261B inputs the data representing the verification result and output by the verification apparatus 100B. If the verification result represented by the input data expresses that "the verification is successful", using the CPU 911, the secret element calculation unit 261B inputs the data representing the additive group G among the encryption parameters stored by the encryption parameter storage unit 290B, the data representing the integer z of the secret key stored by the key storage unit 210B, and the data representing the element u and stored by the ciphertext input unit 220B. Using the CPU 911 and based on the additive group G, integer z, and element u represented by the input data, the secret element calculation unit 261B calculates an element which is obtained when the element u is added z times by the operation on the additive group G, and treats it as an element $h^\sim$. Using the RAM 914, the secret element calculation unit 261B stores data representing the calculated element $h^\sim$.

If the ciphertext c input by the ciphertext input unit 220A is a correct ciphertext, from Equation 26, the element $h^\sim$ calculated by the secret element calculation unit 261B is equal to the element $h^\sim$ calculated by the secret element calculation unit 427B.

Using the CPU 911, the common key calculation unit 262B inputs the data representing the key derivation function KDF among the encryption parameters stored by the encryption parameter storage unit 290B, the data representing the element u and stored by the ciphertext input unit 220B, and the data representing the element $h^\sim$ and stored by the secret element calculation unit 261B. Using the CPU 911 and based on the key derivation function KDF, element u, and element $h^\sim$ represented by the input data, the common key calculation unit 262B calculates a bit string from an ordered pair of the element u and element $h^\sim$ by the key derivation function KDF, and treats it as the common key K. Using the RAM 914, the common key calculation unit 262B stores the calculated common key K.

The element $h^\sim$ calculated by the secret element calculation unit 261B is equal to the element $h^\sim$ calculated by the secret element calculation unit 427B of the ciphertext generating apparatus 400B. Hence, the common key K calculated by the common key calculation unit 262B is equal to the common key K calculated by the common key calculation unit 428B of the ciphertext generating apparatus 400B.

Therefore, the ciphertext generating apparatus 400B and the ciphertext decryption apparatus 200B can share the same common key K.

Using the CPU 911, the common key storage unit 270B inputs the common key K stored by the common key calculation unit 262B. Using the RAM 914, the common key storage unit 270B stores the input common key K.

Using the CPU 911, the encrypted message input unit 281B inputs the encrypted message CM received from the ciphertext generating apparatus 400B. Using the magnetic disk drive 920, the encrypted message input unit 281B stores the input encrypted message CM.

Using the CPU 911, the encrypted message input unit 281B inputs the common key K stored by the common key storage unit 270B, and the encrypted message CM stored by the encrypted message input unit 281B. Using the CPU 911, the message decryption unit 282B decrypts the input encrypted message CM by the input common key K, thus generating a message M'. Using the magnetic disk drive 920, the message decryption unit 282B stores the generated message M'.

As the ciphertext generating apparatus 400B and the ciphertext decryption apparatus 200B share the same common key K, the message M' generated by the message decryption unit 282B is identical to the message M input by the message input unit 440B.

Using the CPU 911, the decrypted message output unit 283B inputs the message M' stored by the message decryption unit 282B. Using the CPU 911, the decrypted message output unit 283B outputs the input message M'.

FIG. 20 is a flowchart showing an example of the flow of the ciphertext decryption process used by the ciphertext decryption apparatus 200A according to this embodiment to decrypt the ciphertext c.

In a hash value calculation step S731B, using the CPU 911 and based on the element u and element u' input by the ciphertext input unit 220B, the hash value calculation unit 231B calculates a hash value which is obtained when the ordered pair of the element u and element u' is hashed by the hash function H, and treats it as a hash value α.

In an integer calculation step S732B, using the CPU 911 and based on the order p stored by the encryption parameter storage unit 290B, the integer x and integer y stored by the key storage unit 210B, and the hash value α calculated by the hash value calculation unit 231B in the hash value calculation step S731B, the integer calculation unit 232B calculates the remainder which is obtained when the sum of the integer x and the product of the integer y and hash value α is divided by the order p, and treats it as the integer t.

In a first verification step S733B, using the CPU 911 and based on the integer w stored by the key storage unit 210 and the element u and element u' input by the ciphertext input unit 220A, the verification apparatus 100B verifies whether u'=w·u.

If u'=w·u, the process advances to a second verification step S734B.

If u'≠w·u, the ciphertext decryption process is ended.

In the second verification step S734B, using the CPU 911, and based on the element u and element v input by the ciphertext input unit 220B and the integer t calculated by the integer calculation unit 232B in the integer calculation step S732B, the verification apparatus 100B verifies whether v=t·u.

If v=t·u, the process advances to a secret element calculation step S735B.

If v≠t·u, the ciphertext decryption process is ended.

In the secret element calculation step S735B, using the CPU 911 and based on the integer z stored by the key storage unit 210B and the element u input by the ciphertext input unit 220B, the secret element calculation unit 261B calculates the element which is obtained when the element u is added z times by the operation on the additive group G, and treats it as the element h~.

In a common key calculation step S736, using the CPU 911 and based on the element u input by the ciphertext input unit 220B and the element h~ calculated by the secret element calculation unit 261B in the secret element calculation step S735B, the common key calculation unit 262B calculates the bit string from the ordered pair of the element u and element h~ by the key derivation function KDF, and treats it as the common key K.

After that, the ciphertext decryption process is ended, and the encrypted message CM is decrypted using the calculated common key K.

The ciphertext decryption apparatus 200B according to this embodiment further has the encryption parameter storage unit 290B.

Using the storage device (magnetic disk drive 920), the encryption parameter storage unit 290B stores the order p of the finite group (additive group) G.

Using the storage device, the key storage unit 210B stores the integer w equal to or larger than 1 and equal to or smaller than p−1, the integer x equal to or larger than 1 and equal to or smaller than p−1, the integer y equal to or larger than 1 and equal to or smaller than p−1, and the integer z equal to or larger than 1 and equal to or smaller than p−1.

Using the processing device (CPU 911), the ciphertext input unit 220B inputs the element u of the finite group (additive group) G, the element u' of the finite group (additive group) G, and the element v of the finite group (additive group) G, as the ciphertext c.

The ciphertext verification unit 230B has the hash value calculation unit 231B and the integer calculation unit 232B.

Using the processing device (CPU 911) and based on the element u and element u' input by the ciphertext input unit 220B, the hash value calculation unit 231B calculates the hash value which is obtained when the element u and element u' are hashed by the predetermined hash function H, and treats it as an integer (hash value) α (=H(u,u')).

Using the processing device (CPU 911), and based on the order p stored by the encryption parameter storage unit 290B, the integer x and integer y stored by the key storage unit 210B, and the integer (hash value) α calculated by the hash value calculation unit 231B, the integer calculation unit 232B calculates the remainder which is obtained when the sum of the integer x and the product of the integer y and integer (hash value) α is divided by the order p, and treats it as the integer t (=(x+y·α)mod p).

The verification apparatus 100B inputs the order p stored by the encryption parameter storage unit 290B, the integer w stored by the key storage unit 210B as the integer e, the element u input by the ciphertext input unit 220B as the element s, and the element u' input by the ciphertext input unit 220B as the element h, judges whether or not the verification is successful, and treats the judgment result as the first verification result. The verification apparatus 100B inputs the order p stored by the encryption parameter storage unit 290B, the integer t stored by the integer calculation unit 232B as the integer e, the element u input by the ciphertext input unit 220B as the element s, and the element v input by the ciphertext input unit 220B as the element h, judges whether or not the verification is successful, and treats the judgment result as the second verification result.

When both the first verification result and the second verification result show that the verification apparatus 100B judges the verification successful, using the processing device (CPU 911) and based on the integer z stored by the key storage unit 210B and the element u input by the ciphertext input unit 220B, the decrypted text generating unit 260B calculates the element which is obtained when the element u is added z times, and treats the result as the element h (=z·u) of the finite group G. Using the processing device (CPU 911) and based on the element u input by the ciphertext input unit 220B and the calculated element h~, the decrypted text generating unit 260B generates the common key K (=KDF (u, h~)) from the element u and the element h~ by the predetermined key derivation function KDF, and outputs the generated common key K as the decrypted text.

With the ciphertext decryption apparatus 200B according to this embodiment, when the verification apparatus 100B verifies whether u'=w·u and v=t·u and judges that the verification is successful, the decrypted text generating unit 260B generates a decrypted text. This can prevent any clue to decipher a cipher from being given to an unauthorized person. Also, the time necessary for the verification apparatus 100B to perform the process of verifying whether u'=w·u and v=t·u can be shortened. Thus, the time necessary for the ciphertext decryption apparatus 200B to perform the entire process of decrypting the ciphertext can be shortened.

The ciphertext decryption apparatus 200B according to this embodiment further has the common key storage unit 270B, the encrypted message input unit 281B, and the message decryption unit 282B.

Using the storage device (RAM 914), the common key storage unit 270B stores the common key K output by the decrypted text generating unit 260B.

Using the processing device (CPU 911), the encrypted message input unit 281B inputs the encrypted message CM.

Using the processing device (CPU 911) and by means of the common key K stored by the common key storage unit 270B, the message decryption unit 282B decrypts the encrypted message CM input by the encrypted message input unit 281B.

With the ciphertext decryption apparatus 200B according to this embodiment, the message decryption unit 282B decrypts the encrypted message CM by means of the common key K which is shared with the ciphertext generating apparatus 400B through the ciphertext c. Thus, the common key cryptographic system that can perform high-speed processing can be employed for generation and decryption of the encrypted message CM.

The ciphertext decryption apparatus 200B (public key cryptography decryption apparatus) described so far has, in order to verify whether a relationship $u'=u^w$ (multiplicative description) or $u'=w \cdot u$ (additive description) is established among the element u and element u', which are part of the ciphertext, of the multiplicative group or additive group, and the integer w as part of the secret key, a device (integer partitioning unit 110) that partitions an exponential part (integer w), a device (verification value calculation unit 130) that calculates, using the partitioned exponents (integer $e_1$ and integer $e_2$), a value $u'^{e_1} u^{-e_2}$ by the double-base exponentiation on the multiplicative group, or a value $e_1 \cdot u' - e_2 \cdot u$ by the double-base scalar multiplication on the additive group such as a group formed on points on a (hyper) elliptic curve, and a device (verification judging unit 150) that judges whether or not the obtained value is equal to the identity element 1 of the multiplicative group or the identity element 0 of the additive group.

The ciphertext decryption apparatus 200B (public key cryptography decryption apparatus) described so far has, in order to verify whether a relationship $v=u^t$ (multiplicative description) or $t \cdot u=v$ (additive description) is established among the exponent (integer) t calculated based on the hash value $\alpha$ calculated from part (element u and element u') of the ciphertext and the element u and element v as part of the ciphertext, a device (integer partitioning unit 110) that partitions an exponential part (integer w), a device (verification value calculation unit 130) that calculates, using the partitioned exponents (integer $e_1$ and integer $e_2$), a value $v^{e_1} \cdot u^{-e_2}$ by the double-base exponentiation on the multiplicative group, or a value $e_1 \cdot v - e_2 \cdot u$ by the double-base scalar multiplication on the additive group such as a group formed on points on a (hyper) elliptic curve, and a device (verification judging unit 150) that judges whether or not the obtained value is equal to the identity element 1 of the multiplicative group or the identity element 0 of the additive group.

The public key cryptographic system 820B described so far is a key encapsulation scheme ACE-KEM cryptographic system that is standardized based on the Cramer-Shoup public key cryptography.

The public key cryptographic system 820B employs the group (additive group) G having the prime-number order p and the base point (generator) g in the group G.

Using the CPU 911, the key generating apparatus 300B randomly selects the integer w, integer x, integer y, and integer z each of which is equal to or larger than 0 and equal to or smaller than p−1. Using the CPU 911, the key generating apparatus 300B calculates the element $g'=w \cdot g$ of the group G, the element $c=x \cdot g$ of the group G, the element $d=y \cdot g$ of the group G, and the element $h=z \cdot g$ of the group G. Using the CPU 911, the key generating apparatus 300B outputs the public key (g',c,d,h) and the secret key (w,x,y,z).

Using the CPU 911, the ciphertext generating apparatus 400B (encryption apparatus) inputs the public key (g',c,d,h). Using the CPU 911, the ciphertext generating apparatus 400B generates the random number r equal to or larger than 0 and equal to or smaller than p−1, and calculates the element $u=r \cdot g$ of the group G, the element $u'=r \cdot g'$ of the group G, and the element $h^\sim = r \cdot h$ of the group G. Using the CPU 911, the ciphertext generating apparatus 400B calculates the hash value $\alpha=H(u \| u')$, which is obtained when a bit string $u \| u'$ obtained by concatenating a bit string expressing the element u and a bit string expressing the element u' is hashed, and calculates the integer $r'=\alpha \cdot r \bmod p$. Using the CPU 911, the ciphertext generating apparatus 400B calculates the element $v=r \cdot c + r' \cdot d$ of the group G. Using the CPU 911, the ciphertext generating apparatus 400B calculates the key $K=KDF(u \| h^\sim)$, which is derived based on a bit string $u \| h^\sim$ obtained when the bit string expressing the element u and a bit string expressing the element $h^\sim$ are concatenated. Using the CPU 911, the ciphertext generating apparatus 400B outputs a ciphertext $C_0=(u,u',v)$ and the key K.

Using the CPU 911, the ciphertext decryption apparatus 200B (decryption apparatus) inputs the secret key (w,x,y,z) and the ciphertext $C_0=(u,u',v)$. Using the CPU 911, the ciphertext decryption apparatus 200B calculates the hash value $\alpha=H(u \| u')$, which is obtained when the bit string $u \| u'$ obtained by concatenating the bit string expressing the element u and the bit string expressing the element u' is hashed. Using the CPU 911, the ciphertext decryption apparatus 200B calculates the integer $t=x+y \cdot \alpha \bmod p$. Using the CPU 911, the ciphertext decryption apparatus 200B checks whether or not $w \cdot u=u'$ and $t \cdot u=v$ are established. If they are not, the ciphertext decryption apparatus 200B outputs "reject". If they are, using the CPU 911, the ciphertext decryption apparatus 200B calculates the element $h^\sim=z \cdot u$, and calculates the key $K=KDF(u \| h^\sim)$ and outputs it.

The verification apparatus 100B described above speeds up the process of checking whether or not $w \cdot u=u'$ and $t \cdot u=v$ are established in this ACE-KEM cryptographic system.

In the verification apparatus 100B, using the CPU 911, the integer partitioning unit 110 inputs w and p and calculates the integers $e_1$ and $e_2$ that satisfy $e_1 \cdot w \equiv e_2 \pmod{p}$. Using the CPU 911, the verification value calculation unit 130 calculates the element $U=e_2 \cdot u - e_1 \cdot u'$ of the group G by the double-base scalar multiplication on the group G. Using the CPU 911, the verification judging unit 150 checks at high speed whether $w \cdot u=u'$ by checking whether the element U is the identity element O of the group G. Also, using the CPU 911, the integer partitioning unit 110 inputs t and p and calculates the integers $e_1$ and $e_2$ that satisfy $e_1 \cdot t \equiv e_2 \pmod{p}$. Using the CPU 911, the verification value calculation unit 130 calculates the element $V=e_2 \cdot u - e_1 \cdot v$ of the group G by the double-base scalar multiplication on the group G. Using the CPU 911, the verification judging unit 150 checks at high speed whether $t \cdot u=v$ is established by checking whether the element V is the identity element O of the group G.

Embodiment 4.

The fourth embodiment will be described with reference to FIGS. 21 to 27.

FIG. 21 shows an example of the entire system configuration of an ID-based public key cryptographic system 820C of this embodiment.

The ID-based public key cryptographic system 820C is a cryptographic communication system that uses identification data that identifies a ciphertext decryption apparatus 200C as the public key of the ciphertext decryption apparatus 200C in the same manner as the ID-based public key cryptographic system 820A described in the second embodiment.

The ID-based public key cryptographic system 820C has an encryption parameter setting apparatus 810C, a key generating apparatus 300C, a ciphertext generating apparatus 400C, and a ciphertext decryption apparatus 200C.

The encryption parameter setting apparatus 810C determines encryption parameters to be used in the ID-based public key cryptographic system 820C. The encryption parameters determined by the encryption parameter setting apparatus 810C are open to the user of the ID-based public key cryptographic system 820C. The encryption parameters determined by the encryption parameter setting apparatus 810C include, e.g., an order p, an additive group G, an element g of the additive group G, an additive group G', an element g' of the additive group G', a multiplicative group $G_t$, a pairing e, a hash function H, a hash function H', and a hash function H".

The order p is a prime number.

The order of the additive group G is p. The element g is the generator of the additive group G.

The order of the additive group G' is p, which is the same as the order of the additive group G. The element g' is a generator of the additive group G'.

The order of the multiplicative group $G_t$ is p, which is the same as the order of each of the additive group G and additive group G'.

The pairing e is a map that maps a set of an element of the additive group G and an element of the additive group G' to an element (pairing value) of the multiplicative group $G_t$. The pairing e has bilinearity. A pairing value e (g, g') of the element g of the additive group G and the element g' of the additive group G' is not the identity element of the multiplicative group $G_t$.

The hash function H is a hash function that generates an integer equal to or larger than 1 and equal to or smaller than p−1 from a bit string having an arbitrary length.

The hash function H' is a hash function that generates a bit string having a predetermined length from an element of the multiplicative group $G_t$.

The hash function H" is a hash function that generates an integer equal to or larger than 1 and equal to or smaller than p−1 from a set of an element of the multiplicative group $G_t$, a bit string having a predetermined length, and an ordered pair of elements of two additive groups G.

The element g' of the additive group G' is used by only the key generating apparatus 300C and accordingly need not be open to other users.

When these encryption parameters are determined in advance, the encryption parameter setting apparatus 810C need not determine them.

The encryption parameter setting apparatus 810C generates a master key and public parameters generated based on the master key. The master key generated by the encryption parameter setting apparatus 810C includes three integers α, β, and γ. The public parameters generated by the encryption parameter setting apparatus 810C include an element $g_1$ of the additive group G, an element $g_3$ of the additive group G, and an element $v_0$ of the multiplicative group $G_t$. The master key generated by the encryption parameter setting apparatus 810C is notified to the key generating apparatus 300C in secret. The public parameters generated by the encryption parameter setting apparatus 810C are open to the user of the ID-based public key cryptographic system 820C.

The key generating apparatus 300C holds in secret the master key notified from the encryption parameter setting apparatus 810C. Based on the public encryption parameters, the public identification data ID of the ciphertext decryption apparatus 200C, and the held master key, the key generating apparatus 300A generates the secret key of the ciphertext decryption apparatus 200C. The secret key generated by the key generating apparatus 300C includes an element $d_0$ of the additive group G' and an element $d_1$ of the additive group G'. The secret key generated by the key generating apparatus 300A is notified to the ciphertext decryption apparatus 200C in secret.

Based on the public encryption parameters, the public parameters, and the identification data ID of the ciphertext decryption apparatus 200C, the ciphertext generating apparatus 400C encrypts a message M, thus generating a ciphertext C. The ciphertext generating apparatus 400C transmits the generated ciphertext C to the ciphertext decryption apparatus 200C.

The ciphertext decryption apparatus 200C holds in secret the secret key generated by the key generating apparatus 300C. The ciphertext decryption apparatus 200C receives the ciphertext C transmitted by the ciphertext generating apparatus 400C. Based on the public encryption parameters and the held secret key, the ciphertext decryption apparatus 200C decrypts the received ciphertext C, thus generating a message M' identical to the message M.

The appearances and hardware resources of the encryption parameter setting apparatus 810C, key generating apparatus 300C, ciphertext generating apparatus 400C, and ciphertext decryption apparatus 200C are similar to those of the ciphertext decryption apparatus 200 described in the first embodiment.

FIG. 22 is a block diagram showing a configuration example of the function block of part of the encryption parameter setting apparatus 810C of this embodiment.

The encryption parameter setting apparatus 810C has an encryption parameter storage unit 819C, a master key generating unit 812C, a public parameter generating unit 813C, a master key output unit 814C, and a public parameter output unit 815C.

Using a magnetic disk drive 920, the encryption parameter storage unit 819C stores data representing the public encryption parameters.

The master key generating unit 812C generates the master key based on the encryption parameters stored by the encryption parameter storage unit 819C.

The master key generating unit 812C has three secret random number generating units 816C to 818C.

Using a CPU 911, each of the three secret random number generating units 816C to 818C inputs the data representing the order p among the encryption parameters stored by the encryption parameter storage unit 819C. Using the CPU 911, each of the three secret random number generating units 816C to 818C randomly generates an integer equal to or larger than 1 and equal to or smaller than p−1 based on the order p represented by the input data.

The first secret random number generating unit 816C treats the generated integer as the integer α and, using a RAM 914, stores data representing the generated integer α.

The second secret random number generating unit 817C treats the generated integer as the integer β and, using the RAM 914, stores data representing the generated integer β.

The third secret random number generating unit 818C treats the generated integer as the integer γ and, using the RAM 914, stores data representing the generated integer γ.

Based on the encryption parameters stored by the encryption parameter storage unit 819C and the master key generated by the master key generating unit 812C, the public parameter generating unit 813C generates the public parameters.

The public parameter generating unit 813C has a first public element calculation unit 831C, a public pairing value calculation unit 832C, and a second public element calculation unit 833C.

Using the CPU 911, the first public element calculation unit 831C inputs the data representing the additive group G and element g among the encryption parameters stored by the encryption parameter storage unit 819C, and the data representing the integer α and stored by the secret random number generating unit 816C. Using the CPU 911 and based on the additive group G, element g, and integer α represented by the input data, the first public element calculation unit 831C calculates an element which is obtained when the element g is added α times by the operation on the additive group G, and treats the calculated element as the element $g_1$. Using the RAM 914, the first public element calculation unit 831C stores data representing the calculated element $g_1$.

Using the CPU 911, the public pairing value calculation unit 832C inputs the data representing the element g, element g', and pairing e among the encryption parameters stored by the encryption parameter storage unit 819C, the data representing the integer α and stored by the secret random number generating unit 816C, and the data representing the integer β and stored by the secret random number generating unit 817C. Using the CPU 911 and based on the element g, element g', and pairing e represented by the input data, the public pairing value calculation unit 832C calculates the pairing value e (g, g') of the element g and element g' by the pairing e. The pairing value e (g,g') is an element of the multiplicative group $G_t$. Using the CPU 911 and based on the integer a and integer β represented by the input data and the calculated pairing value e (g,g'), the public pairing value calculation unit 832C calculates an element which is obtained when the pairing value e (g,g') is multiplied αβ times which is the product of the integer α and integer β and treats the calculated element as the element $v_0$. Using the RAM 914, the public pairing value calculation unit 832C stores data representing the calculated element $v_0$.

Using the CPU 911, the second public element calculation unit 833C inputs the data representing the additive group G and element g among the encryption parameters stored by the encryption parameter storage unit 819C, and the data representing the integer γ and stored by the secret random number generating unit 818C. Using the CPU 911 and based on the additive group G, element g, and integer γ represented by the input data, the second public element calculation unit 833C calculates an element which is obtained when the element g is added γ times by the operation on the additive group G, and treats the calculated element as the element $g_3$. Using the RAM 914, the second public element calculation unit 833C stores data representing the calculated element $g_3$.

Using the CPU 911, the master key output unit 814C inputs the data representing the integer α, integer β, and integer γ stored by the three secret random number generating units 816C to 818C. Using the CPU 911, the master key output unit 814C outputs, as the master key, the input data representing the integer α, integer β, and integer γ.

The master key output by the master key output unit 814C is notified to the key generating apparatus 300C in secret.

Using the CPU 911, the public parameter output unit 815C inputs the data representing the element $g_1$ and stored by the first public element calculation unit 831C, the data representing the element $v_0$ and stored by the public pairing value calculation unit 832C, and the data representing the element $g_3$ and stored by the second public element calculation unit 833C. Using the CPU 911, the public parameter output unit 815C outputs, as the public parameters, the input data representing the element $g_1$, element $g_3$, and element $v_0$.

The public parameters output by the public parameter output unit 815C are open to the user of the ID-based public key cryptographic system 820C.

FIG. 23 is a block diagram showing a configuration example of the function block of the key generating apparatus 300C of this embodiment.

The key generating apparatus 300C has an encryption parameter storage unit 390C, a master key storage unit 330C, an identifier input unit 340C, a secret key generating unit 350C, and a secret key output unit 360C.

Using the magnetic disk drive 920, the encryption parameter storage unit 390C stores the data representing the public encryption parameters in advance.

Using a tamper-resistant storage device, the master key storage unit 330C stores, in secret, the master key notified from the encryption parameter setting apparatus 810C.

As for the ciphertext decryption apparatus 200C whose secret key is to be generated, the identifier input unit 340C inputs, using the CPU 911, an arbitrary-length bit string ID which is identification data for identifying the ciphertext decryption apparatus 200C. Using the RAM 914, the identifier input unit 340C stores the input bit string ID.

The secret key generating unit 350C generates the secret key of the ciphertext decryption apparatus 200C based on the encryption parameters stored by the encryption parameter storage unit 390C, the master key stored by the master key storage unit 330C, and the bit string ID input by the identifier input unit 340C.

The secret key generating unit 350C has a secret random number generating unit 351C, a first secret element calculation unit 352C, and a second secret element calculation unit 353C.

Using the CPU 911, the secret random number generating unit 351C inputs the data representing the order p among the encryption parameters stored by the encryption parameter storage unit 390C. Using the CPU 911 and based on the order p represented by the input data, the secret random number generating unit 351C randomly generates an integer equal to or larger than 1 and equal to or smaller than p−1, and treats it as a secret random number r. Using the RAM 914, the secret random number generating unit 351C stores data representing the generated secret random number r.

Using the CPU 911, the first secret element calculation unit 352C inputs the data representing the additive group G', element g', and hash function H among the encryption parameters stored by the encryption parameter storage unit 390C, the data representing the integer α, integer β, and integer γ of the master key stored by the master key storage unit 330C, the bit string ID stored by the identifier input unit 340C, and the data representing the secret random number r and stored by the secret random number generating unit 351C. Using the CPU 911 and based on the hash function H represented by the input data and the input bit string ID, the first secret element calculation unit 352C calculates a hash value H(ID) which is obtained when the bit string ID is hashed by the hash function H. Using the CPU 911 and based on the integer α, integer β, integer γ, and secret random number r represented by the input data and the calculated hash value H(ID), the first secret element calculation unit 352C calculates an integer $\{\alpha\cdot\beta+[\alpha\cdot H(ID)+\gamma]\cdot r\}$ which is obtained when the product of the secret random number r and an integer $(\alpha\cdot H(ID)+\gamma)$, which is the sum of the integer γ and the product of the integer a and hash value H(ID), is added with the product of the integer a and integer p. Using the CPU 911 and based on the additive group G' and element g' represented by the input data and the calculated integer $\{\alpha\cdot\beta+[\alpha\cdot H(ID)+\gamma]\cdot r\}$, the first secret element calculation unit 352C calculates an element which is obtained when the element g' is added $\{\alpha\cdot\beta+[\alpha\cdot H(ID)+\gamma]\cdot r\}$ times by the operation on the additive group G', and treats the obtained element as the secret element $d_0$. Using the RAM 914, the first secret element calculation unit 352C stores data representing the calculated secret element $d_0$.

Using the CPU 911, the second secret element calculation unit 353C inputs the data representing the additive group G' and element g' among the encryption parameters stored by the encryption parameter storage unit 390C, and the data representing the secret random number r and stored by the secret random number generating unit 351C. Using the CPU 911 and based on the additive group G', element g', and secret random number r represented by the input data, the second secret element calculation unit 353C calculates an element which is obtained when the element g' is added r times by the operation on the additive group G', and treats the obtained element as the secret element $d_1$. Using the RAM 914, the second secret element calculation unit 353C stores data representing the calculated secret element $d_1$.

Using the CPU 911, the secret key output unit 360C inputs the data representing the secret element $d_0$ and stored by the first secret element calculation unit 352C and the data representing the secret element $d_1$ and stored by the second secret element calculation unit 353C. Using the CPU 911, the secret key output unit 360C outputs the input data representing the secret element $d_0$ and secret element $d_1$ as the secret key of the ciphertext decryption apparatus 200C.

The secret key of the ciphertext decryption apparatus 200C output by the secret key output unit 360C is notified to the ciphertext decryption apparatus 200C in secret.

FIG. 24 is a block diagram showing a configuration example of the function block of the ciphertext generating apparatus 400C of this embodiment.

The ciphertext generating apparatus 400C has an encryption parameter storage unit 490C, an identifier storage unit 410C, a message input unit 440C, a message encryption unit 450C, and a ciphertext output unit 470C.

Using the magnetic disk drive 920, the encryption parameter storage unit 490C stores the public encryption parameters (including the public parameters) in advance.

Using the magnetic disk drive 920, the identifier storage unit 410C stores the bit string ID which is the identification data of the ciphertext decryption apparatus 200C to which the ciphertext is to be transmitted.

Using the CPU 911, the message input unit 440C inputs a predetermined-length bit string M which is the message to be transmitted to the ciphertext decryption apparatus 200C. When the message to be transmitted to the ciphertext decryption apparatus 200C has a length equal to or larger than a predetermined length, the message is divided into a plurality of bit strings M having predetermined lengths, and the message input unit 440C inputs the plurality of bit strings M. Using the RAM 914, the message input unit 440C stores the input bit string M.

Based on the encryption parameters (including the public parameters) stored by the encryption parameter storage unit 490C and the bit string ID stored by the identifier storage unit 410C, the message encryption unit 450C encrypts the bit string M input by the message input unit 440C, thus generating the ciphertext C.

The message encryption unit 450C has a secret random number generating unit 451C, a pairing value calculation unit 452C, a cipher bit string calculation unit 453C, a first cipher element calculation unit 454C, a second cipher element calculation unit 455C, and a cipher integer calculation unit 456C.

Using the CPU 911, the secret random number generating unit 451C inputs the data representing the order p among the encryption parameters stored by the encryption parameter storage unit 490C. Using the CPU 911 and based on the order p represented by the input data, the secret random number generating unit 451C randomly generates an integer equal to or larger than 1 and equal to or smaller than p−1 and treats it as a secret random number s. Using the RAM 914, the secret random number generating unit 451C stores data representing the generated secret random number s.

Using the CPU 911, the pairing value calculation unit 452C inputs the data representing the multiplicative group $G_t$ and element $v_0$ among the encryption parameters stored by the encryption parameter storage unit 490C, and the data representing the secret random number s and stored by the secret random number generating unit 451C. Using the CPU 911 and based on the multiplicative group $G_t$, element $v_0$, and secret random number s represented by the input data, the pairing value calculation unit 452C calculates an element which is obtained when the element $v_0$ is multiplied s times by the operation on the multiplicative group $G_t$, and treats the obtained element as an element k. Using the RAM 914, the pairing value calculation unit 452C stores data representing the calculated element k.

Using the CPU 911, the cipher bit string calculation unit 453C inputs the data representing the hash function H' among the encryption parameters stored by the encryption parameter storage unit 490C, the bit string M stored by the message input unit 440C, and the data representing the element k and stored by the pairing value calculation unit 452C. Using the CPU 911 and based on the hash function H' and element k represented by the input data, the cipher bit string calculation unit 453C calculates a hash value H'(k) which is obtained when the element k is hashed by the hash function H'. The hash value H'(k) is a bit string having a predetermined length. Using the CPU 911 and based on the input bit string M and the calculated hash value H'(k), the cipher bit string calculation unit 453C obtains the bitwise exclusive OR of the bit string M and the hash value H(k), and treats the result as a bit string c. Using the RAM 914, the cipher bit string calculation unit 453C stores the calculated bit string c.

Using the CPU 911, the first cipher element calculation unit 454C inputs the data representing the additive group G and element g among the encryption parameters stored by the encryption parameter storage unit 490C, and the data representing the secret random number s and stored by the secret random number generating unit 451C. Using the CPU 911 and based on the additive group G, element g, and secret random number s represented by the input data, the first cipher element calculation unit 454C calculates an element which is obtained when the element g is added s times by the operation on the additive group G, and treats the obtained element as an element $c_0$. Using the RAM 914, the first cipher element calculation unit 454C stores data representing the calculated element $c_0$.

Using the CPU 911, the second cipher element calculation unit 455C inputs the data representing the additive group G, hash function H, element $g_1$, and element $g_3$ among the encryption parameters stored by the encryption parameter storage unit 490C, the bit string ID stored by the identifier storage unit 410C, and the data representing the secret random number s and stored by the secret random number generating unit 451C. Using the CPU 911 and based on the hash function H represented by the input data and the input bit string ID, the second cipher element calculation unit 455C calculates a hash value H(ID) which is obtained when the bit string ID is hashed by the hash function H. The hash value H(ID) is an integer equal to or larger than 1 and equal to or smaller than p−1. Using the CPU 911 and based on the additive group G, element $g_1$, element $g_3$, and secret random number s represented by the input data and the calculated hash value H(ID), the second cipher element calculation unit 455C calculates an element as the sum of an element which is obtained when the element $g_1$ is added a number of times H(ID)·s which is the product of the hash value H(ID) and secret random number s, and an element which is obtained when the element $g_3$ is added s times, and treats the obtained element as an element $c_1$. Using the RAM 914, the second cipher element calculation unit 455C stores data representing the calculated element $c_1$.

Since $g_1 = \alpha \cdot g$ and $g_3 = \gamma \cdot g$, the element $c_1$ calculated by the second cipher element calculation unit 455C is expressed as:

$$c_1 = s \cdot g_3 + H(ID) \cdot s \cdot g_1 \qquad \text{[Equation 27]}$$
$$= [\alpha \cdot H(ID) + \gamma] \cdot s \cdot g$$

Using the CPU 911, the cipher integer calculation unit 456C inputs the data representing the order p and hash function H" among the encryption parameters stored by the encryption parameter storage unit 490C, the data representing the secret random number s and stored by the secret random number generating unit 4510, the data representing the element k and stored by the pairing value calculation unit 452C, the bit string c stored by the cipher bit string calculation unit 453C, the data representing the element $c_0$ and stored by the first cipher element calculation unit 454C, and the data representing the element $c_1$ and stored by the second cipher element calculation unit 455C. Using the CPU 911 and based on the hash function H", element k, element $c_0$, and element $c_1$ represented by the input data, and the input bit string c, the cipher integer calculation unit 456C calculates a hash value H"(k,c,$c_0$,$c_1$) which is obtained when the element k, the bit string c, and the ordered pair of the element $c_0$ and element $c_1$ are hashed by the hash function H". The hash value H"(k,c,$c_0$,$c_1$) is an integer equal to or larger than 1 and equal to or smaller than p−1. Using the CPU 911 and based on the order p and secret random number s represented by the input data and the calculated hash value H"(k,c,$c_0$,$c_1$), the cipher integer calculation unit 456C calculates the remainder which is obtained when the sum of the secret random number s and hash value H"(k,c,$c_0$,$c_1$) is divided by the order p, and treats the obtained remainder as an integer t. Using the CPU 911, the cipher integer calculation unit 456C stores data representing the calculated integer t.

Using the CPU 911, the ciphertext output unit 470C inputs the bit string c stored by the cipher bit string calculation unit 453C, the data representing the element $c_0$ and stored by the first cipher element calculation unit 454C, the data representing the element $c_1$ and stored by the second cipher element calculation unit 455C, and the data representing the integer t and stored by the cipher integer calculation unit 456C. Using the CPU 911, the ciphertext output unit 470C generates the ciphertext C including the input bit string c and the input data representing the element $c_0$, element $c_1$, and integer t. Using the CPU 911, the ciphertext output unit 470C outputs the generated ciphertext C.

The ciphertext C output by the ciphertext output unit 470C is transmitted to the ciphertext decryption apparatus 200C.

FIG. 25 is a block diagram showing a configuration example of the function block of the ciphertext decryption apparatus 200C of this embodiment.

The ciphertext decryption apparatus 200C has an encryption parameter storage unit 290C, a key storage unit 210C, a ciphertext input unit 220C, a ciphertext verification unit 230C, a verification apparatus 100C, a decrypted text generating unit 260C, and a decrypted message output unit 283C.

Using the magnetic disk drive 920, the encryption parameter storage unit 290C stores data representing the public encryption parameters in advance.

In secret, using the tamper-resistant storage device, the key storage unit 210C stores the secret key generated by the key generating apparatus 300C in advance.

Using the CPU 911, the ciphertext input unit 220C inputs the ciphertext C received from the ciphertext generating apparatus 400C. Using the CPU 911 and based on the input ciphertext C, the ciphertext input unit 220C acquires the bit string c, and the data representing the element $c_0$, element $c_1$, and integer t. Using the RAM 914, the ciphertext input unit 220C stores the acquired bit string c, and the data representing the element $c_0$, element $c_1$, and integer t.

Based on the encryption parameters stored by the encryption parameter storage unit 290C, the secret key stored by the key storage unit 210C, and the ciphertext C input by the ciphertext input unit 220C, the ciphertext verification unit 230C generates data to be input to the verification apparatus 100C.

The ciphertext verification unit 230C has a pairing value calculation unit 231C and an integer calculation unit 232C.

Using the CPU 911, the pairing value calculation unit 231C inputs the data representing the multiplicative group $G_t$ and pairing e among the encryption parameters stored by the encryption parameter storage unit 290C, the data representing the secret element $d_0$ and secret element $d_1$ of the secret key stored by the key storage unit 210C, and the data representing the element $c_0$ and element $c_1$ and stored by the ciphertext input unit 220C. Using the CPU 911 and based on the pairing e, element $c_0$, and secret element $d_0$ represented by the input data, the pairing value calculation unit 231C calculates the pairing value of the element $c_0$ and secret element $d_0$ by the pairing e, and treats the calculated value as a pairing value $k_0$. The pairing value $k_0$ is an element of the multiplicative group $G_t$. Using the CPU 911 and based on the pairing e, element $c_1$, and secret element $d_1$ represented by the input data, the pairing value calculation unit 231C calculates the pairing value of the element $c_1$ and secret element $d_1$ by the pairing e, and treats the calculated value as a pairing value $k_1$. The pairing value $k_1$ is an element of the multiplicative group $G_t$. Using the CPU 911 and based on the multiplicative group $G_t$ represented by the input data and the calculated pairing value $k_0$ and pairing value $k_1$, the pairing value calculation unit 231C calculates an element which is obtained when the pairing value $k_0$ is multiplied by the inverse element of the pairing value $k_1$, and treats the obtained element as an element k. The pairing value calculation unit 231C stores data representing the calculated element k.

From the bilinearity of the pairing e, the element k calculated by the pairing value calculation unit 231C is expressed as:

$$k = \frac{e(c_0, d_0)}{e(c_1, d_1)} \quad \text{[Equation 28]}$$
$$= \frac{e(s \cdot g, \{\alpha \cdot \beta + [\alpha \cdot H(ID) + \gamma] \cdot r\} \cdot g')}{e([\alpha \cdot H(ID) + \gamma] \cdot s \cdot g, r \cdot g')}$$
$$= e(g, g')^{s \cdot \alpha \cdot \beta}$$
$$= v_0^s$$

Hence, if the ciphertext C input by the ciphertext input unit 220C is a correct ciphertext, the element k calculated by the pairing value calculation unit 231C is equal to the element k calculated by the pairing value calculation unit 452C of the ciphertext generating apparatus 400C.

Using the CPU 911, the integer calculation unit 232C inputs the data representing the order p and hash function H″ among the encryption parameters stored by the encryption parameter storage unit 290C, the data representing the bit string c, element $c_0$, element $c_1$, and integer t stored by the ciphertext input unit 220C, and the data representing the element k and stored by the pairing value calculation unit 231C. Using the CPU 911 and based on the hash function H″, bit string c, element $c_0$, and element $c_1$ represented by the input data and the input element k, the integer calculation unit 232C calculates a hash value H″($k,c,c_0,c_1$) which is obtained when the element k, the bit string c, and the ordered pair of the element $c_0$ and element $c_1$ are hashed by the hash function H″. The hash value H″($k,c,c_0,c_1$) is an integer equal to or larger than 1 and equal to or smaller than p−1. Using the CPU 911 and based on the order p and integer t represented by the input data and the calculated hash value H″($k,c,c_0,c_1$), the integer calculation unit 232C calculates the remainder which is obtained when the integer obtained by subtracting the hash value H″($k,c,c_0,c_1$) from the integer t is divided by the order p, and treats the calculated remainder as an integer s.

If the element k calculated by the pairing value calculation unit 231C is equal to the element k calculated by the pairing value calculation unit 452C, then the integer s calculated by the integer calculation unit 232C is equal to the secret random number s generated by the secret random number generating unit 451C.

The verification apparatus 100C checks whether $k=v_0^s$ and $c_0=s \cdot g$, and determines that the verification is successful when both $k=v_0^s$ and $c_0=s \cdot g$ are established.

The verification apparatus 100C outputs data expressing the verification result.

Using the CPU 911, the decrypted text generating unit 260C inputs the data representing the verification result output by the verification apparatus 100C. When the verification result expressed by the input data indicates that "the verification is successful", the decrypted text generating unit 260C, using the CPU 911, inputs the data representing the hash function H′ among the encryption parameter stored by the encryption parameter storage unit 290C, the bit string c stored by the ciphertext input unit 220C, and the data representing the element k and stored by the pairing value calculation unit 231C. Using the CPU 911 and based on the hash function H′ and element k represented by the input data, the decrypted text generating unit 260C calculates a hash value H′(k) which is obtained when the element k is hashed by the hash function H′. The hash value H′(k) is a bit string having a predetermined length. Using the CPU 911 and based on the input bit string c and the calculated hash value H′(k), the decrypted text generating unit 260C obtains the bitwise exclusive OR of the bit string c and the hash value H′(k), and treats the result as a bit string M′. Using the RAM 914, the decrypted text generating unit 260C stores the calculated bit string M′.

If the ciphertext c input by the ciphertext input unit 220C is a correct ciphertext, the element k calculated by the pairing value calculation unit 231C is equal to the element k calculated by the pairing value calculation unit 452C of the ciphertext generating apparatus 400A. Hence, the bit string M′ calculated by the decrypted text generating unit 260C is equal to the bit string M input by the message input unit 440C of the ciphertext generating apparatus 400C.

Using the CPU 911, the decrypted message output unit 283C inputs the bit string M′ stored by the decrypted text generating unit 260C. Using the CPU 911, the decrypted message output unit 283C outputs the input bit string M′ as the decrypted message.

FIG. 26 is a detailed block diagram showing a configuration example of the internal block of the verification apparatus 100C of this embodiment.

The verification apparatus 100C has an integer partitioning unit 110C, two verification value calculation units 130C₁ and 130C₂, and a verification judging unit 150C.

The verification apparatus 100C is an apparatus corresponding to the verification apparatus 100 described in the first embodiment, but has the two verification value calculation units 130C₁ and 130C₂ in order to perform the operation on the additive group G and the operation on the multiplicative group $G_t$.

Using the CPU 911, the integer partitioning unit 110C inputs the data representing the order p among the encryption parameters stored by the encryption parameter storage unit 290C, as data representing the order p described in the first embodiment.

Using the CPU 911, the integer partitioning unit 110C inputs the data representing the integer s and stored by the integer calculation unit 232C, as data representing the integer e described in the first embodiment.

Using the CPU 911 and based on the order p and integer s represented by the input data, the integer partitioning unit 110C calculates an integer $e_1$ and an integer $e_2$ that satisfy $e_1 \cdot s \equiv e_2 \pmod{p}$, $|e_1| < \sqrt{p}$, and $0 < e_2 < \sqrt{p}$.

Using the RAM 914, the integer partitioning unit 110C stores data representing the calculated integer $e_1$ and integer $e_2$.

The verification value calculation unit 130C₁ calculates an element $a = e_1 \cdot c_0 - e_2 \cdot g$ of the additive group G by the operation on the additive group G.

Using the CPU 911, the verification value calculation unit 130C₁ inputs the data representing the element g among the encryption parameters stored by the encryption parameter storage unit 290C, as data representing the element s described in the first embodiment.

Using the CPU 911, the verification value calculation unit 130C₁ inputs the data representing the element $c_0$ and stored by the ciphertext input unit 220C, as data representing the element h described in the first embodiment.

Using the CPU 911, the verification value calculation unit $130C_1$ inputs the data representing the integer $e_1$ and integer $e_2$ and stored by the integer partitioning unit $110C$.

Using the CPU $911$ and based on the element g, element $c_0$, integer $e_1$, and integer $e_2$ represented by the input data, the verification value calculation unit $130C_1$ calculates an element obtained by adding an element obtained when the element $c_0$ is added $e_1$ times and the inverse element of an element obtained when the element g is added $e_2$ times, by the operation on the additive group G, and treats the obtained element as the element a.

Using the RAM $914$, the verification value calculation unit $130C_1$ stores data representing the calculated element a.

The verification value calculation unit $130C_2$ calculates an element $a'=k^{e1} \cdot v_0^{-e2}$ of the multiplicative group $G_t$ by the operation on the multiplicative group $G_t$. When this operation on the multiplicative group $G_t$ is described additively, then $a'=e_1 \cdot k - e_2 \cdot v_0$. Hence, except for the difference in the practical calculation method of the group operation, the process performed by the verification value calculation unit $130C_2$ is substantially identical to the process performed by the verification value calculation unit $130C_1$.

Using the CPU $911$, the verification value calculation unit $130C_2$ inputs the data representing the element $v_0$ among the encryption parameters stored by the encryption parameter storage unit $290C$, as data representing the element s described in the first embodiment.

Using the CPU $911$, the verification value calculation unit $130C_2$ inputs the data representing the element k and stored by the pairing value calculation unit $231C$, as data representing the element h described in the first embodiment.

Using the CPU $911$, the verification value calculation unit $130C_2$ inputs the data representing the integer $e_1$ and integer $e_2$ and stored by the integer partitioning unit $110C$.

Using the CPU $911$ and based on the element $v_0$, element k, integer $e_1$, and integer $e_2$ represented by the input data, the verification value calculation unit $130C_2$ calculates an element obtained by adding an element obtained when the element k is multiplied $e_1$ times and the inverse element of an element obtained when the element $v_0$ is multiplied $e_2$ times, by the operation on the multiplicative group $G_t$, and treats the obtained element as the element a'.

Using the RAM $914$, the verification value calculation unit $130C_2$ stores data representing the calculated element a'.

Using the CPU $911$, the verification judging unit $150C$ inputs the data representing the element a and stored by the verification value calculation unit $130C_1$, and the data representing the element a' and stored by the verification value calculation unit $130C_2$. Using the CPU $911$ and based on the element a represented by the input data, the verification judging unit $150C$ judges whether or not the element a is the identity element of the additive group G. If the element a is the identity element of the additive group G, then $c_0 = s \cdot g$. Thus, using the CPU $911$, the verification judging unit $150C$ judges that the first verification is successful. Using the CPU $911$ and based on the element a' represented by the input data, the verification value calculation unit $130C_2$ judges whether or not the element a' is the identity element of the multiplicative group $G_t$. If the element a' is the identity element of the multiplicative group $G_t$, then $k=v_0^s$. Thus, using the CPU $911$, the verification judging unit $150C$ judges that the second verification is successful. When it is judged that the first verification is successful and then the second verification is successful, the verification judging unit $150C$ judges that "the verification is successful". Otherwise, the verification judging unit $150C$ judges that "the verification fails".

Using the CPU $911$, the verification judging unit $150C$ outputs data representing the verification result.

FIG. 27 is a flowchart showing an example of the flow of the ciphertext decryption process used by the ciphertext decryption apparatus $200C$ according to this embodiment to decrypt the ciphertext C.

In a pairing value calculation step S731C, using the CPU $911$ and based on the secret element $d_0$ stored by the key storage unit $210C$ and the element $c_0$ input by the ciphertext input unit $220C$, the pairing value calculation unit $231C$ calculates the pairing value $k_0 = e(d_0, d_0)$ of the element $c_0$ and element $d_0$ by the pairing e. Using the CPU $911$ and based on the secret element $d_1$ stored by the key storage unit $210C$ and the element $c_1$ input by the ciphertext input unit $220C$, the pairing value calculation unit $231C$ calculates the pairing value $k_1 = e(c_1, d_1)$ of the element $c_1$ and element $d_1$ by the pairing e. Using the CPU $911$ and based on the calculated pairing value $k_0$ and pairing value $k_1$, the pairing value calculation unit $231C$ calculates the element $k = k_0/k_1$, which is obtained by multiplying the pairing value $k_0$ by the inverse element of the pairing value $k_1$ by the operation on the multiplicative group $G_t$.

In an integer calculation step S732C, using the CPU $911$ and based on the bit string c, element $c_0$, and element $c_1$ input by the ciphertext input unit $220C$ and the element k calculated by the pairing value calculation unit $231C$ in the pairing value calculation step S731C, the integer calculation unit $232C$ calculates the hash value $H''(k,c,c_0,c_1)$ which is obtained when the element k, the bit string c, and the ordered pair of the element $c_0$ and element $c_1$ are hashed by the hash function $H''$. Using the CPU $911$ and based on the order p stored by the encryption parameter storage unit $290C$, the integer t input by the ciphertext input unit $220$, and the calculated hash value $H''(k,c,c_0,c_1)$, the integer calculation unit $232C$ calculates the remainder which is obtained when the integer obtained by subtracting the hash value $H''(k,c,c_0,c_1)$ from the integer t is divided by the order p, and treats the calculated remainder as the integer s.

In an integer partitioning step S733C, using the CPU $911$ and based on the order p stored by the encryption parameter storage unit $290C$ and the integer s calculated by the integer calculation unit $232C$ in the integer calculation step S732, the integer partitioning unit $110C$ calculates the integer $e_1$ and the integer $e_2$ that satisfy $e_1 \cdot s \equiv e_2 \pmod{p}$, $|e_1| < \sqrt{p}$, and $0 < e_2 < \sqrt{p}$.

In a first verification step S734C, using the CPU $911$ and based on the element g stored by the encryption parameter storage unit $290C$, the element $c_0$ input by the ciphertext input unit $220C$, and the integer $e_1$ and integer $e_2$ calculated by the integer partitioning unit $110C$ in the integer partitioning step S733C, the verification value calculation unit $130C_1$ calculates the element which is the sum of the element obtained when the element $c_0$ is added $e_1$ times and the inverse element of the element obtained when the element g is added $e_2$ times, by the operation on the additive group G, and treats the obtained element as the element a.

Using the CPU $911$ and based on the element a calculated by the verification value calculation unit $130C_1$, the verification judging unit $150C$ judges whether or not the element a is the identity element of the additive group G.

If the element a is the identity element of the additive group G (i.e., $c_0 = s \cdot g$), the flow advances to a second verification step S735C.

If the element a is not the identity element of the additive group G (i.e., $c_0 \neq s \cdot g$), the ciphertext decryption process is ended.

In the second verification step S735C, using the CPU 911 and based on the element $v_0$ stored by the encryption parameter storage unit 290C, the element k calculated by the pairing value calculation unit 231C in the pairing calculation step S731C, and the integer $e_1$ and integer $e_2$ calculated by the integer partitioning unit 110C in the integer partitioning step S733C, the verification value calculation unit $130C_2$ calculates the element obtained by multiplying the element which is obtained when the element k is multiplied $e_1$ times, and the inverse element of the element which is obtained when the element $v_0$ is multiplied $e_2$ times, by the operation on the multiplicative group $G_t$, and treats the obtained element as the element a'.

Using the CPU 911 and based on the element a' calculated by the verification value calculation unit $130C_2$, the verification judging unit 150C judges whether or not the element a' is the identity element of the multiplicative group $G_t$.

If the element a' is the identity element of the multiplicative group $G_t$ (i.e., $k=v_0^s$), the flow advances to a decrypted text generating step S736C.

If the element a' is not the identity element of the multiplicative group $G_t$ (i.e., $k \neq v_0^s$), the ciphertext decryption process is ended.

In the decrypted text generating step S736C, using the CPU 911 and based on the element k calculated by the pairing value calculation unit 231C in the pairing value calculation step S731, the decrypted text generating unit 260C calculates the hash value H'(k) which is obtained when the element k is hashed by the hash function H'. Using the CPU 911 and based on the input bit string c input by the ciphertext input unit 220C and the calculated hash value H'(k), the decrypted text generating unit 260C obtains the bitwise exclusive OR of the bit string c and the hash value H'(k), and treats the result as the bit string M'.

Using the CPU 911, the decrypted message output unit 283C outputs the bit string M' calculated by the decrypted text generating unit 260C, as the decrypted message.

Then, the ciphertext decryption process is ended.

In this example, first, whether $c_0=s \cdot g$ is verified first, and after that whether $k=v_0^s$ is verified. However, this verification order maybe reversed. Alternatively, the verification value calculation unit $130C_1$ and verification value calculation unit $130C_2$ may calculate the element a and element a' simultaneously in a parallel manner.

The ciphertext decryption apparatus 200C of this embodiment further has the encryption parameter storage unit 290C.

Using the storage device (magnetic disk drive 920), the encryption parameter storage unit 290C stores an order p of the additive group $G_1$ (additive group G), a generator g of the additive group $G_1$ (additive group G), and the element $v_0$ of the multiplicative group $G_t$ whose order is the order p.

Using the storage device, the key storage unit 210C stores an element (secret element) $d_0$ of an additive group $G_2$ (additive group G') whose order is the order p, and an element (secret element) $d_1$ of the additive group $G_2$ (additive group G').

Using the processing device (CPU 911), the ciphertext input unit 220C inputs the bit string c, an element $c_0$ of the additive group $G_1$, an element $c_1$ of the additive group $G_1$, and an integer t equal to or larger than 1 and equal to or smaller than p−1, as the ciphertext C.

The ciphertext verification unit 230C has the pairing value calculation unit 231C and the integer calculation unit 232C.

Using the processing device (CPU 911) and based on the element $c_0$ input by the ciphertext input unit 220 and the element (secret element) $d_0$ stored by the key storage unit 210C, the pairing value calculation unit 231C calculates the pairing value of the element $c_0$ and element (secret element) $d_0$ by the predetermined pairing function e, and treats the calculated value as the element $k_0$ ($=e(c_0,d_0)$) of the multiplicative group $G_t$. Using the processing device (CPU 911) and based on the element $c_1$ input by the ciphertext input unit 220C and the element $d_1$ stored by the key storage unit 210C, the pairing value calculation unit 231C calculates the pairing value of the element $c_1$ and element $d_1$ by the pairing function e, and treats the calculated value as the element $k_1$ ($=e(c_1,d_1)$) of the multiplicative group $G_T$. Using the processing device (CPU 911) and based on the calculated element $k_0$ and the calculated element $k_1$, the pairing value calculation unit 231C multiplies the element $k_0$ by the inverse element of the element $k_1$, and treats the obtained element as the element k ($=k_0/k_1$) of the multiplicative group $G_t$.

Using the processing device (CPU 911) and based on the element k calculated by the pairing value calculation unit 231C, and the bit string c, element $c_0$, and element $c_1$ input by the ciphertext input unit 220C, the integer calculation unit 232C calculates the hash value which is obtained when the element k, bit string c, element $c_0$, and element $c_1$ are hashed by the predetermined hash function H", and treats the calculated value as the integer (hash value) H"($k,c,c_0,c_1$). Using the processing device (CPU 911) and based on the integer t input by the ciphertext input unit 220C, the calculated integer H"($k,c,c_0,c_1$), and the order p stored by the encryption parameter storage unit 290C, the integer calculation unit 232C calculates the remainder which is obtained when the integer obtained by subtracting the integer H"($k,c,c_0,c_1$) from the integer t is divided by the order p, and treats the calculated remainder as the integer s ($=t-H"(k,c,c_0,c_1)$ mod p).

The verification apparatus 100C treats the additive group $G_1$ (additive group G) as the finite group G, and inputs the order p stored by the encryption parameter storage unit 290C, as the order p, the integer s calculated by the integer calculation unit 232C, as the integer e, the generator g stored by the encryption parameter storage unit 290C, as the element s, and the element $c_0$ input by the ciphertext input unit 220C, as the element h. The verification apparatus 100C judges whether or not the verification is successful, and treats the result as the first verification result. The verification apparatus 100C treats the multiplicative group $G_t$ as the finite group G, and inputs the order p stored by the encryption parameter storage unit 290C, as the order p, the integer s calculated by the integer calculation unit 232C, as the integer e, the element $v_0$ stored by the encryption parameter storage unit 290C, as the element s, and the element k calculated by the pairing value calculation unit 231C, as the element h. The verification apparatus 1000 judges whether or not the verification is successful, and treats the result as the second verification result.

When both the first verification result and the second verification result show that the verification apparatus 100C judges the verification successful, using the processing device (CPU 911) and based on the element k calculated by the pairing value calculation unit 231C, the decrypted text generating unit 260C calculates the hash value which is obtained when the element k is hashed by the hash function H', and treats the calculated value as the bit string H'(k). Using the processing device (CPU 911) and based on the bit string c input by the ciphertext input unit 220C and the calculated bit string H'(k), the decrypted text generating unit 260C obtains the exclusive OR of the bit string c and the hash value H'(k), and treats the result as the bit string M'(=c XOR H'(k)). The decrypted text generating unit 260C outputs the calculated bit string M' as the decrypted text.

According to the ciphertext decryption apparatus 200C of this embodiment, when the verification apparatus 100C verifies whether $c_0=s \cdot g$ and $k=v_0^s$ and judges that the verification is successful, the decrypted text generating unit 260C generates a decrypted text. This can prevent any clue to decipher the ciphertext from being given to an unauthorized person. Since the time necessary for the verification apparatus 100C to verify whether $c_0=s \cdot g$ and $k=v_0^s$ can be shortened, the time necessary for the ciphertext decryption apparatus 200C to perform the entire process of decrypting the ciphertext can be shortened.

The ciphertext decryption apparatus 200C described so far is a BB(Boneh-Boyen)1-ID-based cryptography decryption apparatus.

The ciphertext decryption apparatus 200C inputs the secret key $d_{ID}=(d_0,d_1)$ and the ciphertext $C=(c,c_0,c_1,t)$ and has
- a calculation device (pairing value calculation unit 231C) which calculates the ratio $k=e(c_0,d_0)/e(c_1,d_1)$ of the pairing values,
- a calculation device (integer calculation unit 232C) which calculates the integer $s=t-H''(k,c,c_0,c_1)$,
- a device (integer partitioning unit 110C) which partitions the exponential part (integer) s,
- a device (verification value calculation unit 130c₂) which calculates, using the partitioned exponents (integer $e_1$ and integer $e_2$), the value $k^{e1} \cdot v_0^{-e2}$ by the double-base exponentiation on the multiplicative group $G_T$, and
- a device (verification judging unit 150C) which judges whether or not the calculated value is equal to the identity element 1 of the multiplicative group $G_T$.

The ciphertext decryption apparatus 200C described so far is a key decapsulation apparatus in a BB1-ID-based cryptographic system (ID-based public key cryptographic system 820C).

The ciphertext decryption apparatus 200O (BB1-ID-based cipher key decapsulation apparatus) inputs the secret key $d_{ID}=(d_0,d_1)$ and the ciphertext $C=(c,c_0,c_1,t)$ and has
- a calculation device (pairing value calculation unit 231C) which calculates the ratio $k=e(c_0,d_0)/e(c_1,d1)$ of the pairing values,
- a calculation device (integer calculation unit 232C) which calculates the integer $s=t-H''(k,c,c_0,c_1)$,
- a device (integer partitioning unit 110C) which partitions the exponential part (integer) s,
- a device (verification value calculation unit 130C₂) which calculates, using the partitioned exponents (integer $e_1$ and integer $e_2$), the value $k^{e1} \cdot v_o^{-e2}$ by the double-base exponentiation on the multiplicative group $G_T$, and
- a device (verification judging unit 150C) which judges whether or not the calculated value is equal to the identity element 1 of the multiplicative group $G_T$.

The ciphertext decryption apparatus 200C (BB1-ID-based cryptographic decryption apparatus) described so far inputs the secret key $d_{ID}=(d_0,d_1)$ and the ciphertext $C=(c,c_0,c_1,t)$ and has
- a calculation device (pairing value calculation unit 231C) which calculates the ratio $k=e(c_0,d_0)/e(c_1,d_1)$ of the pairing values,
- a calculation device (integer calculation unit 232C) which calculates the integer $s=t-H''(k,c,c_0,c_1)$,
- a device (integer partitioning unit 110C) which partitions the exponential part (integer) s,
- a device (verification value calculation unit 130C₂) which calculates, using the partitioned exponents (integer $e_1$ and integer $e_2$), the value $k^{e1} \cdot v_0^{-e2}$ by the double-base exponentiation on the multiplicative group $G_T$, and
- a device (verification judging unit 150C) which judges whether or not the calculated value is equal to the identity element 1 of the multiplicative group $G_T$.

The ciphertext decryption apparatus 200C (BB1-ID-based cipher key decapsulation apparatus) described so far inputs the secret key $d_{ID}=(d_0,d_1)$ and the ciphertext $C=(c,c_0,c_1,t)$ and has
- a calculation device (pairing value calculation unit 231C) which calculates the ratio $k=e(c_0,d_0)/e(c_1,d_1)$ of the pairing values,
- a calculation device (integer calculation unit 232C) which calculates the integer $s=t-H''(k,c,c_0,c_1)$,
- a device (integer partitioning unit 110C) which partitions the exponential part (integer) s,
- a device (verification value calculation unit 130C₁) which calculates, using the partitioned exponents (integer $e_1$ and integer $e_2$), a value $(e_1 \cdot c_0-e_2 \cdot g)$ by the double-base scalar multiplication on the additive group G of, e.g., elements formed of points on a (hyper) elliptic curve, and
- a device (verification judging unit 150C) which judges whether or not the calculated value is equal to the identity element 0 of the additive group G.

The ID-based public key cryptographic system 820C described so far is an BB1-ID-based cryptographic system.

The ID-based public key cryptographic system 820C employs the additive group G, the additive group G', and the multiplicative group $G_t$ which have an order p being a prime number, the generator g of the additive group G, the generator g' of the additive group G', and the pairing e.

The encryption parameter setting apparatus 810C performs a set-up process (Setup). Using the CPU 911, the encryption parameter setting apparatus 810C generates the random integer α, integer β, and integer γ each equal to or larger than 1 and equal to or smaller than p−1, and calculates the element $g_1=\alpha \cdot g$ of the group G, the element $g_2=\beta \cdot g$ of the group G, and the element $g_3=\gamma \cdot g$ of the group G. Using the CPU 911, the encryption parameter setting apparatus 810C calculates the element $g'_1=\alpha \cdot g'$ of the group G', the element $g'_2=\beta \cdot g'$ of the group G', and the element $g'_3=\gamma \cdot g'$ of the group G'. Using the CPU 911, the encryption parameter setting apparatus 810C calculates the element $g'_0=(\alpha \cdot \beta) \cdot g'$ of the group G', and the pairing value $v_0=e(g,g'_0)$ (that is, $v_0=e(g,g')^{\alpha \cdot \beta}$) of the multiplicative group $G_t$. The encryption parameter setting apparatus 810C outputs (g, $g_1$, $g_3$, $v_0$) as the public key of PKG, and (g',α,β,γ) as the secret key of PKG.

The key generating apparatus 300C performs a secret key extraction process (Extract). Using the CPU 911, the key generating apparatus 300C inputs the bit string ID which identifies the ciphertext decryption apparatus 200C, and generates the random integer (secret random number) r equal to or larger than 1 and equal to or smaller than p−1. Using the CPU 911, the key generating apparatus 300C calculates the integer $e=\alpha \cdot \beta+(\alpha \cdot H(ID)+\gamma) \cdot r$, the element $d_0=e \cdot g'$ of the group G', and the element $d_1=r \cdot g'$ of the group G', and outputs $(d_0,d_1)$ as the secret key $d_{ID}$ for the ID.

The ciphertext generating apparatus 400C performs an encryption process (Encrypt). Using the CPU 911, the ciphertext generating apparatus 400C inputs the plaintext M and the recipient ID (the bit string ID which identifies the ciphertext decryption apparatus 200C). Using the CPU 911, the ciphertext generating apparatus 400C generates the random integer (secret random number) s equal to or larger than 1 and equal to or smaller than p−1. Using the CPU 911, the ciphertext generating apparatus 400C calculates the element $k=v_0^s$ of $G_t$. Using the CPU 911, the ciphertext generating apparatus 400C calculates the bit string c=XOR (M,H'(k)), the element $c_0=s \cdot g$ of the group G, the element $c_1=s \cdot g_3+(H(ID) \cdot g_1$ of the group G, and the integer $t=s+H''(k,c,c_0,c_1)$ by the hash functions H, H', and H''. Using the CPU 911, the ciphertext generating apparatus 400C outputs the ciphertext $C=(c,c_0,c_1,t)$.

The ciphertext decryption apparatus 200C performs a decryption process (Decrypt). Using the CPU 911, the ciphertext decryption apparatus 200C inputs the secret key $d_{ID}=(d_0,d_1)$ and the ciphertext $C=(c,c_0,c_1,t)$. Using the CPU 911, the ciphertext decryption apparatus 200C calculates the element $k=e(c_0,d_0)/e(c_1,d_1)$ of the multiplicative group $G_t$, and the integer $s=t-H''(k,c,c_0,c_1)$, and checks whether or not $k=v_0^s$ and $c_0=s \cdot g$ are established. If No, using the CPU 911, the ciphertext decryption apparatus 200C outputs "reject". If Yes, using the CPU 911, the ciphertext decryption apparatus 200C calculates bit string M=XOR(c,H''(k)) and outputs it.

The verification apparatus 100C described above speeds up the process of checking whether or not $k=v_0^s$ and $c_0=s \cdot g$ are established in this BB1-ID-based cryptographic system.

In the verification apparatus 100C, the integer partitioning unit 110C, using the CPU 911, inputs s and p, and calculates the integer $e_1$ and integer $e_2$ that satisfy $e_1 \cdot s \equiv e_2 \pmod{p}$. Using the CPU 911, the verification value calculation unit 130$C_2$ calculates $v_1=k^{e_1} \cdot v_0^{-e_2}$ by the double-base exponentiation on the multiplicative group $G_t$. Using the CPU 911, the verification judging unit 150C checks whether or not $v_1=1$, thereby checking at high speed whether or not $k=v_0^s$ is established.

If $v_1=1$ is established, using the CPU 911, the verification value calculation unit 130$C_1$ calculates $W=e_1 \cdot c_0-e_0 \cdot g$ by the double-base scalar multiplication on the additive group G. Using the CPU 911, the verification judging unit 150C checks whether or not W=0, thereby checking at high speed whether or not $c_0=s \cdot g$ is established.

Embodiment 5.

The fifth embodiment will be described with reference to FIGS. 28 to 33.

FIG. 28 shows an example of the entire system configuration of an ID-based signature system 820D of this embodiment.

The ID-based signature system 820D is a digital signature system which uses the identification data that identifies a signature apparatus 400D, as the public key of the signature apparatus 400D.

The ID-based signature system 820D has an encryption parameter setting apparatus 810D, a key generating apparatus 300D, the signature apparatus 400D, and a signature verification apparatus 200D.

The encryption parameter setting apparatus 810D determines encryption parameters to be used in the ID-based signature system 820D. The encryption parameters determined by the encryption parameter setting apparatus 810D are open to the user of the ID-based signature system 820D. The encryption parameters determined by the encryption parameter setting apparatus 810C include, e.g., an order p, an additive group G, an element g of the additive group G, a hash function H, and a hash function H'.

The order p is a prime number.

The order of the additive group G is p. The element g is the generator of the additive group G.

The hash function H is a hash function that generates an integer equal to or larger than 1 and equal to or smaller than p−1 from the set of an element of the additive group G and a bit string having an arbitrary length.

The hash function H' is a hash function that generates an integer equal to or larger than 1 and equal to or smaller than p−1 from the set of the ordered pair of two arbitrary-length bit strings and the ordered pair of three elements of the additive group G.

When these encryption parameters are determined in advance, the encryption parameter setting apparatus 810D need not determine them.

The encryption parameter setting apparatus 810D generates a master key and public parameters generated based on the master key. The master key generated by the encryption parameter setting apparatus 810D includes an integer x equal to or larger than 1 and equal to or smaller than p−1. The master key generated by the encryption parameter setting apparatus 810D is notified to the key generating apparatus 300D in secret. The public parameters generated by the encryption parameter setting apparatus 810D include an element X of the additive group G. The public parameters generated by the encryption parameter setting apparatus 810D are open to the user of the ID-based signature system 820D.

The key generating apparatus 300D holds in secret the master key notified from the encryption parameter setting apparatus 810D. Based on the public encryption parameters, the public identification data ID of the signature apparatus 400D, and the held master key, the key generating apparatus 300D generates the signing key of the signature apparatus 400D. The signing key generated by the key generating apparatus 300D includes an integer s equal to or larger than 1 and equal to or smaller than p−1, and an element R of the additive group G. The signing key generated by the key generating apparatus 300D is notified to the signature apparatus 400D in secret.

The signature apparatus 400D holds in secret the signing key notified from the key generating apparatus 300D. Based on the public encryption parameters, the public parameters, and the held signing key, the signature apparatus 400D generates a signature σ for the message M. The signature σ guarantees that the content of the message M is not altered.

Based on the public encryption parameters, the public parameters, and the identification data ID of the signature apparatus 400D, the signature verification apparatus 200D verifies the signature σ attached to the message M, and judges if the message M is not altered. The signature verification apparatus 200D outputs the verification result.

FIG. 29 is a block diagram showing a configuration example of the function block of part of the encryption parameter setting apparatus 810D of this embodiment.

The encryption parameter setting apparatus 810D has an encryption parameter storage unit 819D, a secret random number generating unit 812D, a public element calculation unit 813D, a master key output unit 814D, and a public parameter output unit 815D.

Using a magnetic disk drive 920, the encryption parameter storage unit 819D stores the public encryption parameters.

Using a CPU 911, the secret random number generating unit 812D inputs data representing the order p among the encryption parameters stored by the encryption parameter storage unit 819D. Using the CPU 911 and based on the order p represented by the input data, the secret random number generating unit 812D randomly generates an integer equal to or larger than 1 and equal to or smaller than p−1, and treats it as the secret random number x. Using a RAM 914, the secret random number generating unit 812D stores data representing the generated secret random number x.

Using the CPU 911, the public element calculation unit 813D inputs data representing the additive group G and element g among the encryption parameters stored by the encryption parameter storage unit 819D, and the data representing the secret random number x and stored by the secret random number generating unit 812D. Based on the additive group G, element g, and secret random number x represented by the input data, the public element calculation unit 813D calculates an element which is obtained when the element g is added x times by the operation on the additive group G, and treats the calculated element as a public element X. Using the RAM 914, the public element calculation unit 813D stores data representing the calculated public element X.

Using the CPU 911, the master key output unit 814D inputs the data representing the secret random number x and stored by the secret random number generating unit 812D. Using the CPU 911, the master key output unit 814D outputs, as the master key, the input data representing the secret random number x.

The master key output by the master key output unit 814D is notified to the key generating apparatus 300D in secret.

Using the CPU 911, the public parameter output unit 815D inputs the data representing the public element X and stored by the public element calculation unit 813D. Using the CPU 911, the public parameter output unit 815D outputs, as the public parameters, the input data representing the public element X.

The public parameters output by the public parameter output unit 815D, together with the encryption parameters, are open to the user of the ID-based signature system 820D.

FIG. 30 is a block diagram showing a configuration example of the function block of the key generating apparatus 300D of this embodiment.

The key generating apparatus 300D has an encryption parameter storage unit 390D, a master key storage unit 330D, an identifier input unit 340D, a signing key generating unit 350D, and a signing key output unit 360D.

Using the magnetic disk drive 920, the encryption parameter storage unit 390D stores the data representing the public encryption parameters in advance.

Using a tamper-resistant storage device, the master key storage unit 330D stores the master key notified from the encryption parameter setting apparatus 810D.

Using the CPU 911, the identifier input unit 340D inputs an arbitrary-length bit string ID which is identification data for identifying the ciphertext decryption apparatus 400D whose signing key is to be generated. Using the RAM 914, the identifier input unit 340D stores data representing the input bit string ID.

The signing key generating unit 350D generates the signing key of the signature apparatus 400D based on the encryption parameters stored by the encryption parameter storage unit 390D, the master key stored by the master key storage unit 330D, and the bit string ID input by the identifier input unit 340D.

The signing key generating unit 350D has a secret random number generating unit 351D, a key element calculation unit 352D, and a key integer calculation unit 353D.

Using the CPU 911, the secret random number generating unit 351D inputs the data representing the order p among the encryption parameters stored by the encryption parameter storage unit 390D. Using the CPU 911 and based on the order p represented by the input data, the secret random number generating unit 351D randomly generates an integer equal to or larger than 1 and equal to or smaller than p−1, and treats it as a secret random number r. Using the RAM 914, the secret random number generating unit 351D stores data representing the generated secret random number r.

Using the CPU 911, the key element calculation unit 352D inputs the data representing the additive group G and element g among the encryption parameters stored by the encryption parameter storage unit 390D, and the data representing the secret random number r and stored by the secret random number generating unit 351D. Using the CPU 911 and based on the additive group G, element g, and secret random number r represented by the input data, the key element calculation unit 352D calculates an element r·g which is obtained when the element g is added r times by the operation on the additive group G, and treats it as the element R. Using the RAM 914, the key element calculation unit 352D stores data representing the calculated element R.

Using the CPU 911, the key integer calculation unit 353D inputs the data representing the order p and hash function H among the encryption parameters stored by the encryption parameter storage unit 390D, the data representing the secret random number x of the master key stored by the master key storage unit 330D, the bit string ID stored by the identifier input unit 340D, the data representing the secret random number r and stored by the secret random number generating unit 351D, and the data representing the public element R and calculated by the key element calculation unit 352D. Using the CPU 911 and based on the hash function H and element R represented by the input data and the input bit string ID, the key integer calculation unit 353D calculates a hash value H (R, ID) which is obtained when the set of the element R and bit string ID is hashed by the hash function H. Using the CPU 911 and based on the order p, secret random number x, and secret random number r represented by the input data, and the calculated hash value H (R, ID), the key integer calculation unit 353D calculates a remainder which is obtained when the sum of the secret random number r and the product of the hash value H (R, ID) and secret random number x is divided by the order p, and treats the calculated remainder as an integer s. Using the RAM 914, the key integer calculation unit 353D stores data representing the calculated integer s.

Using the CPU 911, the signing key output unit 360D inputs the data representing the element R and stored by the key element calculation unit 352D, and the data representing the integer s and stored by the key integer calculation unit 353D. Using the CPU 911, the signing key output unit 360D outputs, as the signing key, the input data representing the integer s and element R.

The signing key output by the signing key output unit 360D is notified to the signature apparatus 400D in secret.

FIG. 31 is a block diagram showing a configuration example of the function block of the signature apparatus 400D of this embodiment.

The signature apparatus 400D has an encryption parameter storage unit 490D, an identifier storage unit 410D, a signing key storage unit 420D, a message input unit 440D, a signature generating unit 450D, and a signature output unit 470D.

Using the magnetic disk drive 920, the encryption parameter storage unit 490D stores in advance data representing the public encryption parameters.

Using the magnetic disk drive 920, the identifier storage unit 410D stores the bit string ID that identifies the signature apparatus 400D itself.

Using a tamper-resistant storage device, the signing key storage unit 420D stores data representing the signing key generated by the key generating apparatus 300D.

Using the CPU 911, the message input unit 440D inputs an arbitrary-length bit string M which is the message to be signed. Using the RAM 914, the message input unit 440D stores the input bit string M.

Based on the encryption parameters stored by the encryption parameter storage unit 490D, the bit string ID stored by the identifier storage unit 410D, the signing key stored by the signing key storage unit 420D, and the bit string M input by the message input unit 440D, the signature generating unit 450D generates a signature σ.

The signature generating unit 450D has a first signature element calculation unit 451D, a secret random number generating unit 452D, a second signature element calculation unit 453D, a challenge calculation unit 454D, and a signature integer calculation unit 455D.

Using the CPU 911, the first signature element calculation unit 451D inputs the data representing the additive group G and element g among the encryption parameters stored by the encryption parameter storage unit 490D, and the data representing the integer s of the signing key stored by the signing key storage unit 420D. Using the CPU 911 and based on the additive group G, element g, and integer s represented by the input data, the first signature element calculation unit 451D calculates an element which is obtained when the element g is added s times by the operation on the additive group G, and treats the calculated element as an element S. Using the RAM 914, the first signature element calculation unit 451D stores data representing the calculated element S.

Since the element S is constant irrespective of the bit string M, the first signature element calculation unit 451D may calculate the element S in advance before the message input unit 440D inputs the bit string M and, using the magnetic disk drive 920, may store the element S.

Using the CPU 911, the secret random number generating unit 452D inputs the data representing the order p among the encryption parameters stored by the encryption parameter storage unit 490D. Using the CPU 911 and based on the order p represented by the input data, the secret random number generating unit 452D randomly generates an integer equal to or larger than 1 and equal to or smaller than p−1, and treats it as a secret random number y. Using the RAM 914, the secret random number generating unit 452D stores data representing the generated secret random number y.

Using the CPU 911, the second signature element calculation unit 453D inputs the data representing the additive group G and element g among the encryption parameters stored by the encryption parameter storage unit 490D, and the data representing the secret random number y and stored by the secret random number generating unit 452D. Using the CPU 911 and based on the additive group G, element g, and secret random number y represented by the input data, the second signature element calculation unit 453D calculates an element which is obtained when the element g is added y times by the operation on the additive group G, and treats the calculated element as an element Y. Using the RAM 914, the second signature element calculation unit 453D stores data representing the calculated element Y.

Using the CPU 911, the challenge calculation unit 454D inputs the data representing the hash function H' among the encryption parameters stored by the encryption parameter storage unit 490D, the bit string ID stored by the identifier storage unit 410D, the data representing the element R of the signing key stored by the signing key storage unit 420D, the bit string M stored by the message input unit 440D, the data representing the element S and stored by the first signature element calculation unit 451D, and the data representing the element Y and stored by the second signature element calculation unit 453D. Using the CPU 911 and based on the element R, element S, and element Y represented by the input data, and the input bit string ID and bit string M, the challenge calculation unit 454D calculates a hash value which is obtained when the set of the ordered pair of the bit string ID and bit string M and the ordered pair of the element R, element S, and element Y is hashed by the hash function H', and treats the calculated hash value as a hash value c. The hash value c is an integer equal to or larger than 1 and equal to or smaller than p−1. Using the RAM 914, the challenge calculation unit 454D stores data representing the calculated hash value c.

Using the CPU 911, the signature integer calculation unit 455D inputs the data representing the order p among the encryption parameters stored by the encryption parameter storage unit 490D, the data representing the integer s of the signing key stored by the signing key storage unit 420D, the data representing the secret random number y and stored by the secret random number generating unit 452D, and the data representing the hash value c and stored by the challenge calculation unit 454D. Using the CPU 911 and based on the order p, integer s, secret random number y, and hash value c represented by the input data, the signature integer calculation unit 455D calculates a remainder which is obtained when the sum of the secret random number y and the product of the hash value c and integer s is divided by the order p, and treats the calculated remainder as an integer z. Using the RAM 914, the signature integer calculation unit 455D stores data representing the calculated integer z.

Using the CPU 911, the signature output unit 470D inputs the data representing the element R of the signing key stored by the signing key storage unit 420D, the data representing the element S and stored by the first signature element calculation unit 451D, the data representing the element Y and stored by the second signature element calculation unit 453D, and the data representing the integer z and stored by the signature integer calculation unit 455D. Using the CPU 911 and based on the input data, the signature output unit 470D generates the signature σ including the input data representing the element R, element S, element Y, and integer z. Using the CPU 911, the signature output unit 470D outputs the generated signature σ.

FIG. 32 is a block diagram showing a configuration example of the function block of the signature verification apparatus 200D of this embodiment.

The signature verification apparatus 200D has an encryption parameter storage unit 290D, an identifier storage unit 210D, a message input unit 225D, a signature input unit 220D, a signature verification unit 230D, a verification apparatus 100D, and a verification result output unit 260D.

Using the magnetic disk drive 920, the encryption parameter storage unit 290D stores in advance data representing the public encryption parameters (including the public parameters).

Using the magnetic disk drive 920, the identifier storage unit 210D stores the bit string ID that identifies the signature apparatus 400D.

Using the CPU 911, the message input unit 225D inputs a bit string M which is a message attached with the signature σ. Using the RAM 914, the message input unit 225D stores the input bit string M.

Using the CPU 911, the signature input unit 220D inputs the signature σ attached to the bit string M input by the message input unit 225D. Using the CPU 911, the signature input unit 220D acquires data representing the element R, element S, element Y, and integer z from the input signature σ. Using the RAM 914, the signature input unit 220D stores the acquired data representing the element R, element S, element Y, and integer z.

The signature verification unit 230D has a challenge calculation unit 231D, an integer calculation unit 232D, a verification element calculation unit 233D, and a first verification unit 250D.

Using the CPU 911, the challenge calculation unit 231D inputs the data representing the hash function H' and stored by the encryption parameter storage unit 290D, the bit string ID which identifies the signature apparatus 400D and is stored by the identifier storage unit 210D, the data representing the element R, element S, and element Y and stored by the signature input unit 220D, and the bit string M stored by the message input unit 225D. Using the CPU 911 and based on the hash function H', element R, element S, and element Y represented by the input data, and the input bit string ID and bit string M, the challenge calculation unit 231D calculates a hash value which is obtained when the set of the ordered pair of the bit string ID and bit string M and the ordered pair of the element R, element S, and element Y is hashed by the hash function H', and treats the calculated hash value as a hash value c. The hash value c is an integer equal to or larger than 1 and equal to or smaller than p−1. Using the RAM 914, the challenge calculation unit 231D stores data representing the calculated hash value c.

If the bit string M is not altered, the hash value c calculated by the challenge calculation unit 231D is equal to the hash value c calculated by the challenge calculation unit 454D of the signature apparatus 400D.

Using the CPU 911, the integer calculation unit 232D inputs the data representing the hash function H among the encryption parameters stored by the encryption parameter storage unit 290D, the bit string ID which identifies the signature apparatus 400D and is stored by the identifier storage unit 210D, and the data representing the element R and stored by the signature input unit 220D. Using the CPU 911 and based on the hash function H and element R represented by the input data and the input bit string ID, the integer calculation unit 232D calculates a hash value which is obtained when the set of the element R and bit string ID is hashed by the hash function H, and treats the calculated hash value as a hash value h. The hash value h is an integer equal to or larger than 1 and equal to or smaller than p−1. Using the CPU 911, the integer calculation unit 232D stores data representing the calculated hash value h.

Using the CPU 911, the verification element calculation unit 233D inputs the data representing the additive group G among the encryption parameters stored by the encryption parameter storage unit 290D, and the data representing the element R and element S and stored by the signature input unit 220D. Using the CPU 911 and based on the additive group G, element R, and element S represented by the input data, the verification element calculation unit 233D calculates an element which is obtained by adding the element S and the inverse element of the element S by the operation on the additive group G, and treats the calculated element as an element R'. Using the RAM 914, the verification element calculation unit 233D stores data representing the calculated element R'.

The first verification unit 250D verifies if z·g=Y+c·S.

Using the CPU 911, the first verification unit 250D inputs the data representing the additive group G and element g among the encryption parameters stored by the encryption parameter storage unit 290D, the data representing the element S, element Y, and integer z and stored by the signature input unit 220D, and the data representing the hash value c and stored by the challenge calculation unit 231D. Using the CPU 911 and based on the additive group G, element g, element S, element Y, integer z, and hash value c represented by the input data, the first verification unit 250D judges whether or not the element Y+c·S obtained by adding the element Y and an element which is obtained by adding c times the element S is equal to the element z·g which is obtained by adding z times the element g. Using the CPU 911, the first verification unit 250D judges that "the verification is successful" when the element z·g and the element Y+c·S are equal, and that "the verification fails" when the element z·g and the element Y+c·S are not equal. Using the CPU 911, the first verification unit 250D stores data representing the verification result.

Y=y·g, S=s·g, and z=y+c·s mod p. Thus, $$Y+c \cdot S = (y+c \cdot s) \cdot g = z \cdot g \qquad \text{[Equation 29]}$$

Therefore, if the bit string M is not altered, z·g=Y+c·S is established.

The verification apparatus 100D verifies if R'=h·X.

The verification apparatus 100D is an apparatus corresponding to the verification apparatus 100 described in the first embodiment.

Using the CPU 911, the verification apparatus 100D inputs the data representing the order p among the encryption parameters stored by the encryption parameter storage unit 290D, as data representing the order p described in the first embodiment.

Using the CPU 911, the verification apparatus 100D inputs the data representing the hash value h and stored by the integer calculation unit 232D, as data representing the integer e described in the first embodiment.

Using the CPU 911, the verification apparatus 100D inputs the data representing the element R' and stored by the verification element calculation unit 233D, as data representing the element h described in the first embodiment.

Using the CPU 911, the verification apparatus 100D inputs the data representing the public element X among the encryption parameters stored by the encryption parameter storage unit 290D, as data representing the element s described in the first embodiment.

Using the CPU 911 and based on the order p, hash value h, element R', and element X represented by the input data, the verification apparatus 100D verifies if R'=h·X.

Using the CPU 911, the verification apparatus 100D judges that "the verification is successful" when R'=h·X, and that "the verification fails" when R'≠h·X.

Using the CPU 911, the verification apparatus 100D outputs data representing the verification result.

R=r·g, S=s·g=r+H(R,ID)·mod p, h=H(R,ID), and X=x·g. Thus,

[Equation 30]

$$R' = S - R$$
$$= (r + H(R, ID) \cdot x) \cdot g - r \cdot g$$
$$= h \cdot X$$

Therefore, if the bit string M is not altered, R'=h·X is established.

Using the CPU 911, the verification result output unit 260D inputs the data representing the verification result and stored by the first verification unit 250D, and the data representing the verification result and output by the verification result output unit 260D. Using the CPU 911 and based on the two input verification results, the verification result output unit 260D judges that "the verification is successful" when both the first verification unit 250D and verification apparatus 100D judge that "the verification is successful", and judges that "the verification fails" otherwise. Using the CPU 911, the verification result output unit 260D outputs data representing the verification result.

FIG. 33 is a flowchart showing an example of the flow of the signature verification process used by the signature verification apparatus 200D of this embodiment to verify the signature σ.

In a challenge calculation step S731D, using the CPU 911 and based on the bit string ID stored by the identifier storage unit 210D, the element R, element S, and element Y input by the signature input unit 220D, and the bit string M input by the message input unit 225D, the challenge calculation unit 231D calculates a hash value H'(ID,R,S,Y,M) which is obtained when the set of the ordered pair of the bit string ID and bit string M and the ordered pair of the element R, element S, and element Y is hashed by the hash function H', and treats the calculated value as the hash value c.

In a first verification step S732D, using the CPU 911 and based on the order p and element g stored by the encryption parameter storage unit 290D, the element S, element Y, and integer z input by the signature input unit 220D, and the hash value c calculated by the challenge calculation unit 2310 in the challenge calculation step S731D, the first verification unit 250D verifies if z·g=Y+c·S.

When z·g=Y+c·S, the flow advances to an integer calculation step S733D.

When z·g=Y+c·S, the flow advances to a failure judgment step S737D.

In the integer calculation step S733, using the CPU 911 and based on the bit string ID stored by the identifier storage unit 210D and the element R input by the signature input unit 220D, the integer calculation unit 232D calculates a hash value H (R, ID) which is obtained by hashing the set of the element R and bit string ID by the hash function H, and treats the calculated value as the hash value h.

In a verification element calculation step S734D, using the CPU 911 and based on the element R and element S input by the signature input unit 220D, the verification element calculation unit 233D calculates an element S—R which is obtained when the element S and the inverse element of the element R are added by the operation on the additive group G, and treats the calculated element as the element R'.

In a second verification step S735D, using the CPU 911 and based on the order p and element X stored by the encryption parameter storage unit 290D, the hash value h calculated by the integer calculation unit 232D in the integer calculation step S733D, and the element R' calculated by the verification element calculation unit 233D in the verification element calculation step S734D, the verification apparatus 100D verifies if R'=h·X.

When R'=h·X, the flow advances to a success judgment step S736D.

When R'≠h·X, the flow advances to a failure judgment step S737D.

In the success judgment step S736D, using the CPU 911, the verification result output unit 260D judges that the verification is successful, and outputs the verification result.

After that, the signature verification process is ended.

In the failure judgment step S737D, using the CPU 911, the verification result output unit 260D judges that the verification fails, and outputs the verification result.

After that, the signature verification process is ended.

In this example, if z·g=Y+c·S is verified first, and then if R'=h·X is verified. However, either verification may come first.

The signature verification apparatus 200D of this embodiment has a processing device (CPU 911) which processes data, the message input unit 225D, the signature input unit 220D, the signature verification unit 230D, the verification apparatus 100D, and the verification result output unit 260D.

Using the processing device (CPU 911), the message input unit 225D inputs the message (bit string M).

Using the processing device (CPU 911), the signature input unit 220D inputs the signature σ for the message (bit string M) input by the message input unit 225D.

Using the processing device (CPU 911) and based on the message (bit string M) input by the message input unit 225D and the signature σ input by the signature input unit 220D, the signature verification unit 230D calculates the integer e (hash value h), the element s (public element X) of the finite group (additive group) G, and the element h (element R') of the finite group (additive group) G, which are to be input to the verification apparatus 100D.

The verification apparatus 100D inputs the integer e (hash value h), the element s (public element X) of the finite group (additive group) G, and the element h (element R') of the finite group (additive group) G, which are calculated by the signature verification unit 230D, and judges whether or not the verification is successful.

Using the processing device (CPU 911) and based on the verification result of the verification apparatus 100D, the verification result output unit 260D outputs a verification result indicating whether or not the verification is successful.

With the signature verification apparatus 200D of this embodiment, the signature can be verified by means of verification by the verification apparatus 100D that h=e·s. As the time necessary for the verification apparatus 100D to perform the process of verifying the consistency of the signature can be shortened, the time necessary for the signature verification apparatus 200D to perform the entire process of verifying the signature can be shortened.

The signature verification apparatus 200D of this embodiment further has a storage device (e.g., magnetic disk drive 920 and RAM 914) which stores data, the encryption parameter storage unit 290D, and the identifier storage unit 210D.

Using the storage device (magnetic disk drive 920), the encryption parameter storage unit 290D stores the order p of the finite group (additive group) G, the generator g of the finite group (additive group) G, and the element (public element) X of the finite group (additive group) G.

Using the storage device (magnetic disk drive 920), the identifier storage unit 210D stores the bit string ID that identifies the signature apparatus 400D.

Using the processing device (CPU 911), the message input unit 225D inputs the bit string M as the message.

Using the processing device (CPU 911), the signature input unit 220D inputs the element R of the finite group (additive group) G, the element S of the finite group (additive group) G, the element Y of the finite group (additive group) G, and the integer z equal to or larger than 1 and equal to or smaller than p−1, as the signature σ.

The signature verification unit 230D has the integer calculation unit 232D, the verification element calculation unit 233D, the challenge calculation unit 231D, and the first verification unit 250D.

Using the processing device (CPU 911) and based on the element R input by the signature input unit 220D and the bit string ID stored by the identifier storage unit 210D, the integer calculation unit 232D calculates a hash value which is obtained when the element R and the bit string I are hashed by the predetermined hash function H, and treats the calculated value as the integer h (=H(R,ID)).

Using the processing device (CPU 911) and based on the element R and element S input by the signature input unit 220D, the verification element calculation unit 233D adds the element S and the inverse element of the element R, and treats the sum as the element R' (=S−R) of the finite group (additive group) G.

Using the processing device (CPU 911) and based on the bit string ID stored by the identifier storage unit 210D, the element R, element S, and element Y input by the signature input unit 220D, and the bit string M input by the message input unit 225D, the challenge calculation unit 231D calculates a hash value which is obtained when the bit string ID, the element R, the element S, the element Y, and the bit string M are hashed by the predetermined hash function H', and treats the calculated value as the integer (hash value) c (=H'(ID,R,S,Y,M)).

Using the processing device (CPU 911) and based on the generator g stored by the encryption parameter storage unit 290D, the element S, element Y, and integer z input by the signature input unit 220D, and the integer (hash value) c calculated by the challenge calculation unit 231D, the first verification unit 250D judges whether or not the element Y+c·S, obtained by adding the element Y and the element c·S which is obtained when the element S is added the number of times of the integer (hash value) c, is equal to the element z·g obtained when the generator g is added the number of times of the integer z. When the element Y+c·S and the element z·g are equal, the first verification unit 250D judges that the verification is successful, and treats this judgment result as the first verification result.

The verification apparatus 100D inputs the order p stored by the encryption parameter storage unit 290D, as the order p, the integer h calculated by the integer calculation unit 232D, as the integer e, the element X stored by the encryption parameter storage unit 290D, as the element s, and the element R' calculated by the verification element calculation unit 233D, as the element h, judges whether or not the verification is successful, and treats the judgment result as the second verification result.

Using the processing device (CPU 911) and based on the first verification result of the verification by the first verification unit 250D and the second verification result of the verification by the verification apparatus 100D, when both the first verification result and the second verification result show that the verification is judged successful, the verification result output unit 260D outputs a verification result indicating that the verification is successful.

With the signature verification apparatus 200D of this embodiment, since the verification apparatus 100D verifies if R'=h·X, the signature σ can be verified. Since the time necessary for the verification apparatus 100D to perform the process of verifying if R'=h·X can be shortened, the time necessary for the signature verification apparatus 200D to perform the entire process of verifying the signature can be shortened.

The signature verification apparatus 200D described so far is a digital signature verification apparatus which judges whether or not the signature is correct by verifying if the element $s^e$ which is obtained when the element s of the multiplicative group is multiplied e times by the exponentiation on the multiplicative group, or the element e·s which is obtained when the element s of the additive group is added e times by the scalar multiplication on the additive group such as a group formed of points on a (hyper) elliptic curve, coincides with the known element h.

The signature verification apparatus 200D has
 a device (integer partitioning unit 110) which partitions an exponential part (integer e),
 a device (verification value calculation unit 130) which, using the partitioned exponents (integer $e_1$ and integer $e_2$), calculates a value $h^{e1} \cdot e^{-e2}$ by the double-base exponentiation on the multiplicative group, or a value $e_1 \cdot h - e_2 \cdot s$ by the double-base scalar multiplication on the additive group such as a group formed of points on a (hyper) elliptic curve, and
 a device (verification judging unit 150) which judges whether or not the calculated value is equal to the identity element 1 of the multiplicative group or the identity element 0 of the additive group.

The signature verification apparatus 200D (digital signature verification apparatus) described so far has
 a calculation device (integer partitioning unit 110) which inputs the exponent (integer) e and the group order p of the multiplicative group or additive group used in a cipher and calculates the two integers $e_1$ and $e_2$ (note that $e_1 \cdot e \equiv e_2 \pmod p$) each having a bit length half that of the order p, and
 a verification apparatus (verification value calculation unit 130, verification judging unit 150) which verifies $s^{e2} \cdot h^{-e1} = 1$ or $e_2 \cdot s - e_1 \cdot h = 0$.

The integer partitioning unit 110 described so far partitions the exponential part (integer e) by performing the extended Euclidean algorithm.

The integer partitioning unit 110 described so far has, in repetitive division of two integers,
 a calculation device (third remainder calculation unit 117) in which an integer $v_2$ as the divisor and an integer $v_1$ as the dividend are a remainder $v_3$ of the division of the preceding step and an integer $v_2$ as the divisor of the preceding step, respectively, and
 a calculation device (conformity judging unit 116) which judges that the remainder $v_3$ of the division result of each step is equal to or larger than a predetermined number ($\sqrt{p}$), or equal to or smaller than a predetermined number ($\sqrt{p}$).

The signature verification apparatus 200D described so far is a BNN (Bellare-Namprempre-Neven)-ID-based signature verification apparatus.

The signature verification apparatus 200D has, in order to verify, based on the element X on the multiplicative group or additive group which is the public key of the secret key generation center (key generating apparatus 300D), the element R as part of the secret key (signing key) of the signing person (signature apparatus 400D), the element S as part of the signature a, and the bit string ID that identifies the signing person, if an element $R \cdot X^{H(R,ID)}$ or $R+H(R,ID) \cdot X$ coincides with the element S, a device (integer partitioning unit 110) which partitions the exponential part (hash value h=H(R,ID)), a device (verification value calculation unit 130) which, using the partitioned exponents (integer $e_1$ and integer $e_2$), calculates a value $(S/R)^{e_1} \cdot X^{-e_2}$ by the double-base exponentiation on the multiplicative group, or a value $e_1 \cdot (S-R) - e_2 \cdot X$ by the double-base scalar multiplication on the additive group such as a group formed of points on a (hyper)elliptic curve, and a device (verification judging unit 150) which judges whether or not the calculated value is equal to the identity element 1 of the multiplicative group or the identity element 0 of the additive group.

The ID-based signature system 820D described so far is a signature system employing the BNN-ID-based signature scheme which is a Fiat-Shamir-transformed BNN-ID-based authentication system.

The ID-based authentication system 820E employs the multiplicative group G whose order p is a prime number, and the generator g of the additive group G.

The encryption parameter setting apparatus 810D performs a PKG key generating process. Using the CPU 911, the encryption parameter setting apparatus 810D generates a random integer x equal to or larger than 1 and equal to or smaller than p−1. Using the CPU 911, the encryption parameter setting apparatus 810D calculates the element $X=g^x$ of the multiplicative group G. Using the CPU 911, the encryption parameter setting apparatus 810D outputs the element X of the group G as the PKG public key, and the integer x as the PKG secret key.

The key generating apparatus 300D performs a user secret key extraction process. Using the CPU 911, the key generating apparatus 300D inputs the PKG secret key x and the bit string ID that identifies the proving apparatus 400E. First, using the CPU 911, the key generating apparatus 300D generates a random integer (secret random number) r equal to or larger than 1 and equal to or smaller than p−1. Using the CPU 911, the key generating apparatus 300D calculates the element $R=g^r$ of the group G and the integer $s=r+H(R,ID) \cdot x$, and outputs (R,s) as the user secret key.

The signature apparatus 400D performs a signature generating process. Using the CPU 911, the signature apparatus 400D inputs the message M and the secret key (R,s). First, using the CPU 911, the signature apparatus 400D generates the random integer (secret random number) y equal to or larger than 1 and equal to or smaller than p−1. Using the CPU 911, the signature apparatus 400D calculates the element $S=g^s$ of the group G and the element $Y=g^y$ of the group G, and calculates the integer $c=H_1(S,Y,R,M)$. Using the CPU 911, the signature apparatus 400D calculates the integer $z=y+c \cdot s \bmod p$, and outputs (c,z,S,Y,R) as the signature.

The signature verification apparatus 200D performs a signature verification process. Using the CPU 911, the signature verification apparatus 200D inputs the signature (c,z,S,Y,R) and the bit string ID that identifies the signature apparatus 400D. The signature verification apparatus 200D verifies if $g^z=Y \cdot S^c$ and $S=R \cdot X^{H(R,ID)}$ are established, if the element S and element Y are elements of G, and if the integer z is equal to or larger than 1 and equal to or smaller than p−1. If all of these conditions are established, using the CPU 911, the signature verification apparatus 200D judges that the signature verification is accepted; if not, the signature verification is not accepted.

The verification apparatus 100D described so far speeds up the process of verifying whether or not $S=R \cdot X^{H(R,ID)}$ in the BNN-ID-based signature system.

In the verification apparatus 100D, the integer partitioning unit 110, using the CPU 911, inputs h (=H(R,ID)) and p, and calculates the integer $e_1$ and integer $e_2$ that satisfy $e_1 \cdot h \equiv e_2$ (mod p). Using the CPU 911, the verification value calculation unit 130 calculates $X_1=X^{e_1} \cdot R'^{e_2}$ (note that $R'=S \cdot R^{-1}$) by the double-base exponentiation on the multiplicative group G. By checking whether or not $X_1=1$, the verification apparatus 100E checks at high speed if $S=R \cdot X^{H(R,ID)}$ is established.

Embodiment 6.

The sixth embodiment will be described with reference to FIGS. 34 to 37.

FIG. 34 shows an example of the entire system configuration of an ID-based authentication system 820E of this embodiment.

The ID-based authentication system 820E is a system in which an authentication apparatus 200E authenticates that a proving apparatus 400E is not a counterfeit. In this authentication, the authentication apparatus 200E utilizes identification data that identifies the proving apparatus 400E as the public key of the proving apparatus 400E.

The ID-based authentication system 820E has an encryption parameter setting apparatus 810D, a key generating apparatus 300D, the proving apparatus 400E, and the authentication apparatus 200E.

The encryption parameter setting apparatus 810D and key generating apparatus 300D are similar to those described in the fifth embodiment, and their description will be omitted.

The proving apparatus 400E transmits an authentication request message to the authentication apparatus 200E. The authentication request message transmitted from the proving apparatus 400E includes ah element R, element S, and element Y of an additive group G.

Upon reception of the authentication request message, the authentication apparatus 200E transmits a question message to the proving apparatus 400E. The question message transmitted from the authentication apparatus 200E includes an integer c equal to or larger than 1 and equal to or smaller than p−1.

Upon reception of the question message, the proving apparatus 400E transmits a response message to the authentication apparatus 200E. The response message transmitted from the proving apparatus 400E includes an integer z equal to or larger than 1 and equal to or smaller than p−1 and calculated based on the integer c.

The authentication apparatus 200E verifies the element R, element S, and element Y included in the received authentication request message and the integer z included in the received response message. If they match, the authentication apparatus 200E authenticates that the proving apparatus 400E is not a counterfeit.

FIG. 35 shows a block diagram showing a configuration example of the function block of the proving apparatus 400E of this embodiment.

Portions of the proving apparatus 400E which are common to those of the signature apparatus 400D described in the fifth embodiment are denoted by the same reference numerals, and their description will be omitted.

The proving apparatus 400E has an encryption parameter storage unit 490D, a signing key storage unit 420D, a signature generating unit 450D, an authentication request transmission unit 470E, a question reception unit 454E, and a response transmission unit 475E.

Using a CPU 911, the authentication request transmission unit 470E inputs data representing the element R of the signing key and stored by the signing key storage unit 420D, data representing the element S and stored by a first signature element calculation unit 451D, and data representing the element Y and stored by a second signature element calculation unit 453D. Using the CPU 911, the authentication request transmission unit 470E generates the authentication request message including the input data representing the element R, element S, and element Y. Using a communication device 915, the authentication request transmission unit 470E transmits the generated authentication request message to the authentication apparatus 200E.

Using the communication device 915, the question reception unit 454E receives the question message transmitted from the authentication apparatus 200E. Using the CPU 911, the question reception unit 454E acquires data representing the integer c included in the received question message. Using a RAM 914, the question reception unit 454E stores the acquired data representing the integer c.

Using the CPU 911, a signature integer calculation unit 455D inputs data representing an order p among the encryption parameters stored by the encryption parameter storage unit 490D, data representing an integer s of the signing key stored by the signing key storage unit 420D, data representing a secret random number y stored by the secret random number generating unit 452D, and the data representing the integer c and stored by the question reception unit 454E. Using the CPU 911 and based on the order p, integer s, secret random number y, and integer c represented by the input data, the signature integer calculation unit 455D calculates a remainder which is obtained when the sum of the secret random number y and the product of the integer c and integer s is divided by the order p, and treats the calculated remainder as an integer z. Using the RAM 914, the signature integer calculation unit 455D stores data representing the calculated integer z.

Using the CPU 911, the response transmission unit 475E inputs the data representing the integer z and stored by the signature integer calculation unit 455D. Using the CPU 911, the response transmission unit 475E generates the response message including the input data representing the integer z. Using the communication device 915, the response transmission unit 475E transmits the generated response message to the authentication apparatus 200E.

FIG. 36 is a block diagram showing a configuration example of the function block of the authentication apparatus 200E of this embodiment.

Portions of the authentication apparatus 200E which are common to those of the signature verification apparatus 200D described in the fifth embodiment are denoted by the same reference numerals, and their description will be omitted.

The authentication apparatus 200E has an encryption parameter storage unit 290D, an identifier storage unit 210D, an authentication request reception unit 220E, a challenge generating unit 231E, a question transmission unit 226E, a response reception unit 227E, a signature verification unit 230D, a verification apparatus 100D, and an authentication result output unit 260E.

Using the communication device 915, the authentication request reception unit 220E receives the authentication request message transmitted from the proving apparatus 400E. Using the CPU 911, the authentication request reception unit 220E acquires the data representing the element R, element S, and element Y included in the received authentication request message. Using the RAM 914, the authentication request reception unit 220E stores the acquired data representing the element R, element S, and element Y.

When the authentication request reception unit 220E receives the authentication request message, the challenge generating unit 231E, using the CPU 911, randomly generates an integer equal to or larger than 1 and equal to or smaller than p−1, and treats it as the integer c. Using the RAM 914, the challenge generating unit 231E stores data representing the generated integer c.

Using the CPU 911, the question transmission unit 226E inputs the data representing the integer c and stored by the challenge generating unit 231E. Using the CPU 911, the question transmission unit 226E generates the question message including the input data representing the integer c. Using the communication device 915, the question transmission unit 226E transmits the generated question message to the proving apparatus 400E.

Using the communication device 915, the response reception unit 227E receives the response message transmitted from the proving apparatus 400E. Using the CPU 911, the response reception unit 227E acquires the data representing the integer z included in the received response message. Using the RAM 914, the response reception unit 227E stores the acquired data representing the integer z.

A first verification unit 250D verifies if $z \cdot g = Y + c \cdot S$.

Using the CPU 911, the first verification unit 250D inputs data representing the additive group G and an element g among the encryption parameters stored by the encryption parameter storage unit 290D, the data representing the element S and element Y and stored by the authentication request reception unit 220E, the data representing the integer value c and stored by the challenge generating unit 231E, and the data representing the integer z and stored by the response reception unit 227E. Using the CPU 911 and based on the additive group G, element g, element S, element Y, integer z, and hash value c represented by the input data, the first verification unit 250D judges whether or not an element $Y + c \cdot S$, which is obtained by adding the element Y and an element $c \cdot S$ obtained when the element S is added c times, is equal to an element $z \cdot g$ which is obtained when the element g is added z times, by the operation on the additive group G. When the element $z \cdot g$ and the element $Y + c \cdot S$ are equal, the first verification unit 250D, using the CPU 911, judges that "the verification is successful"; if not, "the verification fails". Using the CPU 911, the first verification unit 250D stores data representing the verification result.

Using the CPU 911, the authentication result output unit 260E inputs the data representing the verification result and stored by the first verification unit 250D, and the data representing the verification result and output by the verification apparatus 100D. Using the CPU 911 and based on the two input verification results, the authentication result output unit 260E judges that "the verification is successful" when both the first verification unit 250D and verification apparatus 100D judge that "the verification is successful", and judges that "the verification fails" otherwise. Using the CPU 911, the authentication result output unit 260E outputs data representing the verification result.

FIG. 37 is a flowchart showing an example of the authentication process used by the authentication apparatus 200E of this embodiment to authenticate the proving apparatus 400E.

Portions of the authentication process which are common to the signature verification process described in the fifth embodiment are denoted by the same reference numerals, and their description will be omitted.

In a secret random number generating step S741E, a secret random number generating unit 452D of the proving apparatus 400E, using the CPU 911, randomly generates the secret random number y equal to or larger than 1 and equal to or smaller than p−1.

In a signature element calculation step S742E, the second signature element calculation unit 453D, using the CPU 911 and based on the secret random number y generated by the secret random number generating unit 452D, calculates the element Y (=y·g) of the additive group G.

In an authentication request transmission step S743E, the authentication request transmission unit 470E of the proving apparatus 400E, using the communication device 915, transmits the authentication request message including the element R stored by the signing key storage unit 420D, the element S (=s·g) calculated by the first signature element calculation unit 451D, and the element Y calculated by the second signature element calculation unit 453D in the secret random number generating step S741E to the authentication apparatus 200E.

In an authentication request reception step S751E, the authentication request reception unit 220E of the authentication apparatus 200E, using the communication device 915, receives the authentication request message transmitted from the proving apparatus 400E in the authentication request transmission step S743E.

In a challenge generating step S752E, the challenge generating unit 231E of the authentication apparatus 200E, using the CPU 911, randomly generates the integer c equal to or larger than 1 and equal to or smaller than p−1.

In a question transmission step S753E, the question transmission unit 226E of the authentication apparatus 200E, using the communication device 915, transmits the question message including the integer c generated by the challenge generating unit 231E in the challenge generating step S752E to the proving apparatus 400E.

In a question reception step S744E, the question reception unit 454E of the proving apparatus 400E, using the communication device 915, receives the question message transmitted from the authentication apparatus 200E in the question transmission step S753E.

In a signature integer calculation step S745E, the signature integer calculation unit 455D of the proving apparatus 400E, using the CPU 911 and based on the order p stored by the encryption parameter storage unit 490D, the integer s stored by the signing key storage unit 420D, the secret random number y generated by the secret random number generating unit 452D in the secret random number generating step S741E, and the integer y included in the question message received by the question reception unit 454E in the question reception step S744E, calculates the integer z (=y+c·s mod p).

In a response transmission step S746E, the response transmission unit 475E of the proving apparatus 400E, using the communication device 915, transmits the response message including the integer z calculated by the signature integer calculation unit 455D in the signature integer calculation step S745E to the authentication apparatus 200E.

In a response reception step S754E, the response reception unit 227E of the authentication apparatus 200E, using the communication device 915, receives the response message transmitted from the proving apparatus 400E in the response transmission step S746E.

A first verification step S732D through a second verification step 57350 are similar to the steps described in the fifth embodiment.

In a success judgment step S735E, the authentication result output unit 260E, using the CPU 911, judges that the authentication is successful, and outputs the authentication result.

After that, the authentication process is ended.

In a failure judgment step S737E, the authentication result output unit 260E, using the CPU 911, judges that the authentication fails, and outputs the authentication result.

The authentication apparatus 200E of this embodiment has a processing device (CPU 911) which processes data, a transmission device (communication device 915) which transmits data, a reception device (communication device 915) which receives data, the authentication request reception unit 220E, the question transmission unit 226E, the response reception unit 227E, the signature verification unit 230D, the verification apparatus 100D, and the authentication result output unit 260E.

Using the reception device (communication device 915), the authentication request reception unit 220E receives the authentication request message.

Using the transmission device (communication device 915), the question transmission unit 226E transmits the question message as a response to the authentication request message received by the authentication request reception unit 220E.

Using the reception device (communication device 915), the response reception unit 227E receives the response message to the transmitted question message.

Using the processing device (CPU 911) and based on the authentication request message received by the authentication request reception unit 220E and the response message received by the response reception unit 227E, the signature verification unit 230D calculates an integer e (hash value h), an element s (element X) of the finite group (additive group) G, and an element h (element R') of the finite group (additive group) G which are to be input to the verification apparatus 100D.

The verification apparatus 100D inputs the integer e (hash value h), the element s (element X) of the finite group (additive group) G, and the element h (element R') of the finite group (additive group) G which are calculated by the signature verification unit 230D, and judges whether or not the verification is successful.

Using the processing device (CPU 911) and based on the verification result of the verification apparatus 100D, the authentication result output unit 260E outputs an authentication result indicating whether or not the verification is successful.

With the authentication apparatus 200E of this embodiment, the proving apparatus 400E can be authenticated by means of judgment by the verification apparatus 100D if h=e·s. As the time necessary for the verification apparatus 100D to perform the process of verifying the consistency of the signature can be shortened, the time necessary for the authentication apparatus 200E to perform the entire process of verifying the proving apparatus 400E can be shortened.

The authentication apparatus 200E of this embodiment further has a storage device (e.g., magnetic disk drive 920 and RAM 914) which stores data, the encryption parameter storage unit 290D, the identifier storage unit 210D, and the challenge generating unit 231E.

Using the storage device (magnetic disk drive 920), the encryption parameter storage unit 290D stores the order p of the finite group (additive group) G, the generator g of the finite group (additive group) G, and the element X of the finite group (additive group) G.

Using the storage device (magnetic disk drive 920), the identifier storage unit 210D stores a bit string ID which identifies the proving apparatus 400E.

Using the reception device (communication device 915), the authentication request reception unit 220E receives the element R of the finite group (additive group) G, the element S of the finite group (additive group) G, and the element Y of the finite group (additive group) G from the proving apparatus 400E as the authentication request message.

Using the processing device (CPU 911), the challenge generating unit 231E randomly generates the integer c equal to or larger than 1 and equal to or smaller than p−1.

Using the transmission device (communication device 915), the question transmission unit 226E transmits the integer c generated by the challenge generating unit 231E to the proving apparatus 400E as the question message.

Using the reception device (communication device 915), the response reception unit 227E receives the integer z equal to or larger than 1 and equal to or smaller than p−1 from the proving apparatus 400E as the response message.

The signature verification unit 230D has the integer calculation unit 232D, verification element calculation unit 233D, and first verification unit 250D.

Using the processing device (CPU 911) and based on the element R received by the authentication request reception unit 220E and the bit string ID stored by the identifier storage unit 210D, the integer calculation unit 232D calculates a hash value which is obtained when the element R and bit string ID are hashed by a predetermined hash function H, and treats the calculated hash value as the integer h (=H(R,ID)).

Using the processing device (CPU 911) and based on the element R and element S received by the authentication request reception unit 220E, the verification element calculation unit 233D adds the element S and the inverse element of the element R, and treats the sum as an element R' (=S−R) of the finite group G.

Using the processing device (CPU 911) and based on the generator g stored by the encryption parameter storage unit 290D, the element S and element Y received by the authentication request reception unit 220E, the integer c generated by the challenge generating unit 231E, and the integer z received by the response reception unit 227E, the first verification unit 250D judges whether or not the element Y+c·S, which is obtained by adding the element Y and the element c·S obtained when the element S is added c times, is equal to the element z·g which is obtained when the element g is added z times. When the element Y+c·S and the element z·g are equal, the first verification unit 250D judges that the verification is successful, and treats this judgment result as the first verification result.

The verification apparatus 100D inputs the order p stored by the encryption parameter storage unit 290D, as the order p, the integer h calculated by the integer calculation unit 232D, as the integer e, the element X stored by the encryption parameter storage unit 290D, as the element s, and the element R' calculated by the verification element calculation unit 233D, as the element h, judges whether or not the verification is successful, and treats the judgment result as the second verification result.

Using the processing device (CPU 911) and based on the first verification result of the verification by the first verification unit 250D and the second verification result of the verification by the verification apparatus 100D, when both the first verification result and the second verification result show that the verification is judged successful, the authentication result output unit 260E outputs an authentication result indicating that the authentication is successful.

With the authentication apparatus 200E of this embodiment, since the verification apparatus 100D verifies if R'=h·X, the proving apparatus 400E can be authenticated. Since the time necessary for the verification apparatus 100D to perform the process of verifying if R'=h·X can be shortened, the time necessary for the authentication apparatus 200E to perform the entire process of authenticating the proving apparatus 400E can be shortened.

The authentication apparatus 200E described so far is an authentication scheme verification apparatus which authenticates the proving apparatus 400E by verifying if the element $s^e$ which is obtained when the element s on the multiplicative group is multiplied e times by the exponentiation on the multiplicative group, or the element e·s which is obtained when the element s on the additive group is added e times by the scalar multiplication on the additive group such as a group formed of points on a (hyper) elliptic curve, coincides with the known element h.

The authentication apparatus 200E has
a device (integer partitioning unit 110) which partitions an exponential part (integer e),
a device (verification value calculation unit 130) which, using the partitioned exponents (integer $e_1$ and integer $e_2$), calculates a value $h^{e_1} \cdot e^{-e_2}$ by the double-base exponentiation on the multiplicative group, or a value $e_1 \cdot h - e_2 \cdot s$ by the double-base scalar multiplication on the additive group such as a group formed of points on a (hyper) elliptic curve, and
a device (verification judging unit 150) which judges whether or not the calculated value is equal to the identity element 1 of the multiplicative group or the identity element 0 of the additive group.

The authentication apparatus 200E (authentication scheme verification apparatus) described so far has
a calculation device (integer partitioning unit 110) which inputs the exponent (integer) e and the group order p of the multiplicative group or additive group used in a cipher and calculates the two integers $e_1$ and $e_2$ (note that $e_1 \cdot e \equiv e_2 \pmod{p}$) each having a bit length half that of the order p, and
a verification apparatus (verification value calculation unit 130, verification judging unit 150) which verifies $s^{e_2} \cdot h^{-e_1} = 1$ or $e_2 \cdot s - e_1 \cdot h = 0$.

The integer partitioning unit 110 described so far partitions the exponential part (integer e) by performing the extended Euclidean algorithm.

The integer partitioning unit 110 described so far has, in repetitive division of two integers,
a calculation device (third remainder calculation unit 117) in which an integer $v_2$ as the divisor and an integer $v_1$ as the dividend are a remainder $v_3$ of the division of the preceding step and an integer $v_2$ as the divisor of the preceding step, respectively, and a calculation device (conformity judging unit 116) which judges that the remainder $v_3$ of the division result of each step is equal to or larger than a predetermined number ($\sqrt{p}$), or equal to or smaller than a predetermined number ($\sqrt{p}$).

The authentication apparatus 200E described so far is a BNN-ID-based authentication scheme verification apparatus.

The authentication apparatus 200E has, in order to verify, based on the element X on the multiplicative group or additive group which is the public key of the secret key generation center (key generating apparatus 300D), the element R as part of the secret key (signing key) of the authentication target party (proving apparatus 400E), the commit value (element) S of the authentication target party, and the bit string ID that identifies the authentication target party, if an element $R \cdot X^{\{H(R,ID)\}}$ or $R+H(R,ID) \cdot X$ coincides with the element S, a device (integer partitioning unit 110) which partitions the exponential part (hash value $h=H(R,ID)$), a device (verification value calculation unit 130) which, using the partitioned exponents (integer $e_1$ and integer $e_2$), calculates a value $(S/R)^{e_1} \cdot X^{-e_2}$ by the double-base exponentiation on the multiplicative group, or a value $e_1 \cdot (S-R) - e_2 \cdot X$ by the double-base scalar multiplication on the additive group such as a group formed of points on a (hyper)elliptic curve, and a device (verification judging unit 150) which judges whether or not the calculated value is equal to the identity element 1 of the multiplicative group or the identity element 0 of the additive group.

The ID-based authentication system 820E described so far is an authentication system employing the BNN-ID-based authentication scheme.

The ID-based authentication system 820E has a proving party (proving apparatus 400E) and an authentication party (authentication apparatus 200E). First, the proving party (proving apparatus 400E) sends a commitment Cmt (authentication request message) to the verification party (authentication apparatus 200E). The verification party (authentication apparatus 200E) receives the commitment Cmt, calculates challenge data Ch (question message) from the commitment Cmt and the public information (encryption parameters and public parameters), and sends the challenge data Ch to the proving party (proving apparatus 400E). The proving party (proving apparatus 400E) receives the challenge data Ch, and calculates response data Rsp and sends it to the verification party (authentication apparatus 200E). The verification party (authentication apparatus 200E) receives the response data Rsp and verifies if it is correct data. The verification party (authentication apparatus 200E) judges that the authentication is accepted when the response data is correct, and judges that the authentication is not accepted otherwise.

The ID-based authentication system 820E employs the multiplicative group G whose order p is a prime number, and the generator g of the additive group G.

The encryption parameter setting apparatus 810D performs a PKG key generating process. Using the CPU 911, the encryption parameter setting apparatus 810D generates a random integer x equal to or larger than 1 and equal to or smaller than p−1. Using the CPU 911, the encryption parameter setting apparatus 810D calculates the element $X=g^x$ of the multiplicative group G. Using the CPU 911, the encryption parameter setting apparatus 810D outputs the element X of the group G as the PKG public key, and the integer x as the PKG secret key.

The key generating apparatus 300D performs a user secret key extraction process. Using the CPU 911, the key generating apparatus 300D inputs the PKG secret key x and the bit string ID that identifies the proving apparatus 400E. First, using the CPU 911, the key generating apparatus 300D generates a random integer (secret random number) r equal to or larger than 1 and equal to or smaller than p−1. Using the CPU 911, the key generating apparatus 300D calculates the element $R=g^r$ of the group G and the integer $s=r+H(R,ID) \cdot x$, and outputs (R,s) as the user secret key.

In the Cmt calculation process, using the CPU 911, the proving apparatus 400E generates the random integer (secret random number) y equal to or larger than 1 and equal to or smaller than p−1. Using the CPU 911, the proving apparatus 400E calculates the element $S=g^s$ of the group G and the element $Y=g^y$ of the group G, and treats the element S, element Y, and element R as the commitment Cmt (authentication request data).

In the Ch calculation process, using the CPU 911, the authentication apparatus 200E generates the random integer c equal to or larger than 1 and equal to or smaller than p−1, and treats the generated integer c as the challenge data Ch (question data).

In the Rsp calculation process, using the CPU 911, the proving apparatus 400E calculates the integer $z=y+c \cdot s$ mod p, and treats the calculated integer z as the response data Rsp.

Using the CPU 911, the authentication apparatus 200E receives Rsp, and verifies if $g^z = Y \cdot S^c$ and $S=R \cdot X^{H(R,ID)}$ are established, if the element S and element Y are elements on the group G, and if the integer z is equal to or larger than 1 and equal to or smaller than p−1. If all of these conditions are established, the authentication apparatus 200E, using the CPU 911, judges that the authentication is accepted; if not, the authentication is not accepted.

The verification apparatus 100E described so far speeds up the process of verifying whether or not $S=R \cdot X^{H(R,ID)}$ in the BNN-ID-based authentication system.

In the verification apparatus 100E, the integer partitioning unit 110, using the CPU 911, inputs h (=H(R,ID)) and p, and calculates the integer $e_1$ and integer $e_2$ that satisfy $e_1 \cdot h = e_2$ (mod p). Using the CPU 911, the verification value calculation unit 130 calculates $X_1 = X^{e_1} \cdot R'^{e_2}$ (note that $R'=S \cdot R^{-1}$) by the double-base exponentiation on the multiplicative group G. By checking whether or not $X_1=1$, the verification apparatus 100E checks at high speed if $S=R \cdot X^{H(R,ID)}$ is established.

In several cryptographic communication system, signature system, and authentication system described above, the verification apparatus 100 speeds up the verification process. However, this technique is not limited to the examples described above, but can be applied to the cryptographic system in general such as the discrete logarithm type cryptographic communication system, authentication system, and signature system.

For the sake of descriptive convenience, cases have been described in which the group operation is described additively. However, whether the group operation is described additively or multiplicatively is not substantial.

In a finite group utilized by the cryptographic system, as far as the group operation can be performed using a processing device such as a computer and one group operation takes much time, the speed of the operation can be increased remarkably by this technique.

EXPLANATION OF SIGNS

Figure 1:
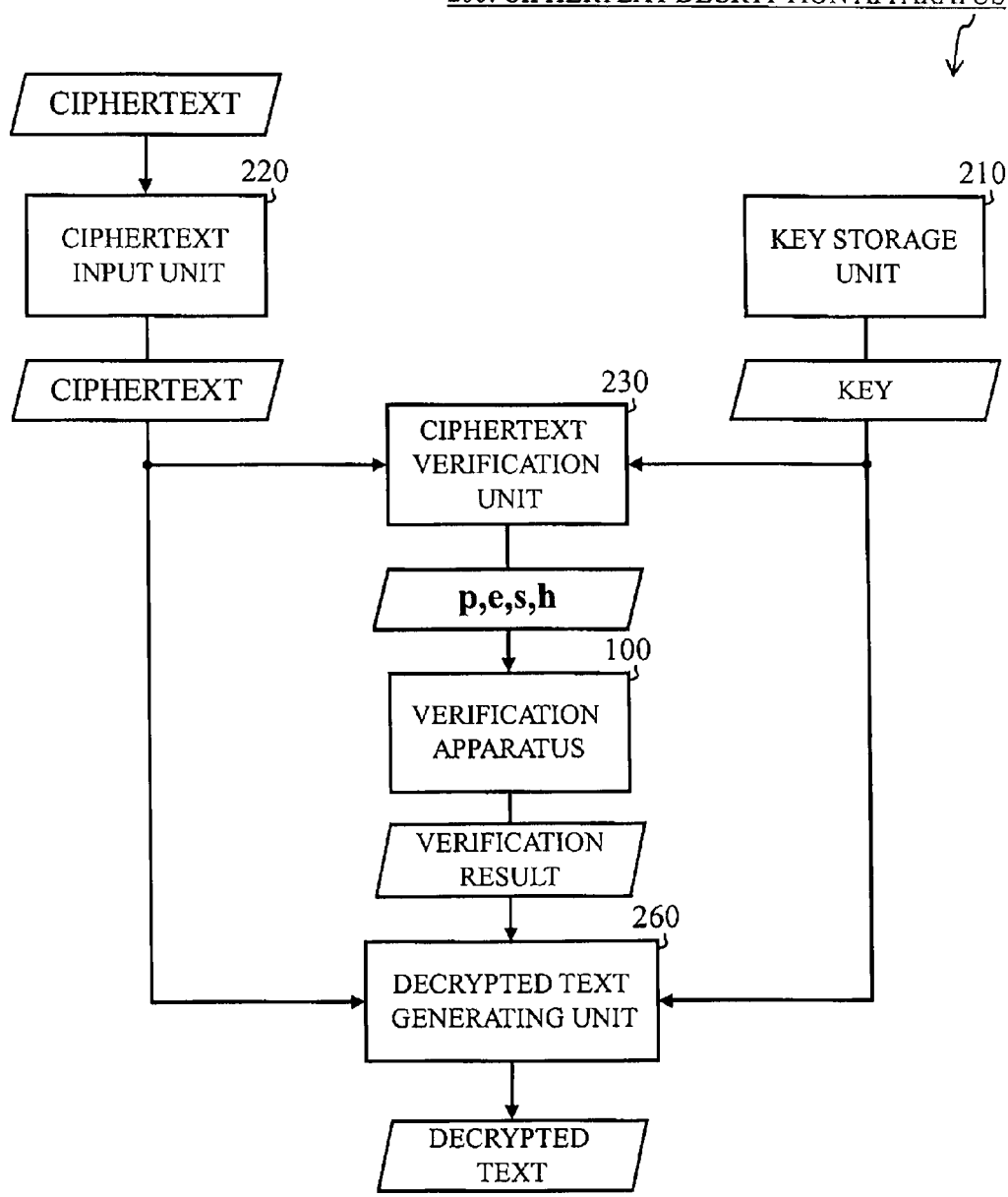
FIG. 1 is a block diagram showing a configuration example of the function block of the ciphertext decryption apparatus 200 according to the first embodiment.
Figure 2:
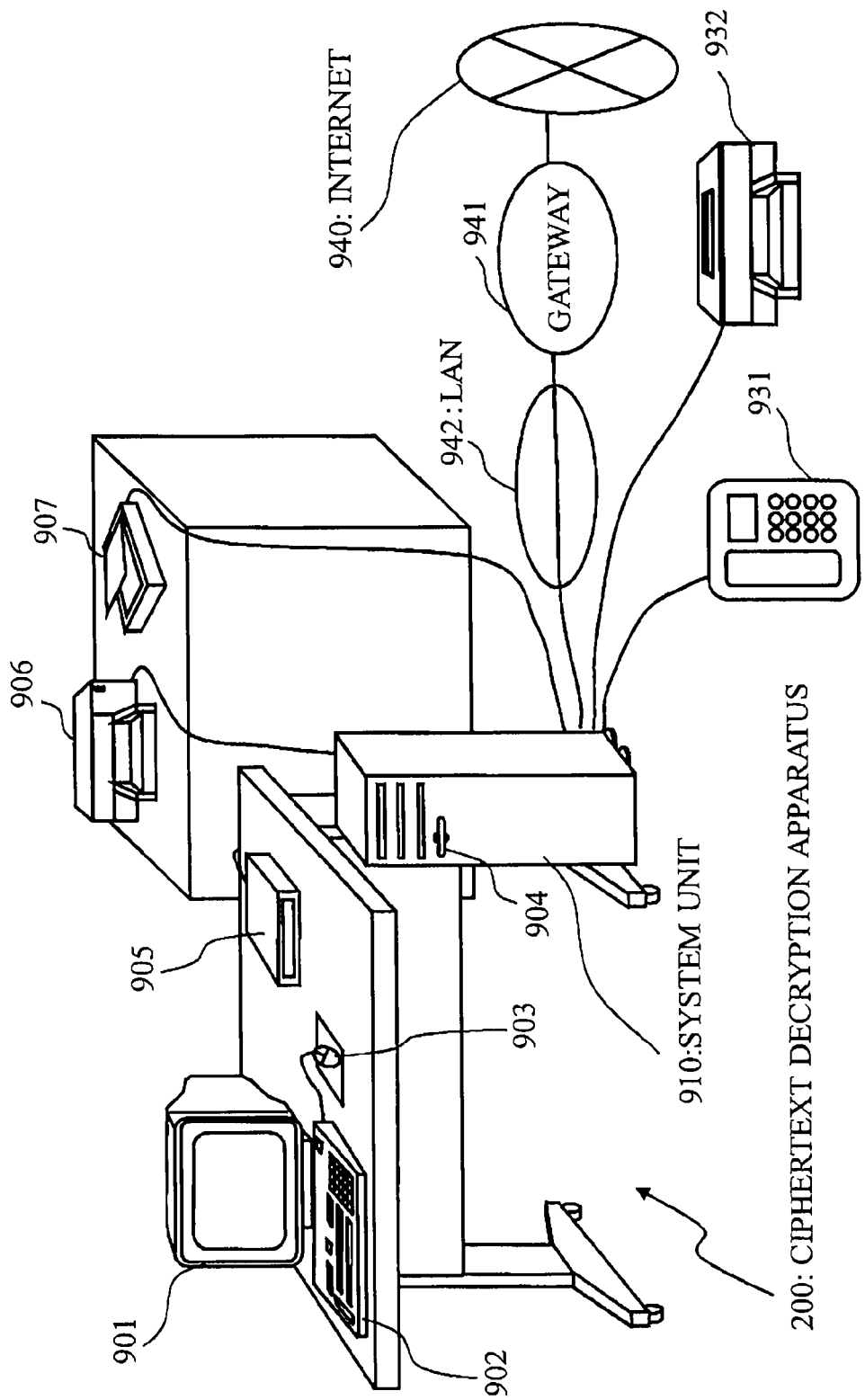
FIG. 2 shows an example of the appearance of the ciphertext decryption apparatus 200 according to the first embodiment.
Figure 3:
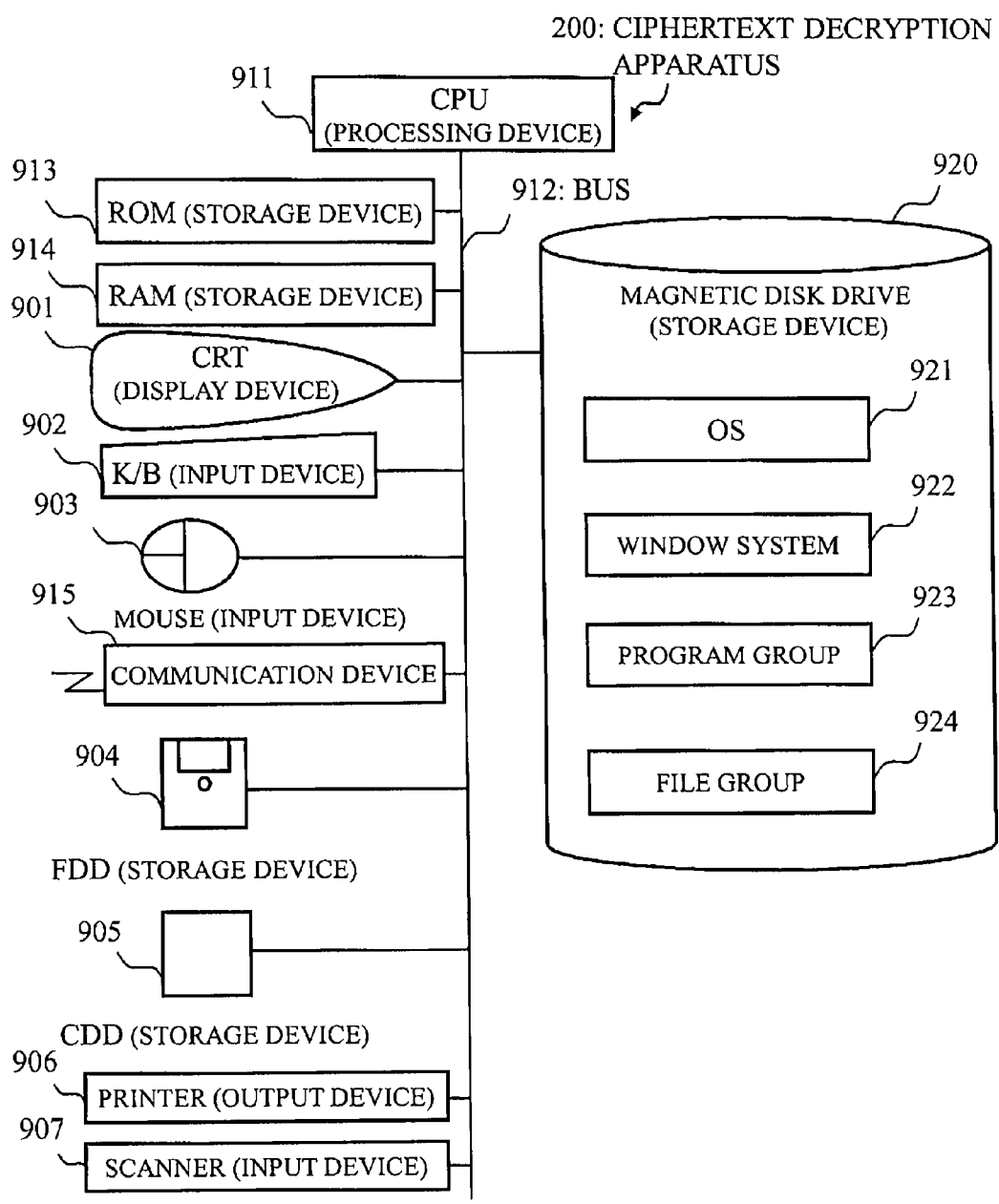
FIG. 3 shows an example of the hardware resources of the ciphertext decryption apparatus 200 according to the first embodiment.
Figure 4:
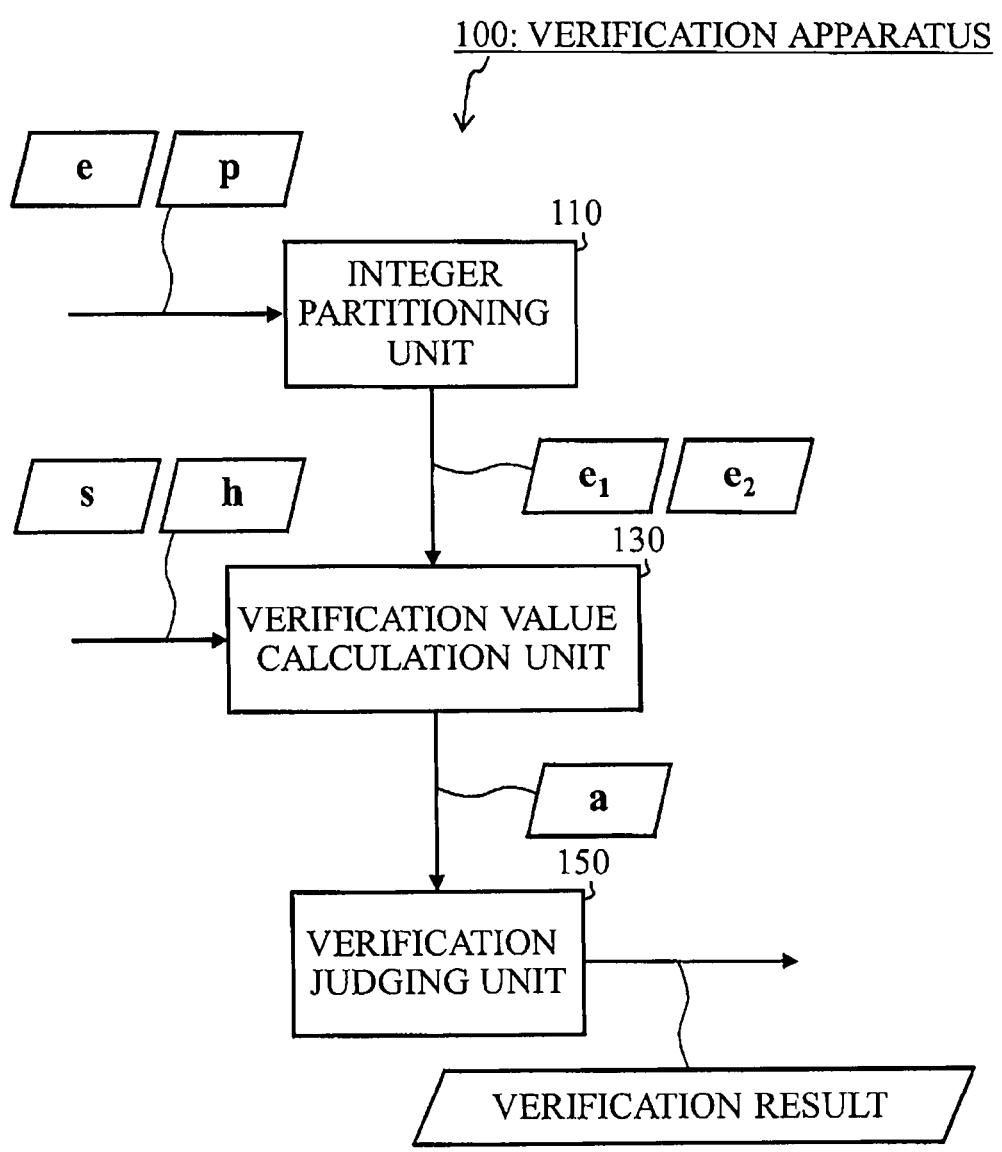
FIG. 4 is a block diagram showing a configuration example of the internal block of the verification apparatus 100 according to the first embodiment.
Figure 5:
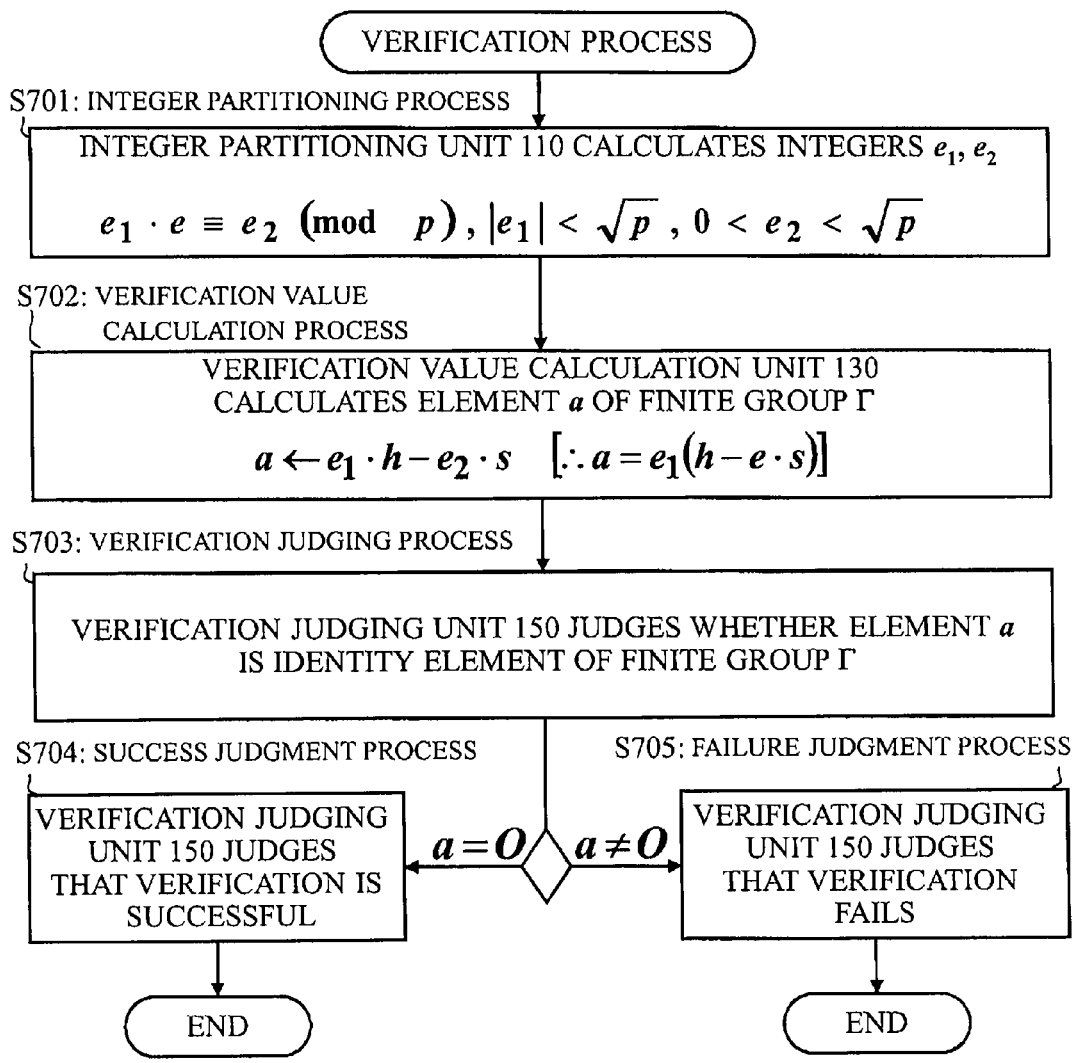
FIG. 5 is a flowchart showing an example of the flow of the verification process used by the verification apparatus 100 according to the first embodiment to judge whether or not $h=e\cdot s$.
Figure 6:
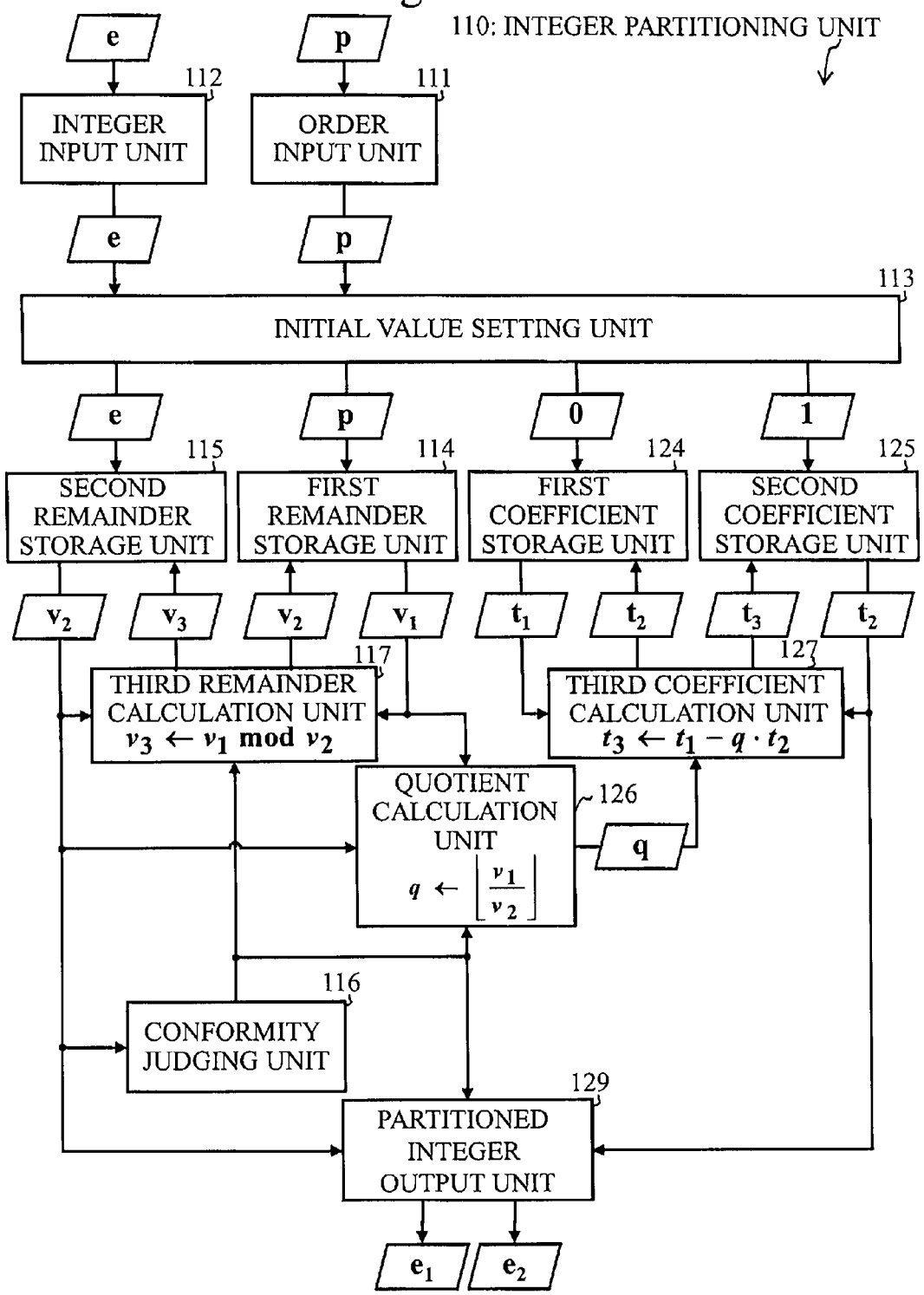
FIG. 6 is a detailed block diagram showing a configuration example of the internal block of the integer partitioning unit 110 according to the first embodiment.
Figure 7:
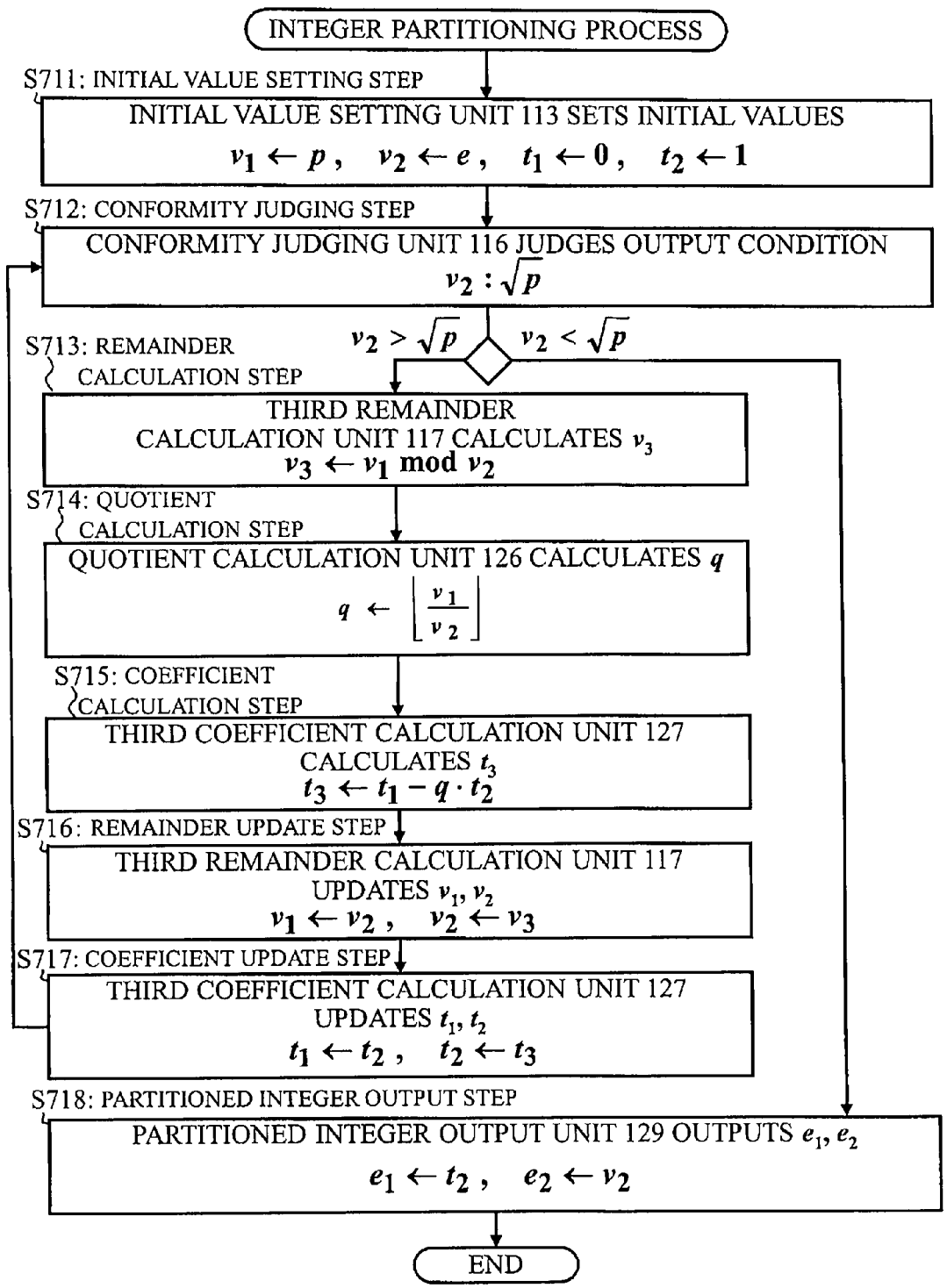
FIG. 7 is a flowchart showing an example of the flow of the integer partitioning process used by the integer partitioning unit 110 according to the first embodiment to partition the integer e.
Figure 8:
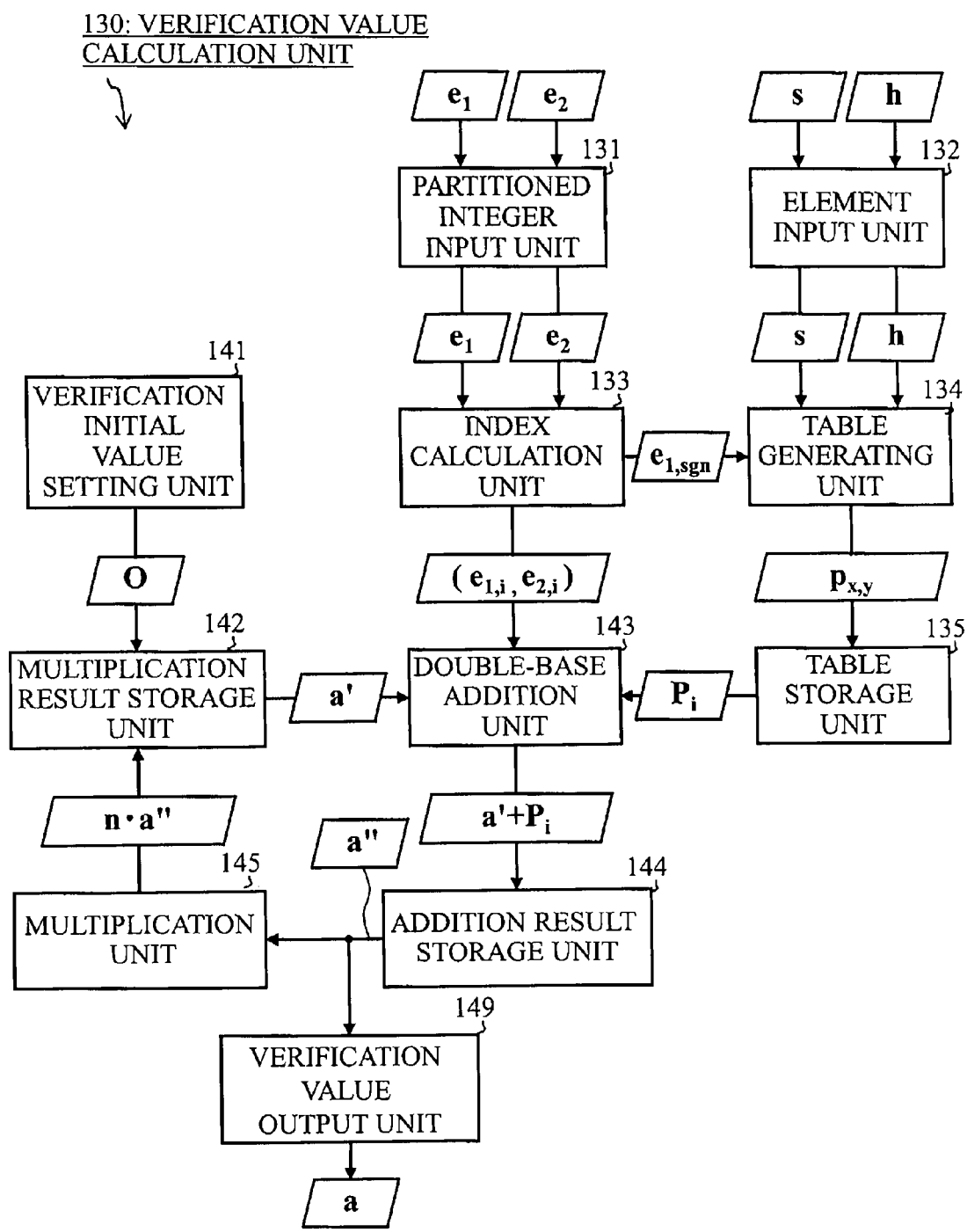
FIG. 8 is a detailed block diagram showing a configuration example of the internal block of the verification value calculation unit 130 according to the first embodiment.
Figure 9:
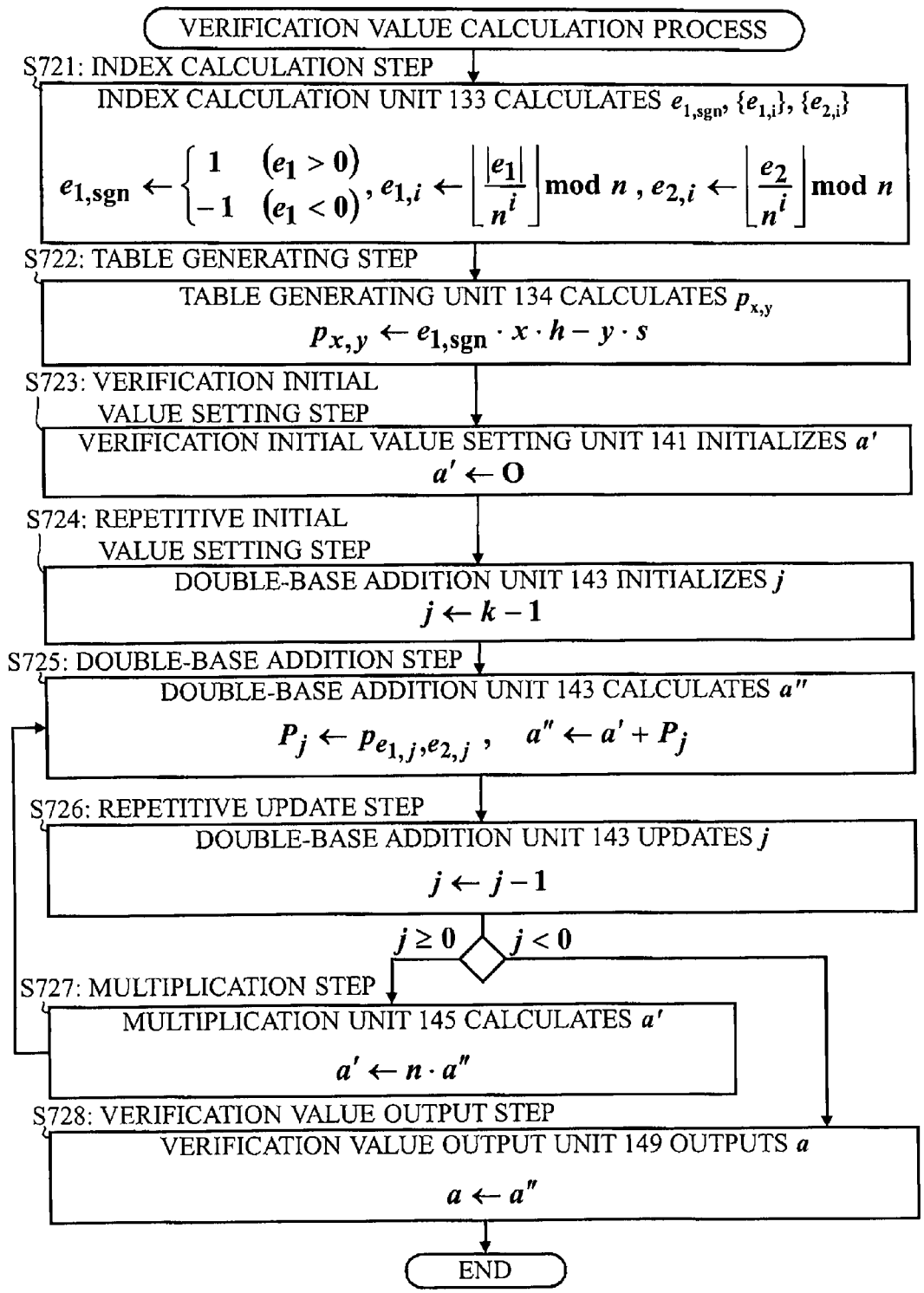
FIG. 9 is a flowchart showing an example of the flow of the verification value calculation process used by the verification value calculation unit 130 according to the first embodiment to calculate the element a of the finite group G.
Figure 10:
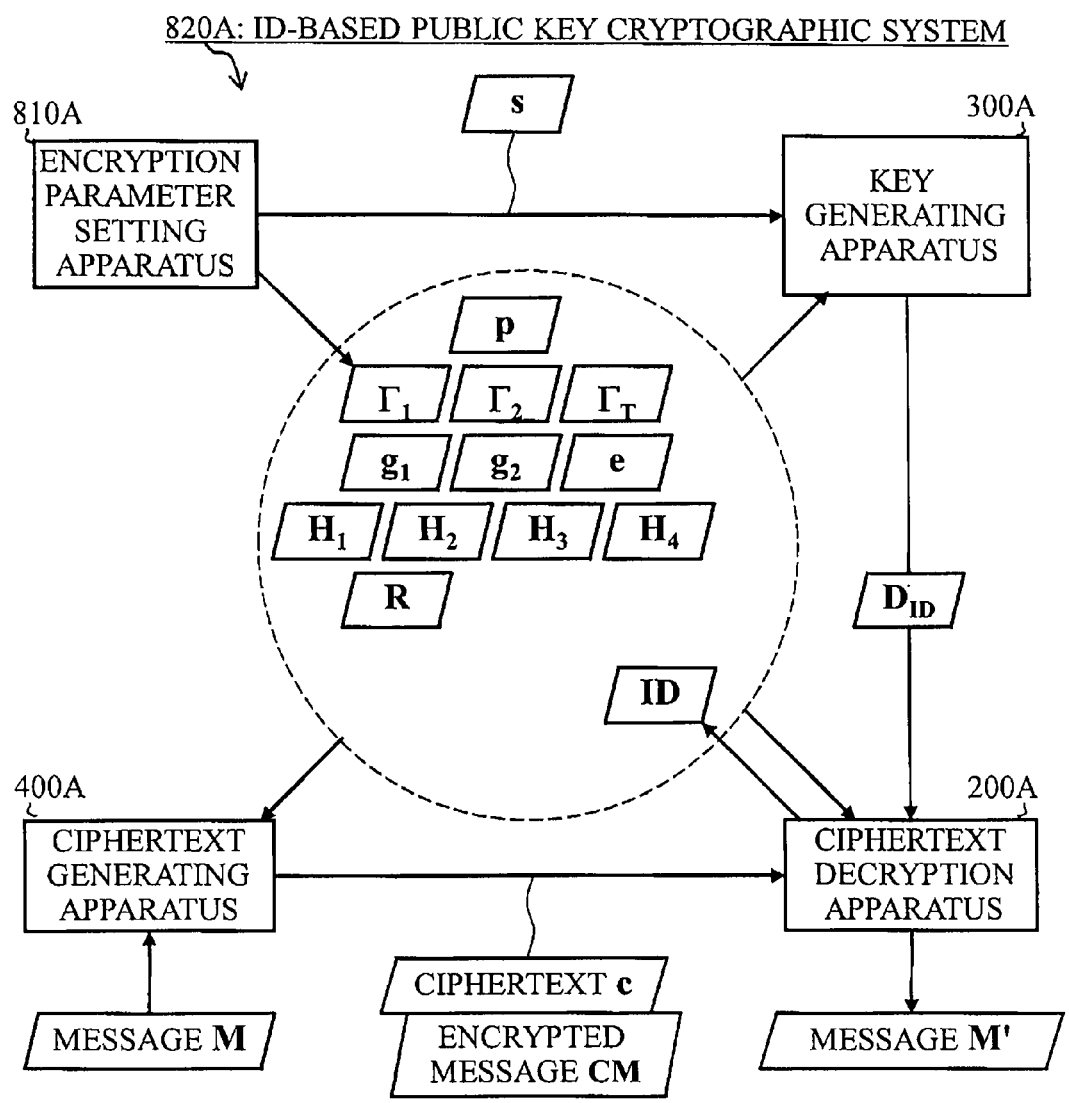
FIG. 10 shows an example of the entire system configuration of the ID-based public key cryptographic system 820A according to the second embodiment.
Figure 11:
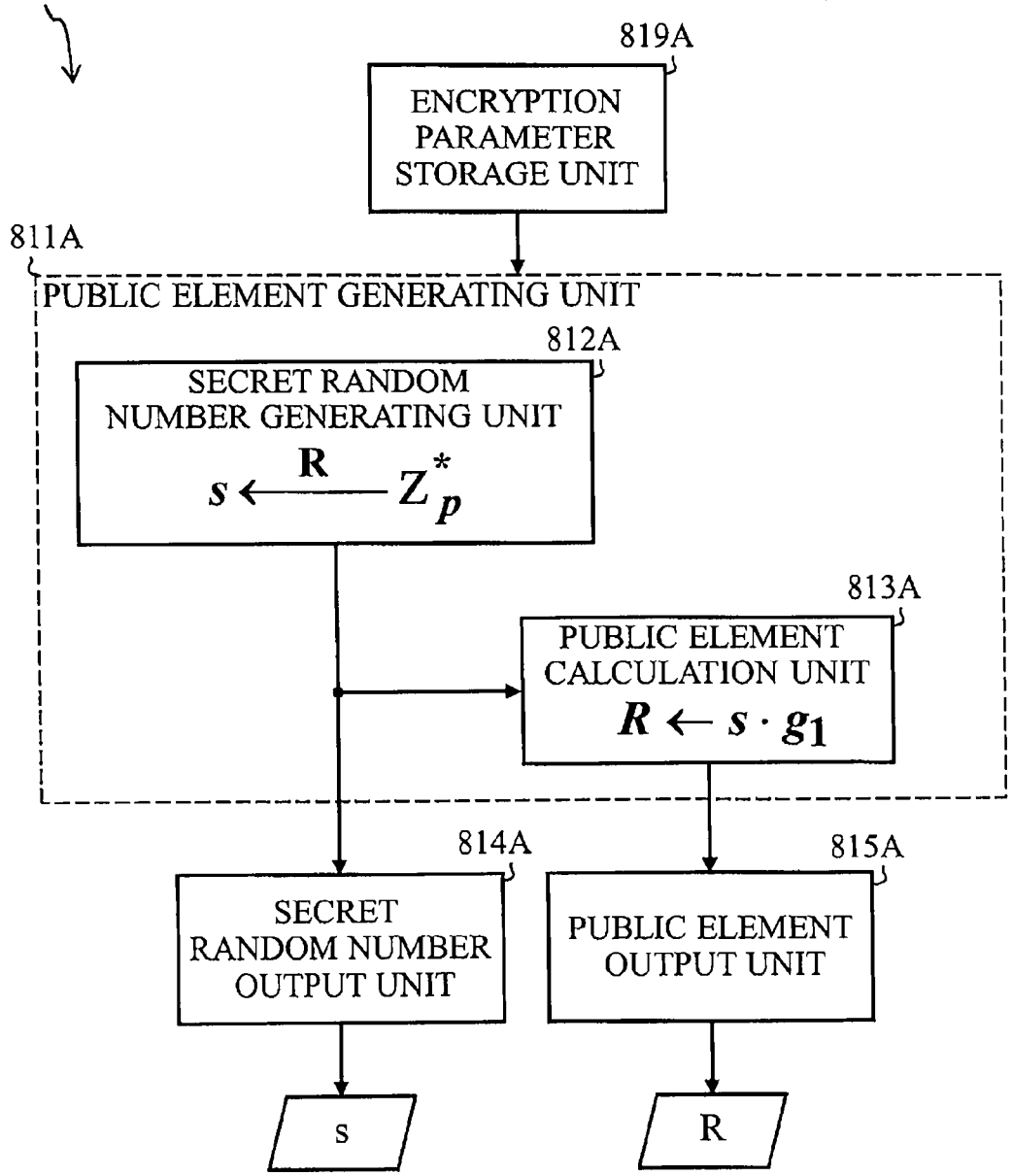
FIG. 11 is a block diagram showing a configuration example of the function block of part of the encryption parameter setting apparatus 810A according to the second embodiment.
Figure 12:
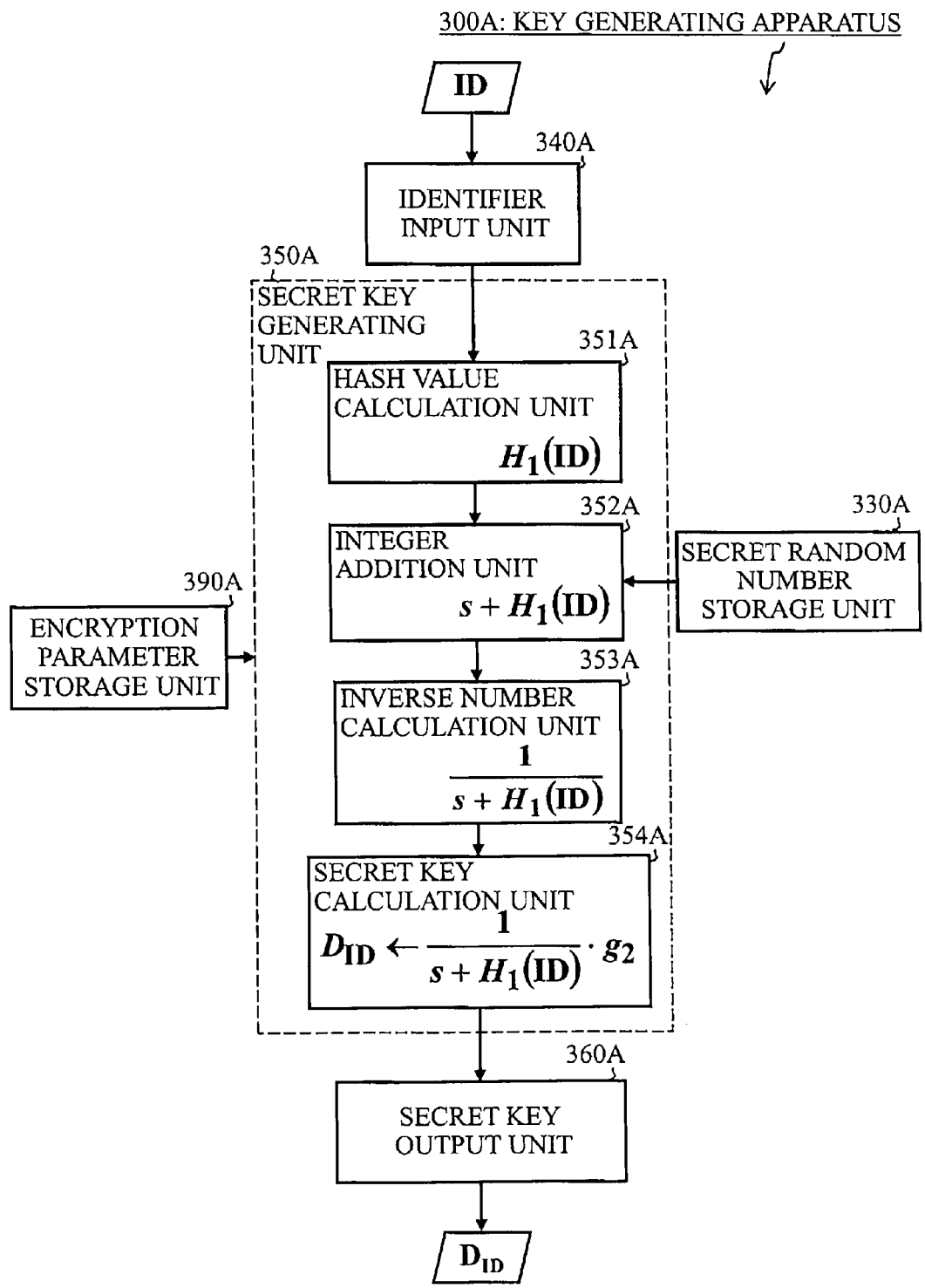
FIG. 12 is a block diagram showing a configuration example of the function block of the key generating apparatus 300A according to the second embodiment.
Figure 13:
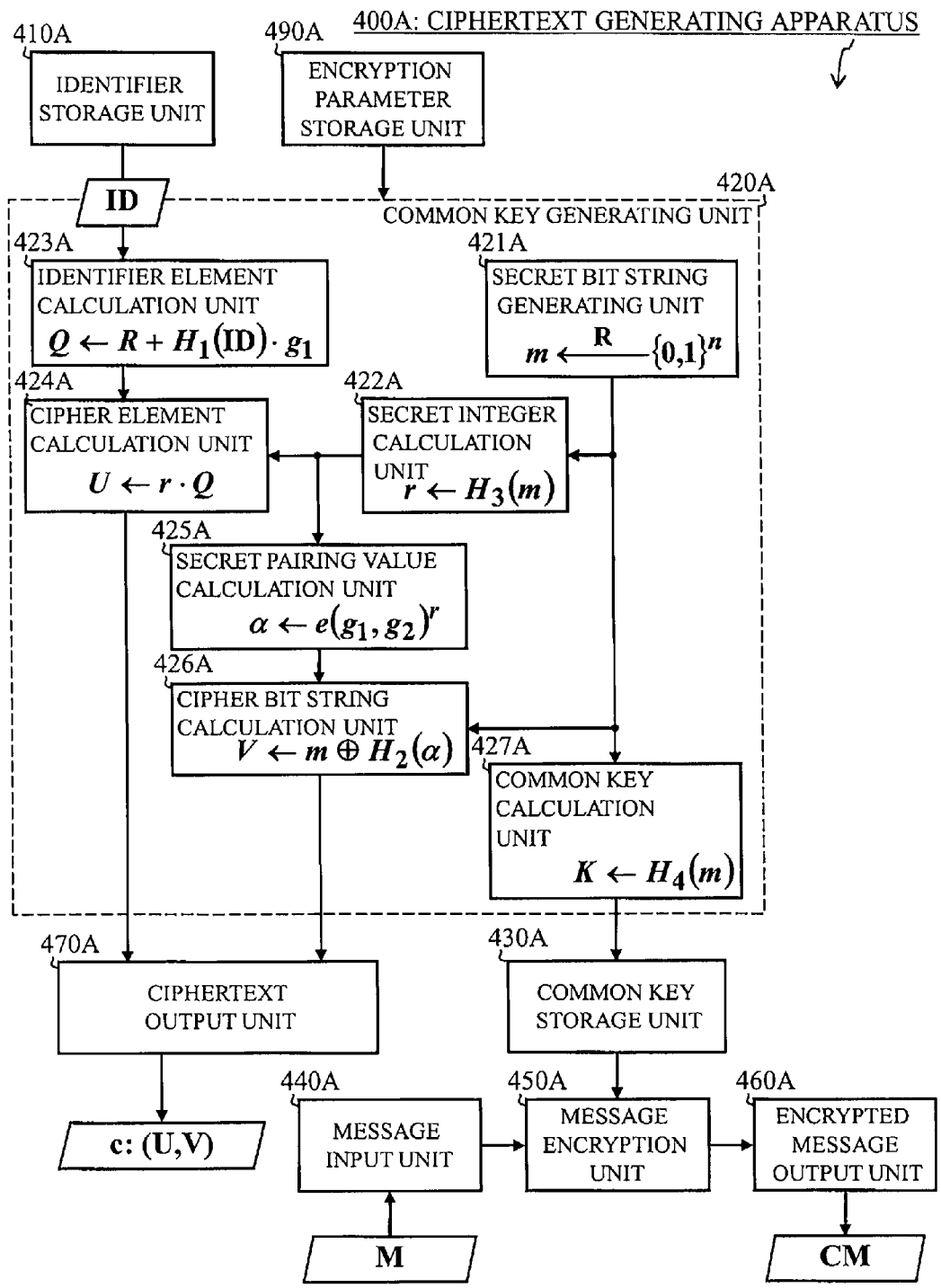
FIG. 13 is a block diagram showing a configuration example of the function block of a ciphertext generating apparatus 400A according to the second embodiment.
Figure 14:
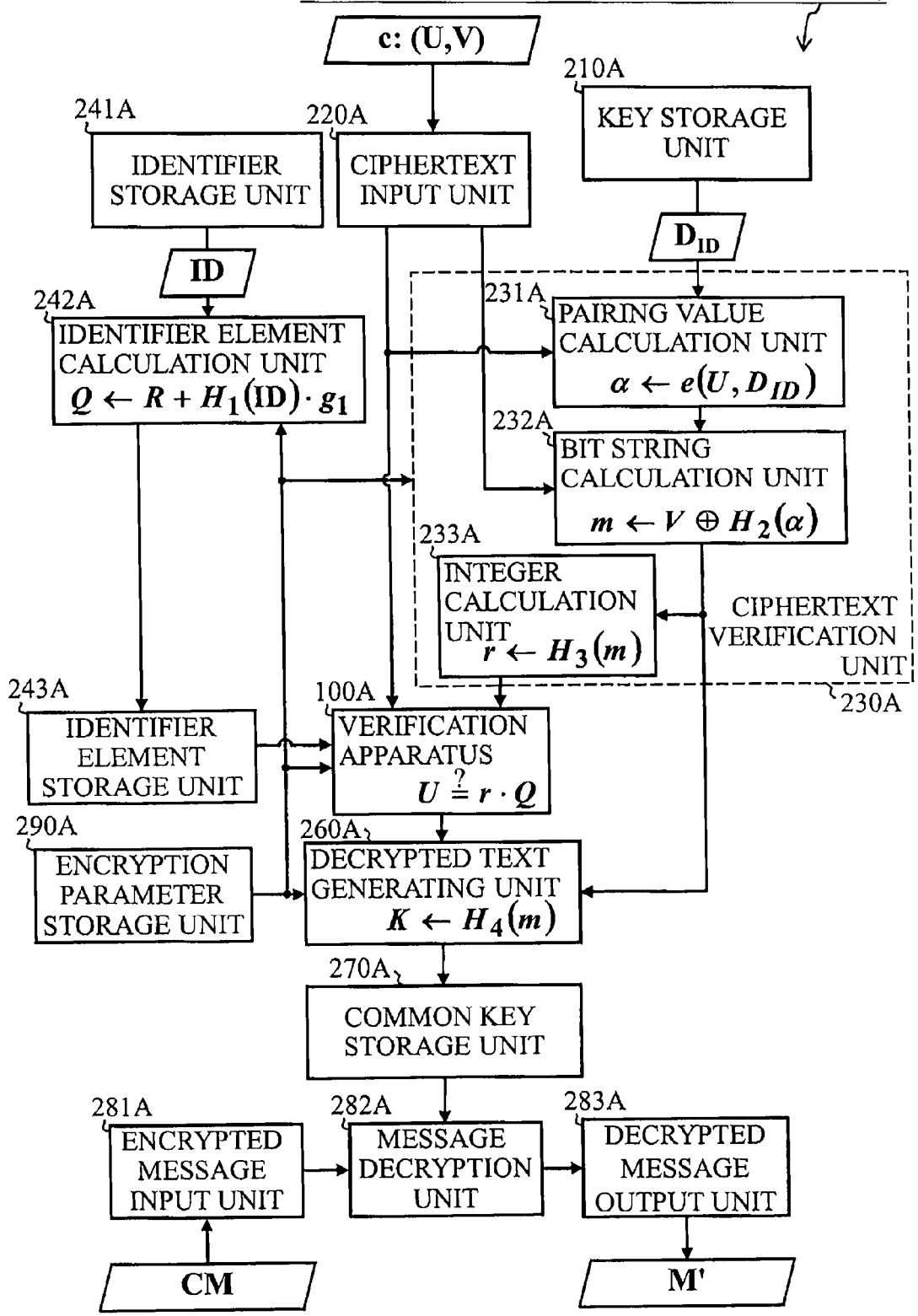
FIG. 14 is a block diagram showing a configuration example of the function block of the ciphertext decryption apparatus 200A according to the second embodiment.
Figure 15:
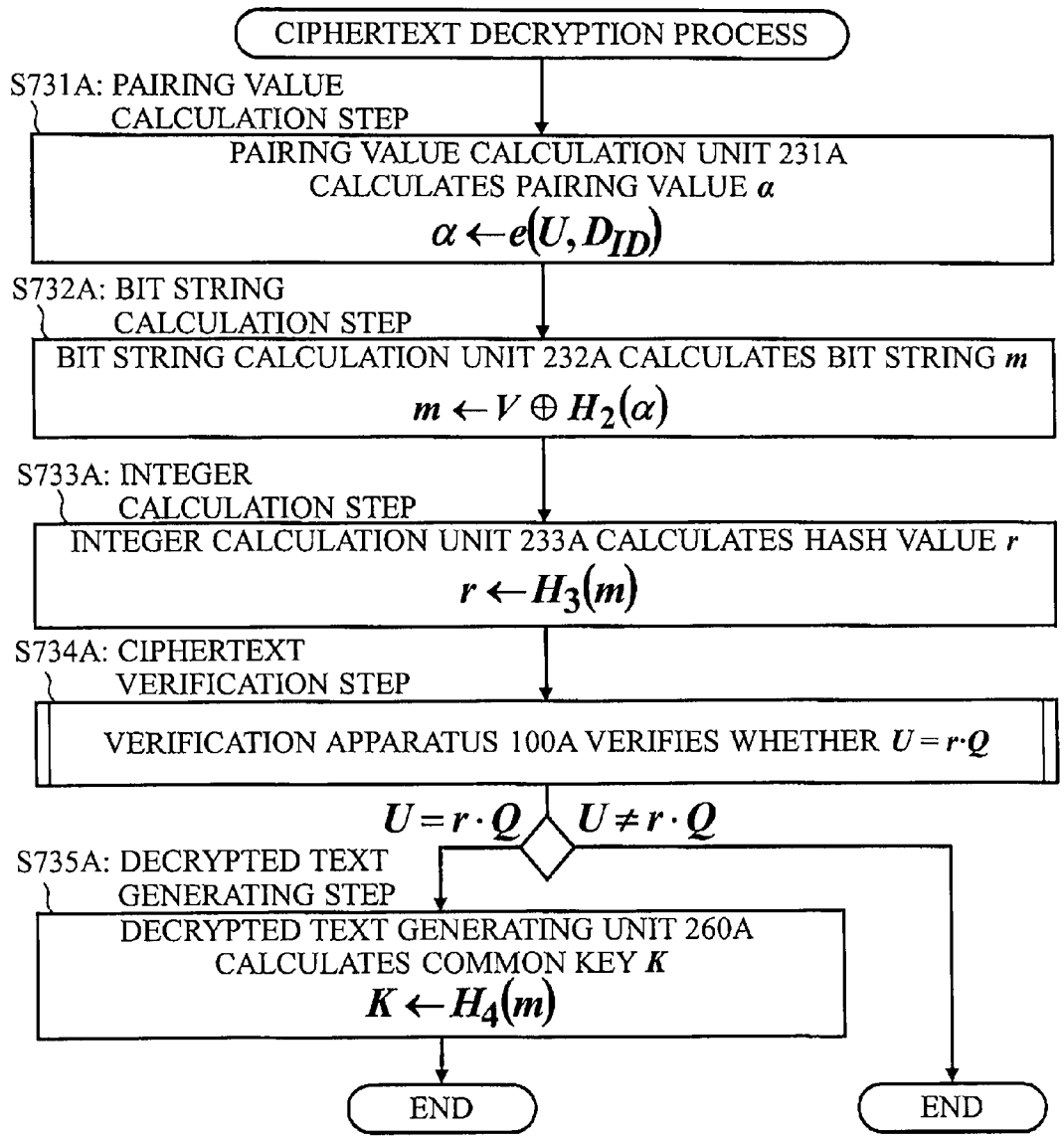
FIG. 15 is a flowchart showing an example of the flow of the ciphertext decryption process used by the ciphertext decryption apparatus 200A according to the second embodiment to decrypt the ciphertext c.
Figure 16:
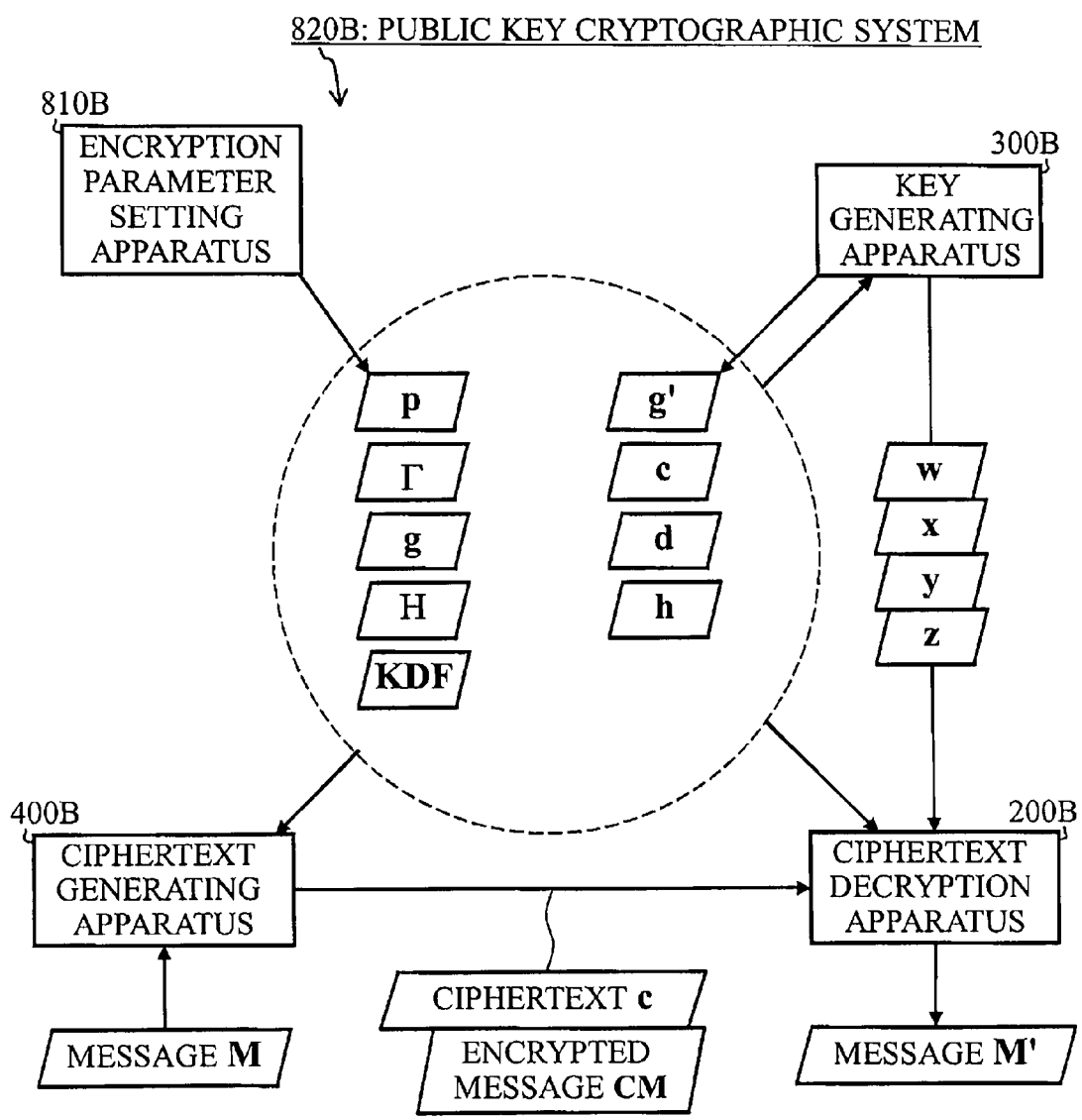
FIG. 16 shows an example of the entire system configuration of the public key cryptographic system 820B according to the third embodiment.
Figure 17:
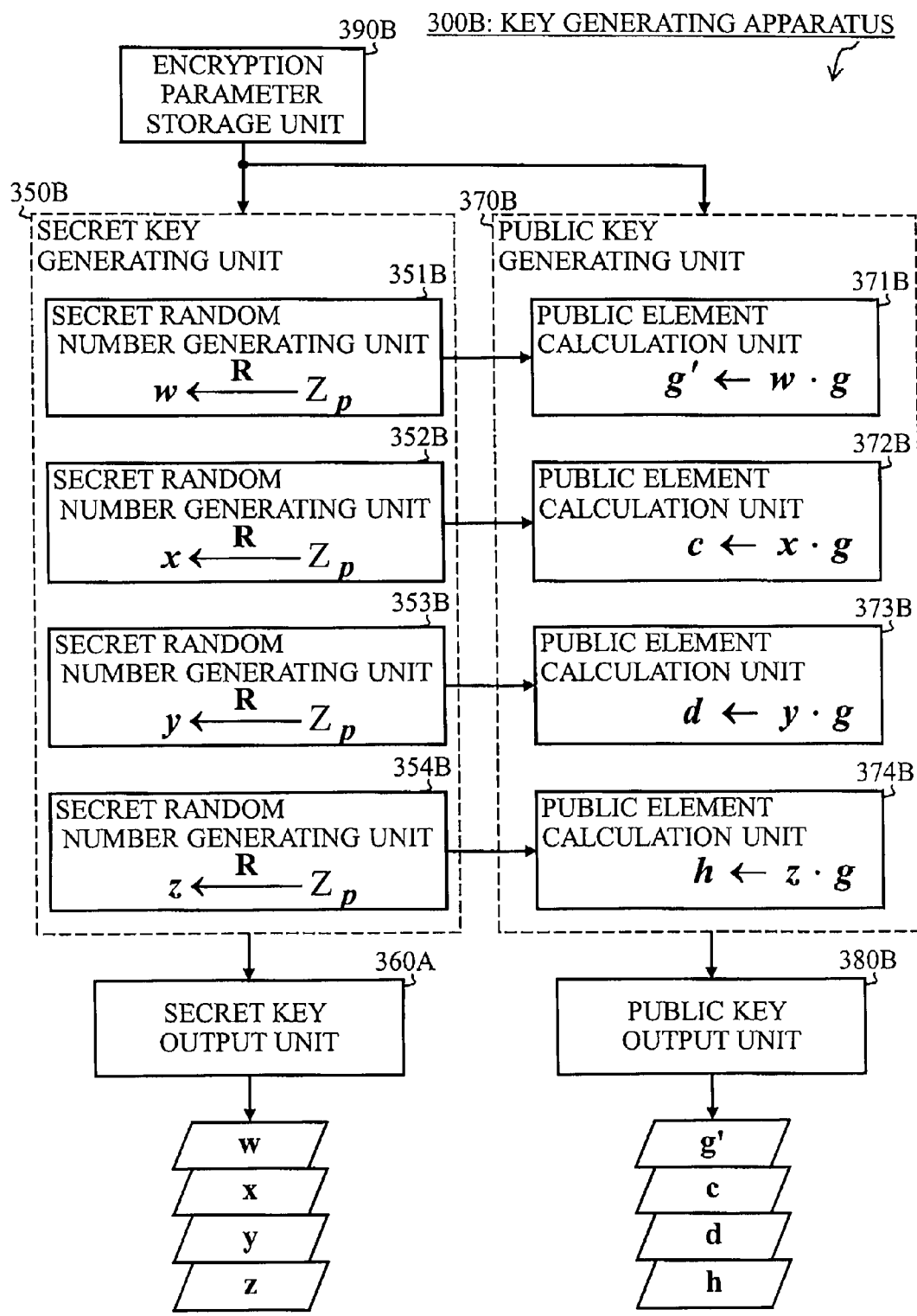
FIG. 17 is a block diagram showing a configuration example of the function block of the key generating apparatus 300B according to the third embodiment.
Figure 18:
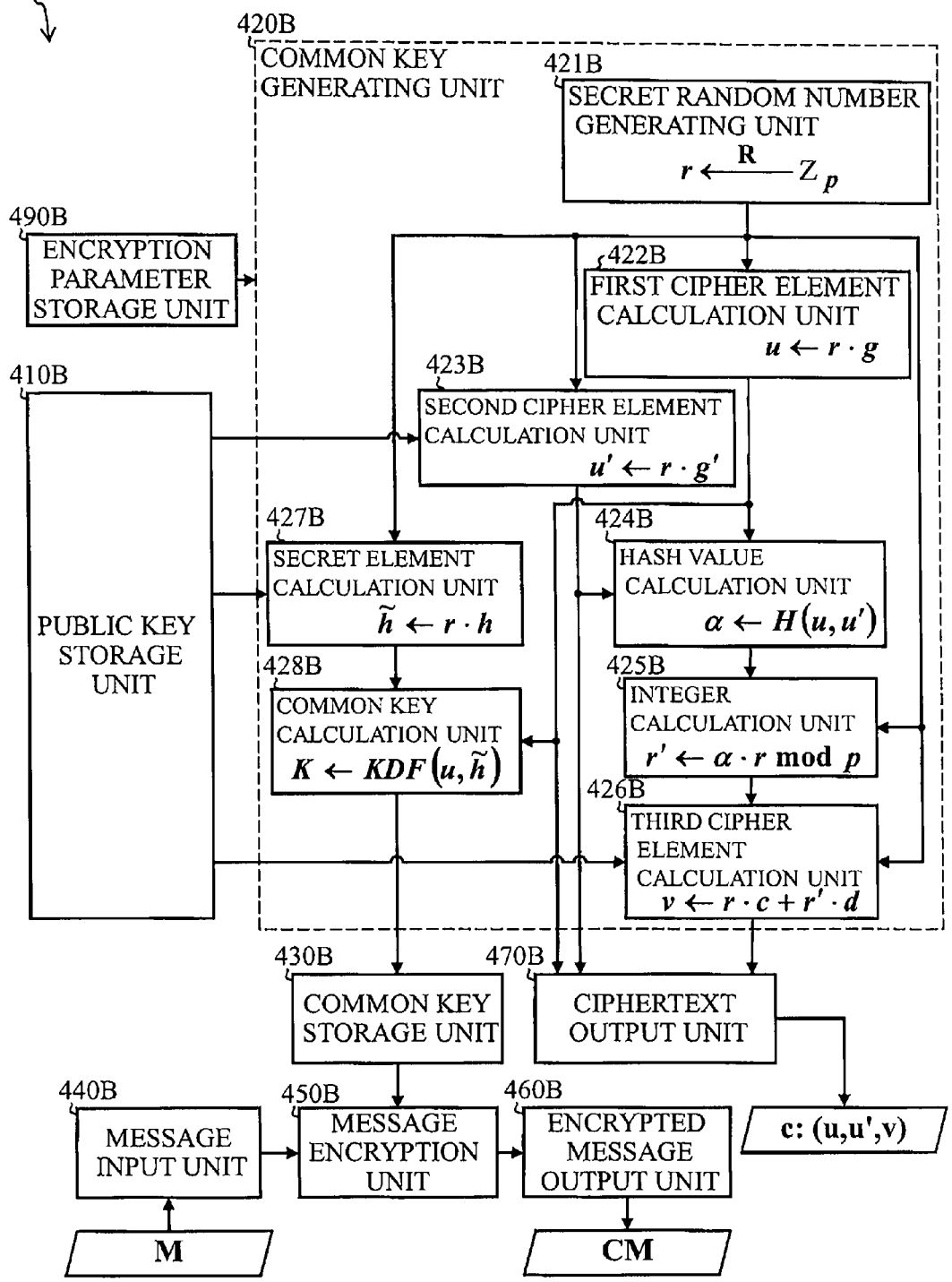
FIG. 18 is a block diagram showing a configuration example of the function block of the ciphertext generating apparatus 400B according to the third embodiment.
Figure 19:
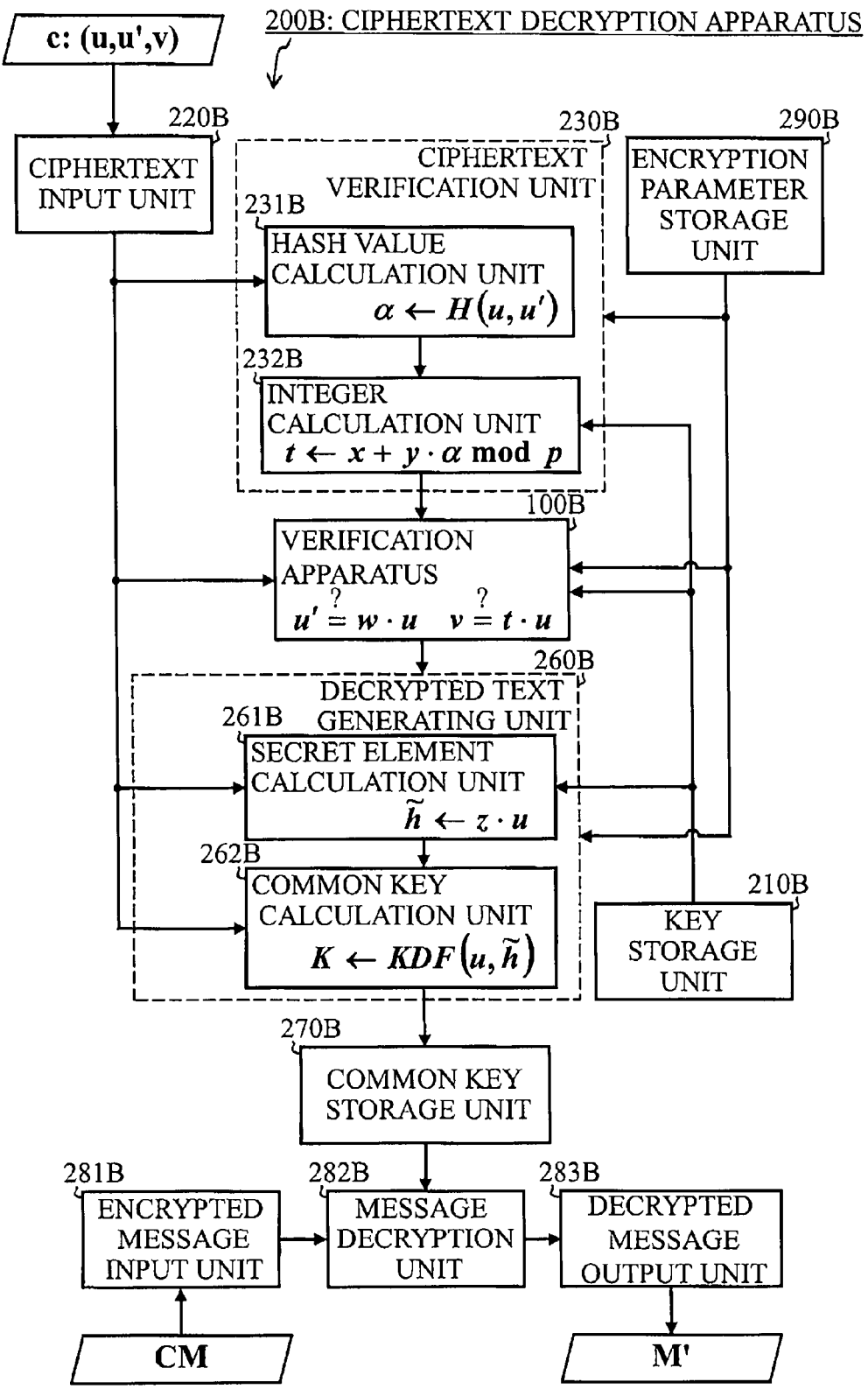
FIG. 19 is a block diagram showing a configuration example of the function block of the ciphertext decryption apparatus 200B according to the third embodiment.
Figure 20:
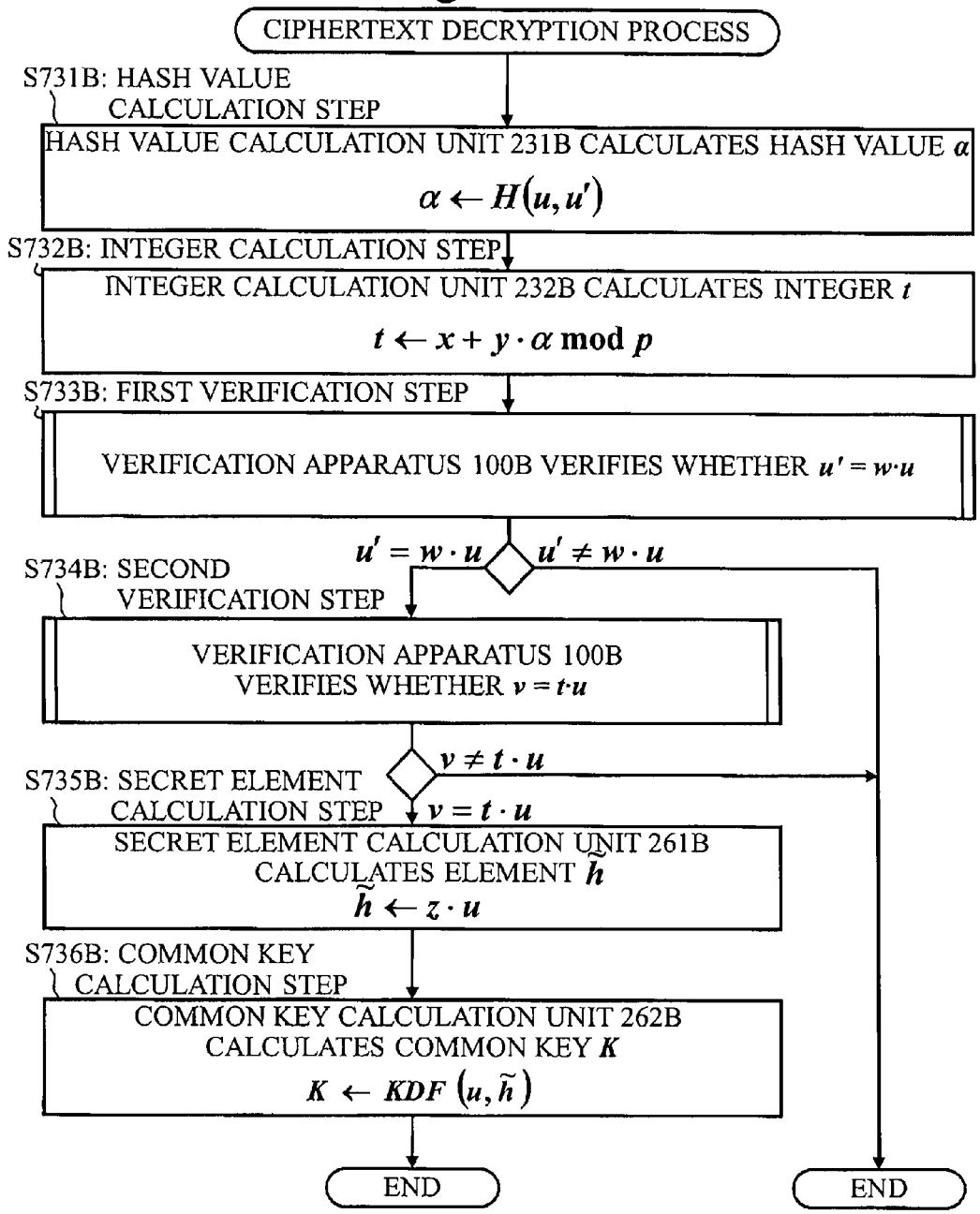
FIG. 20 is a flowchart showing an example of the flow of the ciphertext decryption process used by the ciphertext decryption apparatus 200A according to this embodiment to decrypt the ciphertext c.
Figure 21:
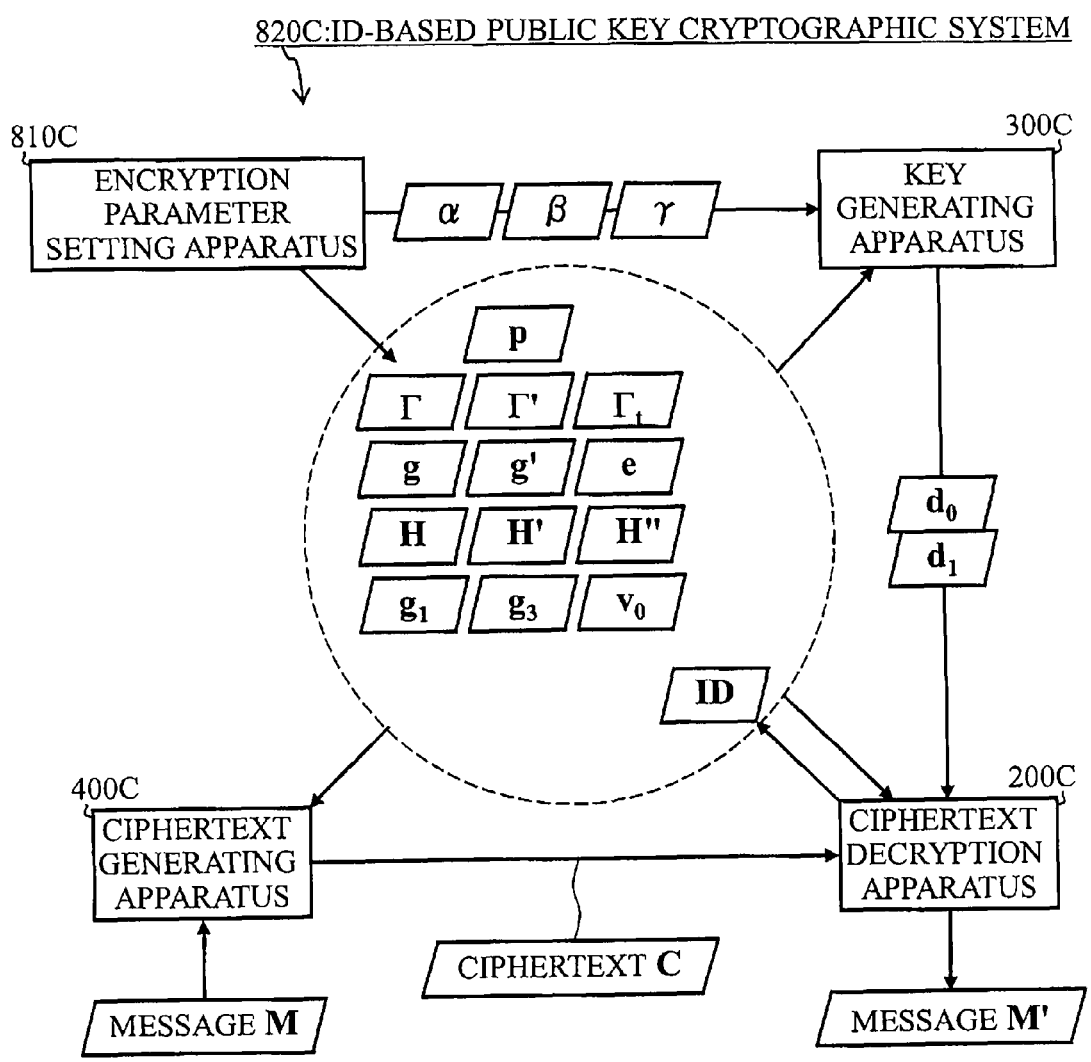
FIG. 21 shows an example of the entire system configuration of the ID-based public key cryptographic system 820C according to the fourth embodiment.
Figure 22:
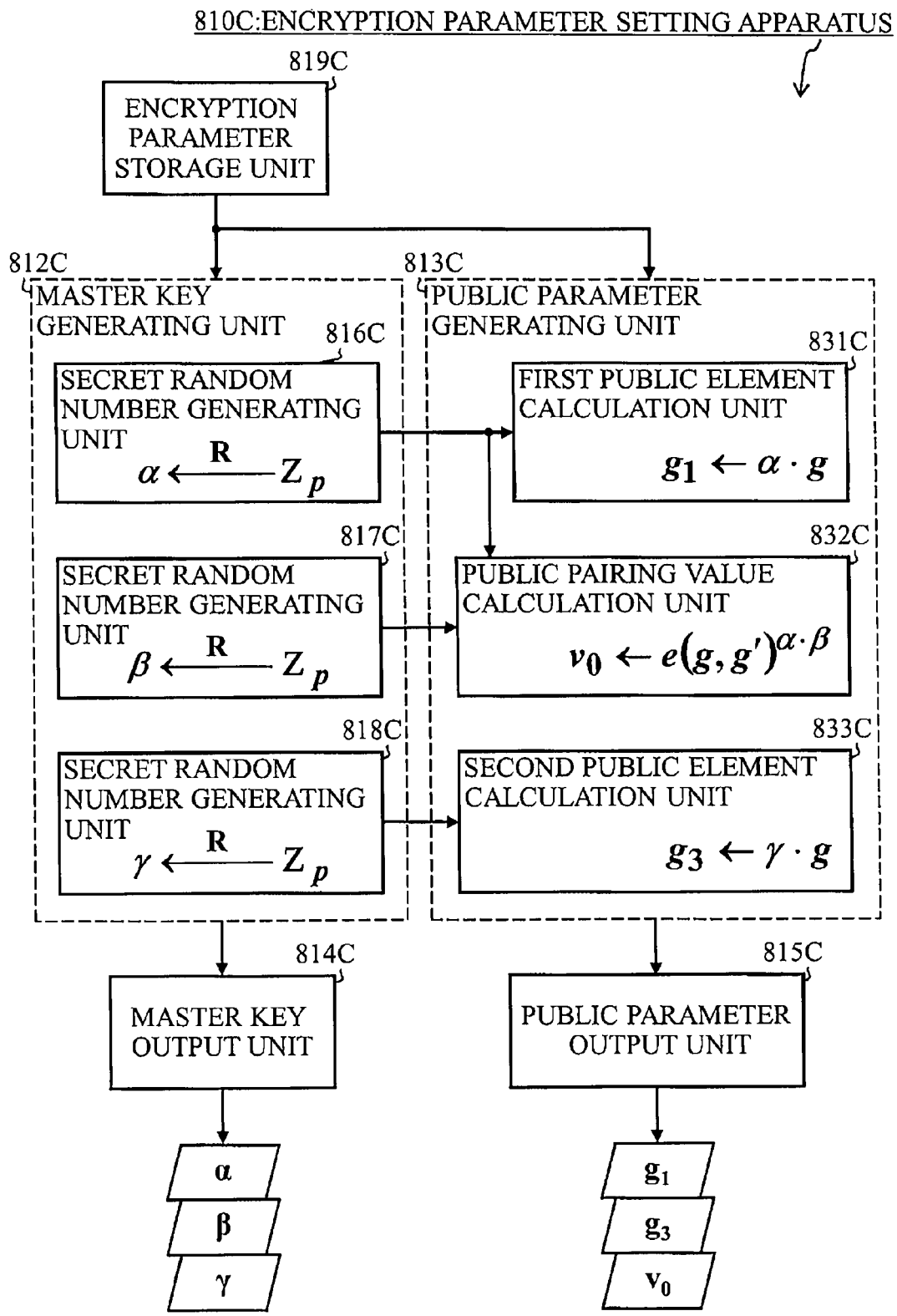
FIG. 22 is a block diagram showing a configuration example of the function block of part of the encryption parameter setting apparatus 810C according to the fourth embodiment.
Figure 23:
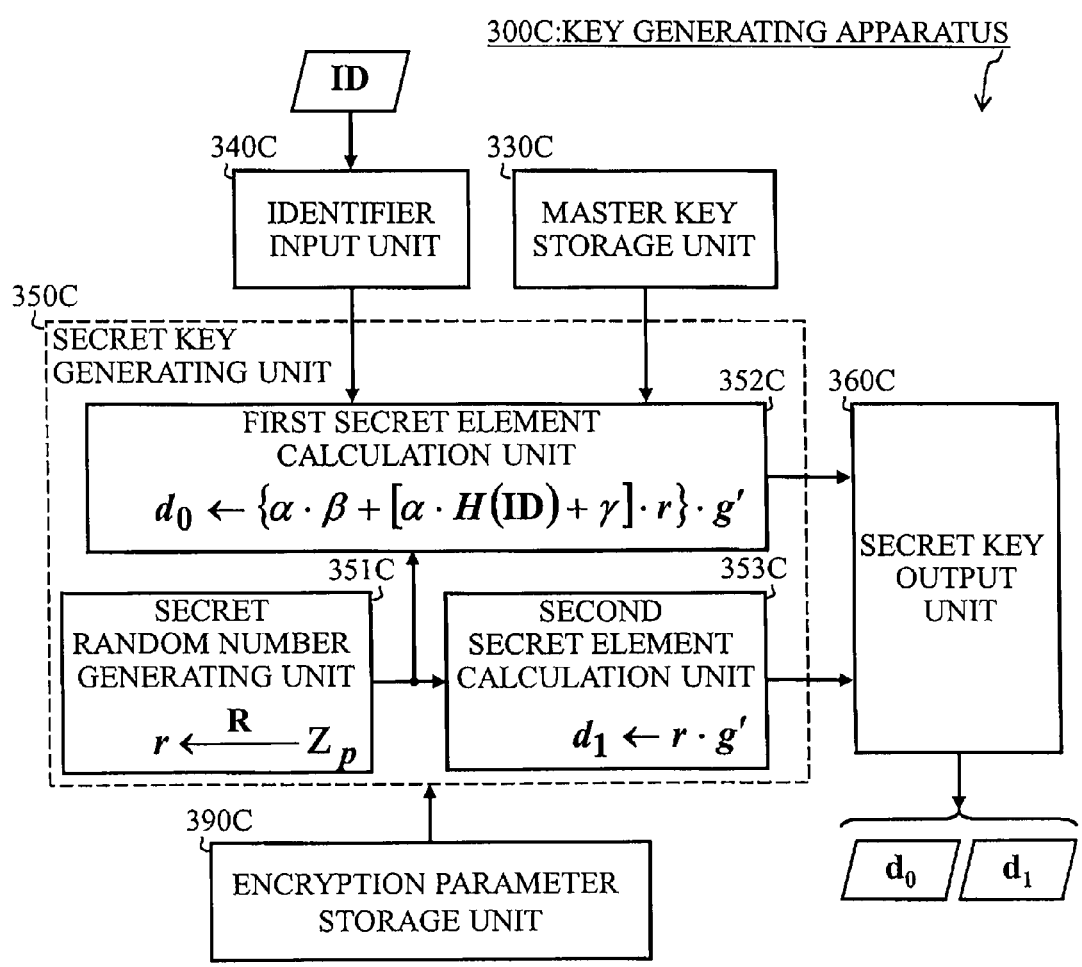
FIG. 23 is a block diagram showing a configuration example of the function block of the key generating apparatus 300C according to the fourth embodiment.
Figure 24:
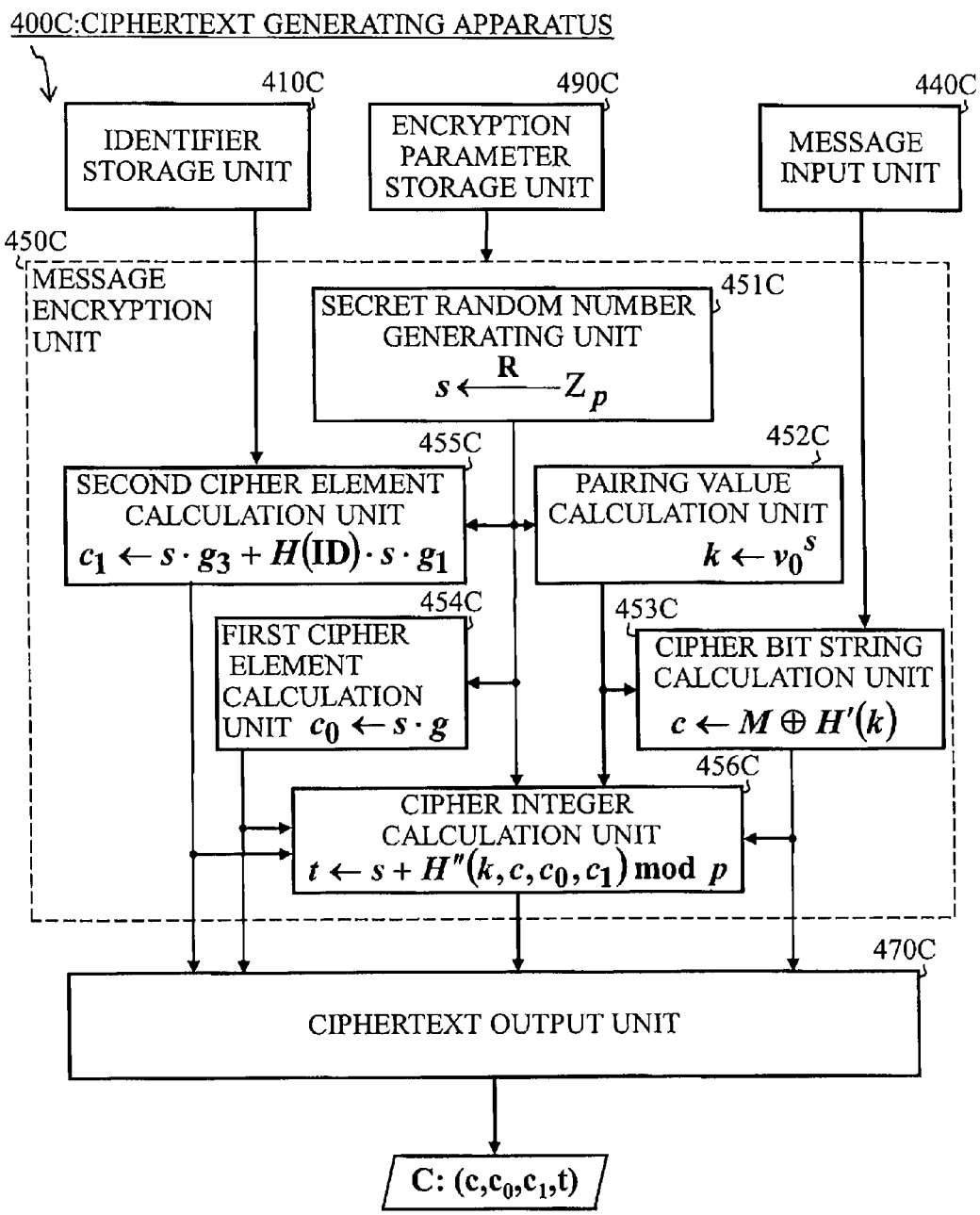
FIG. 24 is a block diagram showing a configuration example of the function block of the ciphertext generating apparatus 400C according to the fourth embodiment.
Figure 25:
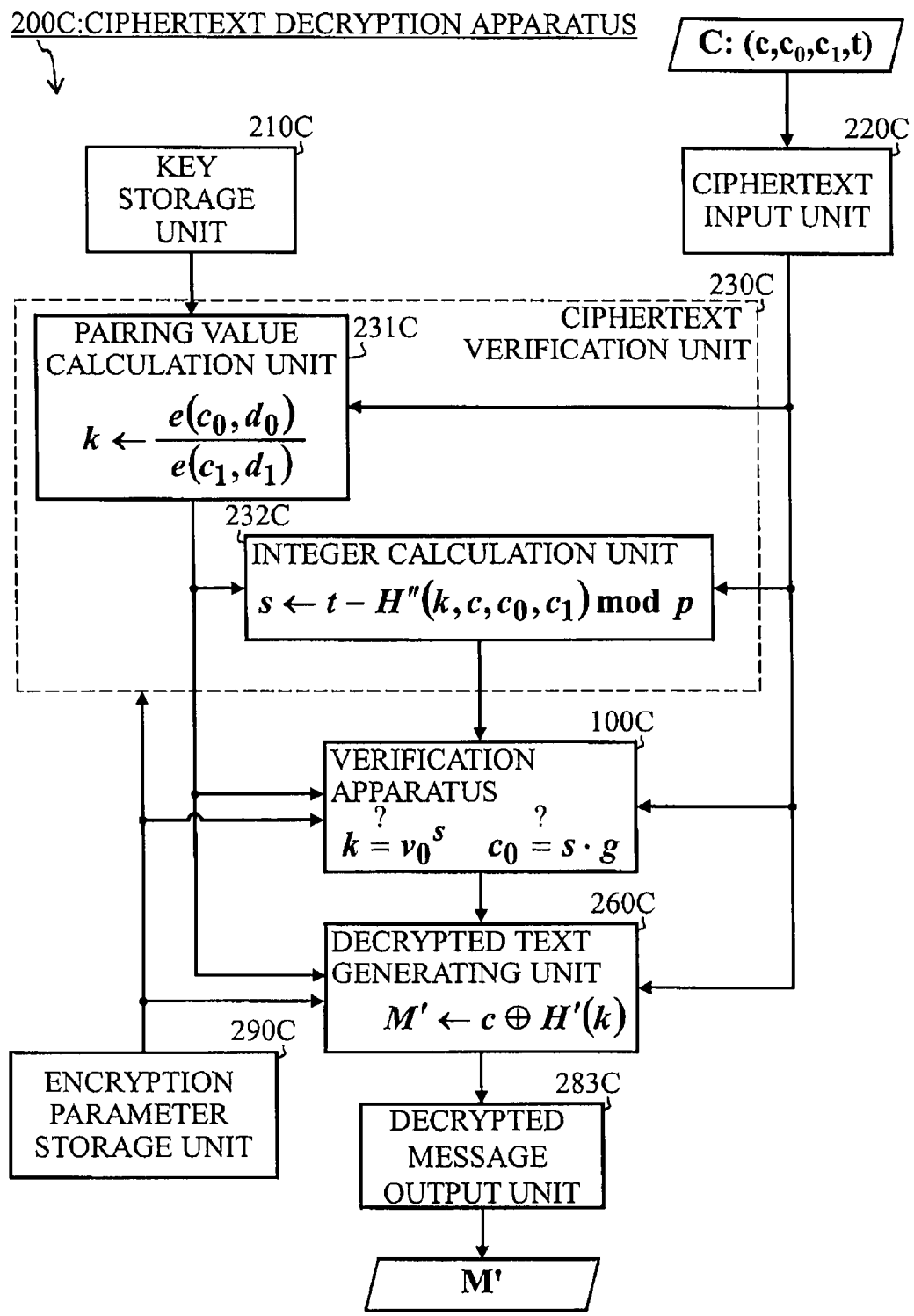
FIG. 25 is a block diagram showing a configuration example of the function block of the ciphertext decryption apparatus 200C according to the fourth embodiment.
Figure 26:
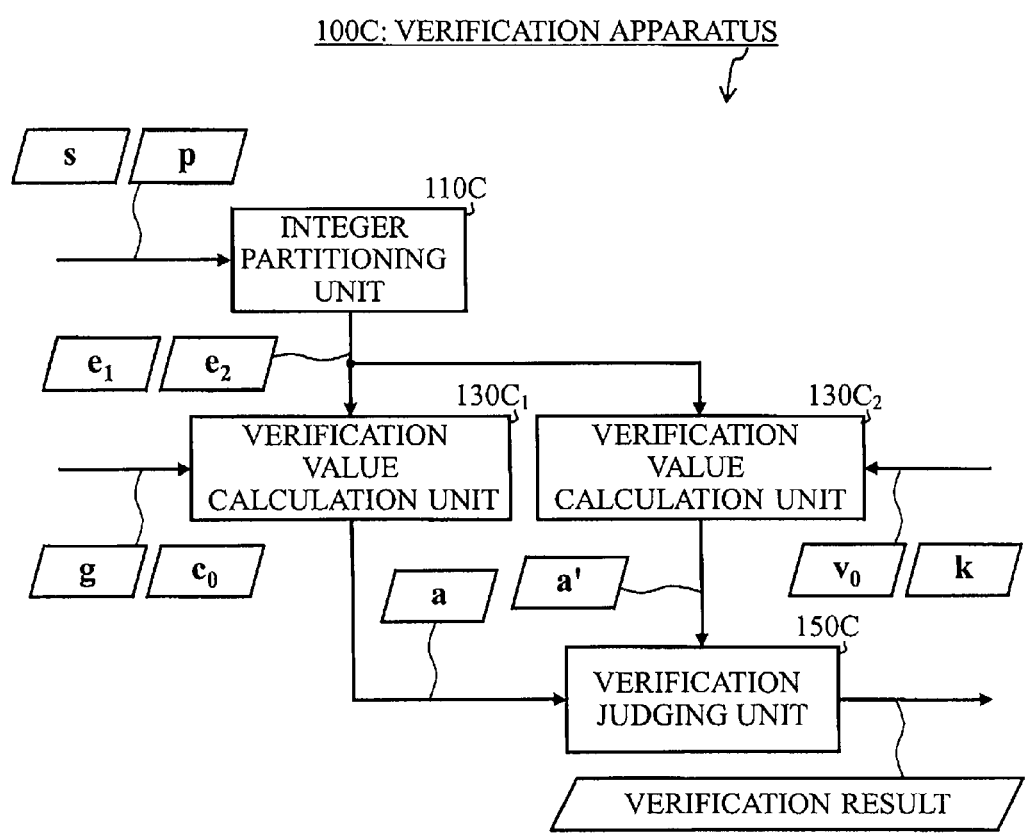
FIG. 26 is a detailed block diagram showing a configuration example of the internal block of the verification apparatus 100C according to the fourth embodiment.
Figure 27:
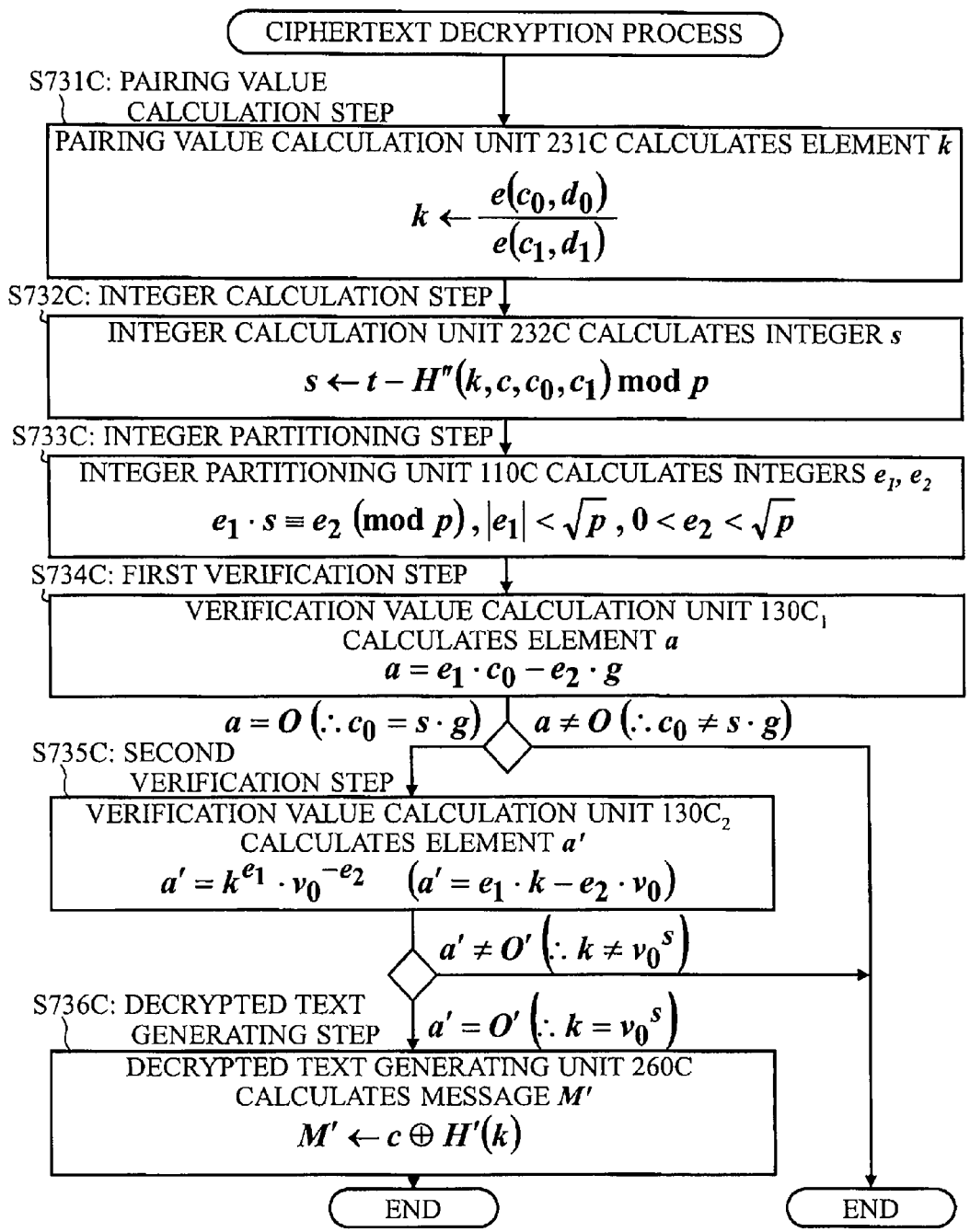
FIG. 27 is a flowchart showing an example of the flow of the ciphertext decryption process used by the ciphertext decryption apparatus 200C according to the fourth embodiment to decrypt the ciphertext C.
Figure 28:
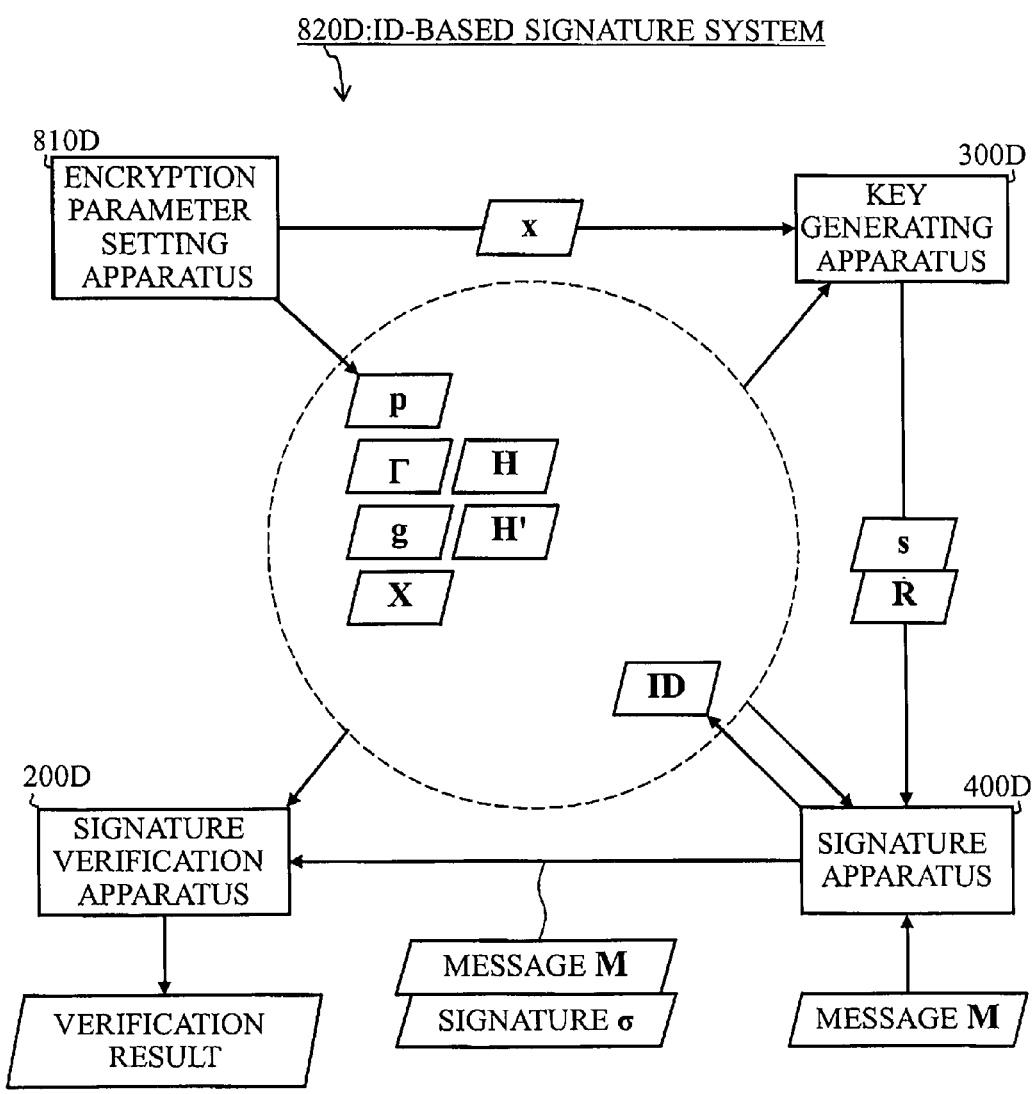
FIG. 28 shows an example of the entire system configuration of the ID-based signature system 820D according to the fifth embodiment.
Figure 29:
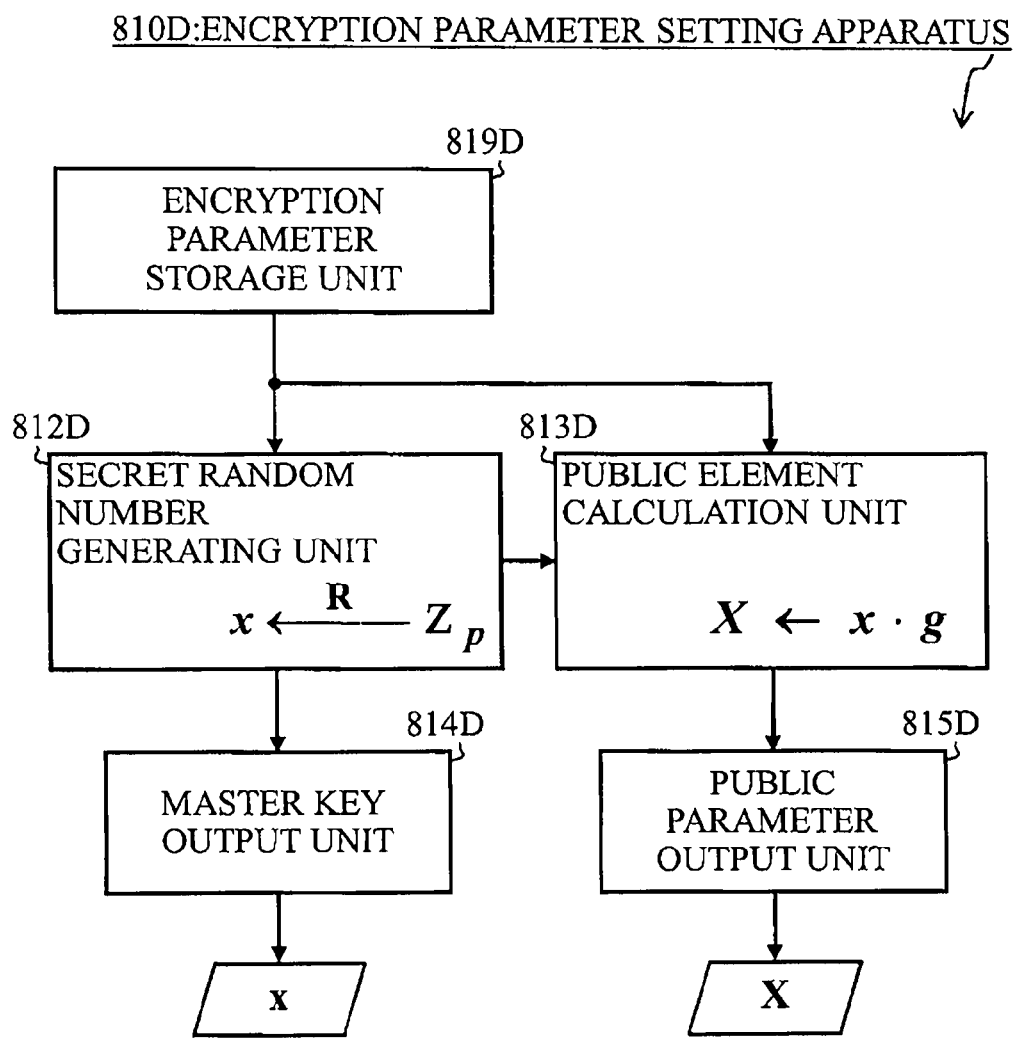
FIG. 29 is a block diagram showing a configuration example of the function block of part of the encryption parameter setting apparatus 810D according to the fifth embodiment.
Figure 30:
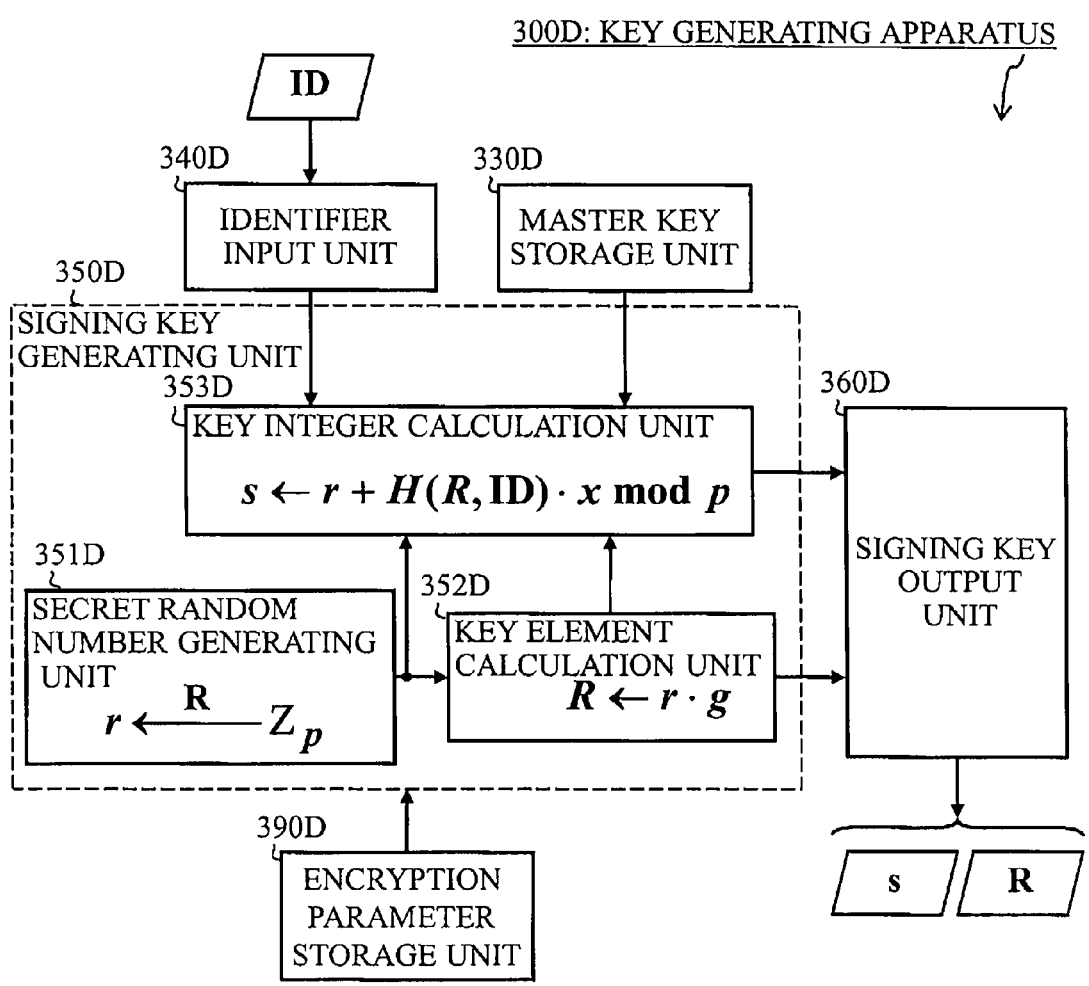
FIG. 30 is a block diagram showing a configuration example of the function block of the key generating apparatus 300D according to the fifth embodiment.
Figure 31:
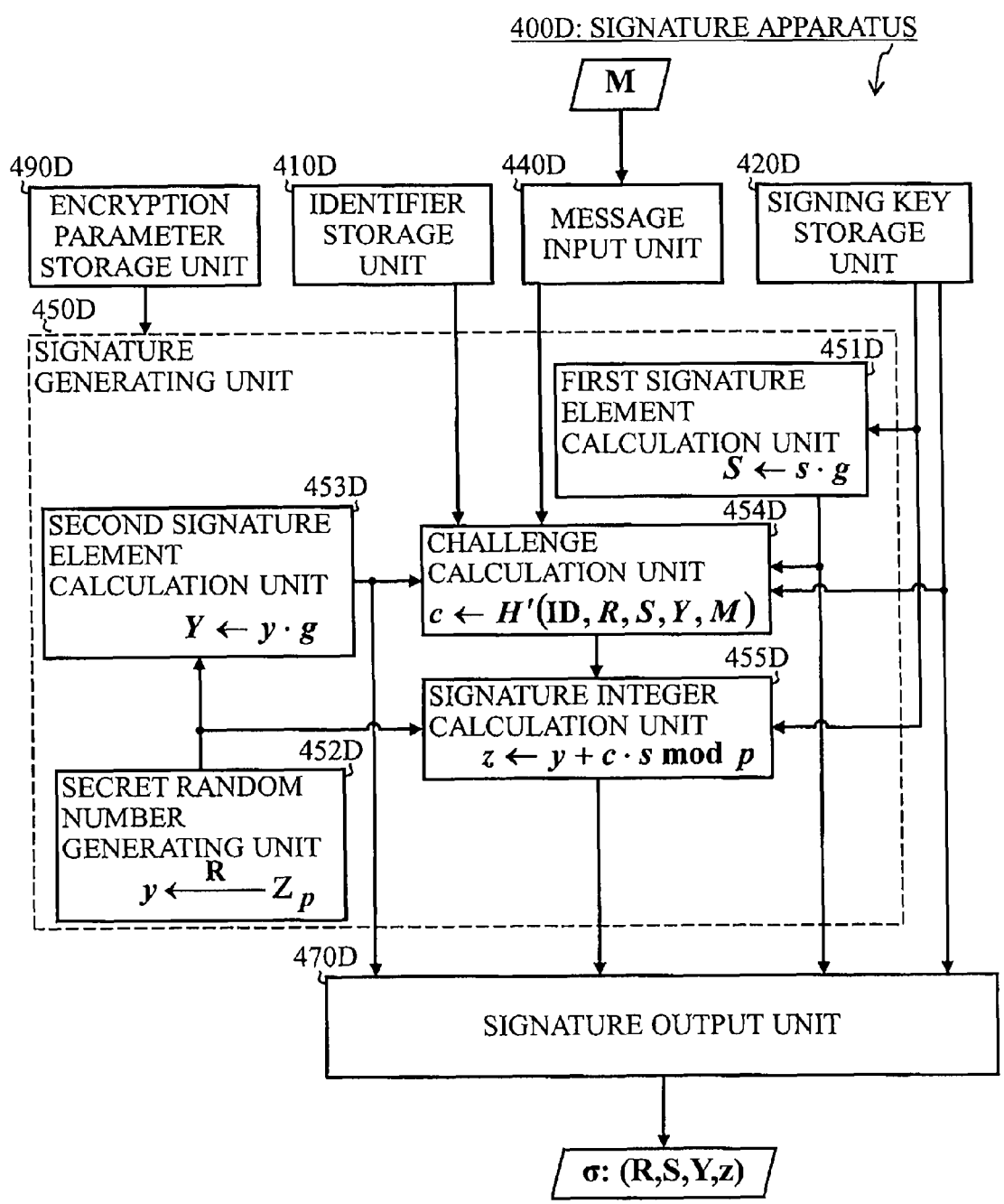
FIG. 31 is a block diagram showing a configuration example of the function block of the signature apparatus 400D according to the fifth embodiment.
Figure 32:
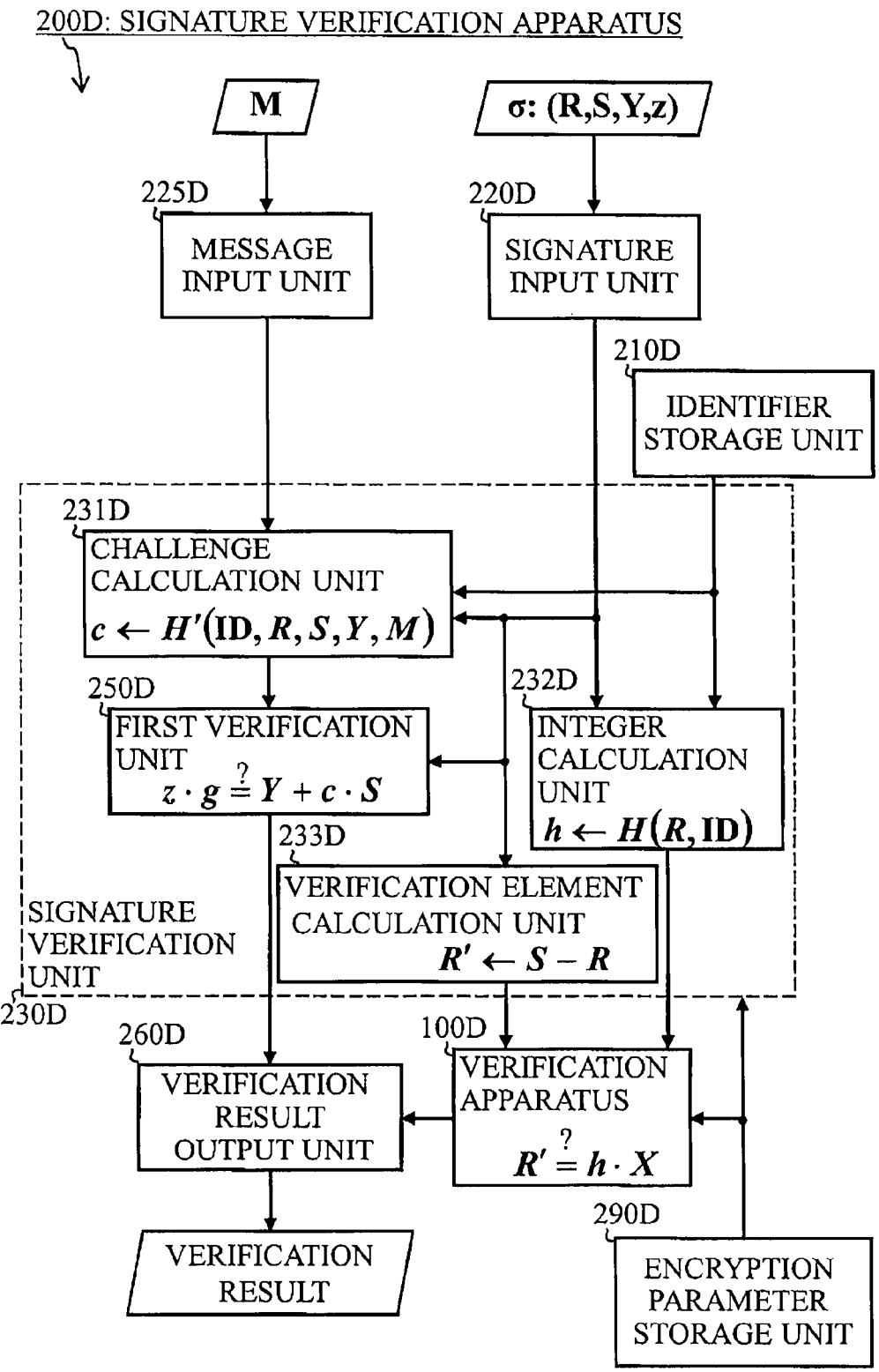
FIG. 32 is a block diagram showing a configuration example of the function block of the signature verification apparatus 200D according to the fifth embodiment.
Figure 33:
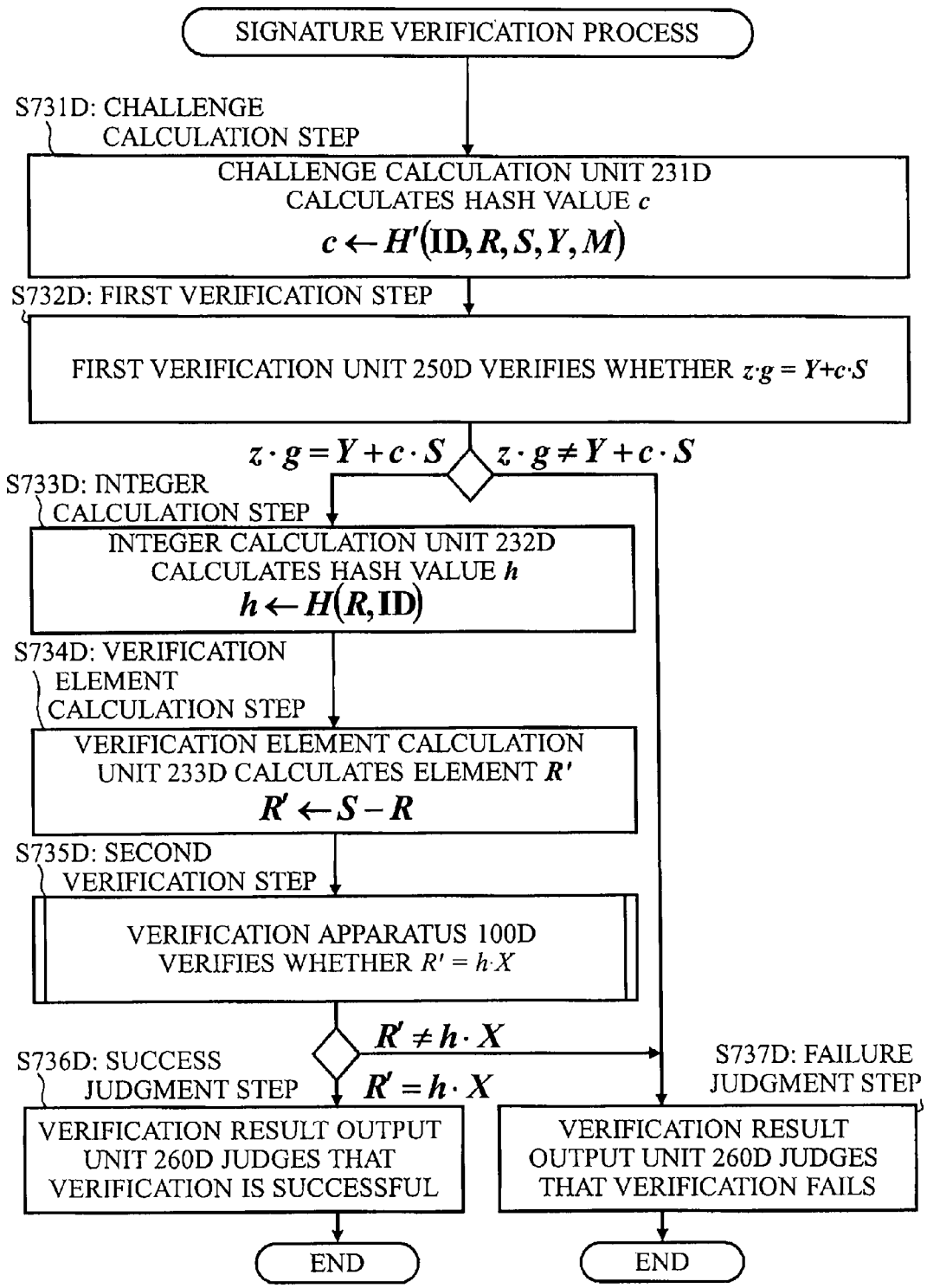
FIG. 33 is a flowchart showing an example of the flow of the signature verification process used by the signature verification apparatus 200D according to the fifth embodiment to verify the signature σ.
Figure 34:
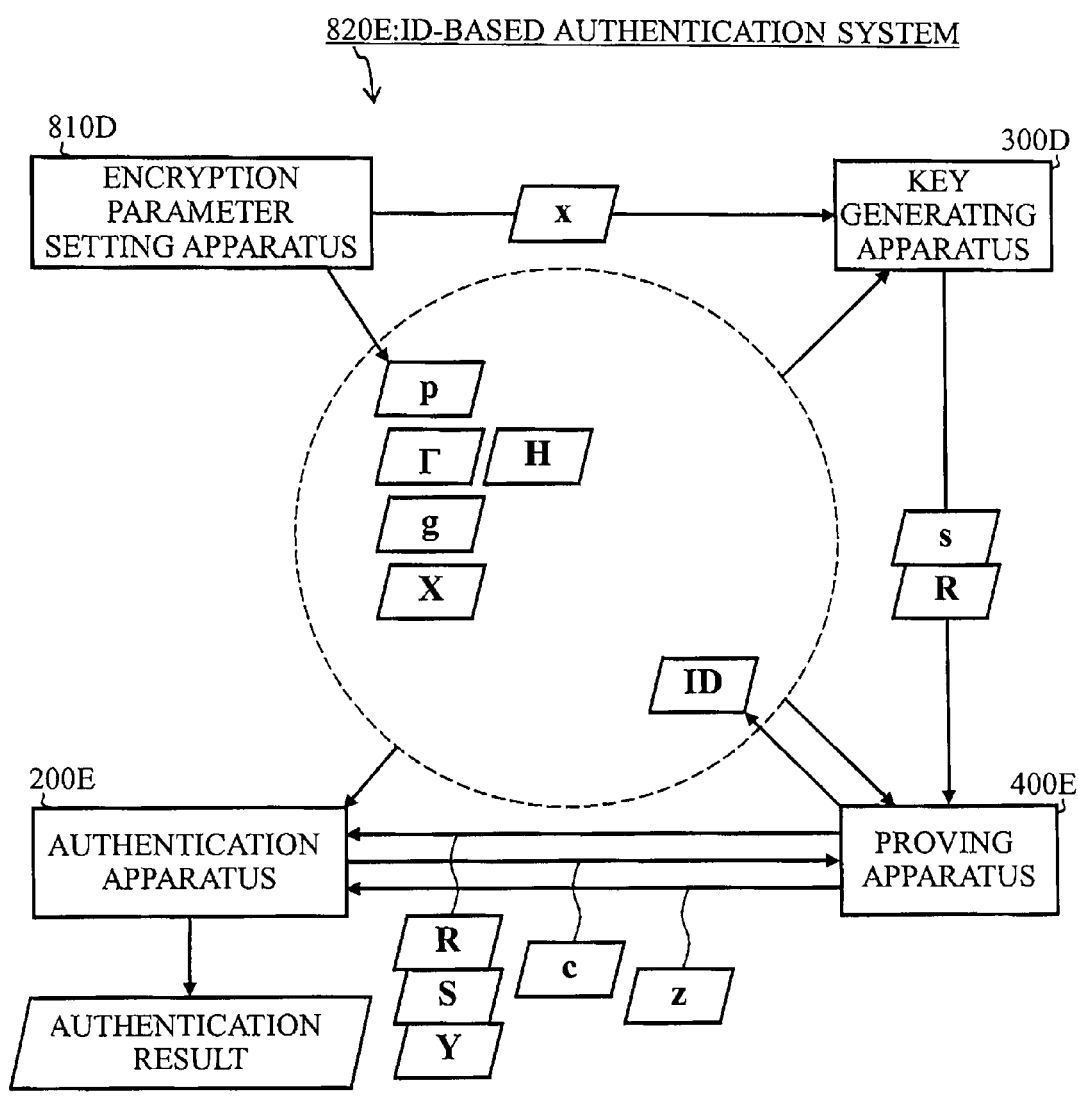
FIG. 34 shows an example of the entire system configuration of the ID-based authentication system 820E according to the sixth embodiment.
Figure 35:
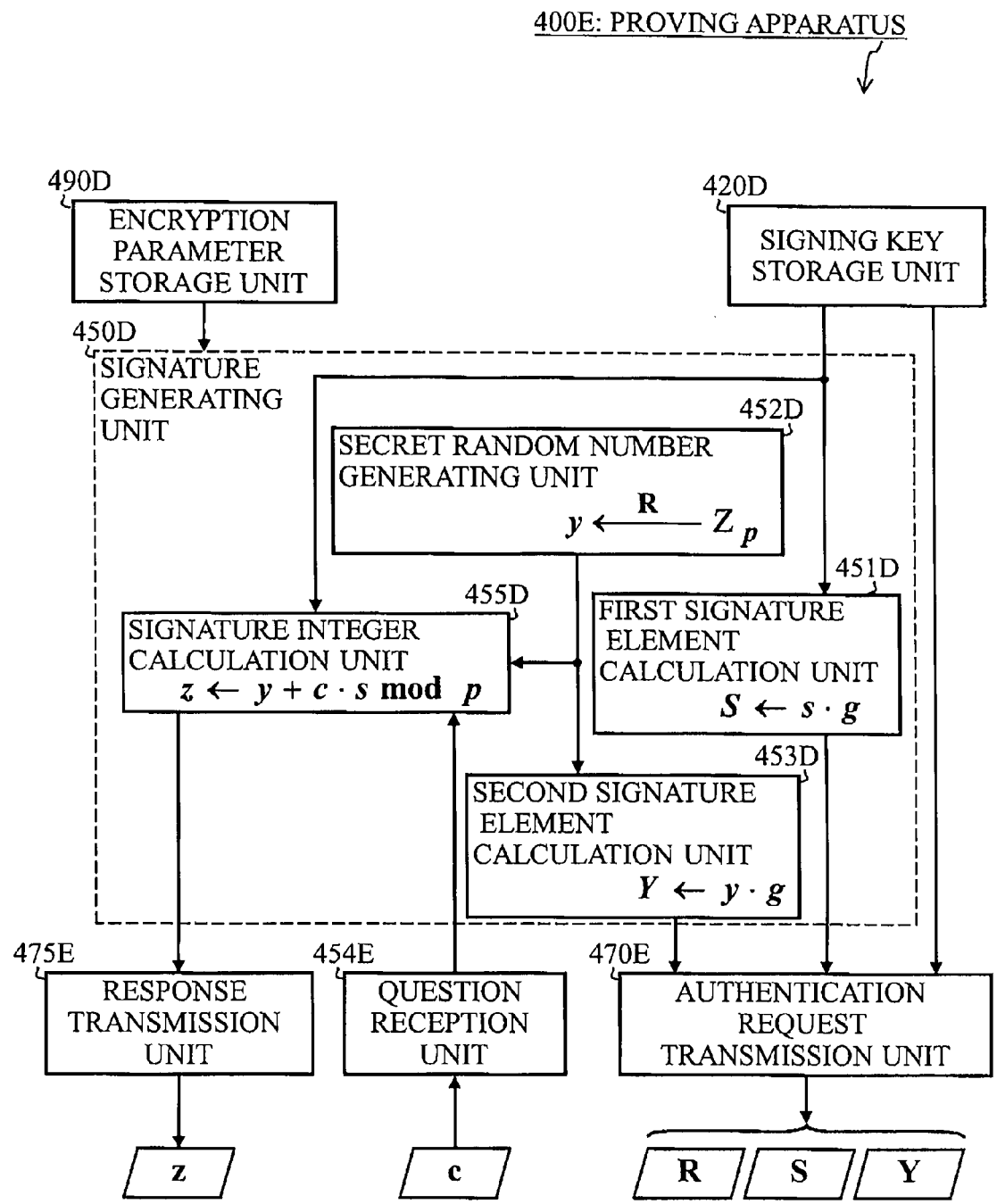
FIG. 35 shows a block diagram showing a configuration example of the function block of the proving apparatus 400E according to the sixth embodiment.
Figure 36:
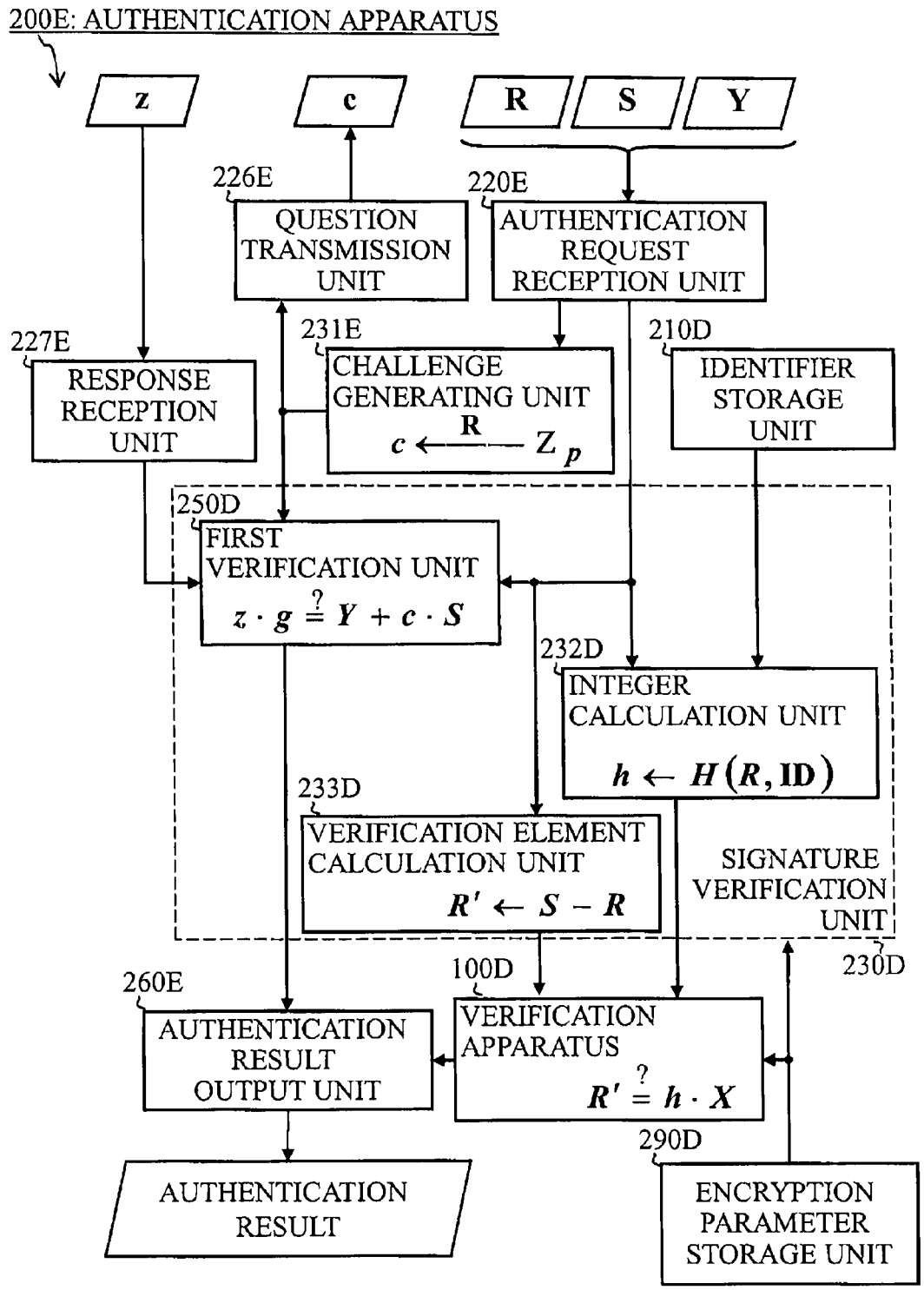
FIG. 36 is a block diagram showing a configuration example of the function block of the authentication apparatus 200E according to the sixth embodiment.
Figure 37:
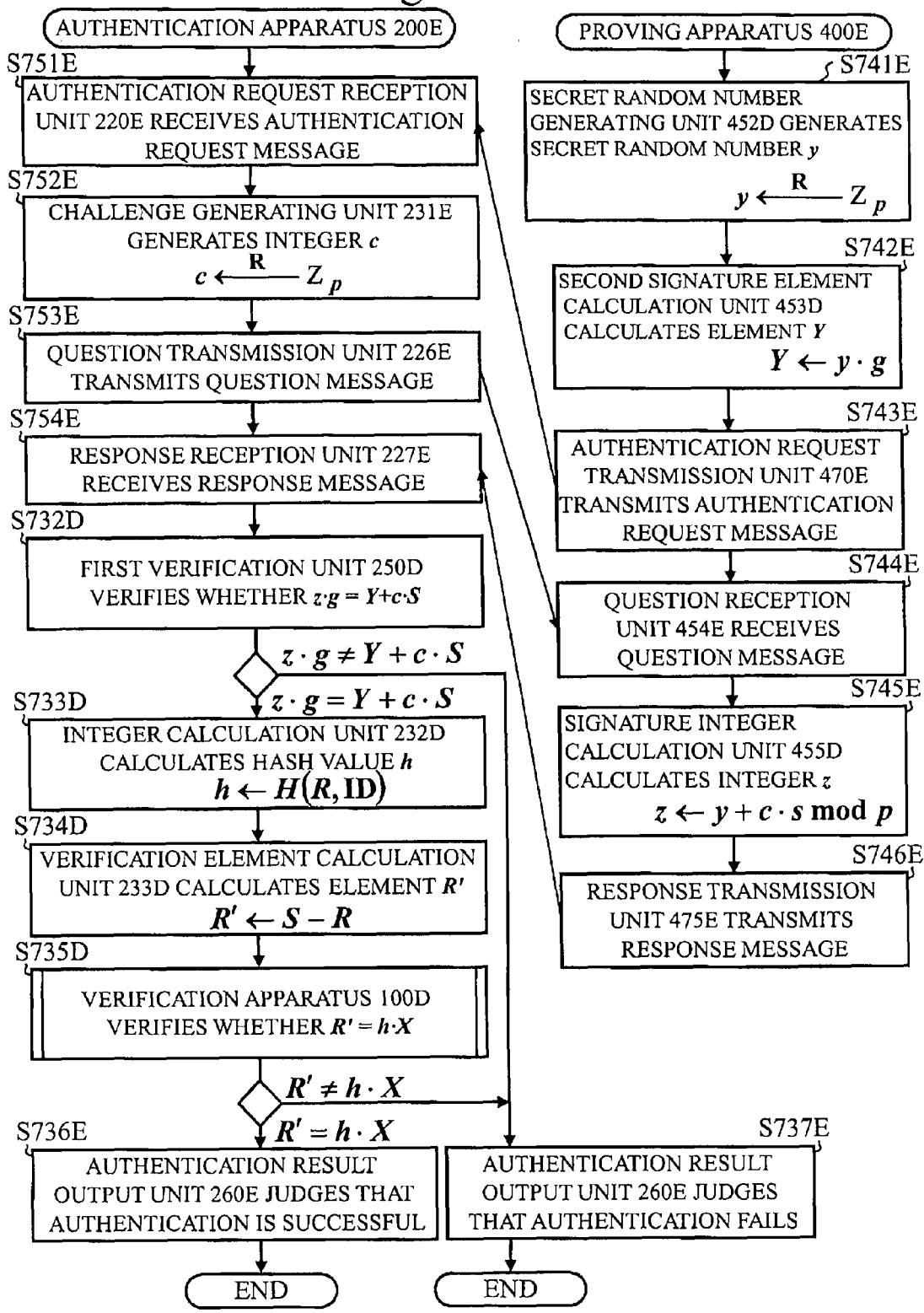
FIG. 37 is a flowchart showing an example of the authentication process used by the authentication apparatus 200E according to the sixth embodiment to authenticate the signature apparatus 400E.

| Explanation of Signs | |
|---|---|
| 100, 100A, 100B, 100C, 100D: | verification apparatus |
| 110, 110C: | integer partitioning unit |
| 111: | order input unit |
| 112: | integer input unit |
| 113: | initial value setting unit |
| 114: | first remainder storage unit |
| 115: | second remainder storage unit |
| 116: | conformity judging unit |
| 117: | third remainder calculation unit |
| 124: | first coefficient storage unit |
| 125: | second coefficient storage unit |
| 126: | quotient calculation unit |
| 127: | third coefficient calculation unit |
| 129: | partitioned integer output unit |
| 130, 130C: | verification value calculation unit |
| 131: | partitioned integer input unit |
| 132: | element input unit |
| 133: | index calculation unit |
| 134: | table generating unit |
| 135: | table storage unit |
| 141: | verification initial value setting unit |
| 142: | multiplication result storage unit |
| 143: | double-base addition unit |
| 144: | addition result storage unit |
| 145: | multiplication unit |
| 149: | verification value output unit |
| 150, 150C: | verification judging unit |
| 200, 200A, 200B, 200C: | ciphertext decryption apparatus |
| 200D: | signature verification apparatus |
| 200E: | authentication apparatus |
| 210, 210A, 210B, 210C: | key storage unit |
| 210D: | identifier storage unit |
| 220, 220A, 220B, 220C: | ciphertext input unit |
| 220D: | signature input unit |
| 225D: | message input unit |
| 220E: | authentication request reception unit |
| 226E: | question transmission unit |
| 227E: | response reception unit |
| 230, 230A, 230B, 230C: | ciphertext verification unit |
| 230D: | signature verification unit |
| 231A: | pairing value calculation unit |
| 232A: | bit string calculation unit |
| 233A: | integer calculation unit |
| 231B: | hash value calculation unit |
| 232B: | integer calculation unit |
| 231C: | pairing value calculation unit |
| 232C: | integer calculation unit |
| 231D: | challenge calculation unit |
| 232D: | integer calculation unit |
| 233D: | verification element calculation unit |
| 231E: | challenge generating unit |
| 241A: | identifier storage unit |
| 242A: | identifier element calculation unit |
| 243A: | identifier element storage unit |
| 250D: | first verification unit |
| 260, 260A, 260B, 260C: | decrypted text generating unit |
| 260D: | verification result output unit |
| 260E: | authentication result output unit |
| 261B: | secret element calculation unit |
| 262B: | common key calculation unit |
| 270A, 270B: | common key storage unit |
| 281A, 281B: | encrypted message input unit |
| 282A, 282B: | message decryption unit |
| 283A, 283B, 283C: | decrypted message output unit |
| 290A, 290B, 290C, 290D, 390A, 390B, 390C, 390D, 490A, 490B, 490C, 490D, | encryption parameter storage unit |
| 819A, 819C, 819D: | key generating apparatus |
| 300A, 300B, 300C, 300D: | |
| 330A: | secret random number storage unit |
| 330C, 330D: | master key storage unit |
| 340A, 340C, 340D: | identifier input unit |
| 350A, 350B, 350C: | secret key generating unit |
| 350D: | signing key generating unit |
| 351A: | hash value calculation unit |
| 352A: | integer addition unit |
| 353A: | inverse number calculation unit |
| 354A: | secret key calculation unit |
| 351B, 352B, 353B, 354B: | secret random number generating unit |
| 351C: | secret random number generating unit |
| 352C: | first secret element calculation unit |
| 353C: | second secret element calculation unit |
| 351D: | secret random number generating unit |
| 352D: | key element calculation unit |
| 353D: | key integer calculation unit |
| 360A, 360B, 360C: | secret key output unit |
| 360D: | signing key output unit |
| 370B: | public key generating unit |
| 371B, 372B, 373B, 374B: | public element calculation unit |
| 380B: | public key output unit |
| 400A, 400B, 400C: | ciphertext generating apparatus |
| 400D: | signature apparatus |
| 400E: | proving apparatus |
| 410A, 410C, 410D: | identifier storage unit |
| 410B: | public key storage unit |
| 420A, 420B: | common key generating unit |
| 420D: | signing key storage unit |
| 421A: | secret bit string generating unit |
| 422A: | secret integer calculation unit |
| 423A: | identifier element calculation unit |
| 424A: | cipher element calculation unit |
| 425A: | secret pairing value calculation unit |
| 426A: | cipher bit string calculation unit |
| 427A: | common key calculation unit |
| 421B: | secret random number generating unit |
| 422B: | first cipher element calculation unit |
| 423B: | second cipher element calculation unit |
| 424B: | hash value calculation unit |
| 425B: | integer calculation unit |
| 426B: | third cipher element calculation unit |
| 427B: | secret element calculation unit |
| 428B: | common key calculation unit |
| 430A, 430B: | common key storage unit |
| 440A, 440B, 440C, 440D: | message input unit |
| 450A, 450B, 450C: | message encryption unit |
| 450D: | signature generating unit |
| 451C: | secret random number generating unit |
| 452C: | pairing value calculation unit |
| 453C: | cipher bit string calculation unit |
| 454C: | first cipher element calculation unit |
| 455C: | second cipher element calculation unit |
| 456C: | cipher integer calculation unit |
| 451D: | first signature element calculation unit |
| 452D: | secret random number generating unit |
| 453D: | second signature element calculation unit |
| 454D: | challenge calculation unit |
| 455D: | signature integer calculation unit |
| 454E: | question reception unit |
| 460A, 460B: | encrypted message output unit |
| 470A, 470B, 470C: | ciphertext output unit |
| 470D: | signature output unit |
| 470E: | authentication request transmission unit |
| 475E: | response transmission unit |
| 810A, 810B, 810C, 810D: | encryption parameter setting apparatus |
| 811A: | public element generating unit |
| 812A: | secret random number generating unit |
| 813A: | public element calculation unit |
| 814A: | secret random number output unit |
| 815A: | public element output unit |
| 812C: | master key generating unit |
| 813C: | public parameter generating unit |
| 814C: | master key output unit |
| 815C: | public parameter output unit |
| 816C, 817C, 818C: | secret random number generating unit |
| 831C: | first public element calculation unit |

-continued

| Explanation of Signs | |
|---|---|
| 832C: | public pairing value calculation unit |
| 833C: | second public element calculation unit |
| 812D: | secret random number generating unit |
| 813D: | public element calculation unit |
| 814D: | master key output unit |
| 815D: | public parameter output unit |
| 820A, 820C: | ID-based public key cryptographic system |
| 820B: | public key cryptographic system |
| 820D: | ID-based signature system |
| 820E: | ID-based authentication system |
| 901: | display device |
| 902: | keyboard |
| 903: | mouse |
| 904: | FDD |
| 905: | CDD |
| 906: | printer |
| 907: | scanner |
| 910: | system unit |
| 911: | CPU |
| 912: | bus |
| 913: | ROM |
| 914: | RAM |
| 915: | communication device |
| 920: | magnetic disk drive |
| 921: | OS |
| 922: | window system |
| 923: | program group |
| 924: | file group |
| 931: | telephone |
| 932: | facsimile machine |
| 940: | Internet |
| 941: | gateway |
| 942: | LAN |

The invention claimed is:

1. A verification apparatus comprising a processing device, an integer partitioning unit, a verification value calculation unit, and a verification judging unit,
    wherein, using the processing device, the integer partitioning unit inputs an order p of a finite group G and an integer e, the order p and the integer e being calculated based on a ciphertext, and calculates an integer $e_1$ and an integer $e_2$ that satisfy $e_1 \cdot e \equiv e_2 \pmod{p}$ based on the order p and the integer e which are input,
    wherein, using the processing device, the verification value calculation unit inputs an element s of the finite group G and an element h of the finite group G, the element s and the element h being calculated based on the ciphertext, and calculates an element $a(=e_1 \cdot h - e_2 \cdot s)$ of the finite group G based on the element s and the element h which are input and the integer $e_1$ and the integer $e_2$ which are calculated by the integer partitioning unit, and
    wherein the verification judging unit judges, using the processing device and based on the element a calculated by the verification value calculation unit, that verification of the ciphertext is successful when the element a is an identity element of the finite group G.

2. The verification apparatus according to claim 1, wherein the integer partitioning unit calculates, using the processing device, the integer $e_1$ and the integer $e_2$ that satisfy a condition that an absolute value of the integer $e_1$ is smaller than a square root of the order p and that the integer $e_2$ is smaller than a square root of the order p.

3. The verification apparatus according to claim 2, further comprising a storage device,
    wherein the integer partitioning unit has a first remainder storage unit, a second remainder storage unit, an initial value setting unit, a conformity judging unit, a third remainder calculation unit, and a partitioned integer output unit,
    wherein the first remainder storage unit stores an integer $v_1$ using the storage device,
    wherein the second remainder storage unit stores an integer $v_2$ using the storage device,
    wherein the initial value setting unit causes, using the processing device, the first remainder storage unit to store the order p as the integer $v_1$, and the second remainder storage unit to store the integer e as the integer $v_2$,
    wherein the conformity judging unit judges, using the processing device, that the output condition is satisfied when the integer $v_2$ stored by the second remainder storage unit is smaller than the square root of the order p,
    wherein, when the conformity judging unit does not judge that the output condition is satisfied, the third remainder calculation unit calculates, using the processing device and based on the integer $v_1$ stored by the first remainder storage unit and the integer $v_2$ stored by the second remainder storage unit, a remainder obtained when the integer $v_1$ is divided by the integer $v_2$, and treats the remainder as an integer $v_3$, causes the first remainder storage unit to store the integer $v_2$ stored by the second remainder storage unit as the integer $v_1$, and causes the second remainder storage unit to store the integer $v_3$ calculated as the integer $v_2$, and
    wherein, when the conformity judging unit judges that the output condition is satisfied, the partitioned integer output unit outputs, using the processing device, the integer $v_2$ stored by the second remainder storage unit as the integer $e_2$.

4. The verification apparatus according to claim 3,
    wherein the integer partitioning unit further comprises a first coefficient storage unit, a second coefficient storage unit, a quotient calculation unit, and a third coefficient calculation unit,
    wherein the first coefficient storage unit stores an integer $t_1$ using the storage device,
    wherein the second coefficient storage unit stores an integer $t_2$ using the storage device,
    wherein the initial value setting unit, using the processing device, further causes the first coefficient storage unit to store 0 as the integer $t_1$, and the second coefficient storage unit to store 1 as the integer $t_2$,
    wherein the quotient calculation unit, using the processing device and based on the integer $v_1$ stored by the first remainder storage unit and the integer $v_2$ stored by the second remainder storage unit, calculates a maximum integer that does not exceed a quotient obtained when the integer $v_1$ is divided by the integer $v_2$, and treats the integer calculated as an integer q,
    wherein, when the conformity judging unit does not judge that the output condition is satisfied, the third coefficient calculation unit calculates, using the processing device and based on the integer $t_1$ stored by the first coefficient storage unit, the integer $t_2$ stored by the second coefficient storage unit, and the integer q calculated by the quotient calculation unit, an integer obtained by subtracting a product of the integer $t_2$ and the integer q from the integer $t_1$ and treats the integer calculated as an integer $t_3$, causes the first coefficient storage unit to store the integer $t_2$ stored by the second coefficient storage unit as the integer $t_1$, and causes the second coefficient storage unit to store the integer $t_3$ calculated as the integer $t_2$, and wherein, using the processing device, when the conformity judging unit judges that the output condition is satisfied, the partitioned integer output unit further outputs the integer $t_2$ stored by the second coefficient storage unit as the integer $e_1$.

5. The verification apparatus according to claim 1,
wherein the verification value calculation unit calculates $\Sigma(n^i \cdot P_i)$ using the processing device (where n is a predetermined integer not less than 2, i is an integer not less than 0 and not more than k, k is a maximum value of numbers of digits of an absolute value of the integer $e_1$ and of the integer $e_2$, both expressed in base-n notation, $P_i$ is an element of the finite group G and satisfies $P_i = e_{1,sgn} \cdot e_{1,i} \cdot h - e_{2,i} \cdot s$, $e_{1,sgn}$ is one of 1 and −1, and $e_{1,i}$ and $e_{2,i}$ are integers each not less than 0 and not more than n−1 and satisfying $e_1 = e_{1,sgn} \cdot \Sigma(n^i \cdot e_{1,i})$ and $e_2 = \Sigma(n^i \cdot e_{2,i})$), and treats the value calculated as the element a of the finite group G.

6. A ciphertext decryption apparatus comprising a storage device, a processing device, a key storage unit, a ciphertext input unit, a ciphertext verification unit, verification apparatus according to claim 1, and a decrypted text generating unit,
wherein the key storage unit stores, using the storage device, a key for decrypting a ciphertext,
wherein the ciphertext input unit inputs, using the processing device, the ciphertext,
wherein the ciphertext verification unit calculates, using the processing device, the integer e, the element s of the finite group G, and the element h of the finite group G, which are to be input by the verification apparatus, based on the key stored by the key storage unit and the ciphertext input by the ciphertext input unit,
wherein the verification apparatus inputs the integer e, the element s of the finite group G, and the element h of the finite group G, which are calculated by the ciphertext verification unit, and the verification apparatus judges whether or not verification of the ciphertext is successful, and
wherein, when the verification apparatus judges that the verification is successful, the decrypted text generating unit decrypts, using the processing device, the ciphertext input by the ciphertext input unit using the key stored by the key storage unit, to generate a decrypted text.

7. The ciphertext decryption apparatus according to claim 6, further comprising an encryption parameter storage unit, an identifier storage unit, an identifier element calculation unit, and an identifier element storage unit,
wherein, using the storage device, the encryption parameter storage unit stores the order p of the finite group G, a generator $g_1$ of the finite group G, and an element R of the finite group G,
wherein, using the storage device, the identifier storage unit stores a bit string ID that identifies the ciphertext decryption apparatus, wherein, using the processing device, based on the bit string ID stored by the identifier storage unit, the identifier element calculation unit calculates a hash value which is obtained when the bit string ID is hashed by a predetermined hash function $H_1$, and treats the hash value calculated as an integer $H_1(ID)$, and based on the generator $g_1$ stored by the encryption parameter storage unit, the element R stored by the encryption parameter storage unit, and the integer $H_1(ID)$ calculated, the identifier element calculation unit adds the element R to an element which is obtained when the generator $g_1$ is multiplied by the integer $H_1(ID)$, and treats a result as an element $Q(=R+H_1(ID) \cdot g_1)$ of the finite group G,
wherein, using the storage device, the identifier element storage unit stores the element Q calculated by the identifier element calculation unit,
wherein, using the storage device, the key storage unit stores an element $D_{ID}$ of finite group $G_2$,
wherein, using the processing device, the ciphertext input unit inputs an element U of the finite group G and a bit string V as a ciphertext,
wherein the ciphertext verification unit has the pairing value calculation unit, a bit string calculation unit, and an integer calculation unit,
wherein, using the processing device and based on the element U input by the ciphertext input unit and the element $D_{ID}$ stored by the key storage unit, the pairing value calculation unit calculates a pairing value of the element U and element $D_{ID}$ by a predetermined pairing function e, and treats the pairing value calculated as a pairing value $\alpha(=e(U,D_{ID}))$,
wherein, using the processing device, based on the pairing value $\alpha$ calculated by the pairing value calculation unit, the bit string calculation unit calculates a hash value which is obtained when the pairing value $\alpha$ is hashed by a predetermined hash function $H_2$, and treats the hash value calculated as a bit string $H_2(\alpha)$, and based on the bit string V input by the ciphertext input unit and the bit string $H_2(\alpha)$ calculated, the bit string calculation unit obtains an exclusive OR of the bit string V and the bit string $H_2(\alpha)$, and treats the exclusive OR obtained as a bit string m $(=V\ XOR\ H_2(\alpha))$,
wherein, using the processing device and based on the bit string m calculated by the bit string calculation unit, the integer calculation unit calculates a hash value which is obtained when the bit string m is hashed by a predetermined hash function $H_3$, and treats the hash value calculated as an integer r $(=H_3(m))$,
wherein the verification apparatus inputs an order p stored by the encryption parameter storage unit as the order p, the integer r calculated by the integer calculation unit as the integer e, the element Q stored by the identifier element storage unit as the element s, and the element U input by the ciphertext input unit as the element h, and judges whether or not verification is successful, and
wherein, when the verification apparatus judges that the verification is successful, the decrypted text generating unit, using the processing device, calculates, based on the bit string m calculated by the bit string calculation unit, a hash value which is obtained when the bit string m is hashed by a predetermined hash function $H_4$, and treats the hash value calculated as a common key $K(=H_4(m))$, and outputs the common key K calculated as the decrypted text.

8. The ciphertext decryption apparatus according to claim 7, wherein the identifier element calculation unit calculates the element Q before the ciphertext input unit inputs the ciphertext.

9. The ciphertext decryption apparatus according to claim 7, further comprising a common key storage unit, an encrypted message input unit, and a message decryption unit,
wherein, using the storage device, the common key storage unit stores the common key K output by the decrypted text generating unit,
wherein, using the processing device, the encrypted message input unit inputs an encrypted message, and
wherein, using the processing device, the message decryption unit decrypts the encrypted message input by the encrypted message input unit by means of the common key K stored by the common key storage unit.

10. The ciphertext decryption apparatus according to claim 6, further comprising an encryption parameter storage unit,
wherein, using the storage device, the encryption parameter storage unit stores the order p of the finite group G,
wherein, using the storage device, the key storage unit stores an integer w not less than 1 and not more than p−1, an integer x not less than 1 and not more than p−1, an integer y not less than 1 and not more than p−1, and an integer z not less than 1 and not more than p−1,
wherein, using the processing device, the ciphertext input unit inputs an element u of the finite group G, an element u' of the finite group G, and an element v of the finite group G, as the ciphertext,
wherein the ciphertext verification unit has a hash value calculation unit and an integer calculation unit,
wherein, using the processing device and based on the element u and element u' input by the ciphertext input unit, the hash value calculation unit calculates a hash value which is obtained when the element u and the element u' are hashed by a predetermined hash function H, and treats the hash value calculated as an integer $\alpha (=H(u,u'))$,
wherein, using the processing device, and based on the order p stored by the encryption parameter storage unit, the integer x and integer y stored by the key storage unit, and the integer $\alpha$ calculated by the hash value calculation unit, the integer calculation unit calculates a remainder which is obtained when a sum of the integer x and a product of the integer y and integer $\alpha$ is divided by the order p, and treats the remainder calculated as an integer $t (=(x+y\cdot\alpha) \bmod p)$,
wherein the verification apparatus inputs the order p stored by the encryption parameter storage unit as the order p, the integer w stored by the key storage unit as the integer e, the element u input by the ciphertext input unit as the element s, and the element u' input by the ciphertext input unit as the element h, judges whether or not the verification is successful, and treats a judgment result as a first verification result, and the verification apparatus inputs the order p stored by the encryption parameter storage unit, the integer t stored by the integer calculation unit as the integer e, the element u input by the ciphertext input unit as the element s, and the element v input by the ciphertext input unit as the element h, judges whether or not the verification is successful, and treats a judgment result as a second verification result, and
wherein, when both the first verification result and the second verification result show that the verification apparatus judges the verification successful, using the processing device, based on the integer z stored by the key storage unit and the element u input by the ciphertext input unit, the decrypted text generating unit adds z times the element u, and treats a result as the element $h(=z\cdot u)$ of the finite group G, and based on the element u input by the ciphertext input unit and an element $\tilde{h}$ calculated, the decrypted text generating unit generates the common key $K(=KDF(u,\tilde{h}))$ from the element u and the element $\tilde{h}$ by a predetermined key derivation function KDF, and outputs the common key K generated as the decrypted text.

11. The ciphertext decryption apparatus according to claim 10, further comprising a common key storage unit, an encrypted message input unit, and a message decryption unit,
wherein, using the storage device, the common key storage unit stores the common key K output by the decrypted text generating unit,
wherein, using the processing device, the encrypted message input unit inputs an encrypted message, and
wherein, using the processing device and by means of the common key K stored by the common key storage unit, the message decryption unit decrypts the encrypted message input by the encrypted message input unit.

12. The ciphertext decryption apparatus according to claim 6, further comprising an encryption parameter storage unit,
wherein, using the storage device, the encryption parameter storage unit stores an order p of an additive group $G_1$, a generator g of the additive group $G_1$, and an element $v_0$ of a multiplicative group $G_T$ whose order is the order p,
wherein, using the storage device, the key storage unit stores an element $d_0$ of an additive group $G_2$ whose order is the order p, and an element $d_1$ of the additive group $G_2$,
wherein, using the processing device, the ciphertext input unit inputs a bit string c, an element $c_0$ of the additive group $G_1$, an element $c_1$ of the additive group $G_1$, and an integer t not less than 1 and not more than p−1, as the ciphertext,
wherein the ciphertext verification unit has a pairing value calculation unit and an integer calculation unit,
wherein, using the processing device, based on the element $c_0$ input by the ciphertext input unit and the element $d_0$ stored by the secret key storage unit, the pairing value calculation unit calculates a pairing value of the element $c_0$ and element $d_0$ by a predetermined pairing function e, and treats the value calculated as an element $k_0 (=e(c_0,d_0))$ of the multiplicative group $G_T$, based on the element $c_1$ input by the ciphertext input unit and the element $d_1$ stored by the secret key storage unit, the pairing value calculation unit calculates a pairing value of the element $c_1$ and element $d_1$ by the pairing function e, and treats the value calculated as an element $k_1 (=e(c_1,d_1))$ of the multiplicative group $G_T$, and based on the element $k_0$ calculated and the element $k_1$ calculated, the pairing value calculation unit divides the element $k_0$ by the element $k_1$, and treats an element obtained as an element $k (=k_0/k_1)$ of the multiplicative group $G_T$,
wherein, using the processing device, based on the element k calculated by the pairing value calculation unit, and the bit string c, element $c_0$, and element $c_1$ input by the ciphertext input unit, the integer calculation unit calculates a hash value which is obtained when the element k, bit string c, element $c_0$, and element $c_1$ are hashed by a predetermined hash function H", and treats a value calculated as an integer $H"(k,c,c_0,c_1)$, and based on the integer t input by the ciphertext input unit, the integer $H"(k,c,c_0,c_i)$ calculated, and the order p stored by the encryption parameter storage unit, the integer calculation unit calculates a remainder which is obtained when an integer obtained by subtracting the integer $H"(k,c,c_0,c_i)$ from the integer t is divided by the order p, and treats the remainder calculated as an integer $s (=t-H"(k,c,c_0,c_i) \bmod p)$,
wherein the verification apparatus treats the additive group $G_1$ as the finite group G, and inputs the order p stored by the encryption parameter storage unit, as the order p, the integer s calculated by the integer calculation unit, as the integer e, the generator g stored by the encryption parameter storage unit, as the element s, and the element $c_0$ input by the ciphertext input unit, as the element h, the verification apparatus judges whether or not the verification is successful, and treats a result as a first verification result, the verification apparatus treats the multiplicative group $G_T$ as the finite group G, and inputs the order p stored by the encryption parameter storage unit, as the order p, the integer s calculated by the integer calculation unit, as the integer e, the element $v_0$ stored by the encryption parameter storage unit, as the element s, and the element k calculated by the pairing value calculation unit, as the element h, and the verification apparatus judges whether or not the verification is successful, and treats a result as a second verification result, and wherein, when both the first verification result and the second verification result show that the verification apparatus judges the verification successful, using the processing device, based on the element k calculated by the pairing value calculation unit, the decrypted text generating unit calculates a hash value which is obtained when the element k is hashed by a hash function H', and treats the value calculated as a bit string H'(k), based on the bit string c input by the ciphertext input unit and the bit string H'(k) calculated, the decrypted text generating unit obtains an exclusive OR of the bit string c and the hash value H'(k), and treats a result as a bit string M'(=c XOR H'(k)), and the decrypted text generating unit outputs the calculated bit string M' as the decrypted text.

13. A signature verification apparatus comprising a processing device, a message input unit, a signature input unit, a signature verification unit, a verification apparatus according to claim 1, and a verification result output unit, wherein, using the processing device, the message input unit inputs a message, wherein, using the processing device, the signature input unit inputs a signature for the message input by the message input unit, wherein, using the processing device and based on the message input by the message input unit and the signature input by the signature input unit, the signature verification unit calculates the integer e, the element s of the finite group G, and the element h of the finite group G, which are to be input to the verification apparatus, wherein the verification apparatus inputs the integer e, the element s of the finite group G, and the element h of the finite group G, which are calculated by the signature verification unit, and judges whether or not verification of the signature, which is a ciphertext, is successful, and wherein, using the processing device and based on a verification result of the verification apparatus, the verification result output unit outputs a verification result indicating whether or not the verification is successful.

14. The signature verification apparatus according to claim 13, further comprising a storage device which stores data, an encryption parameter storage unit, and an identifier storage unit, wherein, using the storage device, the encryption parameter storage unit stores an order p of the finite group G, a generator g of the finite group G, and an element X of the finite group G, wherein, using the storage device, the identifier storage unit stores a bit string ID that identifies a signature apparatus, wherein, using the processing device, the message input unit inputs a bit string M as the message, wherein, using the processing device, the signature input unit inputs an element R of the finite group G, an element S of the finite group G, an element Y of the finite group G, and an integer z not less than 1 and not more than p−1, as the signature, wherein the signature verification unit has an integer calculation unit, a verification element calculation unit, a challenge calculation unit, and a first verification unit, wherein, using the processing device and based on the element R input by the signature input unit and the bit string ID stored by the identifier storage unit, the integer calculation unit calculates a hash value which is obtained when the element R and the bit string ID are hashed by a predetermined hash function H, and treats the value calculated as an integer h(=H(R,ID)), wherein, using the processing device and based on the element R and element S input by the signature input unit, the verification element calculation unit adds the element S and an inverse element of the element R, and treats a sum as an element R'(=S−R) of the finite group G, wherein, using the processing device and based on the bit string ID stored by the identifier storage unit, the element R, element S, and element Y input by the signature input unit, and the bit string M input by the message input unit, the challenge calculation unit calculates a hash value which is obtained when the bit string ID, the element R, the element S, the element Y, and the bit string M are hashed by a predetermined hash function H', and treats the value calculated as an integer c(=H'(I, R,S,Y,M)), wherein, using the processing device and based on the generator g stored by the encryption parameter storage unit, the element S, element Y, and integer z input by the signature input unit, and the integer c calculated by the challenge calculation unit, the first verification unit judges whether or not an element Y+c·S, obtained by adding the element Y and an element c·S which is obtained when the element S is added a number of times of the integer c, is equal to an element z·g obtained when the generator g is added a number of times of the integer z, and when the element Y+c·S and the element z·g are equal, the first verification unit judges that the verification is successful, and treats a judgment result as a first verification result, wherein the verification apparatus inputs an order p stored by the encryption parameter storage unit, as the order p, the integer h calculated by the integer calculation unit, as the integer e, the element X stored by the encryption parameter storage unit, as the element s, and the element R' calculated by the verification element calculation unit, as the element h, judges whether or not the verification is successful, and treats a judgment result as a second verification result, and wherein, using the processing device and based on the first verification result of the verification by the first verification unit and the second verification result of the verification by the verification apparatus, when both the first verification result and the second verification result show that the verification is judged successful, the verification result output unit outputs a verification result indicating that the verification is successful.

15. An authentication apparatus comprising a processing device, a transmission device, a reception device an authentication request reception unit, a question transmission unit, a response reception unit, a signature verification unit, a verification apparatus according to claim 1, and an authentication result output unit, wherein, using the reception device, the authentication request reception unit receives an authentication request message, wherein, using the transmission device, the question transmission unit transmits a question message as a response to the authentication request message received by the authentication request reception unit, wherein, using the reception device, the response reception unit receives the response message to the question message transmitted, wherein, using the processing device and based on the authentication request message received by the authentication request reception unit and the response message received by the response reception unit, the signature verification unit calculates the integer e, the element s of the finite group G, and the element h of the finite group G which are to be input to the verification apparatus, wherein the verification apparatus inputs the integer e, the element s of the finite group G, and the element h of the finite group G which are calculated by the signature verification unit, and judges whether or not verification of the authentication request message, which is a ciphertext, is successful, and wherein, using the processing device and based on a verification result of the verification apparatus, the authentication result output unit outputs an authentication result indicating whether or not the verification is successful.

16. The authentication apparatus according to claim 15, further comprising a storage device, an encryption parameter storage unit, an identifier storage unit, and a challenge generating unit, wherein, using the storage device, the encryption parameter storage unit stores an order p of the finite group G, a generator g of the finite group G, and an element X of the finite group G, wherein, using the storage device, the identifier storage unit stores a bit string ID which identifies a proving apparatus, wherein, using the reception device, the authentication request reception unit receives an element R of the finite group G, an element S of the finite group G, and an element Y of the finite group G from the proving apparatus as the authentication request message, wherein, using the processing device, the challenge generating unit randomly generates an integer c not less than 1 and not more than p−1, wherein, using the transmission device, the question transmission unit transmits the integer c generated by the challenge generating unit to the proving apparatus as the question message, wherein, using the reception device, the response reception unit receives an integer z not less than 1 and not more than p−1 from the proving apparatus as the response message, wherein the signature verification unit has an integer calculation unit, a verification element calculation unit, and a first verification unit, wherein, using the processing device and based on the element R received by the authentication request reception unit and the bit string ID stored by the identifier storage unit, the integer calculation unit calculates a hash value which is obtained when the element R and the bit string ID are hashed by a predetermined hash function H, and treats the hash value calculated as an integer h (=H(R,ID)), wherein, using the processing device and based on the element R and element S received by the authentication request reception unit, the verification element calculation unit adds the element S and an inverse element of the element R, and treats a sum as an element R' of the finite group G, wherein, using the processing device and based on the generator g stored by the encryption parameter storage unit, the element S and element Y received by the authentication request reception unit, the integer c generated by the challenge generating unit, and the integer z received by the response reception unit, the first verification unit judges whether or not an element Y+c·S, which is obtained by adding the element Y and an element c·S obtained when the element S is added c times, is equal to an element z·g which is obtained when the element g is added z times, and when the element Y+c·S and the element z·g are equal, the first verification unit judges that verification is successful, and treats a judgment result as a first verification result, wherein the verification apparatus inputs an order p stored by the encryption parameter storage unit, as the order p, the integer h calculated by the integer calculation unit, as the integer e, the element X stored by the encryption parameter storage unit, as the element s, and the element R' calculated by the verification element calculation unit, as the element h, judges whether or not verification is successful, and treats a judgment result as a second verification result, and wherein, using the processing device and based on the first verification result of the verification by the first verification unit and the second verification result of the verification by the verification apparatus, when both the first verification result and the second verification result show that the verification is judged successful, the authentication result output unit outputs an authentication result indicating that authentication is successful.

17. A non-transitory computer readable medium containing a computer program which causes a computer having a processing device to serve as a verification apparatus according to claim 1.

18. A cryptographic system comprising a verification apparatus, wherein the verification apparatus comprises a processing device, an integer partitioning unit, a verification value calculation unit, and a verification judging unit, wherein, using the processing device, the integer partitioning unit inputs an order p of a finite group G and an integer e, the order p and the integer e being calculated based on a ciphertext, and calculates an integer $e_1$ and an integer $e_2$ that satisfy $e_1 \cdot e \equiv e_2 \pmod{p}$ based on the order p and the integer e which are input, wherein, using the processing device, the verification value calculation unit inputs an element s of the finite group G and an element h of the finite group G, the element s and the element h being calculated based on the ciphertext, and calculates an element a ($=e_1 \cdot h - e_2 \cdot s$) of the finite group G based on the element s and the element h which are input and the integer $e_1$ and the integer $e_2$ which are calculated by the integer partitioning unit, and wherein the verification judging unit judges, using the processing device and based on the element a calculated by the verification value calculation unit, that verification of the ciphertext is successful when the element a is an identity element of the finite group G.

19. A verification method used by a verification apparatus wherein the verification apparatus comprises a processing device, an integer partitioning unit, a verification value calculation unit, and a verification judging unit, wherein, using the processing device, the integer partitioning unit inputs an order p of a finite group G and an integer e, the order p and the integer e being calculated based on a ciphertext, and calculates an integer $e_1$ and an integer $e_2$ that satisfy $e_1 \cdot e \equiv e_2 \pmod{p}$ based on the order p and the integer e which are input, wherein, using the processing device, the verification value calculation unit inputs an element s of the finite group G and an element h of the finite group G, the element s and the element h being calculated based on the ciphertext, and calculates an element $a(=e_1 \cdot h - e_2 \cdot s)$ of the finite group G based on the element s and the element h which are input and the integer $e_1$ and the integer $e_2$ which are calculated by the integer partitioning unit, and wherein the verification judging unit judges, using the processing device and based on the element a calculated by the verification value calculation unit, that verification of the ciphertext is successful when the element a is an identity element of the finite group G.

* * * * *